United States Patent
Laroia

(10) Patent No.: US 9,423,588 B2
(45) Date of Patent: Aug. 23, 2016

(54) METHODS AND APPARATUS FOR SUPPORTING ZOOM OPERATIONS

(71) Applicant: The LightCo Inc., Palo Alto, CA (US)

(72) Inventor: Rajiv Laroia, Far Hills, NJ (US)

(73) Assignee: THE LIGHTCO INC., Palo Alto, CA (US)

( * ) Notice: Subject to any disclaimer, the term of this patent is extended or adjusted under 35 U.S.C. 154(b) by 0 days.

(21) Appl. No.: 14/327,524

(22) Filed: Jul. 9, 2014

(65) Prior Publication Data

US 2015/0293328 A1   Oct. 15, 2015

Related U.S. Application Data

(60) Provisional application No. 61/978,818, filed on Apr. 11, 2014, provisional application No. 61/981,849, filed on Apr. 20, 2014, provisional application No. 62/021,094, filed on Jul. 4, 2014, provisional (Continued)

(51) Int. Cl.
*G02B 7/04* (2006.01)
*H04N 5/353* (2011.01)

(Continued)

(52) U.S. Cl.
CPC ................ *G02B 7/04* (2013.01); *G02B 13/009* (2013.01); *G02B 13/0065* (2013.01); *G03B 13/36* (2013.01); *H04N 5/2253* (2013.01); *H04N 5/2254* (2013.01); *H04N 5/2257* (2013.01); *H04N 5/2354* (2013.01);

(Continued)

(58) Field of Classification Search
CPC ........................ H04N 5/23238; G02B 26/0833
See application file for complete search history.

(56) References Cited

U.S. PATENT DOCUMENTS 4,890,133 A   12/1989  Ogawa et al.
5,078,479 A   1/1992   Vuilleumier et al.
(Continued)

FOREIGN PATENT DOCUMENTS

EP   2642757 A2   9/2013
JP   10091765     4/1998
(Continued)

OTHER PUBLICATIONS

International Search Report and Written Opinion of the International Searching Authority from International Application No. PCT/US2014/061254, pp. 1-29, dated Jan. 8, 2015.

(Continued)

*Primary Examiner* — Ahmed A Berhan
(74) *Attorney, Agent, or Firm* — Michael P. Straub; Abbas Zaidi; Ronald P. Straub

(57) ABSTRACT

Methods and apparatus for performing a zoom operation are described using multiple optical chains in a camera device. At least one optical chain in the camera device includes a moveable light redirection device, said light redirection device being one of a substantially plane mirror or a prism. The moveable light redirection device is moved to a position in accordance with a zoom setting, and a portion of a scene area of interest in captured. Different discrete zoom setting values correspond to different positions of the moveable light redirection device resulting in different capture areas. In some embodiments, multiple optical chains with moveable light redirection devices are used to capture different portions of a scene of interest. A composite image is generated from a plurality of captured images corresponding to different optical chains. A higher zoom setting corresponds to more overlap between captured images of different optical chains.

16 Claims, 78 Drawing Sheets

Related U.S. Application Data application No. 61/893,100, filed on Oct. 18, 2013, provisional application No. 61/896,069, filed on Oct. 26, 2013, provisional application No. 61/899,097, filed on Nov. 1, 2013, provisional application No. 61/922,801, filed on Dec. 31, 2013, provisional application No. 61/943,299, filed on Feb. 21, 2014, provisional application No. 61/943,302, filed on Feb. 21, 2014.

(51) Int. Cl.

| | |
|---|---|
| G03B 13/36 | (2006.01) |
| H04N 5/378 | (2011.01) |
| H04N 5/262 | (2006.01) |
| H04N 5/225 | (2006.01) |
| H04N 5/232 | (2006.01) |
| G02B 13/00 | (2006.01) |
| H04N 5/265 | (2006.01) |
| H04N 5/335 | (2011.01) |
| G02B 7/10 | (2006.01) |
| H04N 5/235 | (2006.01) |

(52) U.S. Cl.
CPC ...... *H04N 5/23238* (2013.01); *H04N 5/23296* (2013.01); *H04N 5/265* (2013.01); *H04N 5/2624* (2013.01); *H04N 5/335* (2013.01); *H04N 5/3532* (2013.01); *H04N 5/378* (2013.01); *G02B 7/102* (2013.01)

(56) References Cited

U.S. PATENT DOCUMENTS

| | | | |
|---|---|---|---|
| 5,353,068 A | 10/1994 | Moriwake | |
| 5,781,331 A | 7/1998 | Carr et al. | |
| 5,889,553 A | 3/1999 | Kino et al. | |
| 5,975,710 A * | 11/1999 | Luster | G02B 27/143 359/364 |
| 5,982,951 A | 11/1999 | Katayama et al. | |
| 6,081,670 A | 6/2000 | Madsen et al. | |
| 6,141,034 A | 10/2000 | McCutchen | |
| 7,009,652 B1 | 3/2006 | Tanida et al. | |
| 7,280,735 B2 | 10/2007 | Thibault | |
| 7,315,423 B2 | 1/2008 | Sato | |
| 7,551,358 B2 | 6/2009 | Lee et al. | |
| 7,561,201 B2 | 7/2009 | Hong | |
| 7,810,511 B2 | 10/2010 | Fagrenius et al. | |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura et al. | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ahn et al. | |
| 8,665,341 B2 | 3/2014 | Georgiev et al. | |
| 8,704,944 B1 | 4/2014 | Wierzoch et al. | |
| 8,780,258 B2 | 7/2014 | Lee | |
| 8,896,655 B2 | 11/2014 | Mauchly et al. | |
| 9,041,826 B2 | 5/2015 | Jung et al. | |
| 2002/0149691 A1 | 10/2002 | Pereira et al. | |
| 2003/0020814 A1 | 1/2003 | Ono | |
| 2003/0185551 A1 | 10/2003 | Chen | |
| 2004/0227839 A1 | 11/2004 | Stavely et al. | |
| 2006/0067672 A1 | 3/2006 | Washisu et al. | |
| 2006/0187338 A1 | 8/2006 | May et al. | |
| 2006/0221218 A1 | 10/2006 | Adler et al. | |
| 2006/0238886 A1 | 10/2006 | Kushida et al. | |
| 2007/0050139 A1 | 3/2007 | Sidman | |
| 2007/0127915 A1 | 6/2007 | Lu et al. | |
| 2007/0177047 A1 | 8/2007 | Goto | |
| 2007/0182528 A1 | 8/2007 | Breed et al. | |
| 2008/0030592 A1 | 2/2008 | Border et al. | |
| 2008/0074755 A1 | 3/2008 | Smith | |
| 2008/0084484 A1 | 4/2008 | Ochi et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0247745 A1 * | 10/2008 | Nilsson | H04N 5/232 396/322 |
| 2008/0251697 A1 | 10/2008 | Park et al. | |
| 2008/0278610 A1 | 11/2008 | Boettiger | |
| 2009/0086032 A1 | 4/2009 | Li | |
| 2009/0154821 A1 | 6/2009 | Sorek et al. | |
| 2009/0225203 A1 | 9/2009 | Tanida et al. | |
| 2009/0278950 A1 | 11/2009 | Deng et al. | |
| 2010/0013906 A1 * | 1/2010 | Border | H04N 5/2259 348/36 |
| 2010/0045774 A1 | 2/2010 | Len et al. | |
| 2010/0053414 A1 | 3/2010 | Tamaki et al. | |
| 2010/0097443 A1 | 4/2010 | Lablans | |
| 2010/0225755 A1 | 9/2010 | Tamaki et al. | |
| 2010/0238327 A1 | 9/2010 | Griffith et al. | |
| 2010/0265346 A1 | 10/2010 | Iizuka | |
| 2010/0283842 A1 | 11/2010 | Guissin et al. | |
| 2010/0296802 A1 | 11/2010 | Davies | |
| 2011/0051243 A1 | 3/2011 | Su | |
| 2011/0063325 A1 | 3/2011 | Saunders | |
| 2011/0069189 A1 | 3/2011 | Venkataraman et al. | |
| 2011/0080655 A1 | 4/2011 | Mori | |
| 2011/0128393 A1 | 6/2011 | Tavi et al. | |
| 2011/0157430 A1 | 6/2011 | Hosoya et al. | |
| 2011/0157451 A1 | 6/2011 | Chang | |
| 2011/0187878 A1 | 8/2011 | Mor et al. | |
| 2011/0222167 A1 | 9/2011 | Iwasawa | |
| 2011/0242342 A1 | 10/2011 | Goma et al. | |
| 2011/0280565 A1 | 11/2011 | Chapman et al. | |
| 2011/0285895 A1 | 11/2011 | Weng et al. | |
| 2012/0002096 A1 | 1/2012 | Choi et al. | |
| 2012/0033069 A1 | 2/2012 | Becker et al. | |
| 2012/0155848 A1 | 6/2012 | Labowicz et al. | |
| 2012/0162464 A1 | 6/2012 | Kim | |
| 2012/0188391 A1 | 7/2012 | Smith | |
| 2012/0242881 A1 | 9/2012 | Suzuki | |
| 2012/0249815 A1 | 10/2012 | Bohn et al. | |
| 2012/0257013 A1 | 10/2012 | Witt et al. | |
| 2012/0257077 A1 | 10/2012 | Suzuki | |
| 2012/0268642 A1 | 10/2012 | Kawai | |
| 2013/0027353 A1 | 1/2013 | Hyun | |
| 2013/0050564 A1 | 2/2013 | Adams, Jr. et al. | |
| 2013/0057743 A1 | 3/2013 | Minagawa et al. | |
| 2013/0064531 A1 | 3/2013 | Pillman et al. | |
| 2013/0076928 A1 | 3/2013 | Olsen et al. | |
| 2013/0086765 A1 | 4/2013 | Chen | |
| 2013/0093842 A1 | 4/2013 | Yahata | |
| 2013/0100272 A1 | 4/2013 | Price et al. | |
| 2013/0153772 A1 | 6/2013 | Rossi et al. | |
| 2013/0155194 A1 | 6/2013 | Sacre et al. | |
| 2013/0194475 A1 | 8/2013 | Okamoto | |
| 2013/0222676 A1 | 8/2013 | Ono | |
| 2013/0223759 A1 | 8/2013 | Nishiyama | |
| 2013/0250125 A1 | 9/2013 | Garrow et al. | |
| 2013/0258044 A1 | 10/2013 | Betts-Lacroix | |
| 2014/0063018 A1 | 3/2014 | Takeshita | |
| 2014/0111650 A1 | 4/2014 | Georgiev et al. | |
| 2014/0152802 A1 | 6/2014 | Olsson et al. | |
| 2014/0204244 A1 | 7/2014 | Choi et al. | |
| 2014/0226041 A1 | 8/2014 | Eguchi et al. | |
| 2014/0267243 A1 | 9/2014 | Venkataraman et al. | |
| 2014/0354714 A1 | 12/2014 | Hirschler et al. | |
| 2015/0035824 A1 | 2/2015 | Takahashi et al. | |
| 2015/0043808 A1 | 2/2015 | Takahashi et al. | |
| 2015/0154449 A1 | 6/2015 | Ito et al. | |
| 2015/0156399 A1 | 6/2015 | Chen et al. | |
| 2015/0234149 A1 | 8/2015 | Kreitzer et al. | |
| 2015/0253647 A1 | 9/2015 | Mercado | |
| 2015/0279012 A1 | 10/2015 | Brown et al. | |
| 2016/0142610 A1 | 5/2016 | Rivard et al. | |

(56) References Cited

U.S. PATENT DOCUMENTS

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020130038076 | 4/2013 |

OTHER PUBLICATIONS

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

\* cited by examiner

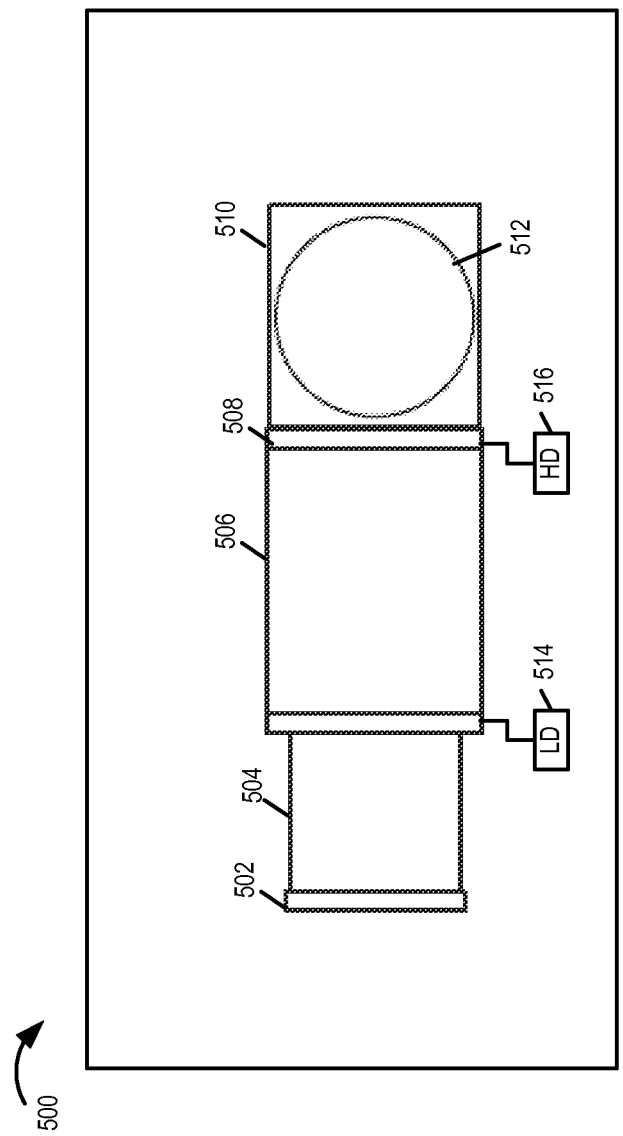

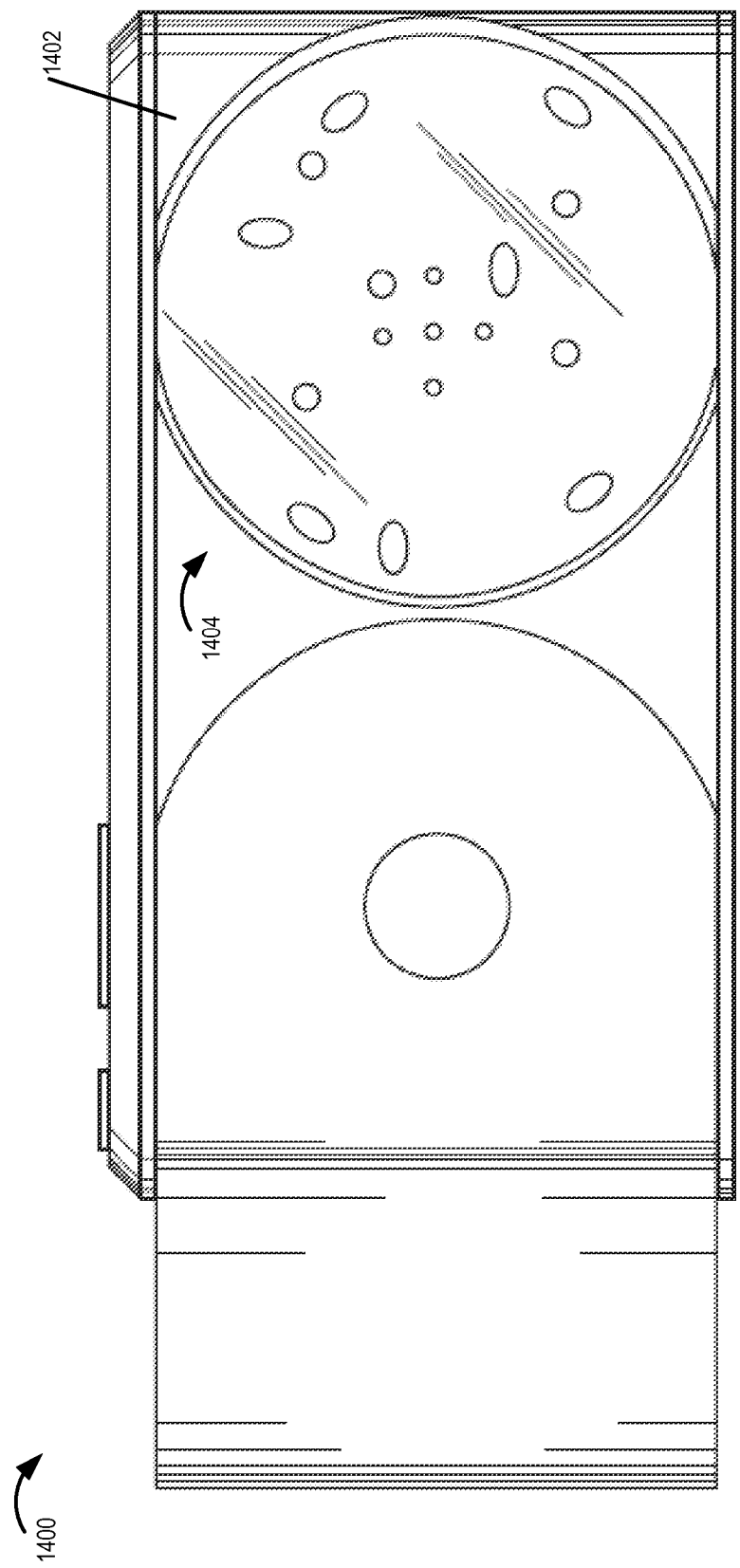

ROUND APERTURE

ROUND APERTURE
$L_1 = L_2 = L$

OVAL APERTURE $L_Y > L_X$

LENGTH AND WIDTH COMPARISON

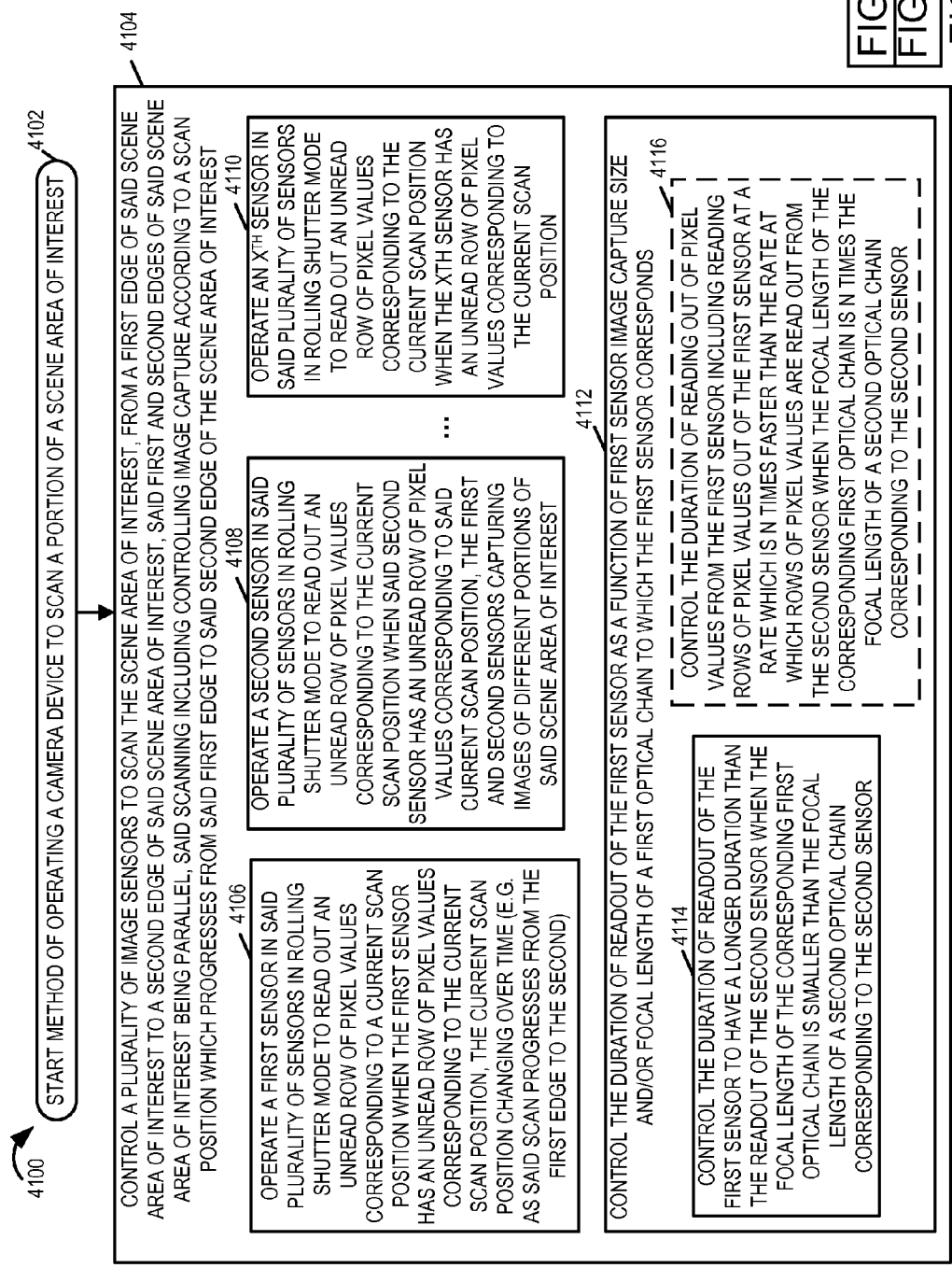

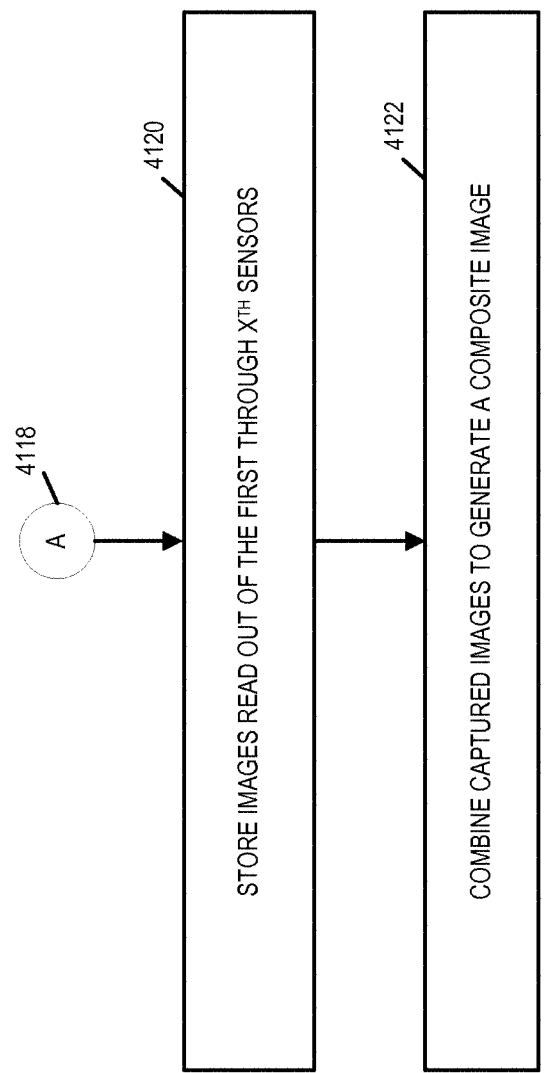

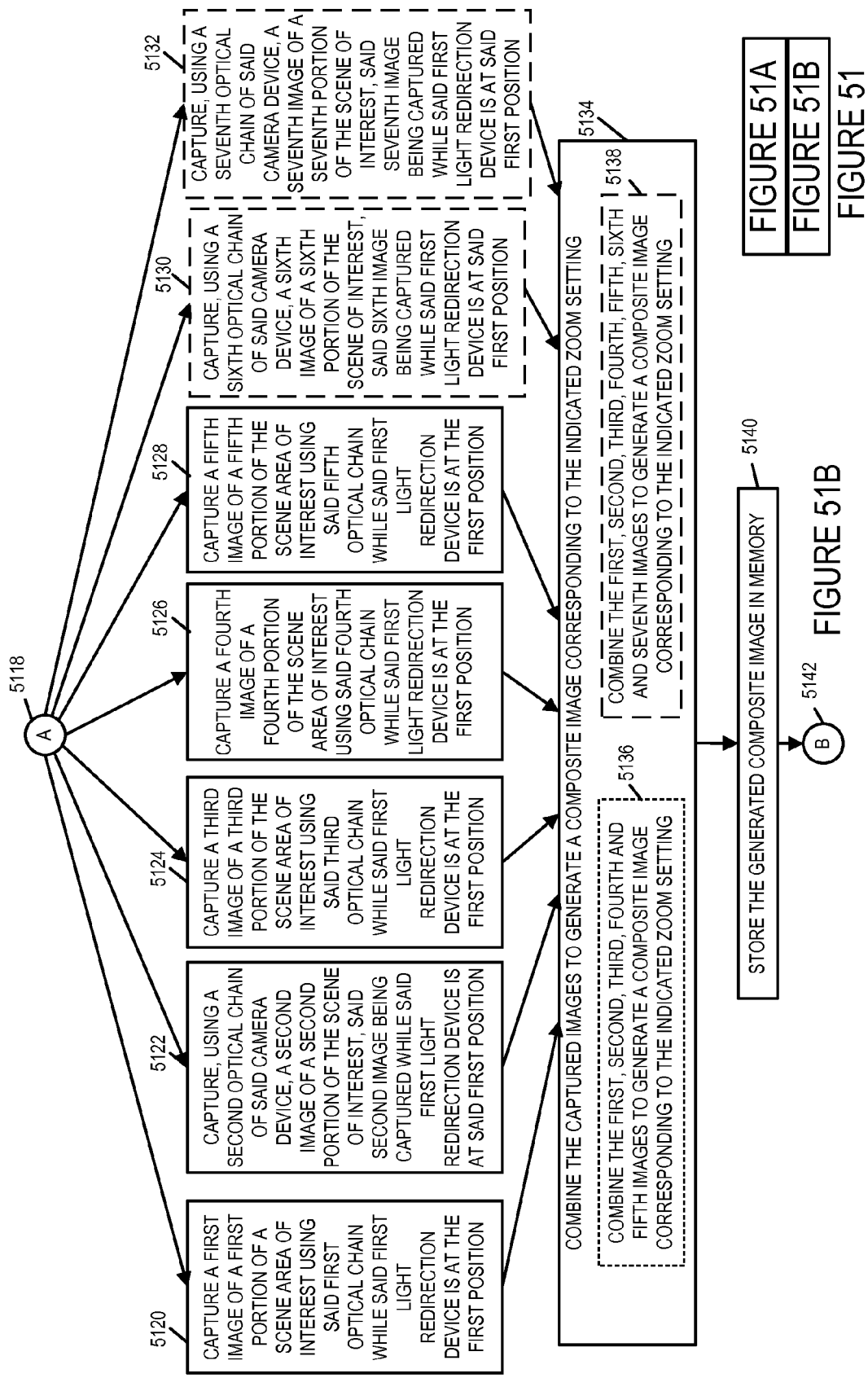

STORED ZOOM SETTINGS TO LIGHT REDIRECTION DEVICE POSITIONS MAPPING TABLE
(FOR OPTICAL CHAINS INCLUDING MOVEABLE LIGHT REDIRECTION DEVICES)

| ZOOM SETTING (5502) | OPTICAL CHAIN 1 LIGHT RE-DIRECTION DEVICE 1 POSITION (5504) | OPTICAL CHAIN 1 LIGHT RE-DIRECTION DEVICE 1 ANGLE (5506) | OPTICAL CHAIN 3 LIGHT RE-DIRECTION DEVICE 2 POSITION (5508) | OPTICAL CHAIN 3 LIGHT RE-DIRECTION DEVICE 2 ANGLE (5510) | OPTICAL CHAIN 4 LIGHT RE-DIRECTION DEVICE 3 POSITION (5512) | OPTICAL CHAIN 4 LIGHT RE-DIRECTION DEVICE 3 ANGLE (5514) | OPTICAL CHAIN 5 LIGHT RE-DIRECTION DEVICE 4 POSITION (5516) | OPTICAL CHAIN 5 LIGHT RE-DIRECTION DEVICE 4 ANGLE (5518) |
|---|---|---|---|---|---|---|---|---|
| 1X (5522) | FIRST POSITION = P1A | $\alpha = \alpha_1$ | SECOND POSITION = P2A | $\beta = \beta_1$ | THIRD POSITION = P3A | $\theta = \theta_1$ | FOURTH POSITION = P4A | $\phi = \phi_1$ |
| 2X (5524) | FIRST POSITION = P1B | $\alpha = \alpha_2$ | SECOND POSITION = P2B | $\beta = \beta_2$ | THIRD POSITION = P3B | $\theta = \theta_2$ | FOURTH POSITION = P4B | $\phi = \phi_2$ |
| 3X (5526) | FIRST POSITION = P1C | $\alpha = \alpha_3$ | SECOND POSITION = P2C | $\beta = \beta_3$ | THIRD POSITION = P3C | $\theta = \theta_3$ | FOURTH POSITION = P4C | $\phi = \phi_3$ |
| 4X (5528) | FIRST POSITION = P1D | $\alpha = \alpha_4$ | SECOND POSITION = P2D | $\beta = \beta_4$ | THIRD POSITION = P3D | $\theta = \theta_4$ | FOURTH POSITION = P4D | $\phi = \phi_4$ |

FIGURE 55

METHODS AND APPARATUS FOR SUPPORTING ZOOM OPERATIONS

RELATED APPLICATIONS

The present application claims the benefit of U.S. Provisional Application Ser. No. 61/978,818 filed Apr. 11, 2014, U.S. Provisional Application Ser. No. 61/981,849, filed Apr. 20, 2014, and U.S. Provisional Application Ser. No. 62/021,094 filed Jul. 4, 2014, each of which is hereby expressly incorporated by reference in their entirety.

FIELD

The present application relates to camera device methods and apparatus and more particularly to methods and apparatus relating to camera devices including at least one optical chain with a light redirection device which can be used as part of a zoom operation.

BACKGROUND

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

In the quest for high quality photos, the amount of light which can be captured is often important to the final image quality. Having a large aperture lens allows a large amount of light to be captured allowing for shorter exposure times than would be required to capture the same amount of light using a small lens. The use of short exposure times can reduce blurriness especially with regard to images with motion. The ability to capture large amounts of light can also facilitate the taking of quality images even in low light conditions. In addition, using a large aperture lens makes it possible to have artistic effects such as small depth of field for portrait photography.

While large lenses have many advantages with regard to the ability to capture relatively large amounts of light compared to smaller lenses, they can be used to support large zoom ranges which may be implemented using optical or digital techniques, and often allow for good control over focus, there are many disadvantages to using large lenses.

Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time.

In addition to weight and size drawbacks, large lenses also have the disadvantage of being costly. This is because of, among other things, the difficultly in manufacturing large high quality optics and packaging them in a manner in which they will maintain proper alignment over a period of time which may reflect the many years of use a camera lenses is expected to provide.

In digital cameras, the photosensitive electronics used as the sensor, e.g., light sensing device, is often either a charge coupled device (CCD) or a complementary metal oxide semiconductor (CMOS) image sensor, comprising a large number of single sensor elements, each of which records a measured intensity level.

In many digital cameras, the sensor array is covered with a patterned color filter mosaic having red, green, and blue regions in an arrangement. A Bayer filter mosaic is one well known color filter array (CFA) for arranging RGB color filters on a square grid of photo sensors. Its particular arrangement of color filters is used in many digital image sensors. In such a filter based approach to capturing a color image, each sensor element can record the intensity of a single primary color of light. The camera then will normally interpolate the color information of neighboring sensor elements, through a process sometimes called demosaicing, to create the final image. The sensor elements in a sensor array using a color filter are often called "pixels", even though they only record 1 channel (only red, or green, or blue) of the final color image due to the filter used over the sensor element.

In cameras, round or circular lenses (lens element) through which light can pass, e.g., lenses with round apertures, are commonly used. This allows light to pass through the lens equaling in both vertical and horizontal directions (actually any direction). Elements in a optical chain in which one or more round lenses are used are often of sufficient size to pass enough light to record a sharp image at the sensor of the camera. For a lens, the optical axis is the line passing through the center of the lens and perpendicular to the plane of the lens. When a lens assembly is constructed out of more than one lens element, the elements are typically arranged so that they all share a common optical axis which is also the optical axis of the lens assembly. In a typical optical chain, e.g., camera module, the optical axis also passes through the center of the sensor. Light traveling along the optical axis of a lens assembly or camera module is not bent by any lens along the path and continues to travel along the optical axis in a straight line. If all the lens elements are circular, then such a camera module has cylindrically symmetry around the optical axis. In most cameras, the optical elements of a camera are arranged in a linear configuration with optical axis passing through an outer lens in a straight line to the sensor. Such a configuration can result in relatively thick cameras, e.g., cameras having a large front to back distance or depth. In cameras with large optics and/or which support mechanical zoom, the camera thickness can be significant with the camera often being several inches thick and far too deep to store in a pocket or even in some cases a purse.

Cameras and other optical systems are often discussed in terms of focal length. The focal length of an optical system is a measure of how strongly the system converges or diverges light. For an optical system in air, it is the distance over which initially collimated rays are brought to a focus. A system with a shorter focal length has greater optical power than a system with a long focal length; that is, it bends the rays more strongly, bringing them to a focus in a shorter distance. Longer focal length (lower optical power), often achieved using large lenses, leads to higher magnification, e.g., zoom, and a narrower angle (field) of view. Accordingly, an optical chain, e.g., camera module, with a large, e.g., long, focal length will capture an image corresponding to a smaller portion of a scene area than an optical chain at the same location with a smaller focal length. It should be appreciated that for the same sensor size, an optical chain with a shorter focal length or higher optical power is associated with a wider angle of view than an optical chain with a longer focal length and will thus capture an image corresponding to a larger portion of a scene area at the same distance from the optical chain than an optical chain at the same position with a larger focal length.

Focal length of a lens element is generally not a function of lens size, e.g., diameter in the case of lens element lenses with round apertures, e.g., round areas through which light can pass. In an optical chain or other optical device the focal length of the device, is sometimes referred to as the effective focal length, since the focal length of the device will depend on the one or more optical elements, e.g., lenses, which make up the device and their interaction. To take good quality sharp pictures requires larger aperture lens elements (larger diameter lenses) when the effective focal length is large.

The use of large focal length lenses and optical chains with large focal lengths is often desirable because of the amount of zoom (magnification) that they can provide. However, the use of optical components which are commonly used to produce an optical chain with a large focal length tends to lead to a thick camera particularly in the case where the optical components are arranged so that the light along the optical axis passes in a straight line from the outermost lens to the sensor which is used to capture an image based on the light passing through a lens.

There is a need for improving the flexibility of camera devices. In particular there is a need for improvements to zoom operations and/or the control of elements of a camera which faciliate performing zoom operations.

SUMMARY

Methods and apparatus for performing a zoom operation are described using multiple optical chains in a camera device. At least one optical chain in the camera device includes a moveable light redirection device, said light redirection device being one of a substantially plane mirror or a prism. The moveable light redirection device is moved to a position, e.g., a predetermined position, in accordance with a zoom setting, and a portion of a scene area of interest in captured. Different discrete zoom setting values correspond to different positions of the moveable light redirection device resulting in different capture areas. In some embodiments, multiple optical chains with moveable light redirection devices are used to capture different portions of a scene of interest, e.g., at the same time. In some embodiments, at least one optical chain in the camera device does not change its image capture scene area as a function of zoom setting. A composite image is generated from a plurality of captured images, e.g., which were captured at the same time, corresponding to different optical chains. In various embodiments, a higher zoom setting corresponds to more overlap between captured images of different optical chains.

An exemplary method of capturing at least one image, in accordance with some embodiments, comprises; moving a first light redirection device, said first light redirection device being one or a substantially plane mirror or a prism, of a first optical chain of a camera device to a first position in accordance with an indicated zoom setting; and capturing a first image of a first portion of a scene area of interest using said first optical chain while said first light redirection device is at said first position. An exemplary camera device, in accordance with some embodiments, includes: a first optical chain including a first light redirection device, said first light redirection device being one of a substantially plane mirror or a prism; a light redirection device positioning control module configured to control the first light redirection device to move to a first position in accordance with an indicated zoom setting; and an image capture control module configured to control the first optical chain to capture a first image of a first portion of a scene area of interest while said first light redirection device is at said first position.

In some embodiments, an exemplary camera device includes a non-transitory machine readable medium, said non-transitory machine readable medium including machine executable instructions which when executed by a processor of the camera device control said camera device to: move a first light redirection device, said first light redirection device being one or a substantially plane mirror or a prism, of a first optical chain of a camera device to a first position in accordance with an indicated zoom setting; and capture a first image of a first portion of a scene area of interest using said first optical chain while said first light redirection device is at said first position.

While many embodiments and features have been discussed in the above summary, it should be appreciated that many of the novel features described herein can be used independent of other novel features. Thus while various exemplary embodiments have been described, the application is not limited to the particular exemplary embodiments or combinations of features described in particular exemplary embodiments.

Numerous additional features and embodiments are described in the detailed description which follows.

BRIEF DESCRIPTION OF THE FIGURES

FIG. 5 illustrates an exemplary optical chain, e.g., camera module, which may be used as one of the optical chains included in the camera device of FIG. 1, FIG. 8, FIG. 12A or various other embodiments.

FIG. 14 illustrates an exemplary camera device which uses non-circular lenses for the optical chains having large focal lengths and circular lenses for optical chains which have smaller focal lengths.

FIG. 41, which comprises the combination of FIG. 41A and FIG. 41B, is a flow chart showing the steps of an exemplary method of operating a camera device to scan a scene of interest and generate a composite image there from.

FIG. 51B is a second part of a flowchart of an exemplary method of capturing at least one image in accordance with an exemplary embodiment.

FIG. 55 is a drawing of an exemplary stored zoom setting to light redirection devices positions mapping table in accordance with an exemplary embodiment.

DETAILED DESCRIPTION

Figure 1:
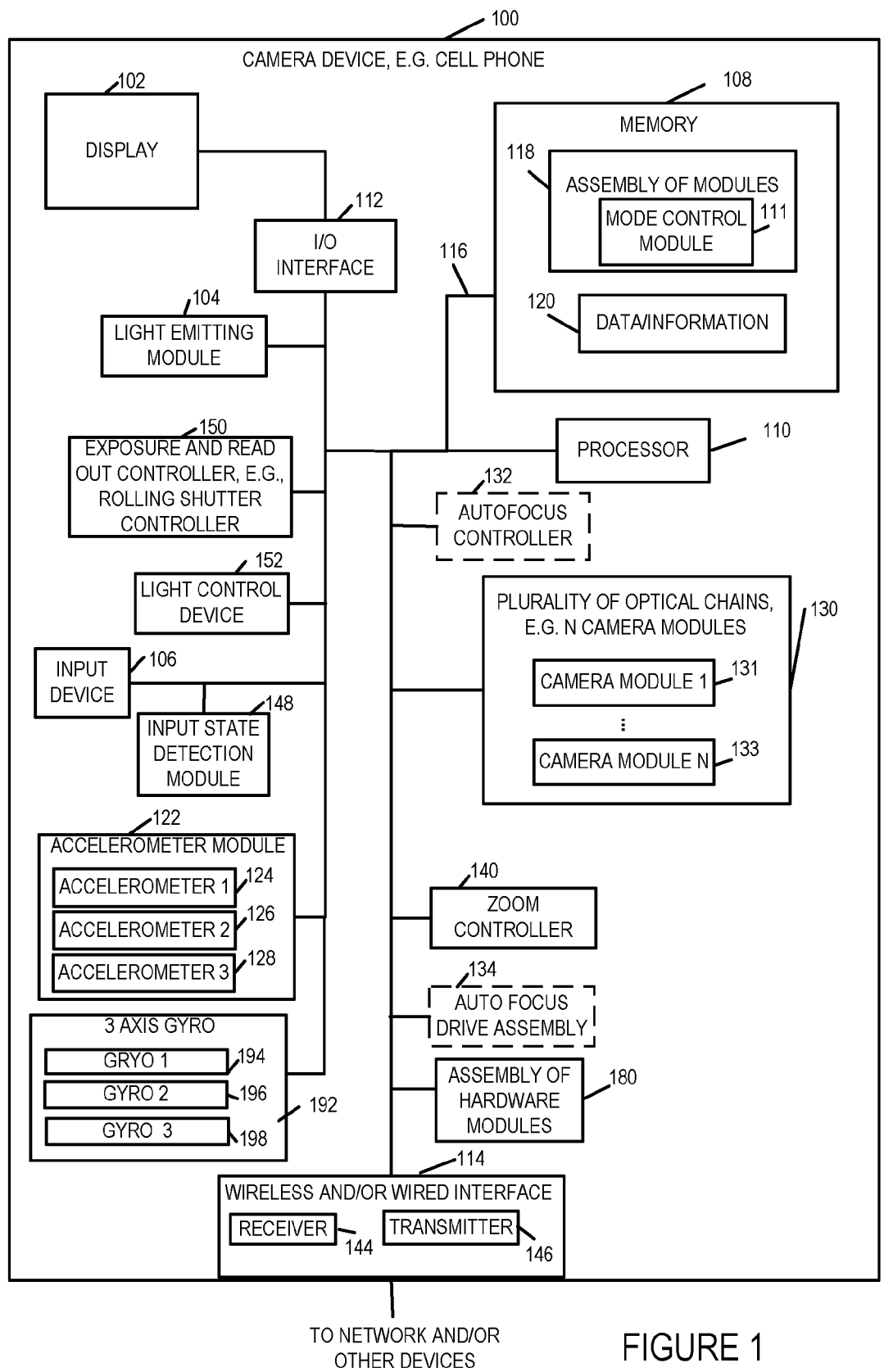
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a WIFI interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 12A:
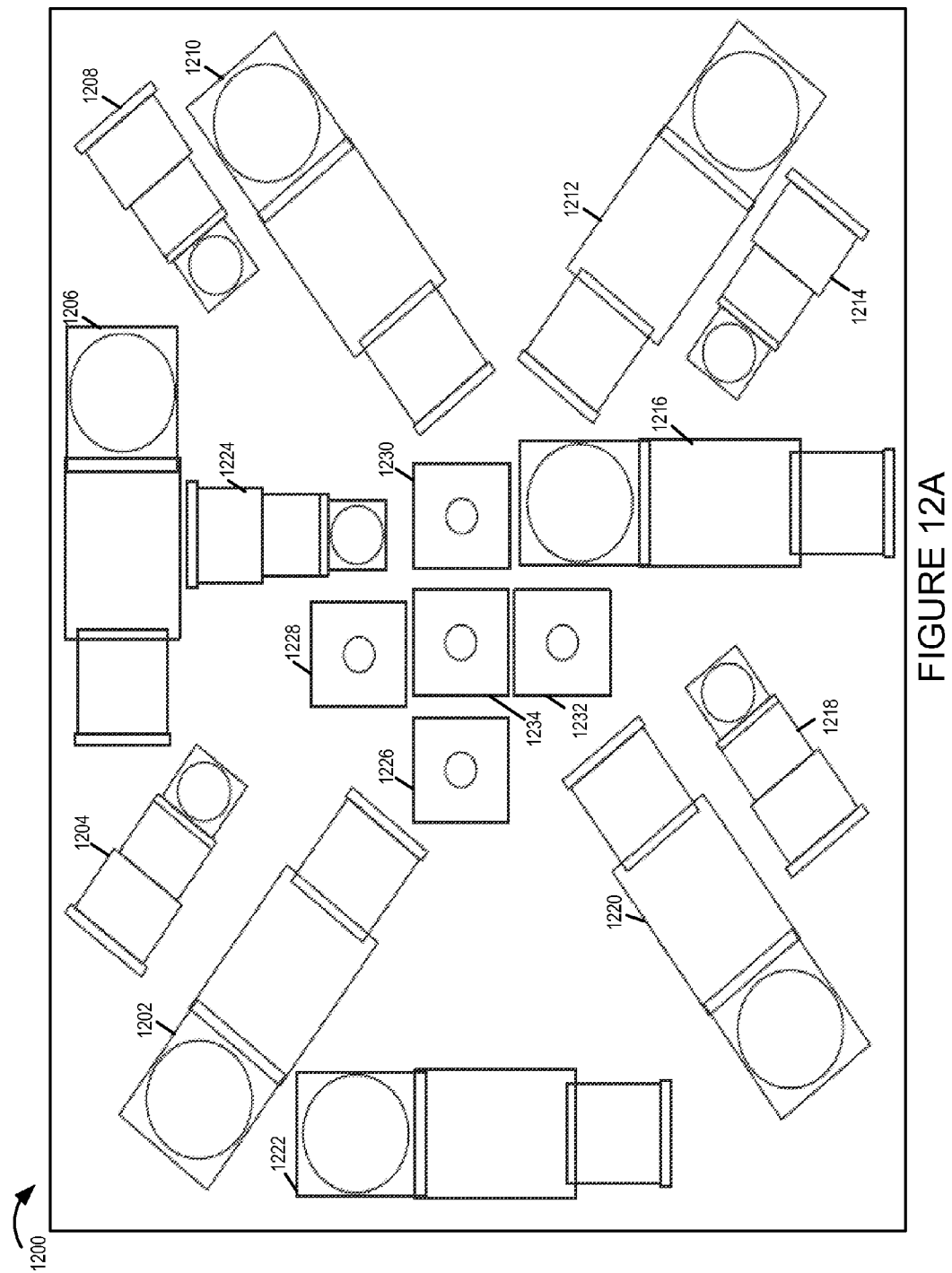
FIG. 12A illustrates an arrangement of optical chains, e.g., camera modules, used in one embodiment to implement a camera device of the type shown in FIGS. 6 and 8 with the lens arrangement shown in FIG. 11.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 12A while in other embodiments the camera device 100 is implemented using the module arrangement shown in FIG. 13B or FIG. 17A or any one of the other Figures included in this application. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
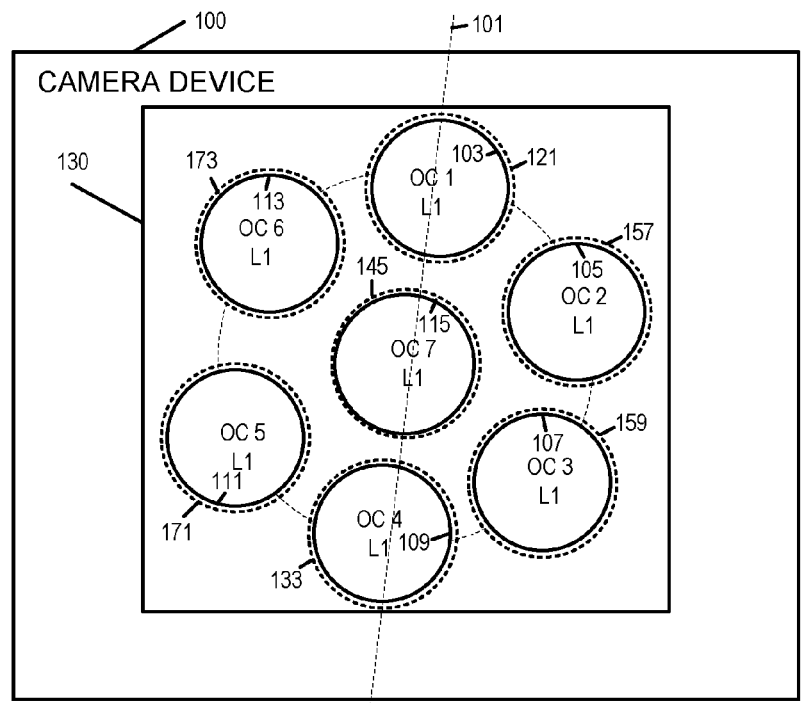
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer lenses shown in FIG. 2 are shown as having circular apertures which are the same size, as will be discussed below different size lenses may be used for different optical chains, e.g., depending on the focal length with optical chains having larger focal lengths normally including outer lenses with larger apertures than optical chains with small focal lengths.

Figure 3:
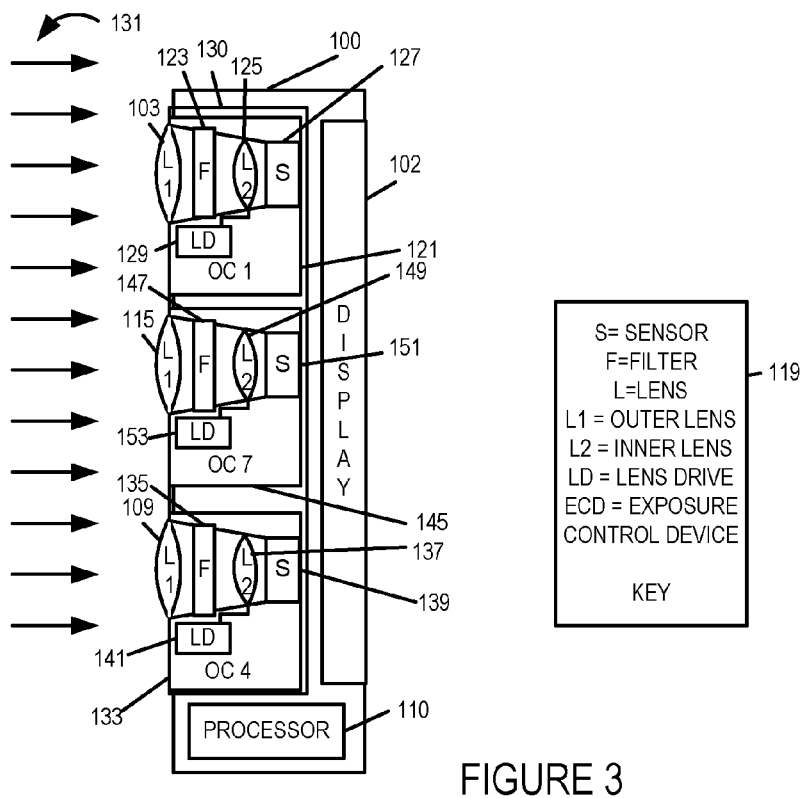
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer lens L1 103, a filter 123, an inner lens L2 125, and a sensor 127. In some embodiments the OC 1 121 further includes lens drive (LD) 129 for controlling the position of lens L2 125 for zooming and/or auto focus operation purposes. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive can alter the relative position of a lens to the sensor 127, e.g., to change the distance between the sensor 127 and the lens 125 as part of a zooming and/or focus operation. OC 7 145 includes an outer lens L1 115, a filter 147, an inner lens L2 149, and a sensor 151. OC 7 145 further includes LD 153 for controlling the position of lens L2 149. The LD 153 includes a motor or other drive mechanism which can move the lens, barrel, cylinder, sensor or other optical chain element to which it is connected.

OC 4 133 includes an outer lens L1 109, a filter 135, an inner lens L2 137, and a sensor 139. OC 4 133 includes LD 141 for controlling the position of lens L2 137. The LD 141 includes a motor or other drive mechanism and operates in the same or similar manner as the drives of the other optical chains. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

Figure 13A:
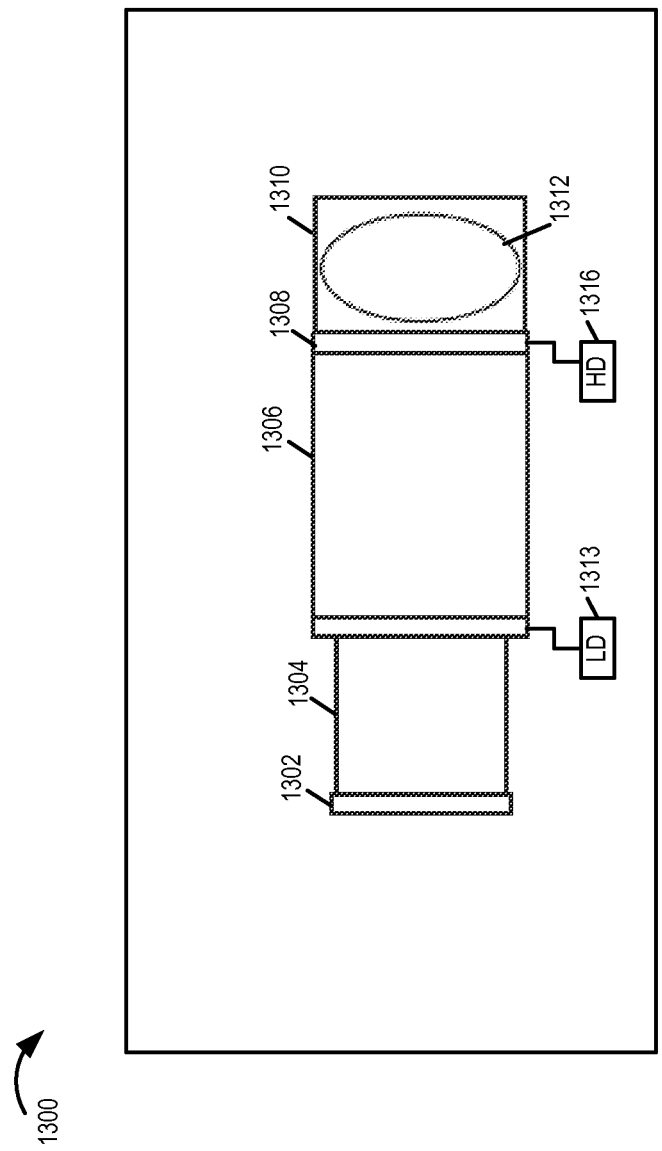
FIG. 13A shows a camera module with a lens that has a non-circular aperture and a light redirection device, e.g., mirror, which can be and is used in various camera device embodiments shown in FIGS. 14-17.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 and FIG. 13A show optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. While in the OCs of FIG. 3 light redirection devices (R), e.g., mirrors or prisms are not shown, as will be discussed below, in at least some embodiments one or more mirrors are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the center of the lens 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost lens of each optical chain appearing as a circle represented using a solid line (OC 1 L1 103, OC 2 L1 105, OC 3 L1 107, OC 4 L1 109, OC 5 L1 111, OC 6 L1 113, OC 7 L1 115). In the FIG. 2 example, the plurality of optical chains 130 include seven optical chains, OC 1 121, OC 2 157, OC 3 159, OC 4 133, OC 5 171, OC 6 173, OC 7 145, which include lenses (OC 1 L1 103, OC 2 L1 105, OC 3 L1 107, OC 4 L1 109, OC 5 L1 111, OC 6 L1 113, OC 7 L1 115), respectively, represented by the solid circles shown in FIG. 2. The lenses of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses shown in FIG. 2 occupy.

Figure 17A:
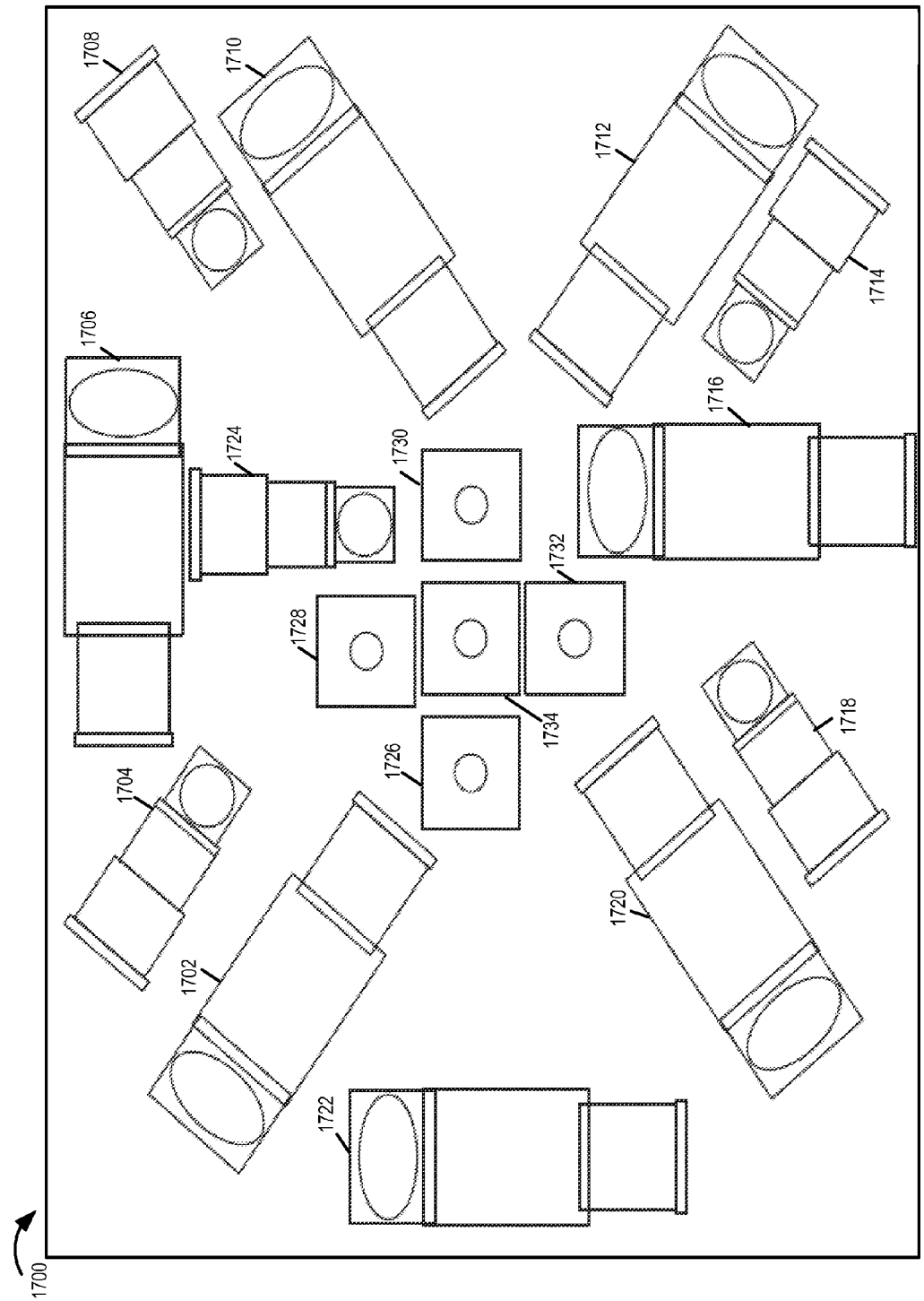
FIG. 17A illustrates an arrangement of camera modules used in one embodiment to implement a camera device of the type shown in FIG. 14 with the lens arrangement shown in FIG. 15.

While gaps are shown between the lens openings of the optical chains OC 1 to OC 7, it should be appreciated that the lenses may be made, and in some embodiments are, made so that they closely fit together minimizing gaps between the lenses represented by the circles formed by solid lines. While seven optical chains are shown in FIG. 2, it should be appreciated that other numbers of optical chains are possible. For example, as shown in FIGS. 12A and 17A seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As will be discussed below, and as shown in FIG. 3, each of the optical chains OC 1 121, OC 7 145, OC 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters or may be omitted depending on the particular optical chain embodiment or configuration.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
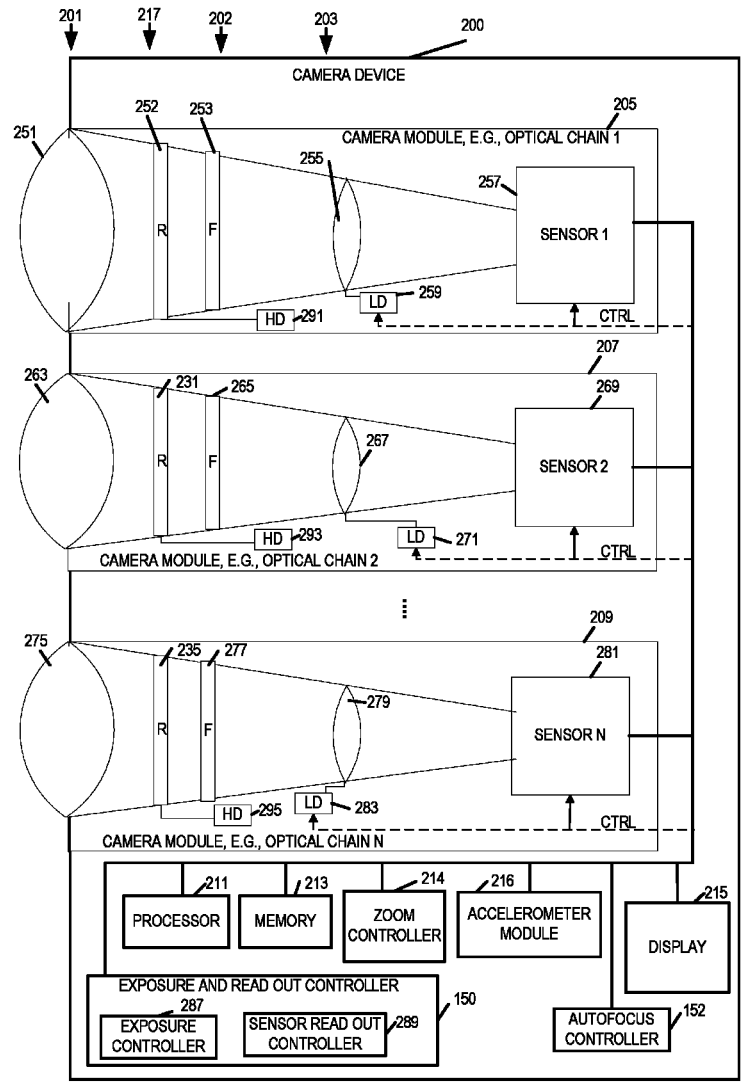
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer lens L1 251, a light redirection element R 252, a hinge (or mirror) drive HD 291, filter 253, inner lens L2 255, sensor 1 257, and LD 259. The HD 291 can be used to move a position of a hinge to which the light redirection device (R) 252, e.g., mirror, is mounted and thus move the mirror to change the scene area to which the module 205 is directed without moving the lens 251. Moving (e.g., rotating about a hinge) the mirror 252 to change the scene area to which the module 205 is directed is especially useful in an embodiment where the outer lens 251 is a plane piece of glass or a plastic piece with no optical power as is the case in some embodiments.

Figure 4B:
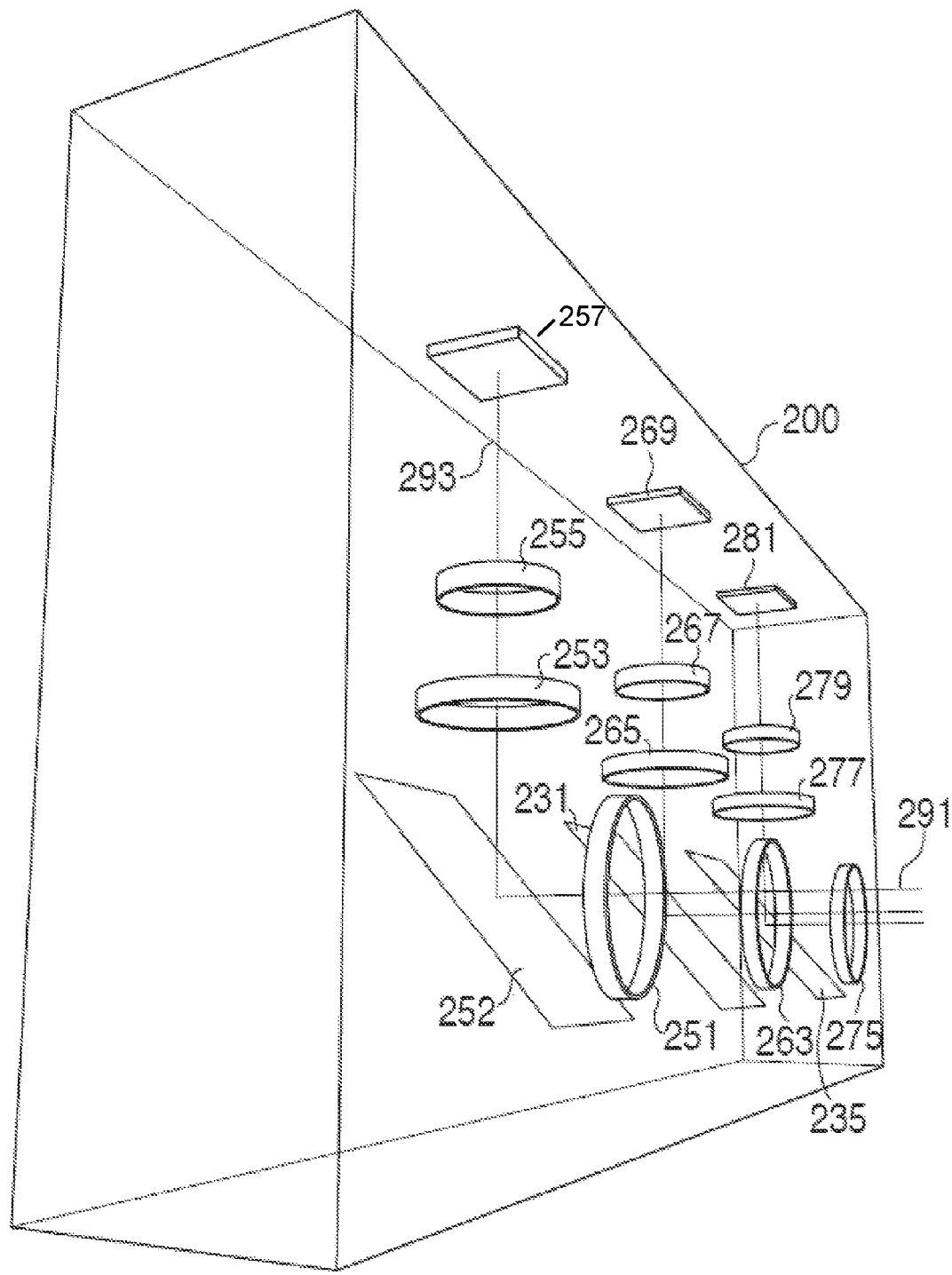
FIG. 4B illustrates the optical chains of the camera device shown in FIG. 4A, as implemented in one particular exemplary embodiment, in greater detail.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer lens 251 of the first optical chain 205 is redirected upward by mirror 252 so that it passes though filter 253 and inner lens 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 255 are included in Part B of the optical chain which have an optical power. Thus, it should be appreciated that in at least some embodiments the outer lens 251 may be implemented as a flat or relatively flat lens which does not protrude from the surface of the camera 200. This reduces the risk of scratches and also reduces the possibly that the outer lens will get caught when inserting or removing it from a pocket or case as might be the case if the lens protruded from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer lens L1 263, light redirection device 231, hinge drive 293, filter 265, inner lens L2 267, sensor 2 269, and LD 271. OC N 209 includes outer lens L1 275, light redirection device 235, hinge drive 295, filter 277, inner lens L2 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. two lenses (see columns 201 and 203 corresponding to L1 and L2, respectively), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain which includes an outer lens 512, a light redirection device, e.g., mirror, 510 positioned behind the lens 512, a hinge drive 516, a mirror hinge 508, a first cylindrical module portion 506, a second cylindrical module portion 504, a sensor 502 and a lens drive 514. Light enters the optical chain 500 via the lens 512 and is redirected by the mirror 510 so that it reaches the sensor 502 at the back of the optical chain. The first and second cylindrical portions 504, 506 can house one or more lenses or filters as well as other optical components through which light may pass before reaching the sensor 502. While the mirror 510 is normally used to redirect light 90 degrees so that light entering through the lens 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the hinge drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510 without moving the lens 512. In some embodiments, the axis of the hinge is perpendicular to the Part B of the optical axis and parallel to the place of the front face of the camera 600. In some embodiments, the lens 512 is plane glass with no optical power.

The hinge drive may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 may be moved by drive 514 so that they slide relative to each other, e.g., barrel portion 504 may be moved so that it moves further into or out of the barrel portion 506 thereby altering the distance from the lens 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6:
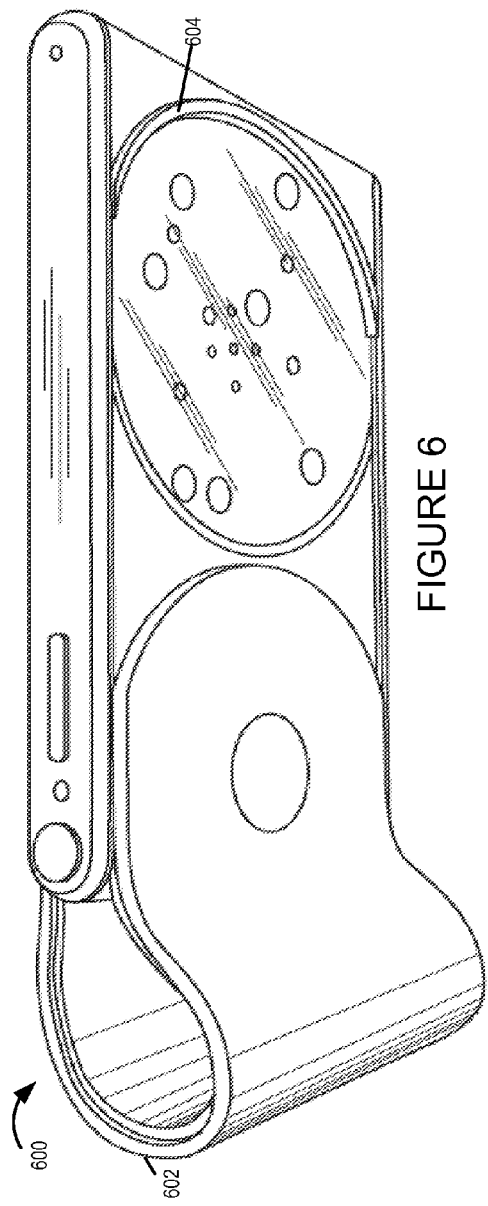
FIG. 6 is a prospective view of an exemplary camera including multiple camera modules in accordance with one feature of the invention with its cover retracted to allow the camera modules to capture images.

FIG. 6 is a perspective view of a camera device 600 which includes a plurality of the optical chains, e.g., camera modules of the type shown in FIG. 5. The camera 600 includes a cover 602 which is flexible and can be slid to the side to form a hand grip and to expose the lens area 604. In the FIG. 6 embodiment, the lens area 604 includes a plurality of outer lenses each represented by a circle. Larger circles correspond to optical chains with larger apertures and focal lengths than the optical chains with smaller lenses. The FIG. 6 embodiment includes a total of 17 optical chains corresponding to three different focal lengths. There are 5 of the small focal length optical chains as can be seen by the 5 smallest circles in the lens area 604, 5 medium focal length optical chains as can be seen by the 5 medium sized circles representing the outer lenses of the 5 medium focal length optical chains and 7 long focal length optical chains as can be seen by the seven larger circles shown in the FIG. 6 lens area 604. The focal length relationship between the smallest and largest optical chains, in one embodiment is such that the smallest focal length is ¼ the focal length of the largest optical chain and ½ the focal length of the medium focal length optical chains. For example, the small, medium and large focal length optical chains may, and in one embodiment do, have equivalent full frame DSLR focal lengths of 35 mm, 70 mm and 140 mm respectively. It should be appreciated that such a difference in focal lengths will result in the 35 mm camera module capturing a scene area approximately four times larger than the area captured by the 70 mm camera module and 16 times the size of the scene area captured by the camera module having the 140 mm focal length. While not shown in FIG. 6, it should be appreciated that camera device 600 may and in some embodiments does include the same or similar elements as camera device 100 and camera device 200 of FIGS. 1 and 4A. Thus it should be appreciated that camera device 600 includes various elements such as the processor 110/211, memory 108/213, zoom controller 140/214, exposure and read out controller 150, accelerometer, gyro, autofocus controller 132 etc., and various other elements discussed above with regard to camera devices 100 and 200.

By using camera modules having different focal lengths to capture portion of a scene area of interest, and by then combining the images as done in various embodiments, the composite image can have a higher overall pixel count than any one individual sensor. Accordingly, even when the sensors used by different camera modules having different focal lengths have the same pixel count, the number of pixels of the composite image can be far higher than the number of pixels of an individual sensor.

In some embodiments, as will be discussed below, different portions of a scene area of interest are captured by different ones of the camera modules having the largest focal length. The camera modules with medium or small focal lengths are then used to capture larger portions of a scene area of interest where the larger scene area of interest may correspond to a complete scene area of interest, e.g., in the case of the camera modules of the camera device using the smallest supported focal length. Overlapping images are captured by image sensors of different camera modules. Based on known spatial information about position of the camera modules on the camera device, e.g., the distance between the outer lenses of the different camera modules and/or the angle at which the each of the individual camera modules (which capture an image to be combined) points, depth information is generated. Using the depth information images captured by different camera modules are combined to form a composite image as will be discussed further below. Note that the images can, and in some embodiments are, combined without generating depth information in a scene or scene area. In some such embodiments an image covering the scene area of interest is first chosen as a reference image. The composite image is then generated from the perspective captured in the reference image. In one such embodiment, a chosen small block of pixels in the reference image is combined with a matching collection of pixels in each image included in a chosen subset of other images. The combining is performed such that each pixel in the reference-image-block is combined with the matching pixel (or interpolated pixel if the image portions match with the non-integer pixel shift) in each of the images in the subject. The combination can be a weighted sum of pixels values, where the weights are assigned based on the quality of the image to which the pixel belongs. This combined block of pixels now becomes a corresponding block of the composite image. The process is repeated for the other blocks of the reference image to generate the entire composite image. Note that images taken with the camera modules with different focal lengths then the reference image have different magnifications. In this case these images should first be appropriately scaled to have the same magnification as the reference image before above process is carried out. The composite image generated by combining multiple images as above as likely to have better SNR then the reference image which was selected of the basis of the image combining used to generate the composite image.

The camera device of FIG. 6 with its 17 different camera modules corresponding to three different focal lengths is particularly well suited for combining captured images to generate a composite image as will be discussed in detail below.

Figure 7:
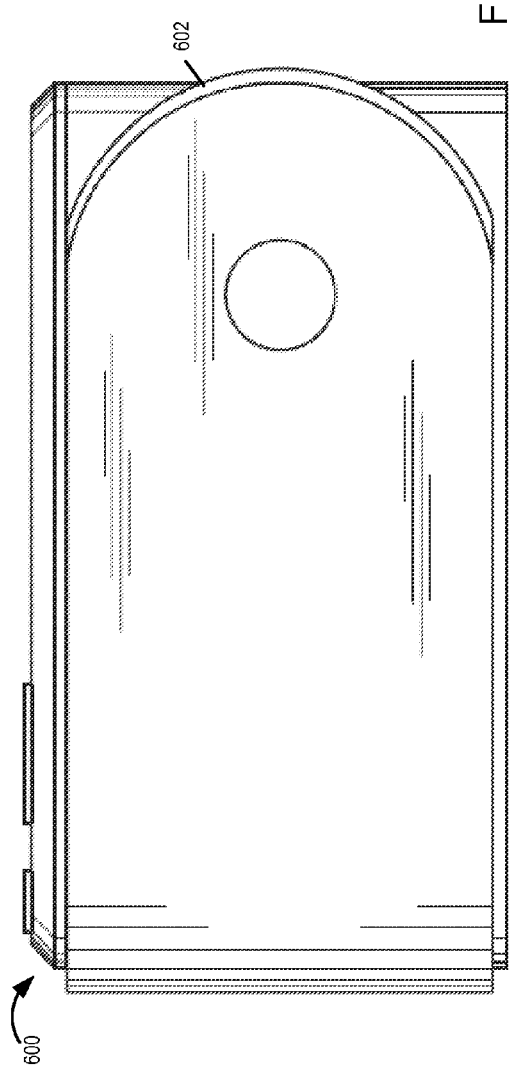
FIG. 7 is illustrates the camera of FIG. 6 with the cover in closed position thereby covering the camera front.

FIG. 7 illustrates the camera device 600 of FIG. 6 with the camera case in the closed position. Note that the flexible case 602 serves as a cover which can protect the lens area 604 and the lenses included therein when the camera is not in use.

Figure 8:
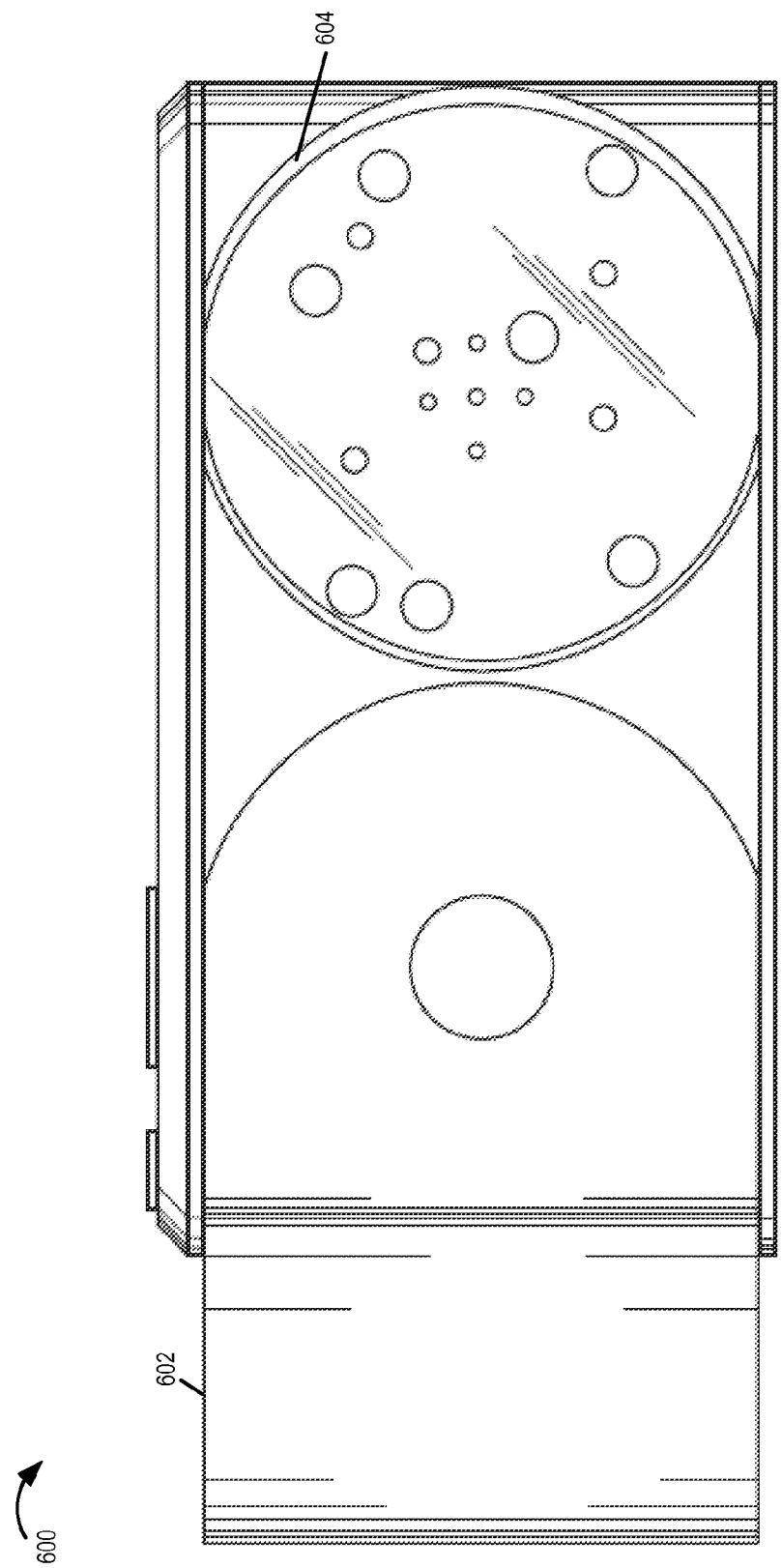
FIG. 8 is a frontal view of a camera device similar to the one of FIG. 6 with a better view of the camera modules so that the arrangement of the lenses of the individual camera modules can be better appreciated.

FIG. 8 is a frontal view of the camera device 600 and the lens arrangement of the camera device with the 15 outer lenses being clearly visible as circles in the lens area 604. Note that the diameter of the smallest lenses is d which correspond to the camera modules having the smallest focal length, the outer lenses corresponding to the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 9:
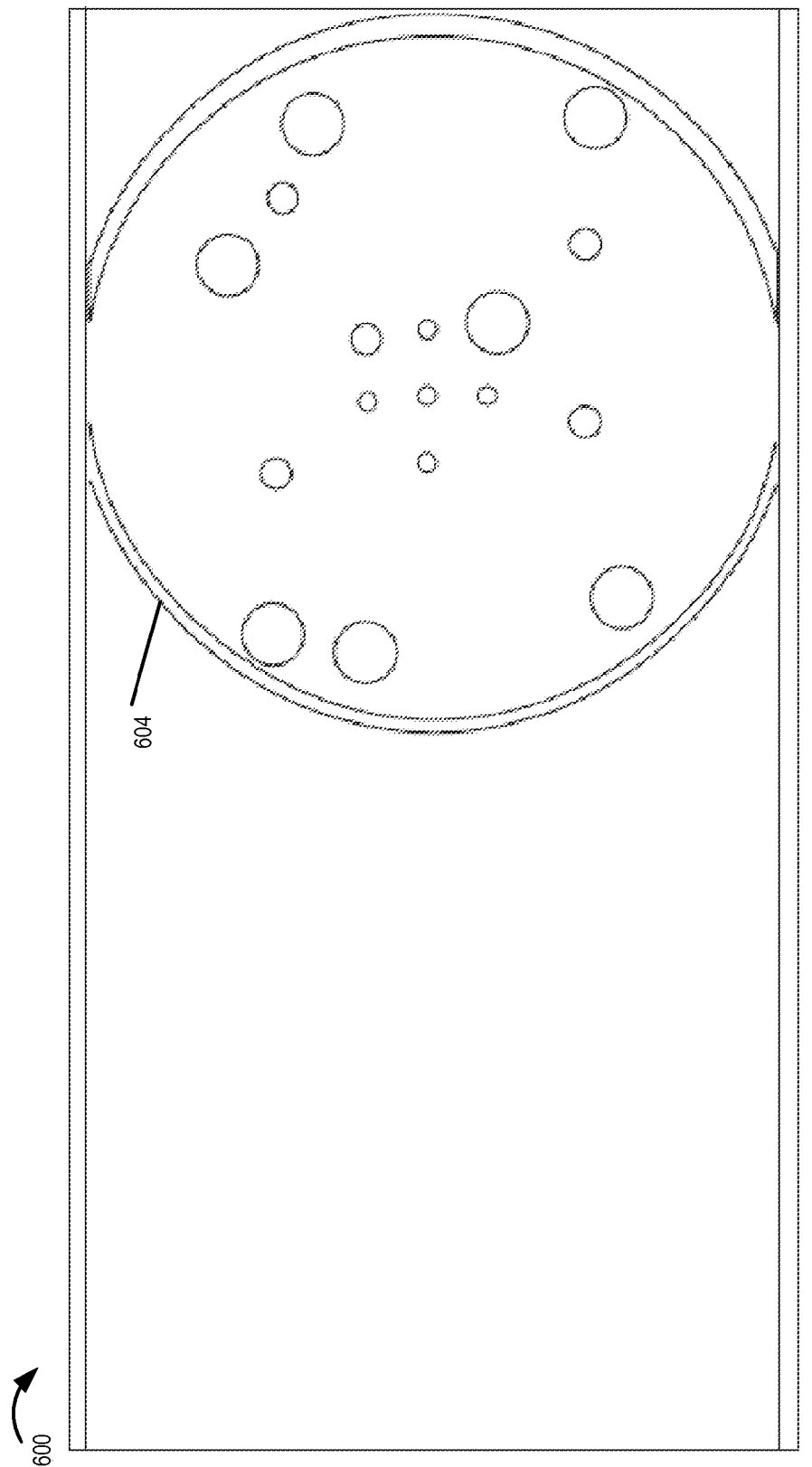
FIG. 9 is an illustration of the camera device of FIG. 8 but without the camera case being shown allowing for better appreciation of the arrangement of lenses on the front of the camera device.

FIG. 9 is a simplified illustration of the camera device 600 with the case, controls and other features being omitted to allow a better appreciation of the lens configuration and lens area.

Figure 10:
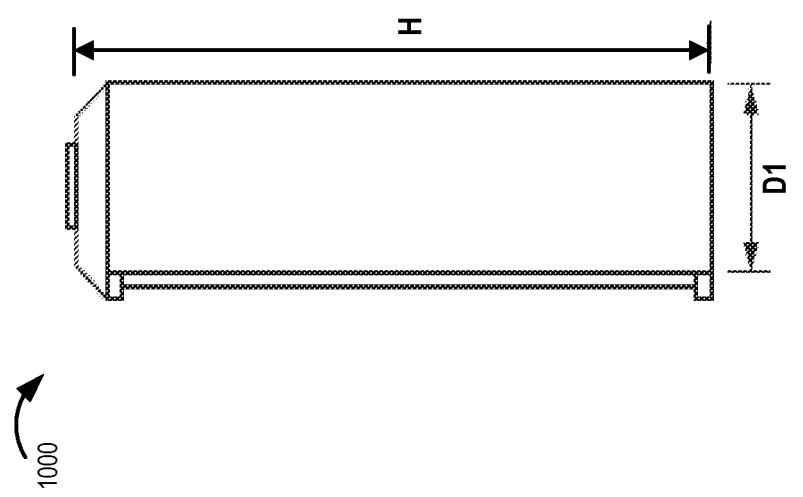
FIG. 10 is a side view of the camera device of FIG. 7 from which it can be seen that the camera has a depth D1 and a height H.

FIG. 10 is a side view 1000 of the camera device 600. As shown in FIG. 10, the camera device has a height H (not including control buttons) and a depth D1. D1 is equal to or greater than the diameter D of the aperture of the largest lens shown in FIG. 6. As will be discussed below, depending on the embodiment, the diameter of outer lenses with round apertures can have an impact on the minimum depth of the camera in the case where light redirection elements, e.g., mirrors, are used to redirect light. In this case the minimum depth of the camera must be greater than this diameter. If this is not the case the actual module aperture will be smaller than the diameter of the outer lens and a smaller outer lens could have been used.

Figure 11:
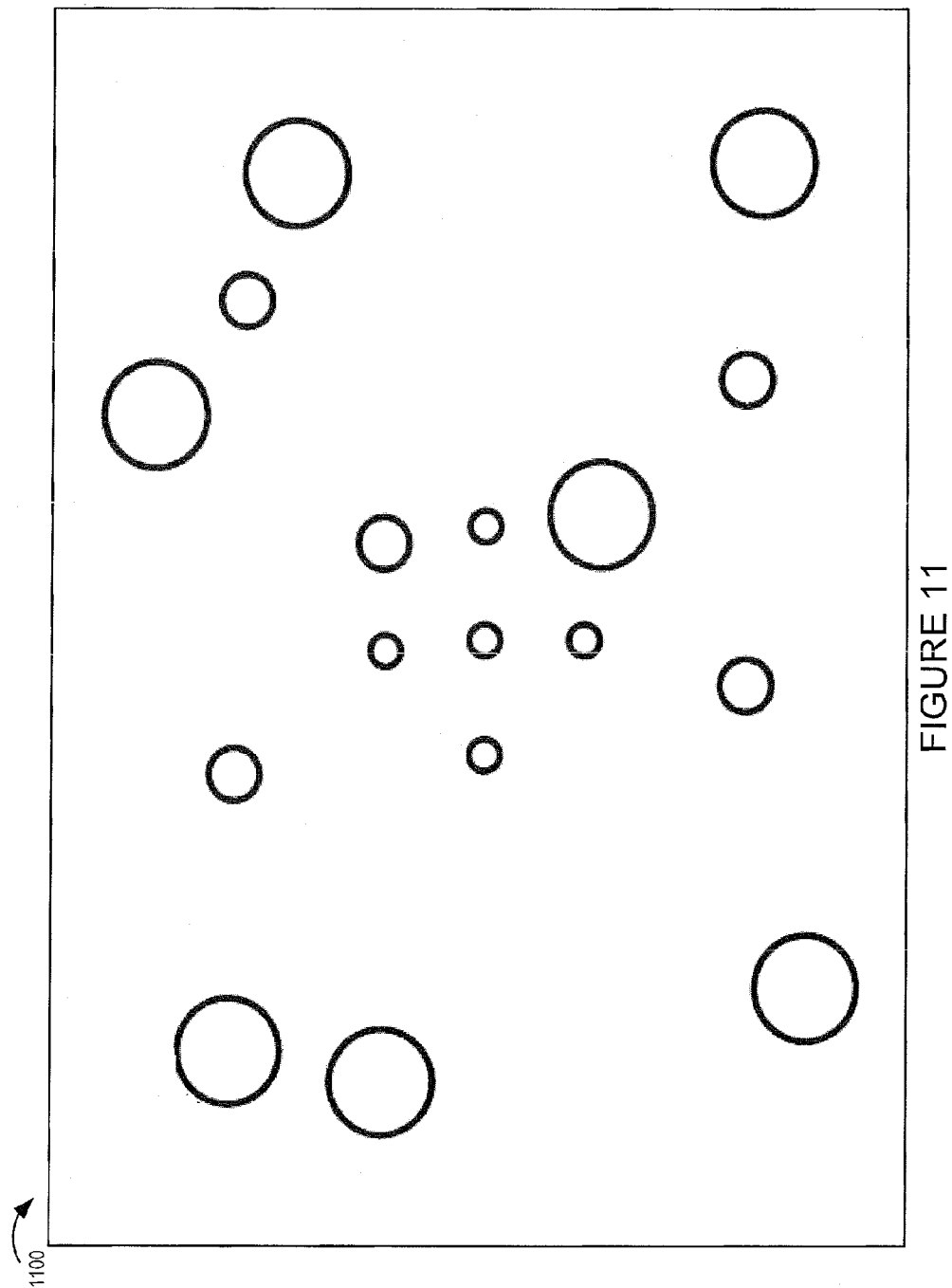
FIG. 11 illustrates the arrangement of lenses shown in FIGS. 8 and 9 in greater detail.

FIG. 11 shows an enlarged version 1100 of the outer lens arrangement of the camera 600. In FIG. 11 the outer lenses of the three different sizes can be clearly seen with the largest diameter lenses corresponding to camera modules having the largest focal length and thus zoom, e.g., magnification.

FIG. 12A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer lenses and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 maybe and in some embodiments are, used as the optical chains 1226, 1228, 1230, 1232 and 1234.

From the FIG. 12A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

Figure 12B:
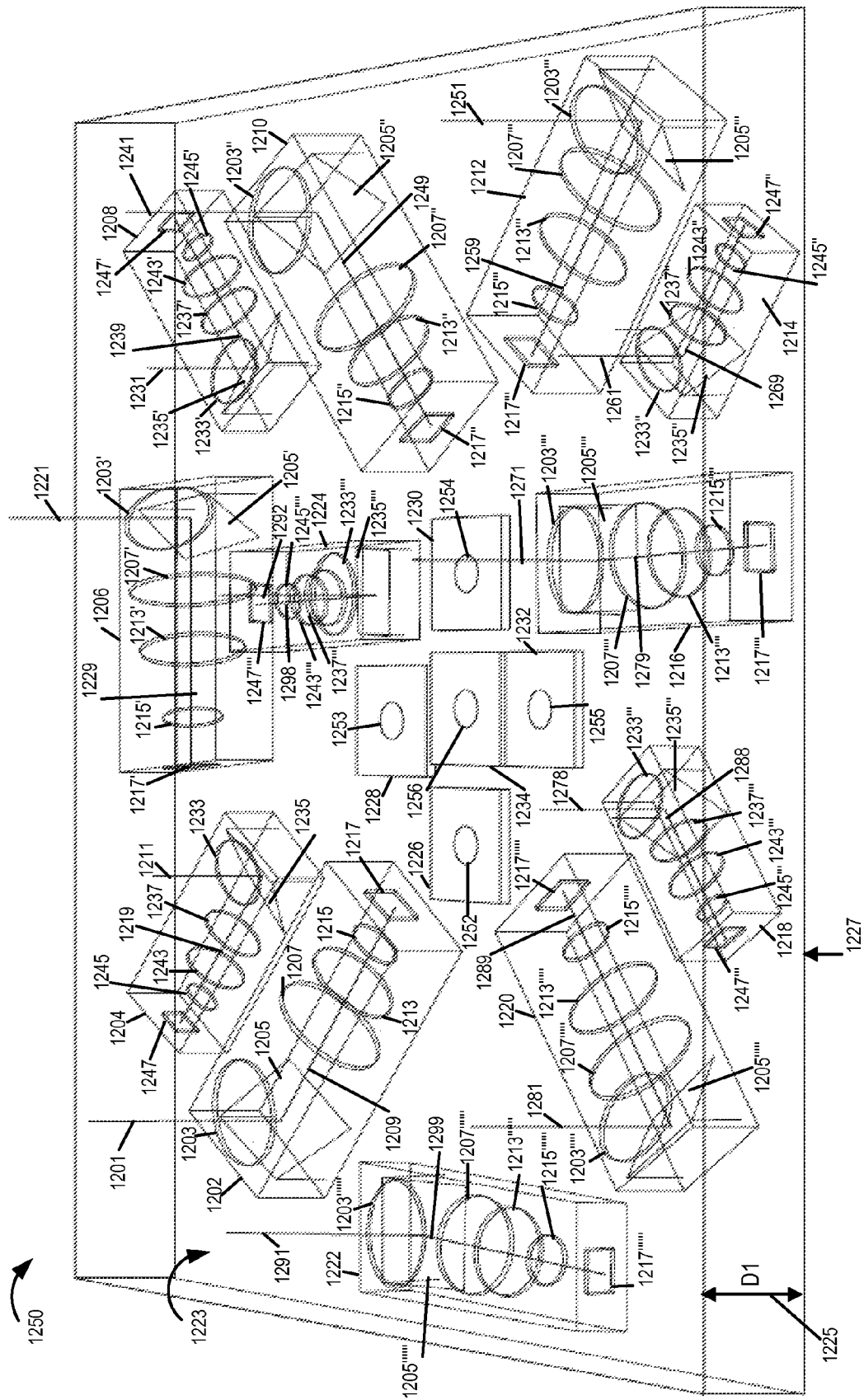
FIG. 12B illustrates a perspective view of a camera device of the type shown in FIG. 8, with the arrangement of various optical chains and elements of the optical chains in the camera device shown in greater detail.

FIG. 12B illustrates a perspective view 1250 of the camera device 600 showing the arrangement of various optical chains in the camera device and the elements of the optical chains in the camera device in greater detail. Thus FIG. 12B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 12A in detail.

As illustrated in FIG. 12B, the camera 600 has a depth D1 which represents the thickness of the camera 600 from the front surface of the camera (indicated by arrow 1223) to the back/rear surface of the camera (indicated by arrow 1227). While not shown in the FIG. 12B in some embodiments the camera device 600 includes the same or similar elements as the camera device of FIGS. 1 and/or 4A.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 12B each OC uses a round outer lens.

The OC 1202 includes an outer lens 1203, a light redirection device 1205, e.g., mirror, positioned behind the lens 1203, a first inner lens 1207, a filter 1213, a second inner lens 1215, and a sensor 1217. In some embodiments the OCs 1202, 1206, 1210, 1212, 1216, 1220, 1222 have the same focal length (largest focal length compared to other OCs in FIG. 12) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ('") etc. For example, OC 1206 includes an outer lens 1203', a light redirection device 1205', e.g., mirror, positioned behind the lens 1203', a first inner lens 1207', a filter 1213', a second inner lens 1215', and a sensor 1217'. The OC 1210 includes an outer lens 1203", a light redirection device 1205", a first inner lens 1207", a filter 1213", a second inner lens 1215", and a sensor 1217". The OC 1212 includes an outer lens 1203'", a light redirection device 1205'", a first inner lens 1207'", a filter 1213'", a second inner lens 1215'", and a sensor 1217'". The OC 1216 includes an outer lens 1203"", a light redirection device 1205"", a first inner lens 1207"", a filter 1213"", a second inner lens 1215"", and a sensor 1217"". The OC 1220 includes an outer lens 1203'"", a light redirection device 1205'"", a first inner lens 1207'"", a filter 1213'"", a second inner lens 1215'"", and a sensor 1217'"". The OC 1222 includes an outer lens 1203""", a light redirection device 1205""", a first inner lens 1207""", a filter 1213""", a second inner lens 1215""", and a sensor 1217""".

Similarly the elements corresponding to OCs 1204, 1208, 1214, 1218, 1224 which have the same focal lengths (intermediate) have been identified using the same reference numerals. The OC 1204 includes an outer lens 1233, a light redirection device 1235, e.g., mirror, positioned behind the lens 1233, a first inner lens 1237, a filter 1243, a second inner lens 1245, and a sensor 1247. Optical chain 1208 includes an outer lens 1233', a light redirection device 1235', e.g., mirror, positioned behind the lens 1233', a first inner lens 1237', a filter 1243', a second inner lens 1245', and a sensor 1247'. OC 1214 includes an outer lens 1233", a light redirection device 1235", a first inner lens 1237", a filter 1243", a second inner lens 1245", and a sensor 1247". OC 1218 includes an outer lens 1233'", a light redirection device 1235'", a first inner lens 1237'", a filter 1243'", a second inner lens 1245'", and a sensor 1247'" and the OC 1224 includes an outer lens 1233"", a light redirection device 1235"", a first inner lens 1237"", a filter 1243"", a second inner lens 1245"", and a sensor 1247"".

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer lens 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost lens 1252, 1253, 1254, 1255, and 1256 respectively through which light enters, the OCs 1226, 1228, 1230, 1232 and 1234 do not have light redirection elements in the FIG. 12B example. While not shown in FIG. 12B the OCs 1226, 1228, 1230, 1232 and 1234 each has an optical axis which is perpendicular to the front face 1223 of the camera 600.

The function of the various elements of an OC such as the outer and inner lenses, mirror, filters and sensors, has been discussed earlier, for example in the discussion of FIGS. 4B and 5. Since the function of the elements of the OCs shown in FIG. 12B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer lenses and is redirected by their respective redirection elements so that it reaches the respective sensors at the back of each of the optical chains. In many cases the outer lens through which the light enters the OC is referred to as the entrance pupil via which the light enters. For example, light entering through outer lens 1203 of the optical chain 1202 (e.g., from the front 1223 of the camera 600 as indicated by the first optical axis 1201) is redirected by mirror 1205 so that it passes through the first inner lens 1207, the filter 1213 and the second inner lens 1215 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the lens of an OC can be moved and/or rotated which results in changing of the optical axis of the OC seen from outside the outer lens of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 12B example the optical axes 1201, 1211, 1221, 1231, . . . 1298, 1299 appear to be parallel, in some embodiments by controlling the light redirection element such as the mirror placed behind the outer lens in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

Figure 12C:
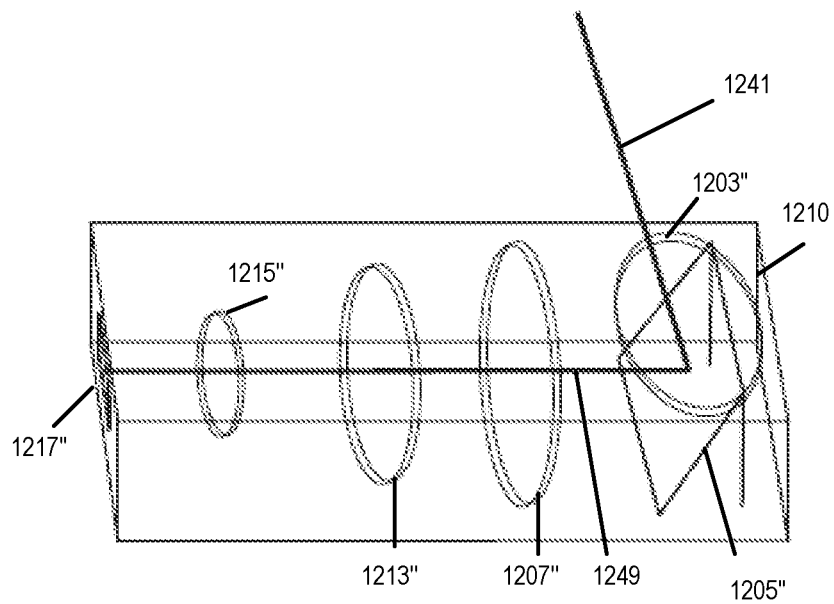
FIGS. 12C, 12D, 12E and 12F illustrate how a first portion of an optical axis of an optical chain shown in FIG. 12B can be changed by altering the position, e.g., angle, of a light redirection device which is part of the optical chain.
Figure 12D:
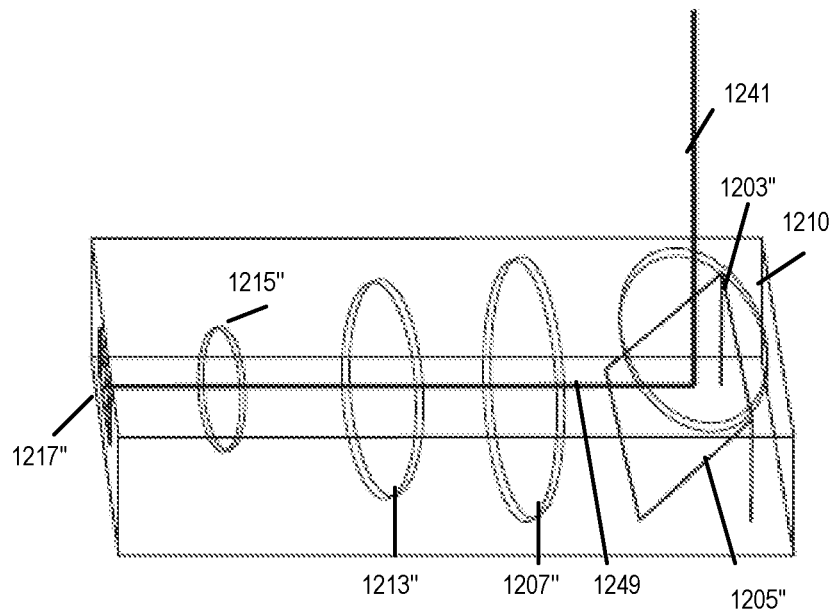
Figure 12E:
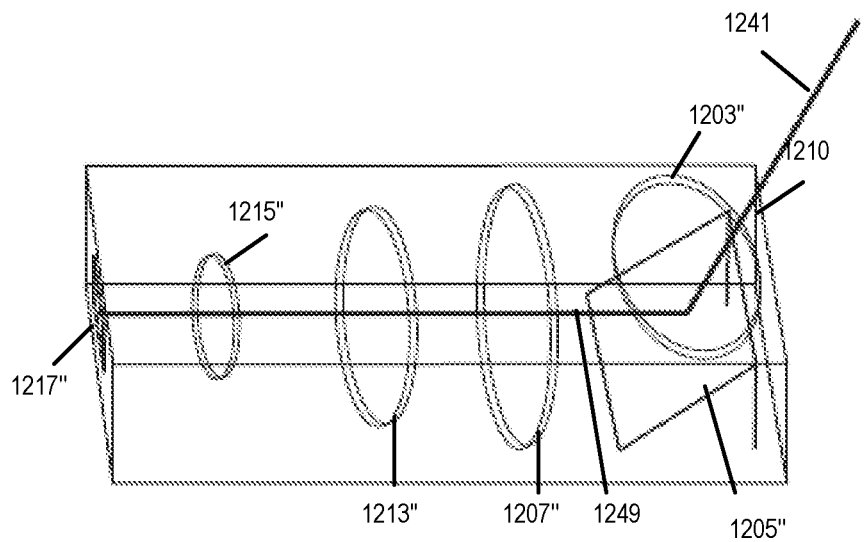

FIGS. 12C through 12E which show optical chain 1210 with the light redirection device 1205" at different positions is exemplary of how the first part 1241 of an optical path may be altered by altering the position of the light redirection device 1205". The OC 1210 includes an outer lens 1203", a light redirection device 1205", e.g., mirror, positioned behind the lens 1203", a first inner lens 1207", a filter 1213", a second inner lens 1215", and a sensor 1217".

In FIG. 12C the angle of the mirror is inclined upward resulting in the first portion 1241 of the optical path to be angled to the left. As should be appreciated by raising the mirror 1205" to this position a different image area will be observed and captured by the sensor 1217" than when the light redirection device 1205" is inclined at 45 degrees relative to the bottom of the optical chain module 1210, which will coincide to the rear of the camera in which the module is mounted assuming the lens 1203" is facing the front of the camera.

Figure 12F:
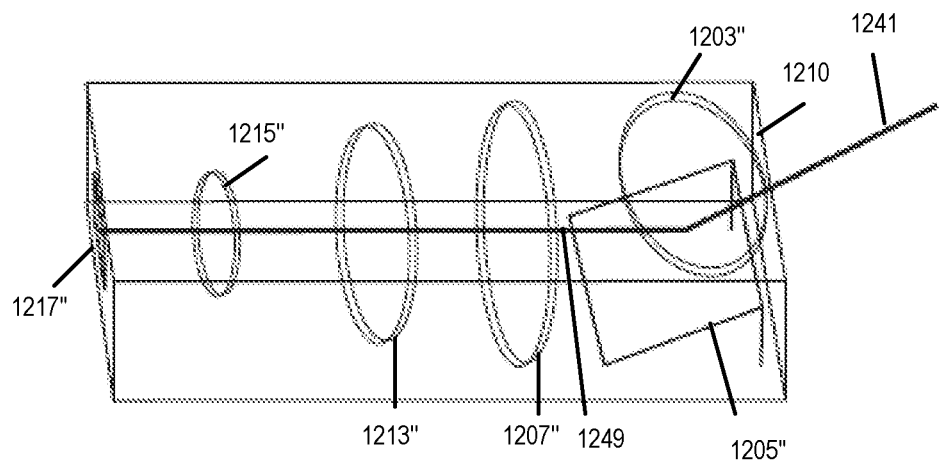

Assuming that in the FIG. 12D configuration, i.e., when the plain mirror 1205" is at a 45 degree angle and the image directed to the sensor corresponds to the center portion of a scene area, changing the position, e.g., angle, of the mirror 1205" will alter the portion of a scene area captured by the sensor 1217". FIG. 12E illustrates how the first portion 1241 can be directed to the right by lowering the angle of mirror 1205" while FIG. 12F shows how the portion of the scene which will be captured and be changed further by lowering the angle of the mirror 1205" even further.

While raising the angle of the light redirection device as shown in FIG. 12C is supported in some embodiments, in other embodiments angles of 45 degrees and less are supported. In such embodiments the maximum depth of the camera need not be increased to support the ability to raise the light redirection device beyond the 45 degree angle.

It should be appreciated that by altering the position of the light redirection devices of the modules shown in FIG. 12B the image areas captured by the modules with light redirection devices can be changed without moving the module itself. For optical chain modules arranged parallel to a 45 degree angle across the face of the camera, such as modules 1208, 1210, 1212, 1214, 1218, 1220, 1202, 1204, changing the angle of the light redirection device effectively moves the image capture area, e.g., from directly in front of the center of the camera or from capturing a corner quadrant of a scene area of interest for example, to some other portion of the scene area. In cases where the camera module is arranged along or parallel the 45 degree angle extending form one corner of the front face of the camera device 1250 to another corner of the camera device 1250 changing the mirror position will have the effect of sliding the image area being captured along the 45 degree diagonal. Thus, when the camera modules are located along the 45 degree bias of the front of the camera, the image capture area may be shifted so that a quadrant of a large image area is captured rather than a center portion of the large image area via simple movement of the light redirection devices of modules arranged along the 45 degree angle with respect to the front face of the camera. The images capture area may be effectively slide from the center to a corner quadrant, or vise versa, by altering the angle of the light rejection device 1205" as shown in FIGS. 12C through 12D.

Different optical chains, depending on their mirror positions and focal length, can, and in some embodiments are, used to capture different portions of a scene area of interest. The image areas which are captured may, and often do, overlap but need not overlap. Overlap of areas captured by different camera modules facilities combining of the images captured by the different modules.

For example consider the following discussion regarding one embodiment where the optical axes of at least some optical chains are not parallel. While for discussion purposes we refer to FIG. 12B and use the reference numbers corresponding to the elements shown in FIG. 12B, it is understood for the discussion of this particular embodiment that unlike the FIG. 12B example, the optical axes of two or more optical chains (as seen from outside the outermost lens of the optical chains) are not parallel to each other and may not be perpendicular to the front face of the camera. A camera device implemented in accordance with this embodiment includes a first optical chain, e.g., a first OC 1202, of a camera having a first optical axis and a first outermost lens and a second optical chain, e.g., a second OC 1208 or OC 1210, of the camera having a second optical axis which is not parallel to the first optical axis and a second outermost lens which is different from the first outermost lens. The first optical chain, can be and in some embodiments is, used to capture a first image of a first portion of a scene area of interest and the second optical chain, can be and in some embodiments is, used to capture a second image of a second portion of the scene area of interest. In some such embodiments the first and second optical axes are not perpendicular to the front face of the camera, e.g., such as front (1223) face of camera 600. In some embodiments in addition to the first and second optical chains, the exemplary camera includes a third optical chain, e.g., OC 1228, having a third optical axis and a third outermost lens 1253 which is separate from the first and second outermost lenses (e.g., 1203 and 1203"). In some embodiments the third optical chain has a focal length which is smaller than a focal length of at least one of the first or second optical chains. In some embodiments the third optical chain is used to capture a third image, the third image including the scene area of interest, e.g., image of the entire scene area of interest. In some embodiments the third optical axis is perpendicular to the front face 1223 of the camera. In some embodiments the third optical axis is not parallel to either of the first optical or the second optical axis. In some embodiments the second optical chain has a second focal length and the first optical chain has a first focal length, the second focal length is smaller than said first focal length. In some other embodiments the first and second focal lengths are the same. In some embodiments the third optical chain has a third focal length which is smaller than the first and second focal lengths.

In some embodiments in addition to the first, second and third optical chains, the camera includes a fourth optical chain, e.g., OC 1234, having a fourth outermost lens, e.g., lens 1256, which is separate from said first, second and third outermost lenses. In some embodiments the fourth optical chain is used to capture a fourth image, the fourth image including a second image of the scene area of interest, e.g., entire scene area of interest. In some embodiments the fourth optical chain has a fourth optical axis, and the third and fourth optical axes are parallel to each other. In some embodiments the third and fourth optical axes are not parallel to the first or second optical axis.

In some embodiments the camera further includes a fifth optical chain, e.g., OC 1220, having a fifth optical axis which is not parallel to the first and second optical axes and a sixth optical chain, e.g., OC 1212, having a sixth optical axis which is not parallel to the first, second, or fifth optical axis. In some embodiments the fifth optical chain is used to capture a fifth image and the sixth optical chain is used to capture a sixth image, the fifth image being an image of a third portion of the scene area of interest and the sixth image being an image of a fourth portion of the scene area of interest. In some embodiments the camera further includes a seventh optical chain, e.g., OC 1216, having the same focal length as the first optical chain, a seventh image, said seventh optical chain having an optical axis perpendicular to the face (1223) of the camera.

In some embodiments the camera 600 includes a processor (e.g., processor 110, 211) configured to generate a composite image by combining at least the first and second images. In some embodiments the processor is configured to generate the composite image from the first, second, third, fourth, fifth and sixth images. In some embodiments the processor is configured to generate the composite image from the first, second, third, fourth, fifth and sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

FIG. 13A shows an exemplary optical chain, e.g., a camera module, 1300 which is similar in construction to the camera module 500 shown in FIG. 5 but which uses a non-round, e.g., oval, outer lens 1312 and a rectangular mirror 1310 as a light redirection device. The optical chain 1300 is used in various exemplary embodiments. The camera module 1300 is an optical chain which includes an outer lenses 1312 which, in some but not all embodiments, is plane glass with no optical power, a light redirection device, e.g., mirror, 1310 positioned behind the lens 1312, a hinge drive 1316, a mirror hinge 1308, a first cylindrical module portion 1306, a second cylindrical module portion 1304, a sensor 1302 and a lens drive 1313. In some embodiments the cylindrical module portions may not be exactly cylindrical as the cross section in some embodiments maybe oval rather than circular. However even with oval cross sections the portions appear generally cylindrical in shape and thus will be referred to as cylindrical portions. Light enters the camera module 1300 via the lens 1312 and is redirected by the mirror 1310 so that it reaches the sensor 1302 at the back of the optical chain. The first and second cylindrical module portions 1304, 1306 can house one or more lenses or filters as well as other optical components through which light may pass before reaching the sensor 1302. While the outer lens 1312 has a non-round aperture, the sensor 1302 may be the same shape and/or type as used in the FIG. 5 embodiment. Thus while different optical chains may use different lenses they may still use a sensor of the same shape and/or resolution as the other optical chains in the camera device.

The advantages of using an optical chain having a non-round aperture in terms of potential camera thickness will be apparent in view of the discussion which follows.

Figure 13B:
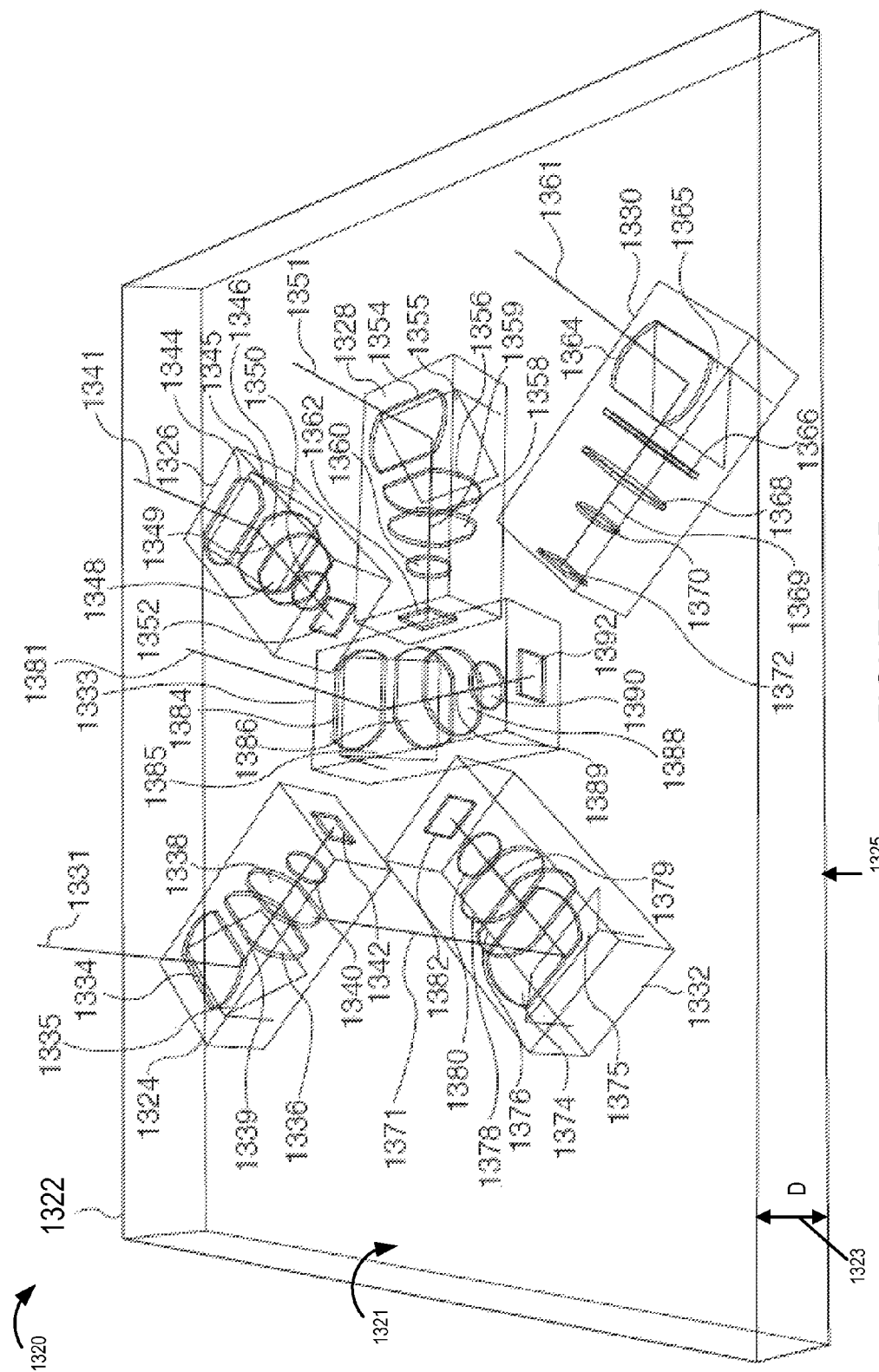
FIG. 13B is a drawing illustrating an exemplary arrangement of a plurality of optical chains (OCs) in a camera and the configuration and arrangement of the elements of each of the optical chains, in accordance with an exemplary embodiment.

FIG. 13B illustrates an exemplary arrangement of a plurality of optical chains (OCs) in a camera device 1320 including a camera housing 1322. In addition to the arrangement of the optical chains inside the camera, the configuration and arrangement of the internal elements of each of the optical chains is also shown in greater detail. While one exemplary arrangement with six OCs is shown in FIG. 13B, it should be appreciated that the optical chains can be arranged in various other positions within the camera 1320. As illustrated in FIG. 13B, the camera 1320 has a depth D which represents the thickness of the camera 1320 from the front surface of the camera (indicated by arrow 1321) to the back/rear surface of the camera (indicated by arrow 1325). It should be appreciated that FIG. 13B shows a perspective view of camera device 1320 so that various features of the camera device 1320 such as camera housing 1322, thickness (D) 1323, front and rear surfaces 1321 and 1325 can be better appreciated. In some embodiments the camera device 1320 includes the same or similar elements as the camera device of FIGS. 1 and/or 4A.

The plurality of optical chains shown in FIG. 13B includes OC 1324, OC 1326, OC 1328, OC 1330, OC 1332 and OC 1333. The elements included in each of the various optical chains shown are similar to those discussed above with regard to FIG. 4A and FIG. 13A. In the embodiment of FIG. 13B each OC uses a non-round, e.g., oval, outer lens.

The OC 1324 includes an outer lens 1334, a light redirection device 1335, e.g., mirror, positioned behind the lens 1334, a first inner lens 1336, a filter 1338, a second inner lens 1340, and a sensor 1342. The OC 1326 includes an outer lens 1344, a light redirection device 1345 positioned behind the lens 1344, a first inner lens 1346, a filter 1348, a second inner lens 1350, and a sensor 1352. The OC 1328 includes an outer lens 1354, a light redirection device 1355 positioned behind the lens 1354, a first inner lens 1356, a filter 1358, a second inner lens 1360, and a sensor 1362. Similarly, OC 1330 includes an outer lens 1364, a light redirection device 1365 positioned behind the lens 1364, a first inner lens 1366, a filter 1368, a second inner lens 1370, and a sensor 1372. The OC 1332 includes an outer lens 1374, a light redirection device 1375 positioned behind the lens 1374, a first inner lens 1376, a filter 1378, a second inner lens 1380, and a sensor 1382. The OC 1333 includes an outer lens 1384, a light redirection device 1385 positioned behind the lens 1384, a first inner lens 1386, a filter 1388, a second inner lens 1390, and a sensor 1392.

As discussed with regard to FIG. 4B, an optical chain such as the optical chain 1324 shown in FIG. 13B, that has a light redirection element, such as the element 1335, can be divided, for purposes of discussion, into two parts. The optical axis of the optical chain 1324 as seen from outside the camera is the optical axis of a first part 1331 (entering the OC from the front of the camera 1320 via the outer lens 1334). Light traveling into the optical chain 1324 along the optical axis is redirected by the redirection element 1335 and traverses a second part 1339 of the first optical chain and reaches the sensor 1342. Similarly, the optical axis of the optical chain 1326 includes a first part 1341 and a second part 1349 after light redirection by the redirection element 1345, the optical axis of the optical chain 1328 includes a first part 1351 and a second part 1359, the optical axis of the optical chain 1330 includes a first part 1361 and a second part 1369, the optical axis of the optical chain 1332 includes a first part 1371 and a second part 1379 and the optical axis of the optical chain 1333 includes a first part 1381 and a second part 1389.

In some particular embodiments, the camera 1320 has a plurality of optical chains/camera modules such as the OCs 1324 through 1333 having lenses with non-circular (also referred as non-round) apertures. In one such embodiment the camera 1320 includes a first optical chain, e.g., OC 1324, that uses the lens 1336 whose non-circular aperture has a length less than or equal to D (camera thickness) in a first direction along the direction of the thickness of the camera and a length larger than D along a second direction perpendicular to the direction of the thickness of the camera. In various embodiments the first lens is the lens closest to the light redirection element on the second optical axis portion, e.g., lens 1336. In some such embodiments the camera 1320 further includes a second optical chain, e.g., OC 1326, that uses a lens 1346 whose non-circular aperture has a length less than or equal to D in the first direction along the direction of the thickness of the camera and a length larger than D along a third direction perpendicular to the first direction. In some such embodiments the second and third directions are at an angle of 90 degrees with respect to each other. In some such embodiments the camera 1320 further includes a third optical chain, e.g., OC 1333, that uses the lens 1386 whose non-circular aperture has a length less than or equal to D in a first direction along the direction of the thickness of the camera and a length larger than D along a fourth direction perpendicular to the first direction, the first, second and third directions being different. In some such embodiments the second and third directions are at an angle of 90 degrees with respect to each other and the second and fourth direction are at an angle between 30 degrees and 60 degrees (e.g., 45 degrees) with respect to each other. In some embodiments the first light redirection device is a mirror. In some embodiments the first light redirection device is a prism. In some embodiments the first light redirection device is a 45 degree angled plane mirror which redirects light by 90 degrees.

The function of the various elements of an OC such as the outer and inner lenses, mirror, filters and sensors, has been discussed earlier, for example in the discussion of FIGS. 4A and 13A. Since the function of the elements of the OCs shown in FIG. 13B is the same or similar and thus the discussion will not be repeated in detail.

Light enters each of the OCs 1324 through 1333 via their respective outer lenses and is redirected by their respective redirection elements so that it reaches the respective sensors at the back of each of the optical chains. In many cases the outer lens through which the light enters the OC is referred to as the entrance pupil via which the light enters. For example, light entering through outer lens 1334 of the optical chain 1324 (e.g., from the front of the camera 1320 as indicated by the first optical axis 1331) is redirected by mirror 1335 so that it passes through the first inner lens 1336, the filter 1338 and the second inner lens 1340 as it travels towards sensor 1342. More or less number of elements, e.g., lenses, filters etc., may be included in each of the OCs in some embodiments. Different optical chains may use different lenses while still using a sensor of the same shape and/or resolution as the other optical chains in the camera device.

FIG. 14 shows a camera device 1400 which is similar to the camera device 600 but which uses lenses with non-round apertures for large focal length optical chains. In various embodiments the lenses with non-round apertures are included as part of various optical chains in a camera housing 1402. The use of lenses with non-round, e.g., oval, apertures is visible in lens area 1404. While the non-round lenses have the same maximum length in one dimension as the round lenses used in FIG. 6 they are smaller in the other direction, e.g., the direction perpendicular to the direction of maximum aperture extent. Different orientations of the lenses with the non-round apertures is intentionally used to allow for the capture of high frequency information in addition to low frequency information in a variety of directions. The camera 1400 is similar to the camera 1320 illustrated in FIG. 13B, however in FIG. 13B a particular arrangement of the optical chains/camera modules with non-round apertures is illustrated while in FIG. 14 the camera 1400 includes optical chains some of which use lenses with round apertures and some other use lenses with non-round apertures as can be seen. The plurality of various optical chains illustrated in FIG. 13B and discussed above can be used in the camera 1400.

While not shown in FIG. 14, it should be appreciated that camera device 1400 may and sometimes does include the same or similar elements as camera device 100 and camera device 200 of FIGS. 1 and 4A. Thus it should be appreciated that camera device 1400 includes various elements such as the processor 110/211, memory 108/213, zoom controller 140/214, exposure and read out controller 150, accelerometer, gyro, autofocus controller 152 etc., and various other elements discussed above with regard to camera devices 100 and 200.

Figure 15:
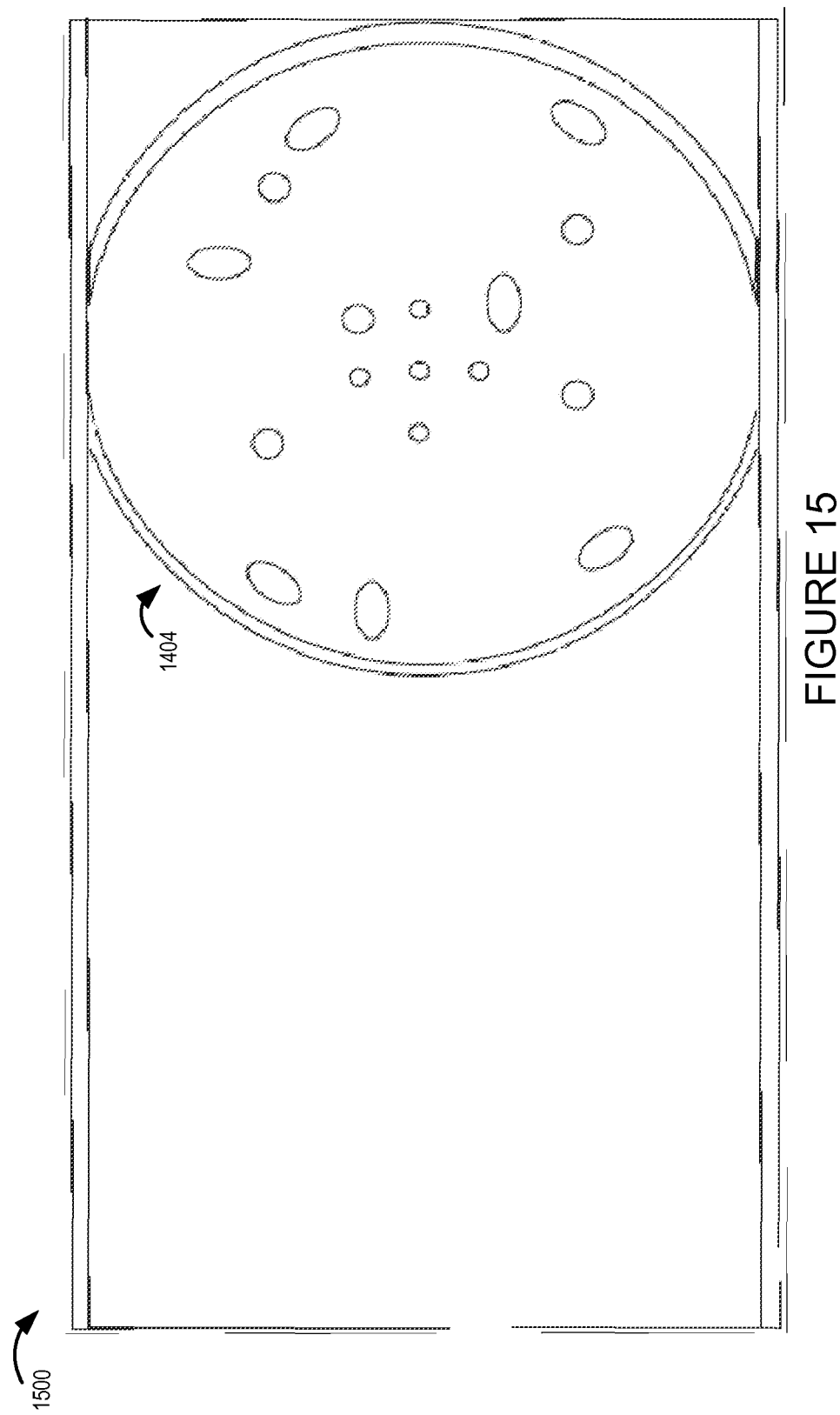
FIG. 15 is a diagram of the front of the camera device shown in FIG. 14 without the camera case.

FIG. 15 is a simplified frontal view 1500 of the camera 1400 with the lens area 1404 clearly shown. As can be seen more clearly in FIG. 15, the lens area 1404 of the camera shows outer lens apertures some of which are round while various others are non-round. As discussed above, such a combination allows for capturing of high frequency information in addition to low frequency information in a various directions.

Figure 16:
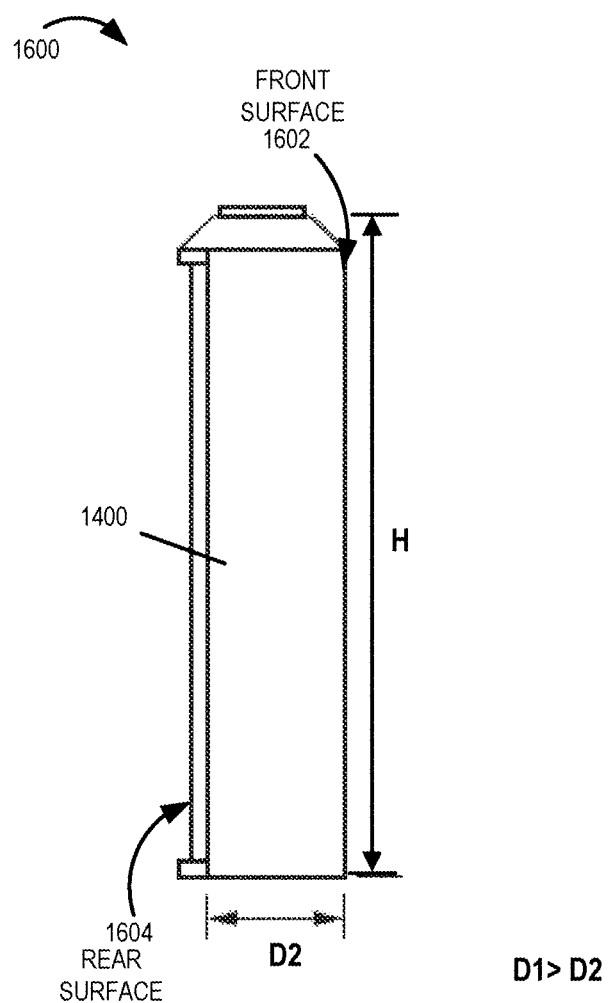
FIG. 16 is a side view of the camera device of FIG. 14 from which it can be seen that the camera has a depth D2 and a height H, where D2 is less than D1 which is the depth of the camera device shown in FIGS. 6-9.

FIG. 16 is a side view 1600 of the camera device 1400. In the side view 1600 of the camera 1400 the front surface 1602 and rear surface 1604 of the camera 1400 is also shown. Note that while the camera height H is the same as in the FIG. 10 example which corresponds to the camera device 600, the camera device 1400 is implemented with a depth D2 which is less than D1 and which, in some embodiments, is less than the length of the oval apertures in the direction of maximum extent. In the FIG. 14 embodiment by using lenses with oval apertures for the camera modules having the largest focal length, the camera depth is not constrained by the maximum dimension of the largest aperture dimension and can be less than the maximum length the of the aperture.

While large or the largest aperture lenses included in a camera such as the camera 1400 may affect the minimum thickness of a camera due to the physical size of the large lenses or light redirection devices associated therewith, it is often possible to support smaller apertures using round lenses while using the non-round lenses for the larger apertures. This is because the light redirection devices corresponding to the smaller round lenses may not be as large and deep as mirrors which would otherwise be required to redirect light of larger round apertures within the body of the camera by 90 degrees. In some embodiments a combination of large lenses with non-round apertures and smaller lenses with round apertures is used. This approach is used in some embodiments including the one shown in FIG. 17.

FIG. 17A shows an arrangement 1700 of optical chains, e.g., camera modules which may be used to implement the camera device 1400. The optical chains (OCs) of the type shown in FIGS. 5 and 13A may be used in the FIG. 17 embodiment but the implementation is not limited to the use of such optical chains. Note that lenses with round apertures are used for the optical chains 1704, 1708, 1714, 1718, 1724 having medium focal lengths and optical chains 1726, 1728, 1730, 1732 and 1734 having small focal lengths. Lenses having non-round apertures are used for the optical chains 1702, 1706, 1710, 1712, 1716, 1720, 1722, having large focal lengths. The particular arrangement and angle of the non-round apertures can be beneficial as will be apparent from the discussion of FIGS. 18 to 23. Each of the optical chains 1704, 1708, 1714, 1718, and 1724 use lenses with round apertures and include elements which are the same or similar to the elements discussed in detail with regard to FIG. 5. Similarly, each of the optical chains 1702, 1706, 1710, 1712, 1716, 1720, 1722 use lenses with non-round apertures and include elements which are the same or similar to the elements discussed in detail with regard to FIG. 13A.

In one embodiment, an optical chain (OC) such as OC 1722, is a first optical chain having a first focal length and a first non-circular lens, and another optical chain, e.g., OC 1706, is a second optical chain having a second focal length and a second non-circular lens. In some embodiments the first and second focal lengths are the same. In some other embodiments the first and second focal lengths are different. In some embodiments the first non-circular lens extends in the first direction by an amount which is greater than a depth of the camera 1400, e.g., depth D2 shown in FIG. 16. In some embodiments the first optical chain includes a first sensor, and the second optical chain includes a second sensor, e.g., such as sensor 1302 of FIG. 13A. In some embodiments the camera 1400 further includes a processor, e.g., such as processor 110 or 211, coupled to the first and second sensors for combining images captured by the first and second sensors to generate a composite image. In some embodiments the first optical chain includes a first light redirection element and the second optical chain includes a second light redirection element, e.g., such as the light redirection element 1310 of FIG. 13A. In some such embodiments the first light redirection element extends in at least one direction by an amount which is greater than the depth of the camera, and the second light redirection element extends in at least one direction by an amount which is greater than the depth of the camera. In some embodiments the first and second light redirection elements are plane mirrors. In some embodiments the first and second light redirection elements are prisms. In some embodiments the first and second focal lengths are equal to or greater than 70 mm and the third focal length is less than 70 mm. In some embodiments the first and second sensors have the same number of pixels, and the third optical chain includes a third sensor having the same number of pixels as the first and second sensors.

In some embodiments an optical chain using round aperture lens, e.g., OC 1704 or 1728, is a third optical chain having a third focal length and including a round lens, the third focal length being less than the first or second focal lengths. In some embodiments the first non-circular lens, corresponding to the first optical chain 1722, is longer in a first direction than in a second direction which is perpendicular to the first direction, and the second non-circular lens, corresponding to the second optical chain 1706, is longer in a third direction than in a fourth direction, the fourth direction being perpendicular to the third direction. In some embodiments the first and third directions are different. In some embodiments the first direction extends in a first plane and the third direction is in the same plane as the first plane. In some embodiments the plane corresponds to a front of the camera 1400.

In some embodiments another camera module, e.g., 1710, is a fourth optical chain having a fourth focal length and a third non-circular lens, the fourth focal length being larger than the third focal length. In some such embodiments the third non-circular lens is longer in a fifth direction than in a sixth direction, the sixth direction being perpendicular to the fifth direction. In some such embodiments the first, third, and fifth directions are different by at least 20 degrees.

Figure 17B:
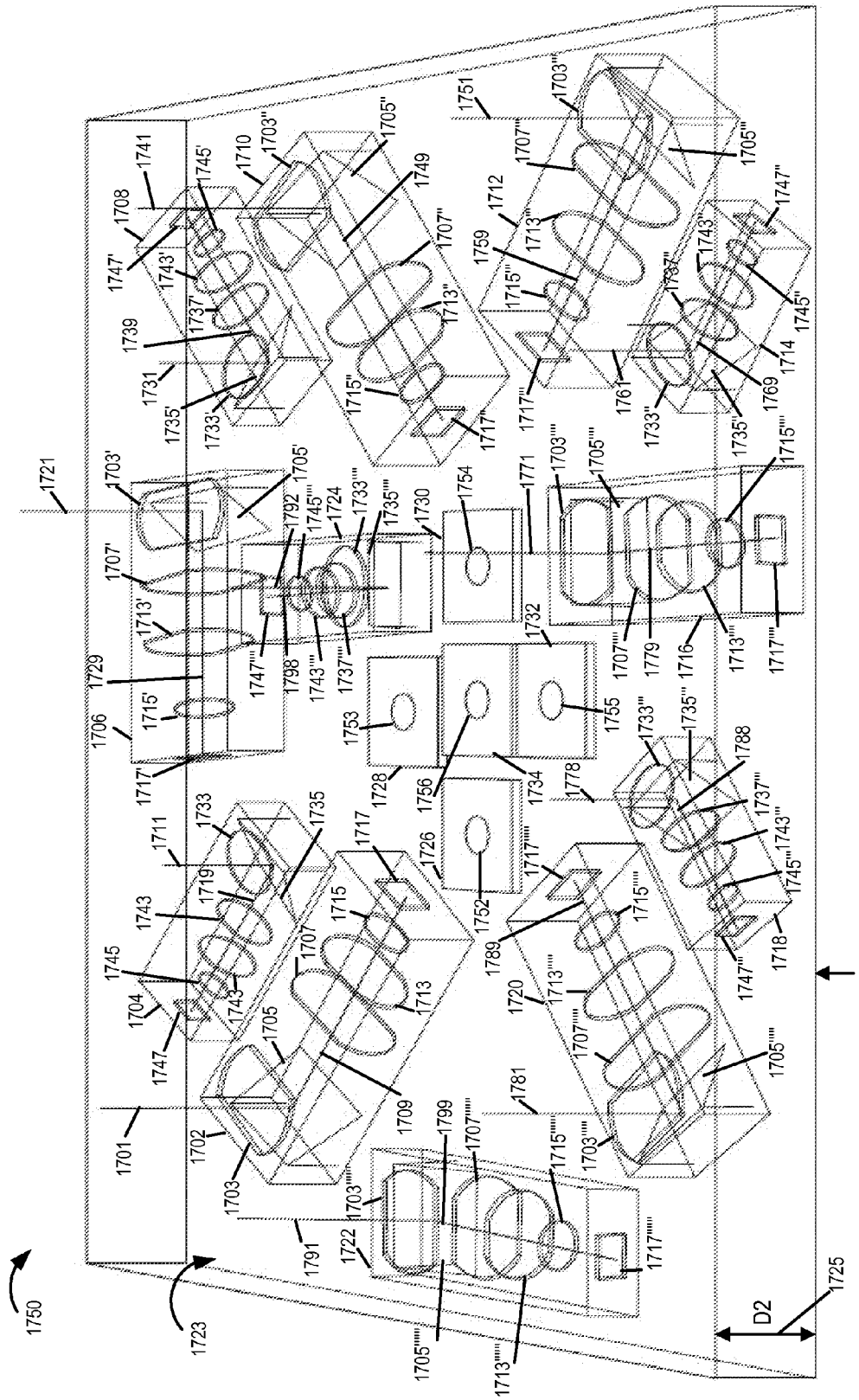
FIG. 17B illustrates a perspective view of a camera device of the type shown in FIG. 14, with the arrangement of various optical chains and elements of the optical chains in the camera device shown in greater detail.

FIG. 17B illustrates a perspective view 1750 of the camera device 1400, with the arrangement of various optical chains and elements of the optical chains in the camera device shown in greater detail.

FIG. 17B illustrates a perspective view 1750 of the camera device 1400 showing the arrangement of various optical chains in the camera device and the elements of the optical chains in the camera device in greater detail. Thus FIG. 17B presents a more detailed illustration of the plurality of optical chains (OCs) 1702, 1704, 1706, 1708, 1710, 1712, 1714, 1716, 1718, 1720, 1722, 1724, 1726, 1728, 1730, 1732 and 1734 having various corresponding focal lengths as discussed with regard to FIG. 17A in detail.

As illustrated in FIG. 17B, the camera 1400 has a depth D2 which represents the thickness of the camera 1400 from the front surface (indicated by arrow 1723) of the camera to the back/rear surface of the camera (indicated by arrow 1727). While not shown in the FIG. 17B in some embodiments the camera device 1400 includes the same or similar elements as the camera device of FIGS. 1 and/or 4A.

In some embodiments the elements included in the optical chains 1702, 1706, 1710, 1712, 1716, 1720, 1722, are similar to those discussed above with regard to FIG. 13B. The optical chains 1704, 1708, 1714, 1718, 1724 and the elements included in these optical chains are similar to those discussed with regard to OCs 1204, 1208, 1214, 1218, 1224 discussed above with regard to FIG. 12B while the optical chains 1726, 1728, 1730, 1732 and 1734 and the elements included therein are similar to those discussed with regard to OCs 1226, 1228, 1230, 1232 and 1234 and the OCs discussed with regard to FIG. 3. In the illustrated embodiment of FIG. 17B some of the OCs use a non-circular outer lens while other OCs use round outer lenses.

The OC 1702 includes a non circular outer lens 1703, a light redirection device 1705, e.g., mirror, positioned behind the lens 1703, a first inner lens 1707 (non circular), a filter 1713, a second inner lens 1715, and a sensor 1717. In some embodiments the OCs 1702, 1706, 1710, 1717, 1716, 1720, 1722 have the same focal length (largest focal length compared to other OCs in FIG. 17) and use similar elements such as the mirror, filter, sensor etc. Accordingly, the elements corresponding to OCs 1706, 1710, 1717, 1716, 1720, 1722 have been identified using the same reference numerals used for identifying similar elements in the OC 1702 but with the reference numbers in these OCs followed by a prime ('), double prime ("), triple prime ("') etc. For example, OC 1706 includes a non circular outer lens 1703', a light redirection device 1705', e.g., mirror, positioned behind the lens 1703', a first non circular inner lens 1707', a filter 1713', a second inner lens 1715', and a sensor 1717'. The OC 1710 includes a non circular outer lens 1703''', a light redirection device 1705''', a first non circular inner lens 1707''', a filter 1713''', a second inner lens 1715''', and a sensor 1717'''. The OC 1712 includes a non circular outer lens 1703''', a light redirection device 1705''', a first non circular inner lens 1707''', a filter 1713''', a second inner lens 1715''', and a sensor 1717'''. The OC 1716 includes a non circular outer lens 1703'''', a light redirection device 1705'''', a first non circular inner lens 1707'''', a filter 1713'''', a second inner lens 1715'''', and a sensor 1717''''. The OC 1720 includes a non circular outer lens 1703''''', a light redirection device 1705''''', a first non circular inner lens 1707''''', a filter 1713''''', a second inner lens 1715''''', and a sensor 1717'''''. The OC 1722 includes a non circular outer lens 1703'''''', a light redirection device 1705'''''', a first non circular inner lens 1707'''''', a filter 1713'''''', a second inner lens 1715'''''', and a sensor 1717''''''.

In some embodiments the optical chains 1704, 1708, 1714, 1718, 1724 have the same focal lengths (intermediate). The OC 1704 includes an outer lens 1733, a light redirection device 1735, e.g., mirror, positioned behind the lens 1733, a first inner lens 1737, a filter 1743, a second inner lens 1745, and a sensor 1747. The elements corresponding to OCs 1708, 1714, 1718, 1724 which have the same focal length as OC 1704 have been identified using the same reference numerals used for identifying similar elements in the OC 1704 but with the reference numbers in these OCs followed by a prime ('), double prime ("), etc. As shown, optical chain 1708 includes an outer lens 1733', a light redirection device 1735', e.g., mirror, positioned behind the lens 1733', a first inner lens 1737', a filter 1743', a second inner lens 1745', and a sensor 1747'. OC 1714 includes an outer lens 1733", a light redirection device 1735", a first inner lens 1737", a filter 1743", a second inner lens 1745", and a sensor 1747". OC 1718 includes an outer lens 1733''', a light redirection device 1735''', a first inner lens 1737''', a filter 1743''', a second inner lens 1745''', and a sensor 1747''' and the OC 1724 includes an outer lens 1733'''', a light redirection device 1735'''', a first inner lens 1737'''', a filter 1743'''', a second inner lens 1745'''', and a sensor 1747''''.

As discussed earlier, an optical chain such as the OC 1702 (or OCs 1706, 1710, 1712, 1716, 1720, 1722, 1704, 1708, 1714, 1718, 1724), that has a light redirection element, such as the element 1705, can be divided, for purposes of discussion, into two parts. The optical axis of the optical chain 1702 as seen from outside of the front of the camera is the optical axis of a first part 1701 (entering the OC from the front 1723 of the camera 1400 via the outer lens 1703). Light traveling into the optical chain 1702 along the optical axis is redirected by the redirection element 1705 and traverses a second part 1709 of the first optical chain and reaches the sensor 1717. Similarly, the optical axis of the optical chain 1704 includes a first part 1711 and a second part 1719 after light redirection by the redirection element 1735, the optical axis of the optical chain 1706 includes a first part 1721 and a second part 1729, the optical axis of the optical chain 1708 includes a first part 1731 and a second part 1739, the optical axis of the optical chain 1710 includes a first part 1741 and a second part 1749, the optical axis of the optical chain 1717 includes a first part 1751 and a second part 1759, the optical axis of the optical chain 1714 includes a first part 1761 and a second part 1769, the optical axis of the optical chain 1716 includes a first part 1771 and a second part 1779, the optical axis of the optical chain 1718 includes a first part 1778 and a second part 1788, the optical axis of the optical chain 1720 includes a first part 1781 and a second part 1789, the optical axis of the optical chain 1722 includes a first part 1791 and a second part 1799, and the optical axis of the optical chain 1724 includes a first part 1792 and a second part 1798.

The other optical chains OCs 1726, 1728, 1730, 1732 and 1734 (smallest focal length OCs) while each having an outermost lens 1752, 1753, 1754, 1755, and 1756 respectively through which light enters, the OCs 1726, 1728, 1730, 1732 and 1734 do not have light redirection elements in the FIG. 17B example. While not shown in FIG. 17B, the OCs 1726, 1728, 1730, 1732 and 1734 each has an optical axis which is perpendicular to the front face 1723 of the camera 1400.

The function of the various elements of an OC such as the outer and inner lenses, mirror, filters and sensors, has been discussed earlier, for example with regard to FIGS. 4B and 5. Since the function of the elements of the OCs shown in FIG. 17B is the same or similar to that discussed with regard to FIGS. 4A-4B and 5, the discussion will not be repeated.

Light enters each of the OCs 1702, 1706, 1710, 1717, 1716, 1720, 1722, 1704, 1708, 1714, 1718, 1724 via their respective outer lenses and is redirected by their respective redirection elements so that it reaches the respective sensors at the back of each of the optical chains. In many cases the outer lens through which the light enters the OC is referred to as the entrance pupil via which the light enters. For example, light entering through outer lens 1703 of the optical chain 1702 (e.g., from the front 1723 of the camera 1400 as indicated by the first optical axis 1701) is redirected by mirror 1705 so that it passes through the first inner lens 1707, the filter 1713 and the second inner lens 1715 as it travels towards sensor 1717. More or less number of elements, e.g., lenses, filters etc., may be included in each of the OCs in some embodiments. Different optical chains may use different lenses while still using a sensor of the same shape and/or resolution as the other optical chains in the camera device 1400. It should be appreciated that the use of optical chains with non-circular lenses arranged in the manner illustrated in FIG. 17B provides several advantages and allows implementation of a thin camera with optical chains have various different focal lengths.

It should be appreciated that the light redirection elements, e.g., such as a hinged mirror, positioned behind the lens of an OC can be moved and/or rotated which results in changing of the optical axis of the OC seen from outside the outer lens of the corresponding OC. That is the optical axis of an optical chain as seen from outside the camera (discussed above as the optical axis of a first part such as optical axes 1701, 1711, 1731 etc.) can be changed by controlling the light redirection elements of the corresponding OC. Thus it should be appreciated that while in FIG. 17B example the optical axes 1701, 1711, 1721, 1731, ... 1798, 1799 appear to be parallel, in some embodiments by controlling the light redirection element such as the mirror placed behind the outer lens in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

Figure 18:
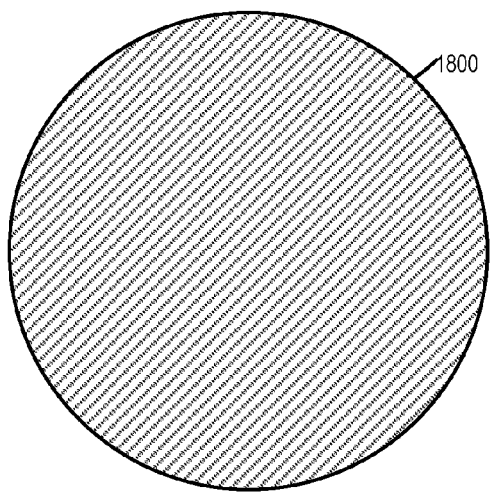
FIG. 18 shows a round aperture corresponding to an exemplary lens with a round opening such as the lenses which may and sometimes are used in the FIG. 12A embodiment.

FIG. 18 shows a round aperture 1800 corresponding to an exemplary lens with a round opening such as the lenses which may and sometimes are used in the FIGS. 12A and 12B embodiment.

Figure 19:
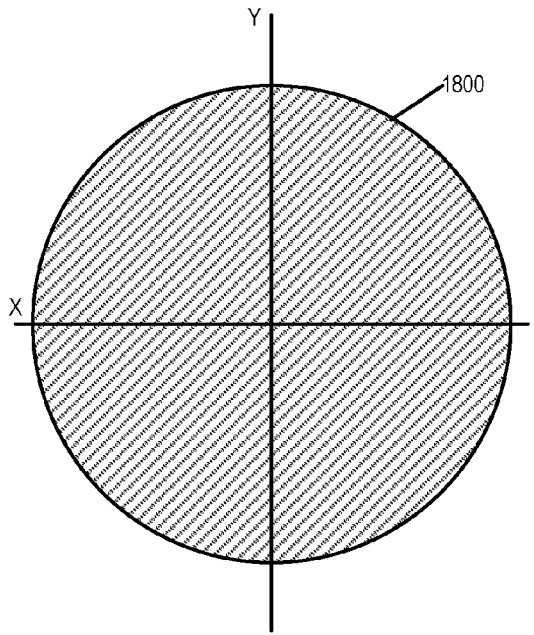
FIG. 19 shows the frequency characteristics which are expected from a lens of the type shown in FIG. 18 with the frequency information being the same or similar in both dimensions.

FIG. 19 shows the possible frequency characteristics which are expected from a well designed (diffraction limited) lens with a round aperture 1800 of the type shown in FIG. 18 with the frequency information being uniform in both vertical and horizontal directions (actually any direction). The uniform frequency characteristics in the vertical and horizontal dimension will allow for the same or similar frequency characteristics and thus resolutions in both the vertical and horizontal dimensions. While the number of pixels or pixel elements of a sensor can affect resolution, the number of picture elements of a sensor or image should not be confused with resolution which relates to the ability of a viewer to distinguish between different features of an image. Resolution quantifies how close lines can be to each other and still be visibly resolved. Resolution units can be tied to physical sizes such as lines per mm, lines per inch and/or to the overall size of an image such, e.g., lines per picture height.

Given the generally uniform frequency response of a lens with a round aperture, a view of an image captured using a round lens should be able to identify vertical and horizontal lines equally well.

Figure 20:
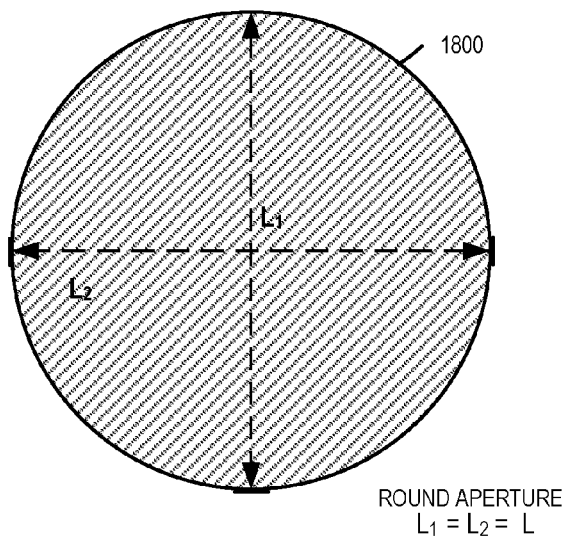
FIG. 20 shows how, in the case of a round aperture, the length of the opening through which light passes is the same in both dimensions of the plane in which the lens opening exists.

FIG. 20 shows how, in the case of a round aperture 1800, the length of the opening through which light passes is the same in both dimensions of the plane in which the lens opening exists. As shown, the length of the opening in the vertical direction $L_1$ equals the length of the opening in the horizontal direction $L_2$. As should be appreciated this is not the case where a lens has a non-round aperture, e.g., an oval, oblong or other non-round shaped aperture through which light passes.

Figure 21:
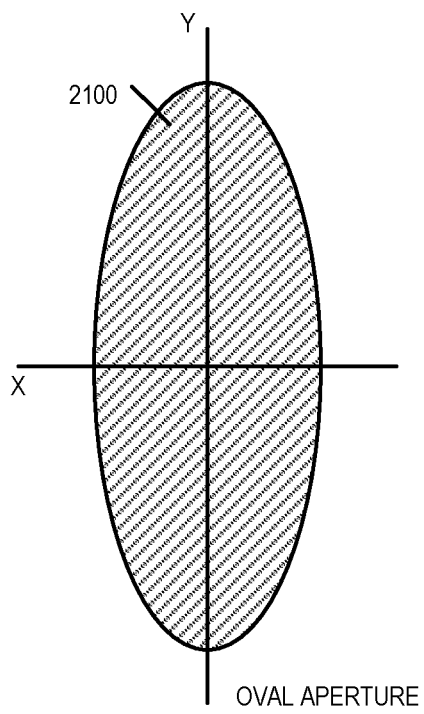
FIG. 21 shows an exemplary non-round, e.g., oval, aperture with the shading used to show the relative amount of frequency information in each of the horizontal and vertical directions which will be captured with it being clear from the figure that more frequency information is available in the vertical direction than in the horizontal direction thereby resulting in higher frequency information being captured and available in the longer dimension of the aperture than in the narrower dimension.

FIG. 21 shows an exemplary non-round, e.g., oval, aperture 2100, with the shading being used to show the relative amount of frequency information in each of the horizontal and vertical directions which will be captured. being clear from the figure that more frequency information is available in the vertical direction than in the horizontal direction thereby resulting in higher frequency information being captured and available in the longer dimension, e.g., dimension of maximum extent, of the aperture than in the narrower dimension.

In general, the performance of even the best designed lenses is limited by their aperture size because of the diffraction limit. The larger the aperture, the better a well-designed lens should be able to perform in terms of capturing detail. In other words, the larger the aperture the greater is the resolution that is possible. The captured resolution can be expressed in the frequency domain as in FIG. 19. A larger radius of the circle in FIG. 19 indicates more captured high frequency information in all spatial directions of the image, e.g., horizontal, vertical or slanted. It is important to note that even when a camera module is not diffraction limited and the above may not apply, it is sometimes still desirable to use a larger aperture because a larger aperture area captures more light in a given period of time making the images less grainy or noisy when the exposure time is limited as is often the case when a subject which is to have its image captured is in motion.

If the aperture is not round but oval, for a well-designed diffraction limited lens there is correspondingly more detail captured along the direction of the longer oval dimension than the direction of the shorter oval dimension.

Figure 22:
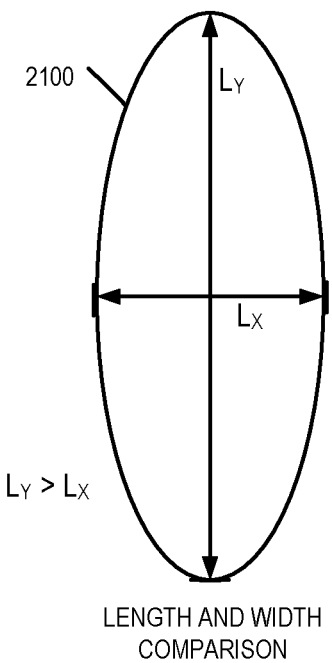
FIG. 22 shows a comparison of the lengths of the non-round aperture in the vertical (Y) and horizontal (X) directions, with the vertical dimension being the longer of the two dimensions in the FIG. 22 example.

FIG. 22 shows a comparison of the lengths of the non-round aperture 2100 in the vertical (Y) and horizontal (X) directions, with the vertical dimension being the longer of the two dimensions in the FIG. 22 example. As shown, the length of the opening through which light passes in the vertical direction $L_Y$ is greater than the length of the opening in the horizontal direction $L_X$.

Figure 23:
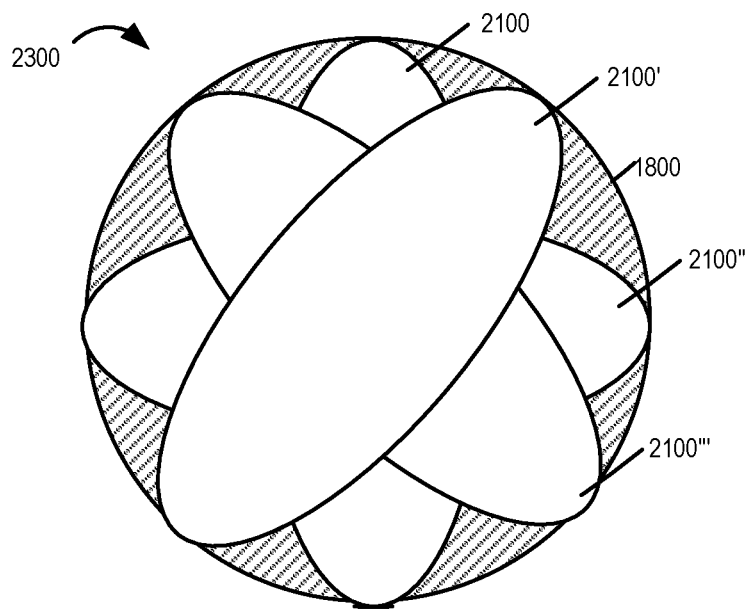
FIG. 23 shows how, by combining image information from multiple non-round lenses oriented in different directions, image information approximating the information expected to be obtained from a round lens can be achieved with more information being available towards the center of the combined image than at various edge locations due to the overlapping of multiple individual images which are combined in the FIG. 23 example to generate a composite image.

FIG. 23 is a diagram 2300 showing how, by combining image information from multiple non-round lenses with oval apertures 2100, 2100', 2100'', 2100''' oriented in different directions, image information approximating the information expected to be obtained from a lens (with radius equal to the bigger oval dimension) with a round aperture 1800 can be achieved with more information being available towards the center of the combined image than at various edge locations due to the overlapping of multiple individual images which are combined in the FIG. 23 example to generate a composite image. The capture of high frequency information through the use of multiple non-round lenses at different angles to each other and combining the images helps make up for the lack of high frequency information captured by an individual non-round lens. It should be appreciated that while the resolution that can be achieved by combining images captured with lenses having apertures as shown in FIG. 23 can approximate that of an image captured using a round lens, the composite image may have a larger dynamic range in terms of luminance information in the regions of image overlap than would be obtained using a single round lens to capture the same image. This is because the different lenses each capture light in the center region. It should be appreciated that a composite image generated by combining images captured using lens having apertures as shown in FIG. 23, in accordance with one embodiment of the invention, will result in a high quality center image portion and lower quality towards the edges of the composite image. This image quality fall off is similar to what might be expected if a single high quality lens were used with the image quality normally being better towards the center of the lens than towards the edges of the lens.

Accordingly, it should be appreciated that a composite image generated by combining images captured using lenses with apertures as shown in FIG. 23 can result in a composite image of similar or better quality in at least some respects than might be obtained by capturing an image using a single round lens with a similar maximum aperture dimension in a direction of maximum extent of the aperture.

Figure 24:
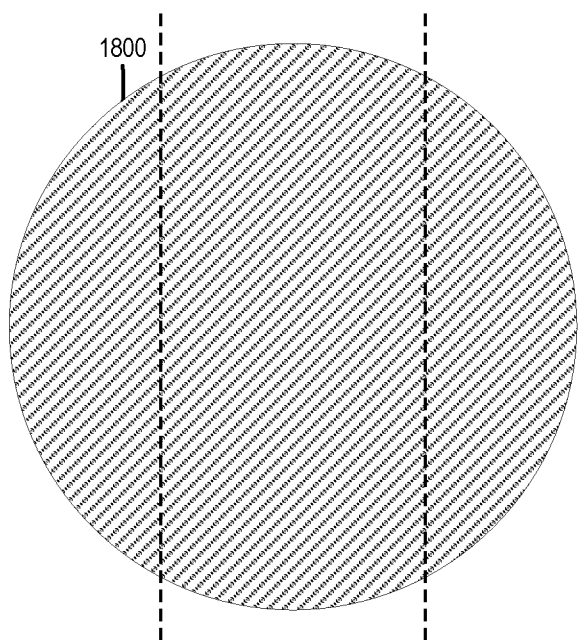
FIG. 24 shows how a lens with a round aperture can be cut or masked to produce a lens having a non-round aperture, e.g., approximating that of an oval or oblong shape.

FIG. 24 shows how a lens with a round aperture 1800 can be cut or masked to produce a lens having a non-round aperture, e.g., approximating that of an oval or oblong shape. Such an embodiment allows for the capture of the most or a significant amount of light for a given max aperture.

Figure 25:
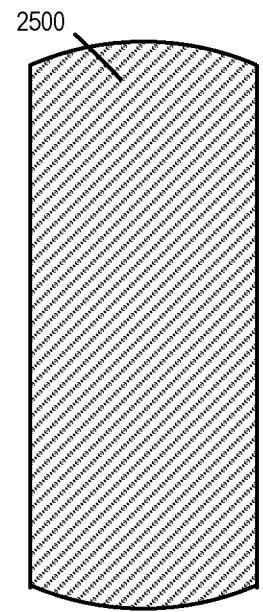
FIG. 25 shows the aperture resulting form cutting or masking a round lens, e.g., a lens with a round aperture, as shown in FIG. 24.

FIG. 25 shows the aperture 2500 resulting from cutting or masking a round lens, e.g., a lens with a round aperture 1800, to produce a lens having an aperture as shown in FIG. 24, e.g., an oblong aperture approximating an oval aperture.

Lenses of the type shown in FIG. 25 are used as the non-round lenses of camera devices in some embodiments. Thus, while shown as oval lenses in some embodiments of the camera device of FIG. 14, lenses with non-oval apertures of the type shown in FIG. 25 are used.

Figure 26:
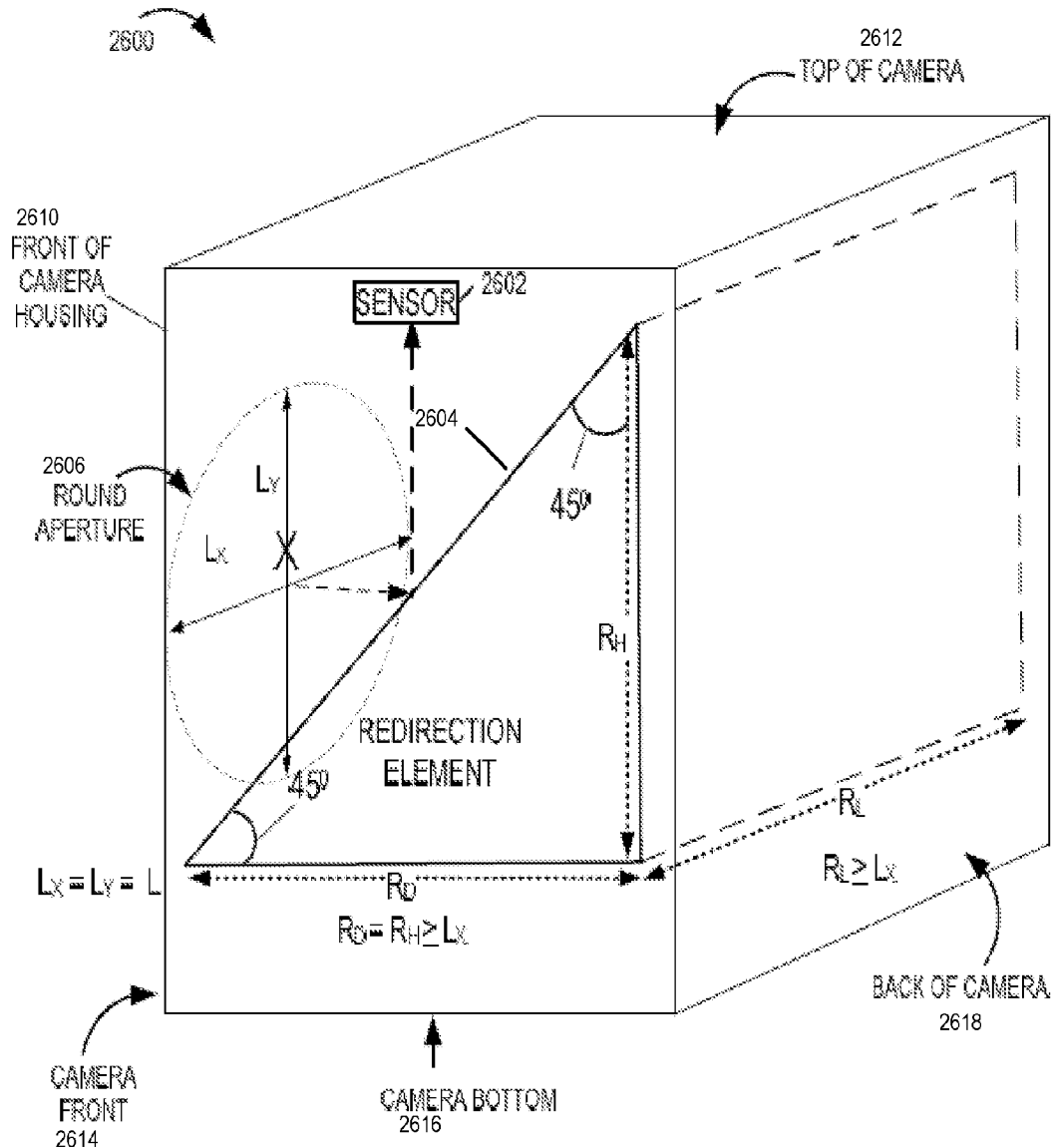
FIG. 26 shows how using a light redirection device to redirect light 90 degrees in combination with an outer lens having a round aperture normally requires a camera depth, e.g., thickness, equal to or greater than the diameter of the lens with the round aperture.

FIG. 26 is a diagram of a camera 2600 that includes a housing 2610 having a front side 2614, top 2612, bottom 2616 and rear or back 2618. A round lens corresponding to round aperture 2606 is mounted in the front 2614 of the housing 2610. FIG. 26 shows how using a light redirection device 2604, e.g., mirror, to redirect light 90 degrees in combination with an outer lens having a round aperture 2606 normally requires a camera depth, e.g., thickness, equal to or greater than the diameter of the lens and corresponding aperture 2606 which is part of the lens. In some embodiments of the invention the lens is simply a round flat piece of plastic or glass. The round aperture 2606 is shown in FIG. 26 on the front of the camera device 2600 through the use of dashed lines. Light passing through the round aperture 2606 will be reflected at 90 degrees by the mirror 2604 up towards the sensor 2602 mounted at the top of the camera 2600. Note the front to rear distance $R_D$ of the light redirection device mounted in the camera and the height $R_H$ of the light redirection device in the FIG. 26 example are equal with both being greater than or equal to the diameter $L_X$ of the round aperture 2606. As a result, the depth of the camera 2600 is equal to or greater than the diameter of the round aperture 2606.

Figure 27:
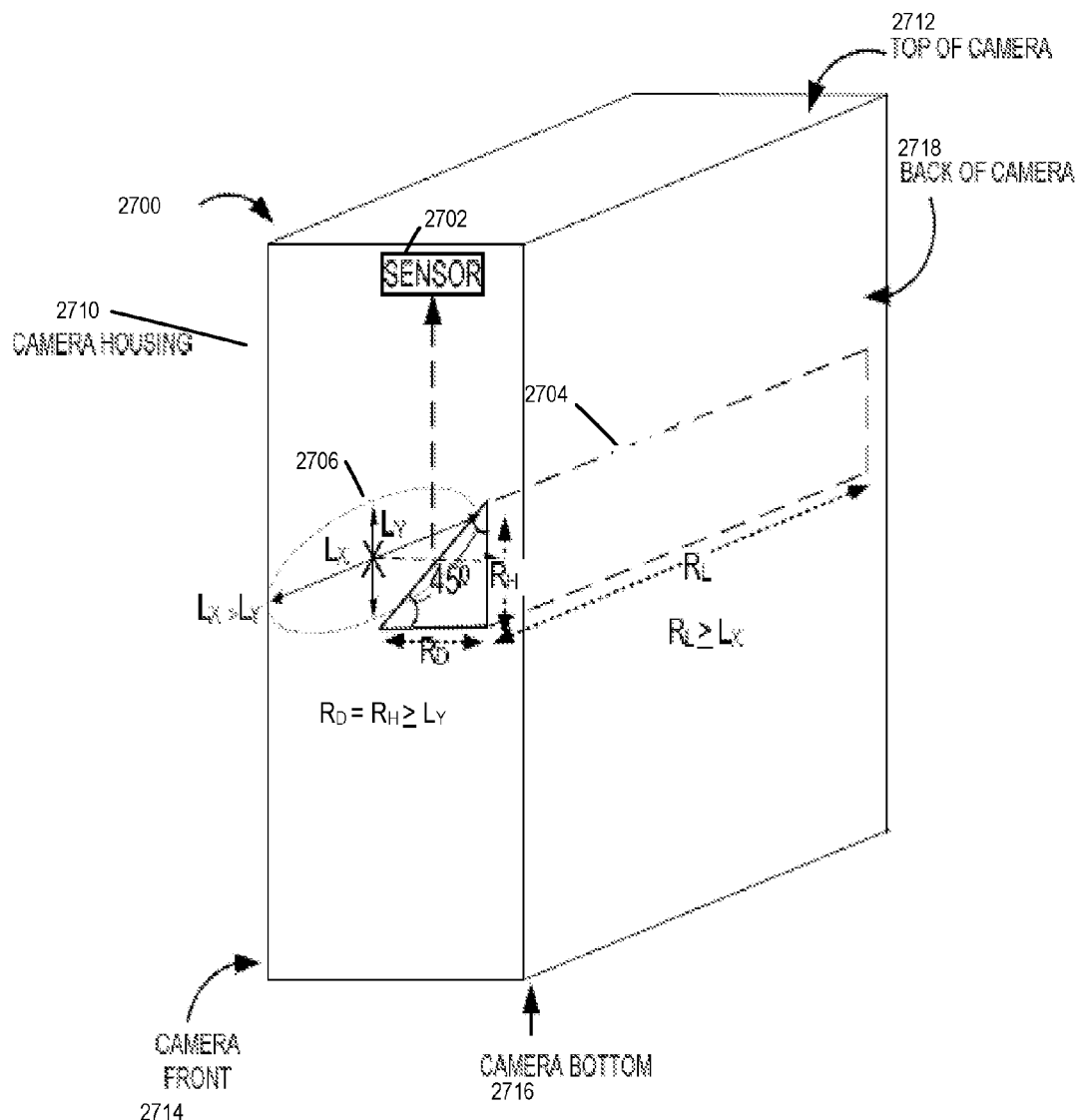
FIG. 27 shows how, in some embodiments, use of a lens with a non-round, e.g., oval, aperture in combination with a light redirection device which redirects light by 90 degrees can allow for use of lenses which are longer in one dimension than the camera is deep.

FIG. 27 is a diagram of a camera 2700 that includes a housing 2710 having a front side 2714, top 2712, bottom 2716 and rear or back 2718. A non-round lens corresponding to non-round, e.g., oval, aperture 2706 is mounted in the front 2714 of the housing 2710. FIG. 27 shows how using a light redirection device 2704, e.g., mirror, to redirect light 90 degrees in combination with an outer lens having a non-round, e.g., oval, aperture 2706 can allow for use of lenses which are longer in one dimension than the camera is deep. Note that the sensor 2702 is mounted on the top 2712 of the camera 2700 (parallel to the top portion of the camera housing) in the same position as the sensor 2602 in the FIG. 26 embodiment but that the mirror 2704 can now be implemented using a mirror with a flat rectangular surface which is less deep than the mirror 2604 used in the FIG. 26 embodiment. It is also worth pointing out that while a rectangular mirror is used for simplicity, an oval mirror can also be used and can also act as the aperture stop in some embodiments. It should be appreciated that use of non-round, e.g., oval, aperture in some embodiments allows for thinner camera, e.g., camera with less thickness than a camera with round aperture with diameter equal to the maximum dimension of the oval aperture.

Figure 28:
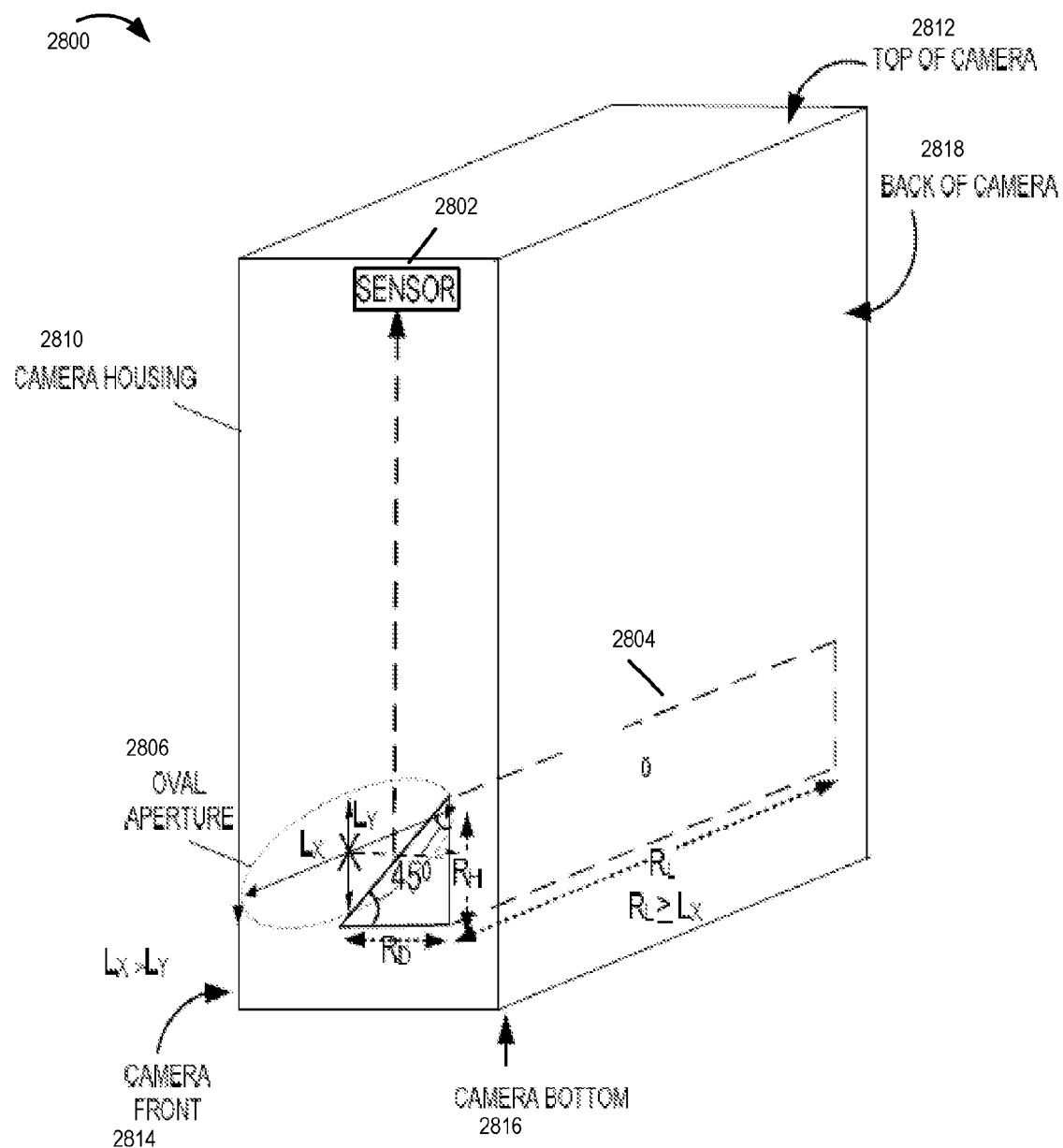
FIG. 28 shows how the length of the light path of a camera module including a non-round aperture can be longer than the depth of the camera with the light redirection device being capable of being positioned at one end of the camera device.

FIG. 28 is a diagram of a camera 2800 that includes a housing 2810 having a front side 2814, top 2812, bottom 2816 and rear or back 2818. A non-round lens corresponding to non-round, e.g., oval, aperture 2806 is mounted in the front 2814 of the housing 2810. FIG. 28 shows how in the camera 2800 the length of the light path of an optical chain including a non-round aperture 2806 can be longer than the depth of the camera 2800 with the light redirection device 2804 being capable of being positioned at one end, e.g., the bottom end 2816, of the camera device 2800. It should be appreciated that the positioning of the light redirection device 2804 and the sensor 2802 near the opposite ends of the camera 2800 allows for ample space for additional oval aperture lenses and light redirection devices.

Figure 29:
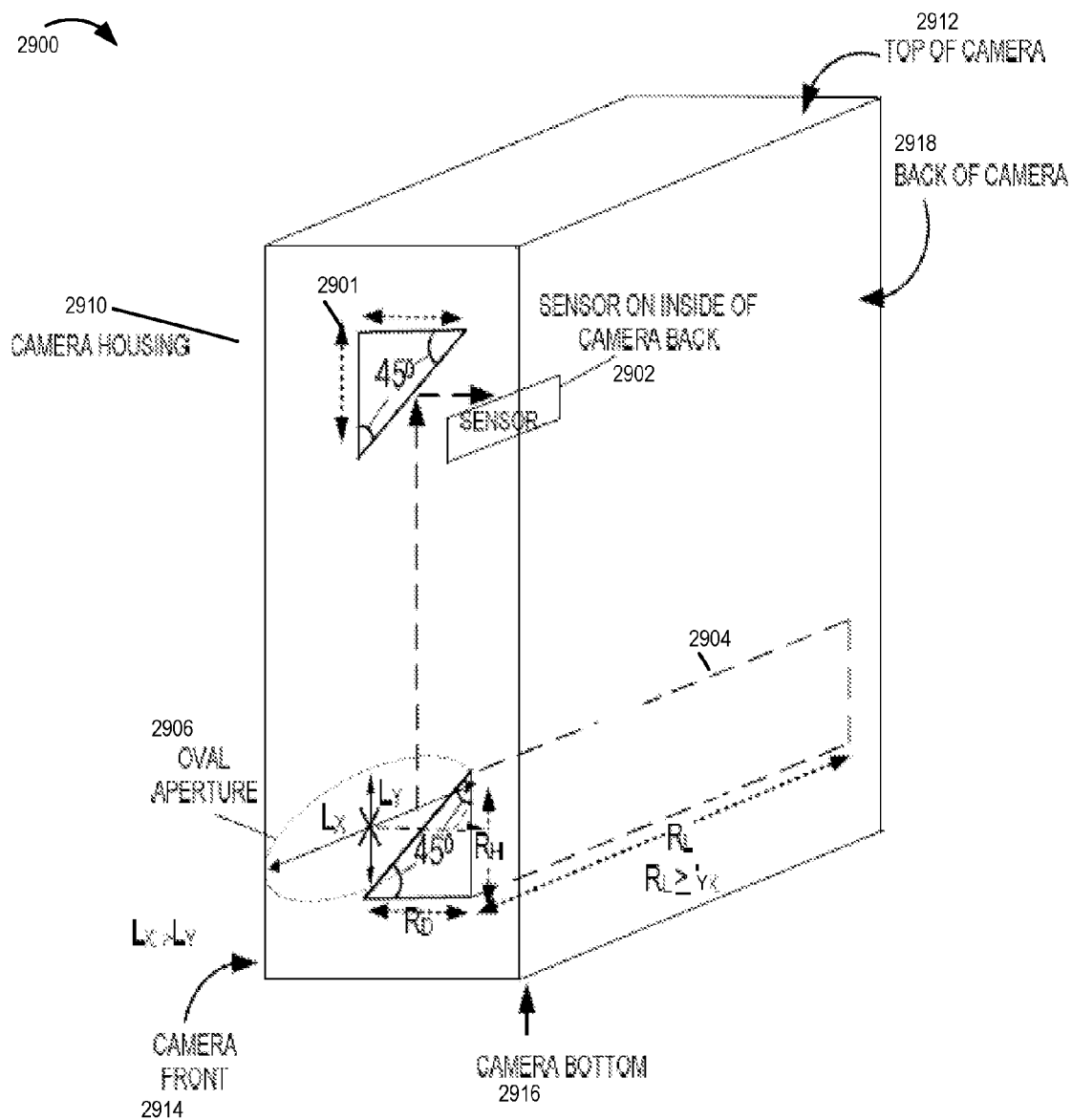
FIG. 29 shows an example in which multiple light redirection devices are used in a camera module to allow for a relatively long light travel path and thus focal length while allowing the sensor to be positioned on either the back or front of the camera depending on which way the light is redirected as it passes through a camera module.

FIG. 29 shows an example of a camera 2900 in which multiple light redirection devices 2904, 2901 are used in an optical chain, e.g., camera module, to allow for a relatively long light travel path and thus focal length while allowing a sensor 2902 to be positioned on either the back 2918 or front 2914 of the camera depending on which way the light is redirected as it passes through a camera module which includes a lens mounted in the front of the camera corresponding to aperture 2906, first light redirection device 2904, second light redirection device 2901 and sensor 2902. Note that in the FIG. 29 outer lens of the camera module is positioned near the bottom 2916 of the camera 2900 as is the first light redirection device 2904 while the second light redirection device 2901 is positioned near the top 2912 of the camera 2900. While the sensor 2902 is shown mounted on the inside back 2918 of the camera 2900 in other embodiments, e.g., where the second light redirection device 2901 directs light towards the front of the camera, the sensor 2902 is mounted on the inside front of the camera housing 2910.

Figure 30:
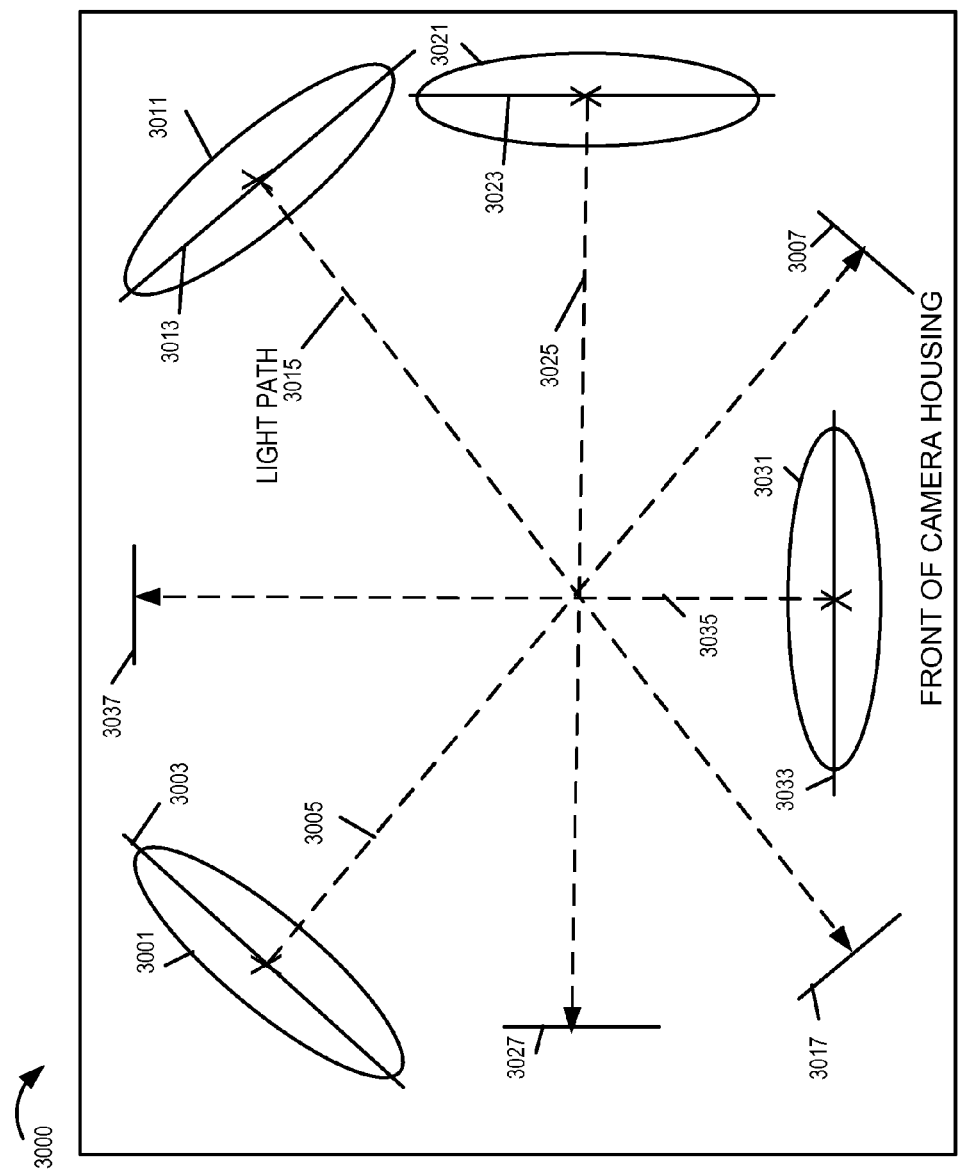
FIG. 30 shows how multiple lenses with non-circular apertures can be used in a single exemplary camera device to collect high frequency information in multiple directions so that high frequency information is available in each of a plurality of directions when combining images to generate a composite image.

FIG. 30 is an illustration of a camera device 3000 that includes 4 optical chains with non-circular outer lenses and apertures. For purposes of simplicity as with FIGS. 27-29 in the FIG. 30 embodiment a single reference number is used to represent both the non-circular lens and its corresponding non-circular aperture. The light enters the outer non-circular apertures of the lenses via the front of the camera and is redirected to corresponding sensors via one or more light redirection devices position under the outer lenses (e.g., lenses 3001, 3011, 3021 and 3031) as indicated in the figure by "X".

The camera device 3000 includes a first optical chain including non-circular lens 3001 which has an oval aperture, a light redirection element 3003, a light path 3005 and a sensor 3007. Light enters the first optical chain and traverses a first portion of the first light path 3005 before impinging on the mirror 3003 and being redirected 90 degrees or approximately 90 degrees towards the sensor 3007.

The camera device 3000 further includes a second optical chain including a second non-circular lens 3011 which has an oval aperture, a second light redirection element 3013, a second light path 3015 and a second sensor 3017. Light enters the second optical chain and traverses a first portion of the second light path 3015 before impinging on the mirror 3013 and being redirected 90 degrees or approximately 90 degrees towards the second sensor 3017.

The camera device 3000 further includes a third optical chain including a third non-circular lens 3021 which has an oval aperture, a third light redirection element 3023, a third light path 3025 and a third sensor 3027. Light enters the third optical chain and traverses a first portion of the third light path 3025 before impinging on the mirror 3023 and being redirected 90 degrees or approximately 90 degrees towards the third sensor 3027.

The camera device 3000 further includes a fourth optical chain including a fourth non-circular lens 3031 which has an oval aperture, a fourth light redirection element 3033, a fourth light path 3035 and a fourth sensor 3037. Light enters the fourth optical chain and traverses a first portion of the fourth light path 3035 before impinging on the fourth mirror 3033 and being redirected 90 degrees or approximately 90 degrees towards the fourth sensor 3027.

Note that while the four lenses and corresponding apertures 3001, 3011, 3021, 3031 are located on the front face of the camera 3000, they are intentionally positioned so that the longest extent of each aperture is at a different angle relative to the bottom of the camera housing which during use will normally coincide with the horizontal direction.

FIG. 30 shows how multiple lenses 3001, 3011, 3021, 3031 with non-circular apertures can be used in a single exemplary camera device 3000 to collect high frequency information in multiple directions so that high frequency information, and thus high resolution, is available in each of a plurality of directions when combining images to generate a composite image. While the camera modules shown in FIG. 30 are shown utilizing a large portion of the space within the camera device for their individual light paths with the light paths crossing, it should be appreciated that the optical chains can, and in some embodiments are, implemented as individual self contained modules which have light paths which do not cross.

Such sealed self contained light modules can be particularly desirable in some embodiments where dust and/or other concerns over contamination may be an issue such as in camera embodiments intended for outdoor and/or beach use where dust and/or sand are of a concern.

Figure 31:
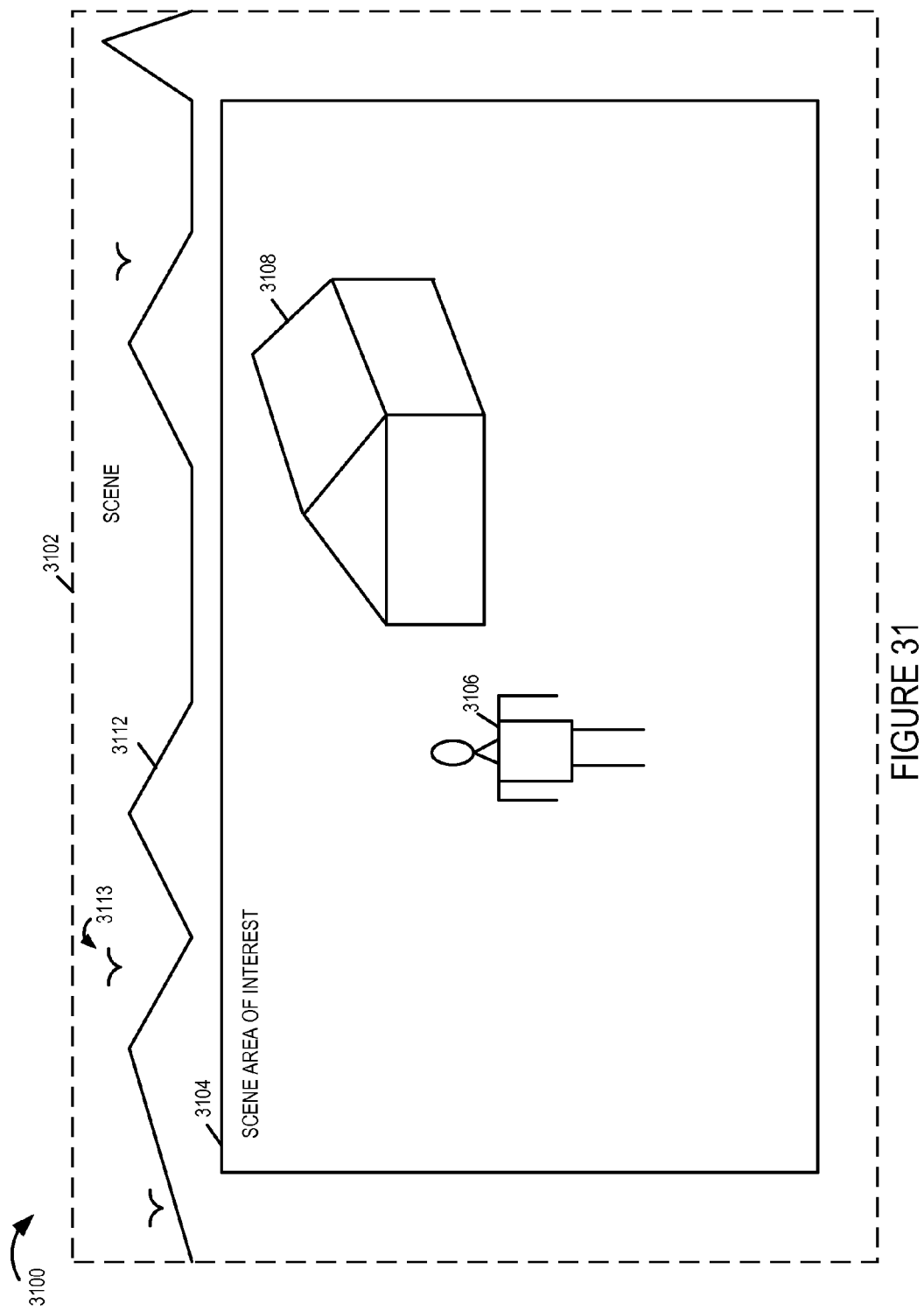
FIG. 31 shows an exemplary scene including a scene area which may have its image captured by camera modules of a camera implemented in accordance with one or more embodiments of the invention.

FIG. 31 shows an exemplary scene 3102 including a scene area 3104 which may have all or portions of its image captured by camera modules of a camera implemented in accordance with one or more embodiments of the invention. The exemplary scene 3102 includes a view of mountains 3112, birds 3113, a person 3106 and a house 3108. While the scene 3102 covers a very large area the scene area of interest 3104 includes the person 3106 and house 3108. It should be pointed out that while reference is made to a 'scene' or 'scene area' such references are not to be interpreted as the physical scene which is 3 dimensional, but it should be interpreted as the 2 dimensional projection or representation of the physical scene obtained by capturing an image of the scene using an ideal camera. Any reference to the area of a scene is to be interpreted as the area in such a 2 dimensional projection. In such a projection even a small object that is sufficiently close to the camera can appear to have a large area given its proximity to the camera while a distant object will appear smaller than an equally sized object closer to the camera.

Figure 32:
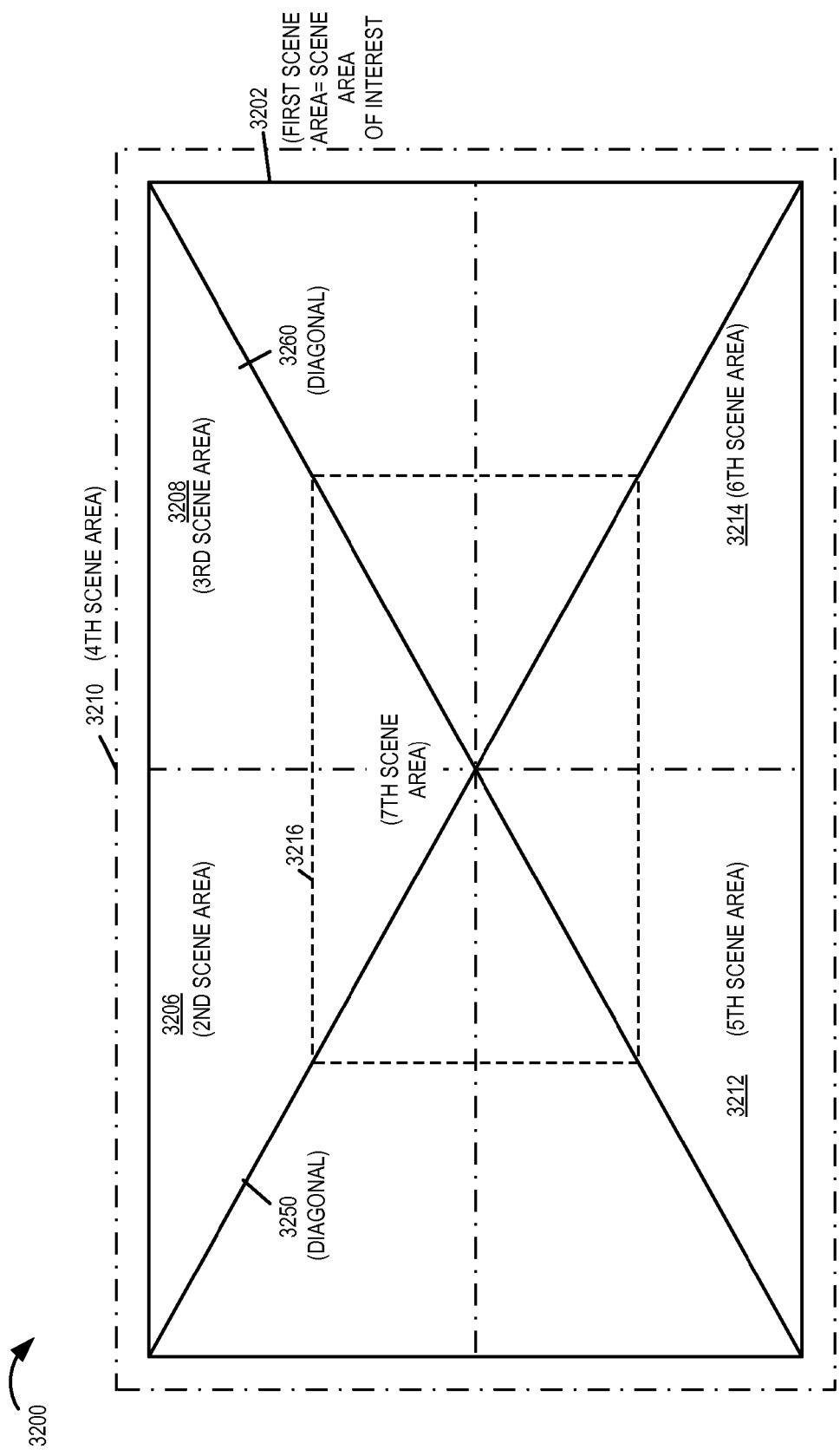
FIG. 32 shows how different camera modules of a camera including multiple camera modules, some of which have different focal lengths, may capture different size portions of a scene area of interest.

FIG. 32 is a drawing 3200 showing how different optical chains, e.g., camera modules, of a camera, such as the camera device 600 of FIG. 6 or the camera device 1400 of FIG. 14, in which each camera device includes multiple optical chains (as shown in FIGS. 12A and 17A), some of which have different focal lengths, can capture different size portions of a scene area of interest 3202 (which may correspond to scene area of interest 3104 shown in FIG. 31).

For purposes of discussion, the capture and combining of images corresponding to different scene areas will be explained using the camera device 600 by referring to FIG. 12A which shows the arrangement of optical chains in camera 600.

Consider for purposes of discussion that the camera device 600 includes the 17 modules arranged as shown in FIG. 12A. As previously discussed in the FIG. 12A example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2).

The five camera modules which are the 13th through 17th camera modules correspond to reference numbers 1226, 1228, 1230, 1230 and 1234 and have the smallest diameter outer lenses and smallest focal length (f1).

It should be appreciated that the camera modules with the largest focal length f3 will capture the smallest portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 32 example which shows 7 distinct scene areas.

In the FIG. 32 example scene area of interest is identified by reference 3202. diagonals 3250 and 3260 are shown so that the relationship between the different areas and how they correspond to each other can be better appreciated. The first scene area 3204 and fourth scene area 3210 are of similar size or are of the same size and correspond to the full scene area of interest 3202 which corresponds to the exemplary scene area of interest 3102 shown in FIG. 31. For purposes of explanation consider that the first and fourth scene areas are captured by optical chains having the focal length f1, i.e., by smaller focal length optical chains. Assume for discussion purposes that (f1) camera module 1228 is used to capture the first scene area 3204 and that (f1) camera module 1232 is used to capture the fourth scene area 3210. Note that the actual image captured by 1228 and 1232 may be of a slightly larger scene area to ensure that the scene area of interest is captured.

We will also assume that f2 camera module 1204 is used to capture the second scene area, that (f2) camera module 1208 is used to capture the third scene area, that (f2) camera module 1218 is used to capture the fifth scene area, that (f2) camera module 1214 is used to capture the sixth scene area 3214 and that (f2) camera module 1224 is used to capture the seventh scene area 3216. Again as with the capture of the other scene areas, the actual images captured by the modules 1204, 1208, 1218, 1214 and 1224 may be of slightly larger scene areas to ensure that the respective second 3206, third 3208, fifth 3212, sixth 3214 and seventh 3216 scene areas are fully contained in the captured images.

Note that the relative position of the outer lenses of the camera modules shown in drawing 1200 are known and fixed. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the lens 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

Figure 34:
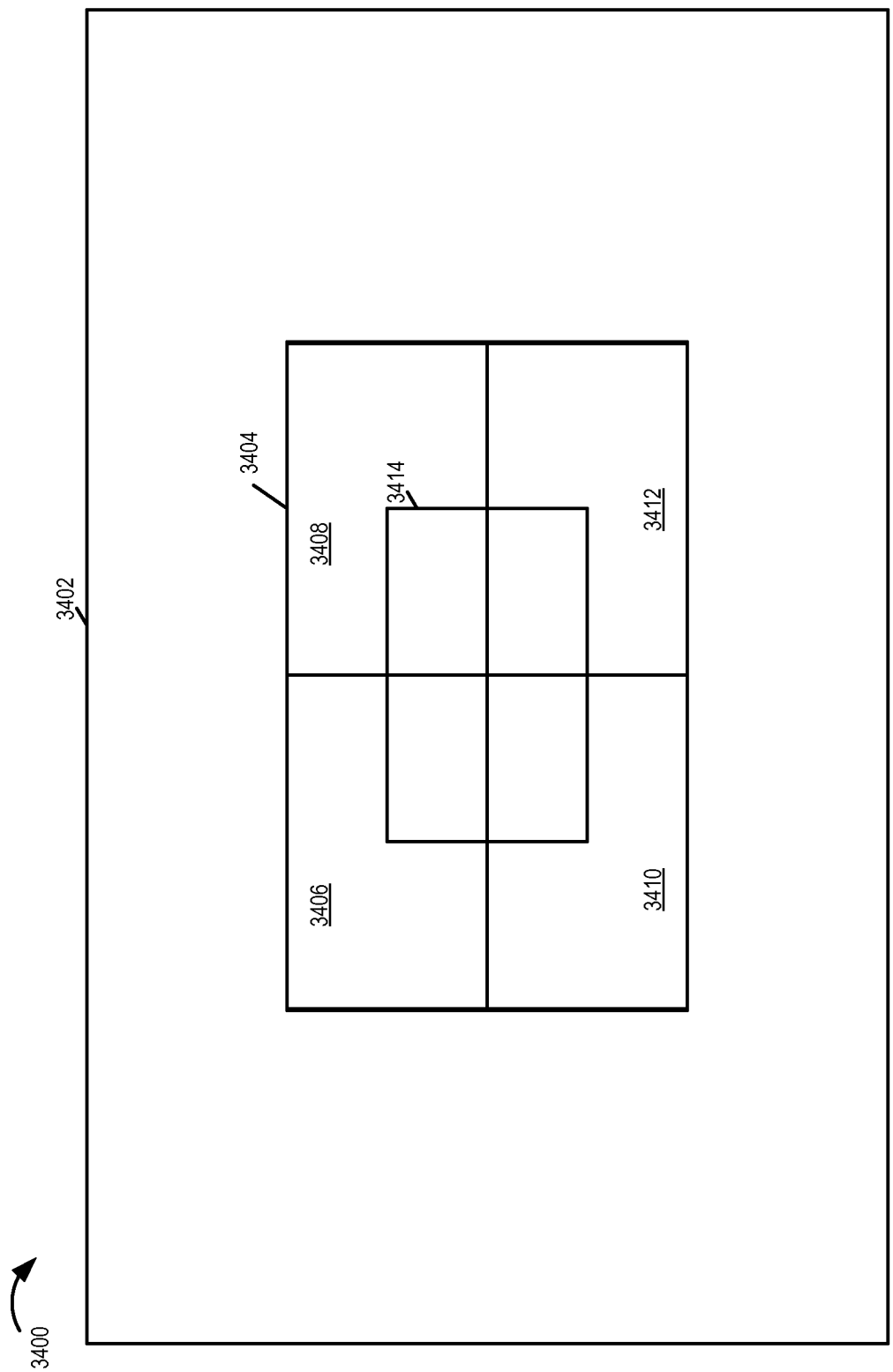
FIG. 34 shows different image captured by a camera having modules capturing scene areas of the sizes shown in FIG. 33 and their relationship to one another which facilitates combing of the images to generate a composite image.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to captured and combined as shown in FIG. 34, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of essentially the same scene area, the Seventh Scene Area of FIG. 32. To capture an image of the Second Scene Area with module 1204, the hinged mirror 510 of module 1204 needs to be adjusted so that the optical axis of camera module 1204 points towards the center of the second scene area 3206. Note that the module 1204 is positioned in the camera 1200 in such a manner that as the mirror rotates around the hinge, the location in the scene area of interest 3202 that the optical axis points to moves along the diagonal 3250 of 3202. Similarly, the mirror for camera module 1214 needs to be adjusted to capture the Sixth Scene Area. Note that in FIG. 12, camera modules 1204, 1214 are arranged proximate, e.g., along or adjacent, the diagonal 3250 while camera modules 1208, 1218 are located proximate, e.g., along or adjacent, the diagonal 3260. Rotating the mirror in 1214, e.g., changing the angle and thus incline of the mirror, makes the module's optical axis move along the diagonal 3250. Mirrors of modules 1208 and 1218 are similarly angled, e.g., rotated, to capture images of the Third (3208) and Fifth (3212) Scene Areas respectively. In the case of modules 1208, 1218 the optical axes move along diagonal 3260 of the scene area of interest. The module 1224 used to capture the seventh image area 3216 points at the center of the scene area of interest 3202 so it's mirror is maintained at 45 degrees.

It should be appreciated from the above discussion that it is particularly beneficial to have at least some camera modules arranged along diagonals 3250 and 3260. These modules have the Part B of their optical axis parallel to one of these two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

Based on the overlapping scene areas, e.g., 3210 and 3204 a depth map is generated, e.g., by the processor included in the camera. In some embodiments the depth of an object in the scene can be determined by examining the relative positions of an object in the images captured by different modules. In at least some embodiments the depth map is used, e.g., in combination with information about the relative position of the outer lenses of the different optical chains and/or optical axis of the optical chains in combining images captured by the different optical chains to form a composite image. The use of the depth information in the generation of the composite image allows for the correction of parallax, perspective and/or other image distortions that may occur or which are present in the images.

In the FIG. 32 example, 7 distinct scene areas are shown for purposes of explaining the invention. Each of the 7 scene areas may be, and in some embodiments is, captured by a different optical chain of the camera device 600 shown in drawing 1200 prior to being combined. The camera modules, as will be discussed below, can capture images at the same time, e.g., in parallel. However, in some embodiments as will be discussed below where rolling shutters are used the camera modules are controlled to capture portions of the scene area of interest in a synchronized manner so that all the different camera modules which capture a given portion of a scene area of interest will capture the given portion at the same time.

It should be appreciated that by combing seven images corresponding to the seven different scene area portions shown in FIG. 32 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 32 would have an overall pixel count of 32 megapixels since the second, third, fifth and sixth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

The (f3) camera module, e.g., 1216, is used to capture the seventh scene area. The center of the seventh scene area coincides with the center of the image area of interest. Since practically most lenses have the least aberrations and best image quality at the center of their field of view, this ensures that the center of the scene area of interest is imaged at high quality by the camera module capturing the seventh scene area. The imaging of the seventh scene area also increases the total amount of light energy captured at the center of the scene area of interest. This allows the composite image generated from the captured images to have its best quality (high resolution and minimum noise) at the center of the scene area of interest.

It should be appreciated that images captured by single lens camera are often better at the center than at the edges due to optical aberrations and vignetting being greater near the edge of the field than at the center. The composite image generated in accordance with some embodiment will show a similar high quality at the center of the image with the possibility of lower quality towards the edges of the composite image. Given that this effect is similar to that of conventional single lens cameras, it should be appreciated that the composite images will be similar to but potentially of higher quality than images captured by a single camera module.

Figure 33:
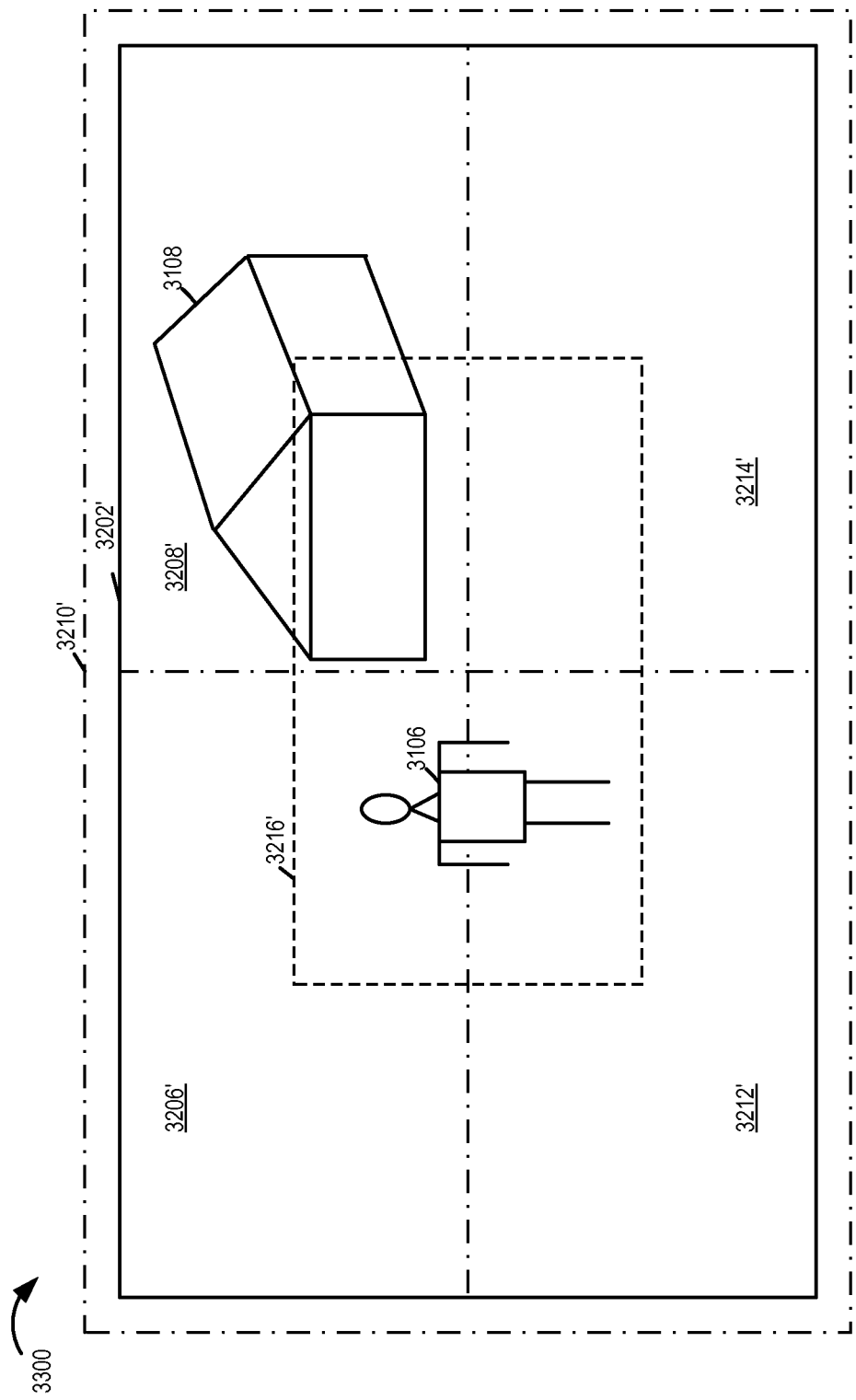
FIG. 33 shows how different camera modules of a camera including multiple camera modules as shown in FIG. 32 may capture different portions of the scene area of interest shown in FIG. 31.

FIG. 33 shows how the different image portions captured in the FIG. 32 example may relate to the exemplary scene area of interest shown in FIG. 31 to give a better understanding of the invention. Each of the image portions of the scene area of interest captured by different modules, as discussed in FIG. 32, are identified in FIG. 33 with the same reference number followed by a prime ('). For example 3202' shows the full captured scene area of interest that includes the scene of interest, 3206' is the second scene area and relates to one portion of the scene area of interest, 3208' is the third scene area and relates to another portion of the scene area of interest, 3210' is the fourth scene area and includes the full scene area of interest, 3212' is the fifth scene area and relates to another portion of the scene area of interest, 3214' is the sixth scene area and relates to another portion of the scene area of interest and 3216' is the seventh scene area and relates to the center portion of the scene area of interest. How each of the captured image portions relate to the exemplary scene area of interest shown in FIG. 31 can be better appreciated from FIG. 33.

FIG. 34 is a drawing 3400 showing different image portions captured by a camera having optical chains, e.g., camera modules, corresponding to three different focal lengths, e.g., (f1, f2 and f3). As discussed in various sections above, in some embodiments each of the optical chains in a camera includes a corresponding image sensor that captures light when an image portion is captured by the corresponding optical chain. In one embodiment a first optical chain including a first sensor captures a first image of a scene of interest 3404 (shown as a medium size rectangle 3404). A second optical chain including a second sensor captures an image portion 3406 (shown as a small size rectangle 3406) of the scene of interest, a third optical chain including a third sensor captures another image portion 3408 of the scene of interest, a fifth optical chain including a fifth sensor captures another image portion 3410 of the scene of interest, a sixth optical chain including a sixth sensor captures another image portion 3412 of the scene of interest and a seventh optical chain including a seventh sensor captures another image portion 3414 of the scene of interest. Furthermore, a fourth optical chain including a fourth sensor captures an image 3402 that includes the entire scene of interest. In one embodiments the focal length of the second, third, fifth, sixth, and seventh optical chains is the same (f3) and is greater than the focal length (f2) of the first optical chain that captures scene area of interest 3404 and the focal length (f1) the fourth optical chain that captures the scene area 3402. In one such embodiment the focal length of the various optical chains are such that f1<f2<f3.

While one embodiment is discussed above, it should be appreciated that various different variations are possible. In one such different embodiment, the different image portions shown in FIG. 34 are captured by a camera having optical chains corresponding to two different focal lengths, e.g., (f1, f2), where image portions 3406, 3408, 3410, 3412, 3414 are captured by optical chains having a focal length (e.g., f2) which is greater than a focal length (e.g., f1) of the optical chain that captures image portions 3402 and 3404. In one such embodiment, f2 is twice f1. FIG. 34 and the image portions shown therein will be used in explaining how rolling shutters corresponding to different camera modules can be controlled in a coordinated manner to facilitate combining of images captured by different camera modules in a way that reduces or minimize motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 1400 including optical chains arranged as illustrated in FIG. 17. In another embodiment the image capture operations performed by the sensors included in corresponding optical chains as discussed above is performed by the camera 600 including optical chains arranged as illustrated in FIG. 12.

Figure 35:
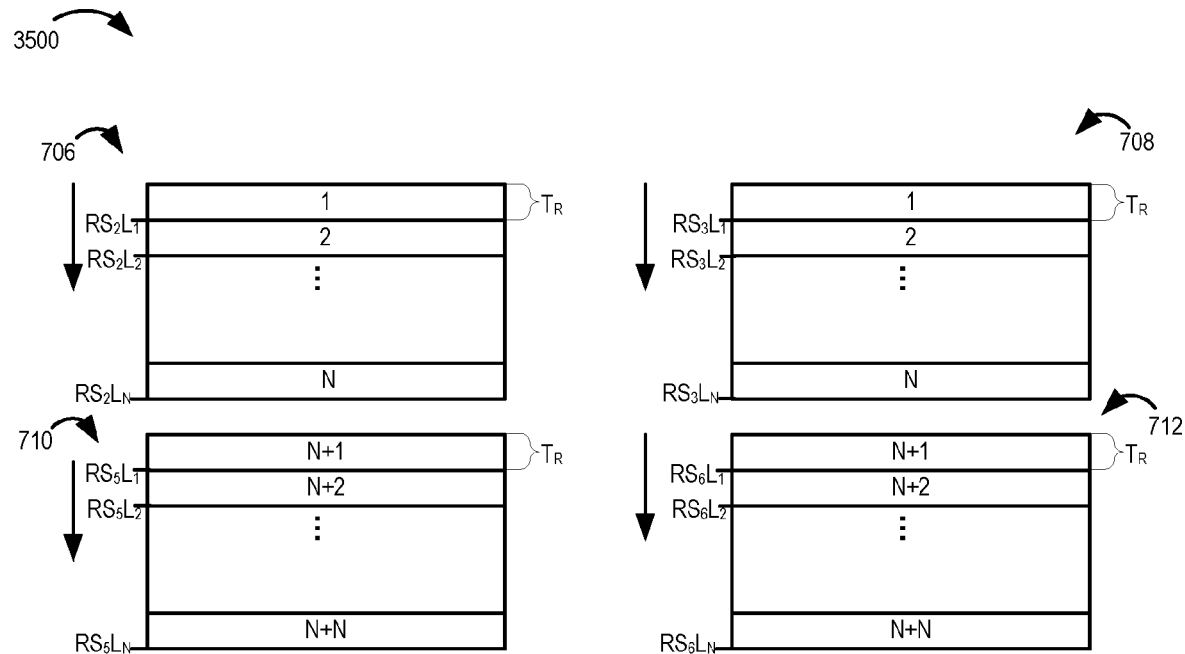
FIGS. 35, 36, 37, 38 and 39 show various aspects relating to rolling shutter control of the reading of sensors of different optical chains in a coordinated manner so that the images captured by the different sensors can be easily combined.

FIG. 35 shows how sensors of four optical chains, e.g., camera modules, using rolling shutters can be used in combination to capture a scene area of interest in a manner that facilitates combining of the captured images with one or more images captured by another optical chain having a smaller focal length which captures a larger portion of the same scene area of interest. Drawings 706, 708, 710 and 712 illustrate how exemplary image sensors corresponding different optical chains are controlled to perform a read out from one edge to another (e.g., top to bottom) as part of image capture operation. For example, drawing 706 shows the second image sensor discussed with regard to FIG. 34 that has N rows of pixel elements that can be read out, e.g., from top to bottom, as part of capturing the image portion 3406 (shown in FIG. 34) by a second optical chain to which the image sensor shown in 706 corresponds. Drawing 708 shows a third image sensor, discussed above with regard to FIG. 34, that has N rows of pixel elements that can be read out from top to bottom as part of capturing image portion 3408 by the third optical chain to which the image sensor shown in 708 corresponds. Similarly 710 and 712 show fifth and sixth sensors each with N rows of pixel elements, capturing image portions 3410 and 3412 shown in FIG. 34. The read out from the sensors shown in drawings 706, 708 starts synchronously at the same time and read out from the sensors shown in drawings 710, 712 starts together when the read out from sensors shown in drawings 710, 712 ends.

Figure 36:
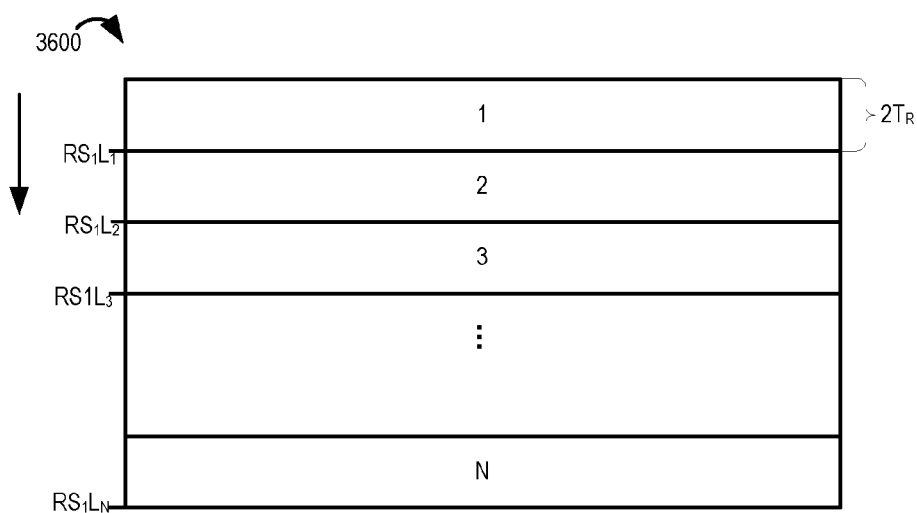

FIG. 36 shows how a sensor corresponding to a optical chain, e.g., first optical chain discussed with regard to FIG. 34, having a focal length half or approximately half that of the optical chains (second, third, fifth and sixth optical chains discussed with regard to FIG. 34) used to capture the image portions 3406, 3408, 3410 and 3412 shown in FIG. 34, can be controlled so that the optical chain with the smaller focal length captures all or portions of scene of interest in a synchronized manner with multiple optical chains having a larger focal length. Drawing 3600 shows the first sensor with N rows of pixel elements that can be read out in a manner synchronized with the read out of pixel rows corresponding to other sensors corresponding to optical chains with larger focal length shown in FIG. 35. While drawing 3600 illustrates that the first sensor corresponding to the relatively smaller focal length has N rows of pixel elements, it should be appreciated that the rectangle in drawing 3600 does not show or represent the physical size of the first sensor.

FIGS. 35, 36, 37, 38 and 39 show various aspects relating to rolling shutter control of the reads of sensors of different camera modules in a coordinated manner so that the images captured by the different sensors can be easily combined. As should be appreciated in embodiments where rolling shutters are used rows of pixel values are read out sequentially. In the FIGS. 35, 36, 37, 38 and 39, it is assumed that each sensor includes the same number of rows of pixel elements, e.g., N rows. Accordingly, for the purposes of discussing these figures, N is the number of rows of pixel values on a sensor and to facilitate a discussion of the rolling shutter control it is assumed that the sensor of different camera modules have the same number of rows of pixel elements. While the sensors have N rows of pixel elements, in some embodiments a joint read of rows is permitted in which case the sensor operates as if it has N/M rows of pixel elements where M is the joint read factor, e.g., the number of rows which are read out jointly, e.g., summed and read out, thereby producing the same number of pixel values as the read out of a single row of pixel elements. A joint read operation has the advantage that a full read out of the sensor can be completed in 1/Mth the time it would take to read out the sensor if individual rows are read separately.

It should be appreciated that in case of an electronic rolling shutter implementation, the rows of the image sensor are read out in sequence. The time taken to read each row is quite small but the number of rows can be large and the minimum time taken to read the entire image can be as much 50 milliseconds or more. Since the row read time is small, we shall assume that all the pixels in a given row are read (nearly) simultaneously. The integration of light for a given row of pixels begins when the row is reset (opening curtain) and ends when the row is read out (closing curtain). The exposure duration is the duration between the row reset time and row reading time. The exposure instant or (capture time) of a given row can be defined as the time at which that row is read out. More precisely the exposure instant may be considered as the average of the row reset and row read times. Clearly scene areas corresponding to different rows of an image sensor are captured at different times. When portions of a given scene area of interest are captured by multiple camera modules, each implementing an electronic rolling shutter, with the intention of combining the multiple captured images to create one image, motion related artifacts can be observed if the rolling shutters of the various modules are not synchronized. In order to minimize these artifacts, the rolling shutters of the camera modules are synchronized such that the images of any given point of the scene area are captured by the different sensors at (nearly) the same instant.

Assuming it takes a time period $T_R$ to read a row of pixel values, to complete a full read of a sensor having N rows, it will take a time period of N times $T_R$. If multiple sensors corresponding to different portions of the scene area are operated to capture the images as quickly as possible, it is possible that combining the images would result in artifacts due to portions of a scene captured at different times being combined.

It should be appreciated that to avoid such temporal (motion related) artifacts it is desirable to have different sensors capture the same portion of a scene area at the same time. It should also be appreciated that when combining images from multiple camera modules having a large focal length with one or more images captured by camera modules with a smaller focal length (and thus which capture a larger part of a scene) it may be desirable for some of the larger focal length modules to capture portions of the scene sequentially, e.g., as if a rolling shutter was being controlled across a larger sensor having a number of rows which is equal to some combination of the number of rows of the sensors of the camera modules with the larger focal length and which thus capture an image corresponding to the smaller portion of a scene.

FIG. 35 illustrates how the N rows of pixel elements shown in drawings 706, 708, 710, 712 corresponding to four sensors each of which corresponds to a different camera module can be read out sequentially. Note that the rows of pixel elements corresponding to the four sensors shown in drawings 706, 708, 710, 712 can capture four different portions of a scene such as scene portions 3406, 3408, 3410 and 3412.

Assume for purposes of discussion that the rows of pixel elements shown in drawings 706, 708, 710, 712 correspond to sensors of the second, third, fifth and sixth optical chains each of which has a focal length f3. As will be discussed below, f3 is twice a focal length f2 of a first optical chain that captures scene of interest 3404 and four times a focal length f1 of a fourth optical chain that captures scene area 3402 in some embodiments. Thus the optical chains using the focal length f3 will provide relatively high magnification but capture a smaller portion of a scene than the optical chains using the focal length f2 or the focal length f1. The optical chains using the focal length f3 will capture an image of a scene area ¼ the size of the optical chains having the focal length f2 and ¹⁄₁₆ the size of optical chains having the focal length f1. While drawing 3500 illustrates that the sensors, corresponding to the larger focal length optical chains that capture portions of scene of interest, have N rows of pixel elements, it should be appreciated that the rectangles in drawings 706, 708, 710, 712 do not show or represent the physical size of the sensors but rather the relative size of the image area captured by the sensor.

This relationship of focal length to scene area capture size is represented in FIGS. 34, 35, 36 and 37 by the relative sizes of the rows of pixel elements shown. Thus, it should be appreciated that while the actual size of the pixel elements may be the same, in each of the sensors, the size of the portion of the scene to which the captured pixel values correspond depends on the focal length of the camera module in which the particular sensor is included.

For purposes of discussion, it will be assumed that drawings 706, 708, 710, 712 of FIG. 35 show rows of pixel elements corresponding to four sensors corresponding to optical chains having the focal length f3. It is also assumed that the sensor corresponding to drawing 706 approximately captures a top left portion of a scene of interest, the sensor corresponding to drawing 708 approximately captures a top right portion of the scene or interest, the sensor corresponding to drawing 710 approximately captures lower left portion of the scene of interest while the sensor corresponding to drawing 712 approximately captures a lower right portion of the scene of interest.

Assuming the sensor corresponding to the drawing 706 is a second sensor S2, the readout of the first line of pixel row 1 will be completed by the time indicated by $RS_2L_1$ which stands for Read Sensor 2 Line 1. Similar annotation is use to indicate the point at which the readout of lines of pixel elements of other sensors is completed with time corresponding to the vertical axis of FIGS. 35-39 and increasing from top to bottom of the figure. The read out of Sensor 3 corresponding to drawing 708 will be completed at the same point in time as the readout out of $RS_2L_1$. Note that in the FIG. 35 example, there is no overlap between the image areas captured by the four sensors S2, S3, S5, S6 with the readout out of Sensor S5 being completed as if it corresponded to the next pixel row following the last pixel row of sensor S2. It should be noted that if sensors had rows of pixel values corresponding to overlapping image portions they would be read out at the same time but the FIG. 35 example assumes no overlap in captured image areas which is not the case in many embodiments.

For purposes of discussion, it will be assumed that $T_R$ is the time to read one row of pixel values from any one of the sensors used in the FIG. 35 example. Since each sensor in the example includes N rows, the time required to fully read any one of the N sensors is N $T_R$. Thus, the readout of row (line N) of the first and thirds sensors S2, S3 will be completed at time NTR while the readout of the last row (line N) of sensors S5 and S6 will be completed at time 2 N TR.

If the sensors included different numbers of rows of pixels the total readout time would of course depend on the number of rows in the sensor.

While it might seem desirable to read out the sensors in the same time period N $T_R$, when the images from the different sensors are being read out using a rolling shutter it may be desirable to control the sensors so that pixel rows corresponding to sensors shown in drawings 710, 712 are read out following a read out of pixel rows corresponding to sensors shown in drawings 706, 708. In this manner, the read out will occur sequentially as if the pixel rows corresponding to drawings 706, 710 were part of a single rolling shutter. This approach which is used in some embodiments allows for the composite image to be similar to what would have been obtained using a single larger sensor with 2 N rows of pixel elements rather than two separate sensors each with N rows. Avoiding the temporal discontinuity that might occur between the last row of one sensor and the first row of the next sensor can thus have advantages when combining images captured by sensors corresponding to different portions of an image.

Thus, it should be appreciated that the sensors of the four camera modules using rolling shutters corresponding to row of pixel elements shown in drawing 706, 708, 710, 712 can be used in combination to capture a scene area of interest in a manner that facilitates combining of the captured images.

The captured images can be combined together to form a composite image of a larger scene area and with one or more images of the larger scene area. The images of the larger scene area can, and in some embodiments are captured by camera modules having a smaller focal length, e.g., a focal length f2, which captures a larger portion of the same scene.

FIG. 36 shows how a sensor corresponding to an optical chain, e.g., camera module, having a focal length f2, which is half or approximately half the focal length f3 of the camera modules used to capture scene areas represented by the sets of rows of pixel elements shown in FIG. 35, can be controlled so that the optical chain with the smaller focal (f2) length captures portions of scene of interest in a synchronized manner with multiple optical chains having a longer focal length. In FIG. 36, the rate at which rows of pixel values are read out is reduced by a factor which is based on the relative ratio of the focal length to one or more other supported focal lengths.

Since focal length f2 is ½ that of f3, the sensor corresponding to drawing 3600 including N pixel element rows capture substantially the same image portions of the scene that are captured by the sensors of the FIG. 35 example, the read out rate of the pixel rows is reduced by a factor of 2, that is, one pixel elements row will be read out in time period $2T_R$. Thus the read out of the sensor corresponding to drawing 3600 that includes N pixel element rows will take a total time period of $N(2T_R)$ to complete a full read out of the pixel rows which is the same amount of time that will be used by the combination of the sensors corresponding to drawings 706, 710 to be fully read out. Assuming FIG. 36 corresponds to a sensor S1, the readout of the first row of pixel values of S1 will be completed at time 2TR which corresponds to the point in time indicated by the indicator RS1 L1 which stands for Read Sensor 1 Line 1. Thus, in such an embodiment where the read out of the pixel rows of FIGS. 35 and 36 are synchronized, the sensor S1 having pixel element rows shown in drawing 3600 will begin its read out at the same time the sensor S2 corresponding to drawing 706 and Sensor S3 which corresponds to drawing 708 begin their read outs of their first rows of pixel elements. Sensor S1 will complete the read out of its N rows of pixel elements at or near the same time the last row of pixel elements shown in drawings 710 and 712 are read out. Thus, sensor S1 will begin its readout of pixel rows and end its pixel row readout in a manner that is synchronized with the sensors to which FIG. 35 corresponds.

While the readout of sensor S1 could have been completed in time $NT_R$ if the sensor was read out at the same per row read out rate as the sensors S2, S3, S5, S6, this would result in the undesirable effect of sensors corresponding to different optical chains capturing the same portion of an image area at different times which can lead to temporal artifacts in a composite image generated from images including an object moving at a high rate of motion. Such temporal artifacts are reduced or avoided by the synchronized image capture technique described herein.

Figure 37:
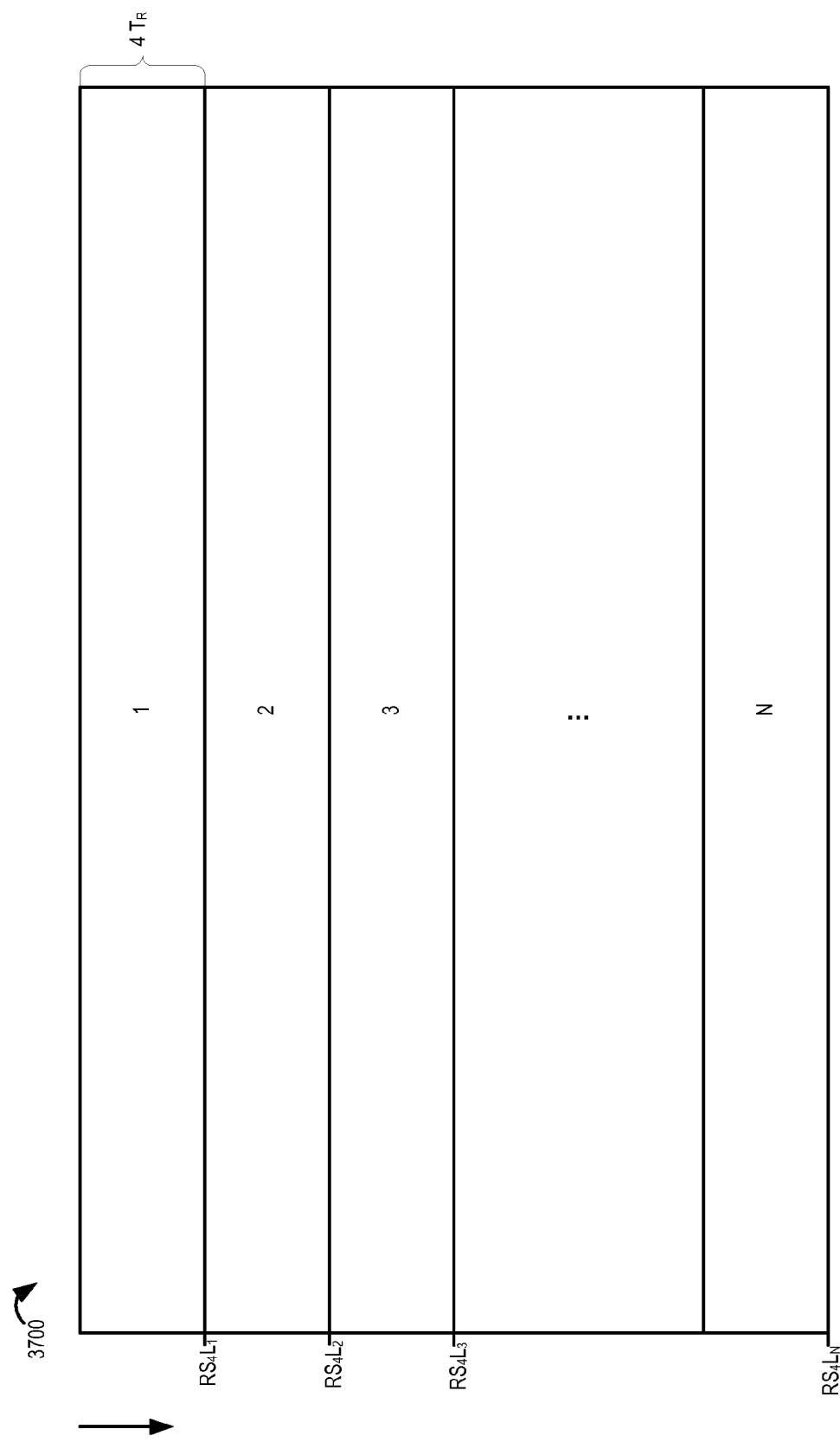

FIG. 37 shows how a sensor, S4, corresponding to an optical chain (e.g., fourth optical chain discussed with regard to FIG. 34) having a focal length (e.g., f1) one fourth or approximately one fourth the focal length f3 of the camera modules used to capture the images shown in FIG. 35 can be controlled so that the corresponding optical chain captures portion of scene of interest in a synchronized manner with multiple camera modules having larger focal lengths.

Since focal length (e.g., f1) of the optical chain to which the sensor of drawing 3700 corresponds is ¼ that of f3, the sensor of drawing 3700 including N pixel element rows capture substantially the same image portions of the scene that are captured by the sensors of the FIGS. 35 and 36 example, the read out rate of the N pixel rows of the sensor of drawing 3700 is reduced by a factor of 4, that is, one pixel elements row will be read out in time period $4T_R$. In FIG. 37 drawing 3700 shows the sensor having N pixel element rows which is controlled to read out one row of pixel values every time period having a duration 4 $T_R$ taking into consideration that the sensor covers a scene portion which is 4 times larger in the vertical dimension than the sensor corresponding to drawing 706 of FIG. 35. While drawing 3700 illustrates that the sensor corresponding to the optical chain with small focal length f1 has N rows of pixel elements, it should be appreciated that the rectangle in drawing 3700 does not show or represent the physical size of the sensor. The size of the sensors (including pixel elements) in the various optical chains may be the same.

As should be appreciated, the read out of the first line of sensor S4 will be completed at time RS4L1 with the Nth line being read out at time RS4LN. Note that given that the readout rate of a row of pixel values occurs once every 4 $T_R$ in FIG. 37 to maintain synchronization with the sensor readouts shown in FIGS. 35 and 36, the readout of sensor S4 will occur at time $4NT_R$ assuming a start time of 0.

Figure 38:
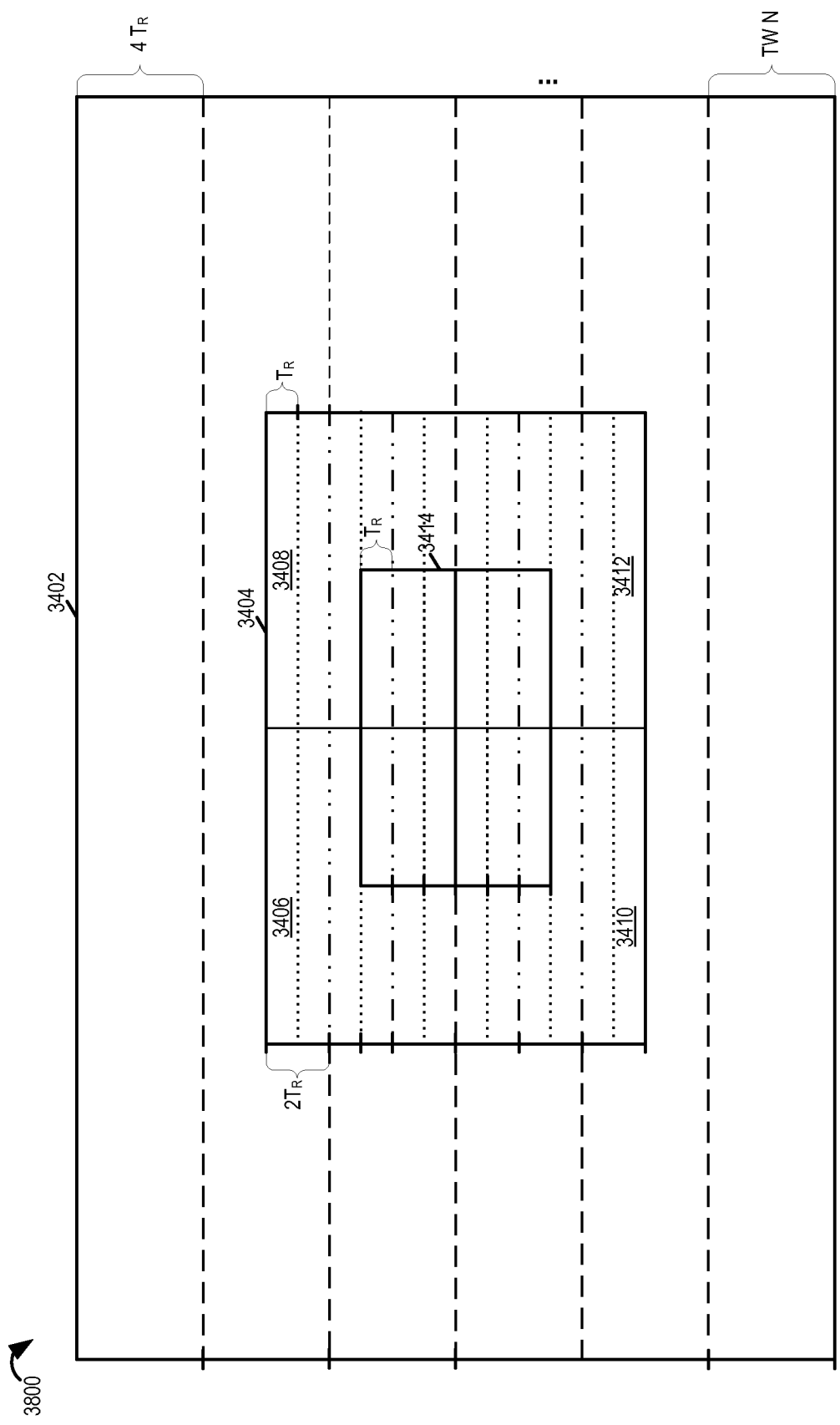

FIG. 38 shows the row readout timing relationships between the sensors used in the FIGS. 35, 36 and 37 embodiments in greater detail when they are used together in a synchronized manner. For illustration and discussion purposes, the same image and/or image portions captured by various optical chains as shown in FIG. 34 and discussed in the corresponding description above, have been used in FIGS. 38-39 for reference. Accordingly, the same reference numbers have been used. Block 3402 represents a scene area captured by a sensor corresponding to a optical chain with focal length f1. Block 3404 represents portion of the scene area 3402 which is captured by a sensor with focal length f2. Blocks 3406, 3410, 3408, 3412 and 3414 represent blocks of a scene area captured by different camera modules having a focal length f3 which provides the highest magnification in the FIG. 38 example with the smallest portion of the scene area being captured.

Figure 39:
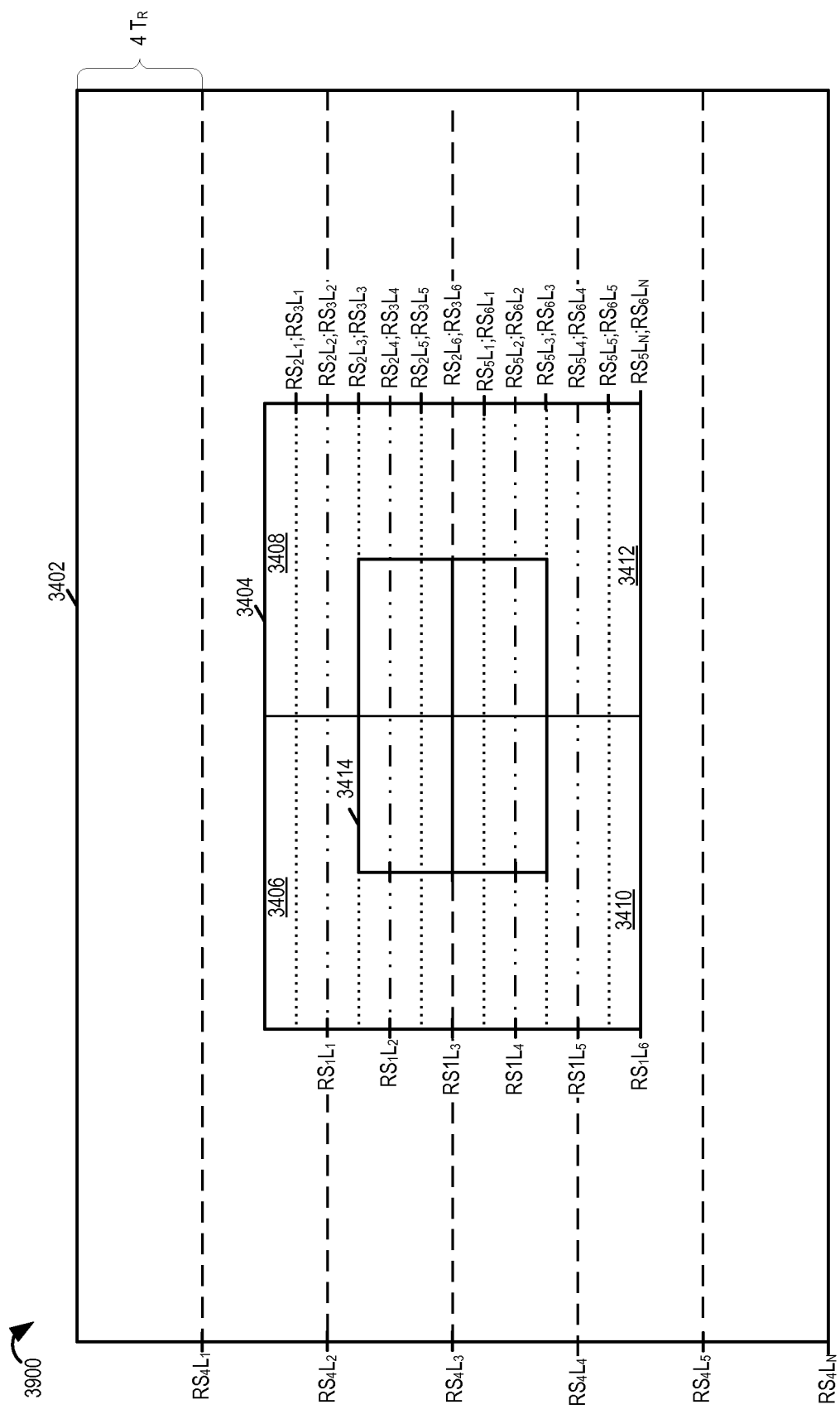

FIG. 39 shows a particular example similar to that shown in FIG. 38 but where the number of rows N is selected to be 6, that is, each of the sensor includes 6 rows of pixel elements, e.g., N=6, with the understanding that the number of rows in most sensors will be much higher. Thus, FIG. 39 is shown for exemplary purposes to illustrate how synchronization may be achieved for a simple case where N=6 and each sensor in the example is of the same size but corresponding to optical chains with different focal lengths.

It should be appreciated from FIG. 39 that when sensors capture images corresponding to the same portions of a scene area, the readouts will occur in parallel. Once a line of pixel values is read out, the next readout will not occur until the synchronization readout control indicates that the next row of unread pixel values is to be read out.

When a sensor corresponds to an image area for which there is no other sensor, the sensor will read out its row of pixel values while the other sensors refrain from performing a read out operation. For example, in the FIG. 39 example, sensor S4 which has the smallest focal length and captures the largest image area will read out its first row of pixel values while sensors S1, S2, S3 and S6 refrain from reading out pixel values. However, when a sensor captures a portion of an image area which is also captured by other sensors it will read out the pixel values in a manner that is synchronized to closely coincide with the readout of the sensor or sensors capturing the same image area. For example, during the time period extending from Time RS3L3 to time RS4L4, sensor S1, Sensor S2 and Sensor S3 will also perform pixel readouts. The number of readouts performed during this time period will depend on the row readout rate of the sensor with sensors corresponding to optical chains have a larger focal length reading out multiple rows of pixel values in the time period in which sensor S4 reads out a single row of pixel values.

Note that $T_R$ which is a unit of time indicating the minimum amount of time used to read a row of pixel elements may be expressed in milliseconds or any other suitable unit of time. Thus, the vertical axis is intended to show time progressing from the top to the bottom based on assumption that the scan of the scene area and read out of the sensors starts at the top and proceeds towards the bottom. While a top to bottom scan direction is shown for purposes of the example, this is not critical or important to the timing synchronization features.

It should be appreciated that while the method of synchronizing readout rates based on focal lengths of the optical chain to which a sensor corresponds have been explained in the simple case where the sensors are of the same size and include the same number of rows, the methods are well suited for use with optical chains which use different size sensors and/or sensors with different numbers of rows of pixel values. As should be appreciated such differences, if present can, and in some embodiments are, taken into consideration as to the start and stop times as well at the readout rate to be used to control the readout of the sensors in a manner which will achieve synchronized image capture of an image area of interest by multiple optical chains, e.g., camera modules. Furthermore overlap in the image areas captured by different modules can be taken into consideration when determining the start times for reading out of different sensors which may correspond to partially overlapping image areas.

For example if sensor S5 of the FIG. 35 example captured an image area which overlapped image portions captured by some of the last rows of sensor S2, the readout of the first row of S5 pixel elements would occur in parallel with the row of pixel elements of sensor S2 which captured the same image portion. In such an embodiment the readout of some but not all of the rows of pixel elements of S5 would follow the completion of the read out of sensor S2 due to the partial overlap in image areas which were being captured by S2 and S5.

While FIGS. 36 to 39 have been used to explain how the read out rate of sensors corresponding to camera modules with small focal lengths can be slowed down to synchronize them to the image capture and pixel read out of sensors corresponding to camera modules with larger focal lengths, where maximizing pixel count in an image is not of top priority, joint reads of pixel rows can, and in some embodiments is, used to speed up the read out of the sensors corresponding to the higher focal length camera modules. During a joint read of a group of M rows, the sensor uses analog circuitry to sum the corresponding pixels of each of the M rows before digitization and reading. A joint read of M rows typically takes the same time as reading a single row thereby speeding up the reading speed by a factor of M. Such an approach allows for synchronized rolling shutter control capture of a scene area of interest in a time period equal to the time period required to read out a single sensor. While such an approach may result in a lower overall image pixel count in a composite image, e.g., with the pixel count of the composite image being reduced in some cases to the pixel count of a single sensor, such an approach may be desirable in cases where motion of an object in the image being captured is present since the motion may introduce artifacts if the overall image capture period is increased since the object will move further in the capture time period than if the capture occurred in a shorter time period.

Figure 40:
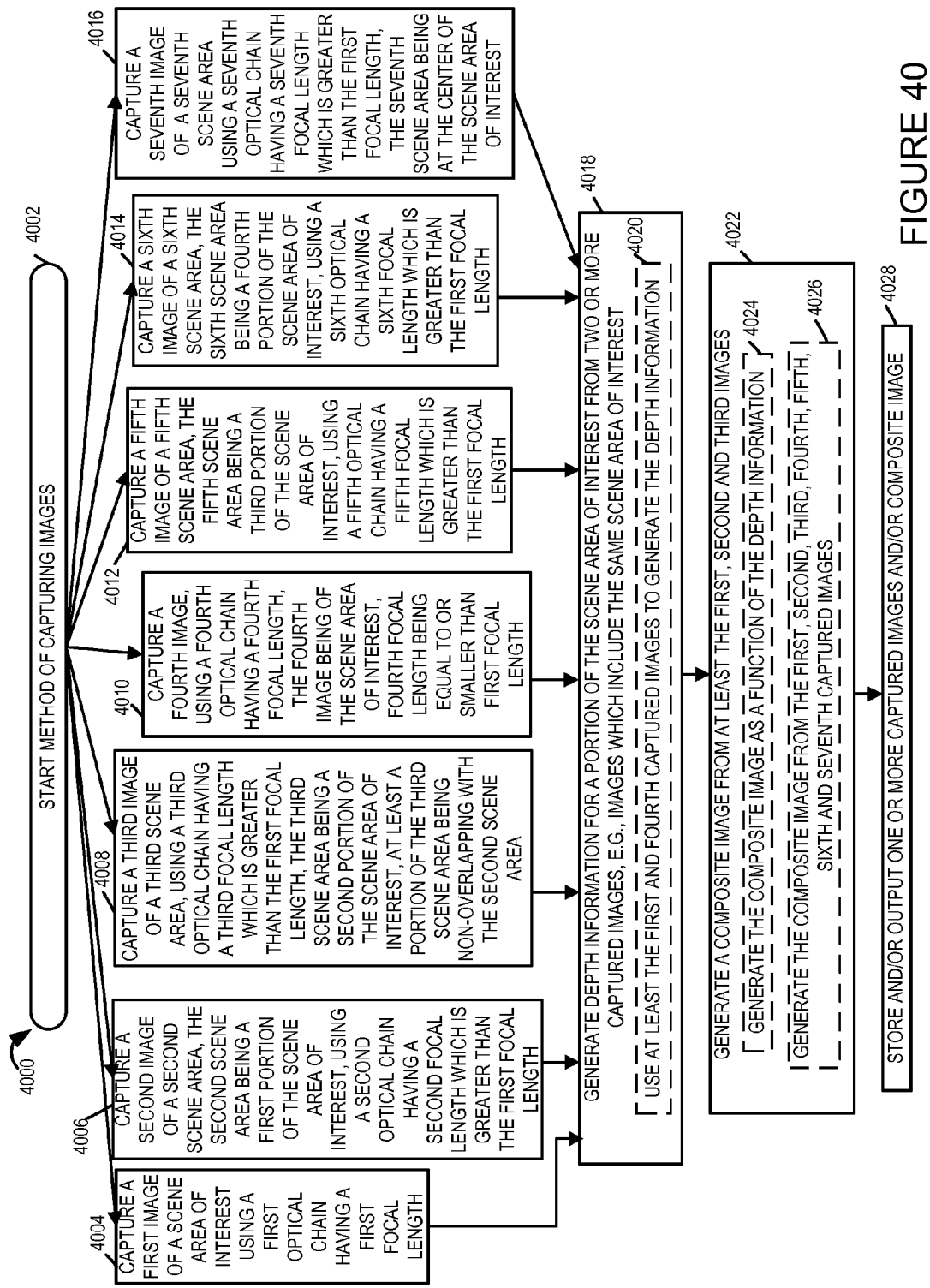
FIG. 40 is an exemplary method of capturing images using multiple camera modules and combining the images in accordance with one exemplary embodiment.

FIG. 40 is an exemplary method of capturing images using multiple optical chains, e.g., camera modules, and combining the images in accordance with one exemplary embodiment.

FIG. 40 shows a flowchart 4000 illustrating the steps of an exemplary method of controlling an imaging device, e.g., such as that shown in FIGS. 6, 8 and/or 14, that includes at least one sensor with a rolling shutter to generate a composite image in accordance with an exemplary embodiment. The camera device implementing the method of flowchart 4000 can and sometimes does include the same or similar elements as the camera device 100 of FIG. 1 and device 200 of FIG. 4A.

The method of flowchart 4000 can be, and in some embodiments is, performed using a camera device such as the camera 100 of FIG. 1. In some embodiments the camera 100 is a battery operated handheld device. The exemplary method starts in step 4002, e.g., when a user of a camera device, e.g., camera 100, presses a button or takes another action to trigger the capture of an image of a scene area of interest. For the purposes of discussion consider that the camera device includes a plurality of optical chains, e.g., camera modules, and each of the camera modules can be independently operated and controlled. For purposes of discussion, the capture and combining of images corresponding to different scene areas will be explained by referring to the optical chains illustrated in FIG. 12A and using that as the basis of the example. As previously discussed in FIG. 12A example, three different focal lengths, f1, f2 and f3 are used where f1<f2<f3.

Operation proceeds from step 4002 to steps 4004, 4006, 4008, 4010, 4012, 4014 and 4016 which involve image capture operations. The image capture operations may and in some embodiments are performed in a synchronized manner. In at least some synchronized embodiments the images captured by some by not necessarily all of the different optical chains correspond to the same or an overlapping time period. In other embodiments image capture is not synchronized but multiple one of the captured images are captured during the same or an overlapping time period. In still other embodiments as least some images are captured sequentially, e.g., in rapid succession. Sequential image capture may, and in some embodiments are used for capturing images corresponding to different portions of a scene area. In step 4004 a first optical chain, e.g., a first camera module 1228, of the camera having a first focal length (f1) is operated to capture a first image of a scene area of interest. In some embodiments the scene area of interest may be slightly smaller than the full image capture area. Operation proceeds from step 4004 to step 4018.

In step 4006 a second image of a second scene area is captured using a second optical chain of the camera, e.g., optical chain 1204, having a second focal length (f2) which is greater than the first focal length (f1), the second scene area being a first portion of the scene area of interest. In various embodiments the second optical chain captures a part, e.g., quarter or half, portion of the scene area of interest. Operation proceeds from step 4006 to step 4018.

In step 4008 a third image of a third scene area is captured using a third optical chain of the camera, e.g., optical chain 1208, having a third focal length (f2) which is greater than the first focal length, at least a portion of the third scene area being non-overlapping with the second scene area, the third scene area being a second portion of the scene area of interest. Thus in some embodiments the third optical chain captures a part, e.g., another quarter, portion of the scene area of interest. Operation proceeds from step 4008 to step 4018. In some embodiments the first, second and third optical chains have outer lenses on a front face of the camera. In some but not all embodiments, the outer most lens of the optical chain is a plane glass or plastic lens with zero optical power.

In step 4010 a fourth image is captured using a fourth optical chain of the camera, e.g., optical chain 1234, having a fourth focal length which is equal to or smaller than f1, the fourth image being of the scene area of interest. In some embodiments the fourth focal length is the same or smaller than the first focal length. Operation proceeds from step 4010 to step 4018.

In step 4012 a fifth image of a fifth scene area is captured using a fifth optical chain of the camera, e.g., optical chain 1218, having a fifth focal length which is greater than the first focal length (f1), the fifth scene area being a third portion of the scene area of interest. Thus the fifth optical chain captures a part, e.g., quarter or half, portion of the scene area of interest. Operation proceeds from step 4012 to step 4018.

In step 4014 a sixth image of a sixth scene area is captured using a sixth optical chain of the camera, e.g., optical chain 1214, having a sixth focal length which is greater than the first focal length, the sixth scene area being a fourth portion of the scene area of interest. Operation proceeds from step 4014 to step 4018.

In step 4016 a seventh image of a seventh scene area is captured using a seventh optical chain of the camera, e.g., optical chain 1224, having a seventh focal length which is greater than the first focal length, the seventh scene area being at the center of the scene area of interest. Operation proceeds from step 4016 to step 4018.

In some embodiments the first and fourth focal lengths are the same. In some embodiments the second, third, fifth and sixth focal lengths are the same. In some embodiments the seventh focal length is the same as the second, third, fifth and sixth focal lengths. In some embodiments the union, e.g., combination, of the second, third, fifth and sixth scene areas includes the scene area of interest.

Returning now to step 4018. Step 4018 is performed in some but not necessarily all embodiments. In step 4018 depth information, for a portion of the scene area of interest which is included in at least two of the captured images, is generated. Thus in some embodiments to generate the depth map information for a portion of the scene area of interest, at least two captured images of the same scene area of interest are used. In some embodiments step 4018 includes step 4020. In such embodiments at least the first and fourth captured images are used to generate the depth information as shown in step 4020. While the first and fourth captured images are used to generate the depth information in one embodiment, other captured images may also be used in generating the depth information. In various embodiments the depth information is generated by a processor, e.g., such as the processor 110 or 211, included in the camera.

In various embodiments the second, third, fifth, sixth and seventh optical chains are arranged in such a manner that the images of the portion of the scene taken by these optical chains are from different spatially separated entrance pupils and thus have different perspectives. Combining such images with different perspectives introduces artifacts, e.g., parallax. To minimize and/or alleviate the effect of such artifacts from a composite image generated using the various images captured by these different optical chains, the depth information is used which provides for parallax correction when combing the images to avoid distortions of the composite image due to the different perspectives.

Operation proceeds from step 4018 to step 4022. In step 4022 a composite image is generated from at least the first, second and third captured images. In some embodiments the step of generating a composite image includes step 4024 where depth information is used in generating the composite image. In such embodiments the composite image is generated from at least the first, second and third captured images as a function of the generated depth information, e.g., depth information generated in step 4018. While depth information is used in generating a composite image in some embodiments, the use of depth information in not necessary in all embodiments for generating a composite image. In some embodiments the step 4022 of generating the composite image further includes using the fourth, fifth, sixth and seventh captured images to generate the composite image as illustrated in step 4026 shown. The composite image includes an image of the scene area of interest. In various embodiments the generated composite image is an image of the scene area of interest. Operation proceeds from step 4022 to step 4028. In step 4028 one or more captured images, e.g., first, second, third, fourth, fifth, sixth and/or seventh image, and/or the composite image is stored, e.g., in a device memory and/or output, e.g., to a display device and/or to an external device via an interface.

In some exemplary embodiment an imaging device such as e.g., the camera device 100, is used to implement the method of flowcharts 4000. In one such embodiment the plurality of optical chains 130 of the camera device 100 include optical chains arranged in the manner as illustrated in FIG. 12A with more detailed arrangements and elements (e.g., sensors, filters) of the optical chains further shown in FIG. 12B. Thus in such an embodiment the plurality of optical chains 130 include optical chains 1202 through 1234 discussed with regard to FIG. 12A. In another embodiment the plurality of optical chains 130 of the camera device 100 include optical chains of the type and arrangement as illustrated in FIG. 17A. In such an embodiment the plurality of optical chains 130 include optical chains 1702 through 1734 discussed with regard to FIGS. 17A and 17B.

In some exemplary embodiments the processor 110 is configured to generate a composite image by combining two or more images captured by the optical chains as discussed above. In one embodiment the processor 110 is configure to generate a composite image from at least a first image of a scene area of interest captured by the first optical chain, a second image of a second scene area which is a first portion of the scene area of interest captured using the second optical chain, and a third image of a third scene area captured using the third optical chain, the third scene area being a second portion of the scene area of interest, at least a portion of the third scene area being non-overlapping with the second scene area.

In some embodiments the processor 110 is configured to generate depth information for a portion of the scene area of interest which is included in at least two of the captured images. In some embodiments the processor 110 is further configured to generate the depth information using at least the first image captured by the first optical chain and a fourth captured image captured by the fourth optical chain, the fourth image being of the scene area of interest. In some such embodiments the processor 110 is further configured to generate the composite image as a function of said depth information. In some embodiments the fourth optical chain has a fourth focal length which is equal to or smaller than the first focal length of the first optical chain. In some embodiments the processor 110 is further configured to control storage of the one or more captured images and/or the generated composite image in the memory 108 and/or output of the one or more captured images and/or composite image on the display 102 and/or transmission of the captured images or the composite image to another device via an interface such as interface 114.

It should be appreciated that various features and/or steps of method 4000 relate to improvements in cameras and/or image processing even though such devices may use general purpose processors and/or image sensors. While one or more steps of the method 4000, such as the steps of generating depth information and generating composite image, have been discussed as being performed by a processor, e.g., processor 110, 211, it should be appreciated that one or more of the steps of the method 4000 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 4000 therein providing additional image processing efficiency, accuracy and/or operational capability to the imaging device, e.g., camera, implementing the method.

FIG. 41 which comprises the combination of FIGS. 41A and 41B, is a flowchart 4100 illustrating the steps of an exemplary method of operating an imaging device, e.g., such as that shown in FIGS. 6, 8 and/or 14, that includes at least one image sensor with a rolling shutter to scan a portion of a scene area of interest in accordance with an exemplary embodiment. The camera device implementing the method of flowchart 4100 can and sometimes does include the same or similar elements as the camera device of FIG. 1 and FIG. 4A.

The exemplary method starts in step 4102, e.g., with a user initiating the capture of a scene area of interest on a camera device which causes the camera device, e.g., camera device 100, to initiate a scan and thus image capture of the scene area of interest by one or more optical chains. For the purposes of discussion consider that the camera device includes a plurality of image sensors wherein each sensor is a part of an optical chain, e.g., first through $X^{th}$ sensors being included in a first through $X^{th}$ optical chain respectively. Operation proceeds from step 4102 to step 4104. In step 4104 a plurality of image sensors included in the camera are controlled to scan the scene area of interest from a first edge of the scene area of interest to a second edge of the scene area of interest, the first (e.g., top) and second (e.g., bottom) edges of the scene area of interest being parallel, the scanning including controlling image capture according to a scan position which progresses from the first edge to the second edge of the scene area of interest (e.g., at a uniform rate). In some embodiments the plurality of image sensors include multiple image sensors which capture substantially non-overlapping portions of the scene area of interest (in some embodiments the majority of image portions do not overlap) and the union of the portions of the scene area of interest captured by the multiple sensors cover the scene area of interest. In some embodiments the multiple image sensors include an even number of sensors, e.g., 4.

In some embodiments the plurality of image sensors includes a first, a second and a third image sensor, the first image sensor capturing a first portion of the scene area of interest, the second image sensor capturing a second portion of the scene area of interest, and the third image sensor capturing the entire scene area of interest. In some such embodiments the first and second portions of the scene area of interest are partially non-overlapping.

In some embodiments the first sensor captures an image of a portion of the scene area of interest which is not captured by the second sensor, and the second sensor captures an image of a portion of the scene area of interest which is not captured by the first sensor. In some embodiments a first portion of the scene area of interest captured by the first sensor begins at a scan location which precedes a second portion of the scene area of interest captured by the second sensor. In some embodiments the second portion of the scene area of interest corresponds to the center of the scene area of interest. In some embodiments plurality of sensors includes 5 sensors, four of which capture substantially non-overlapping portions of the scene area of interest. In some embodiments first through fourth different corner portions of the second portion of the scene area of interest overlap different corresponding portions of the scene area of interest which are captured by the remaining four sensors of the five sensors.

In some embodiments the plurality of sensors includes 5 sensors, four of which capture four different portions of the scene area of interest, at least one corner of each of the four different portions of the scene area of interest not overlapping an image portion captured by the other three of the four different portions of the scene area of interest, the fifth sensor capturing a center portion of the scene area of interest.

In various embodiments step 4104 includes performing one or more of the steps 4106, 4108 and 4110. As part of controlling one or more sensors to scan the scene area of interest, in step 4106 a first sensor in the plurality of sensors is operated in rolling shutter mode to read out an as yet unread row of pixel values corresponding to a current scan position when the first sensor has an unread row of pixel values corresponding to the current scan position, the current scan position changing over time (e.g. as the scan progresses from the first edge to the second). In some embodiments, the scan position progresses from the first edge of the scene area of interest to the second edge of the scene area of interest at a uniform rate.

In step 4108 a second sensor in the plurality of sensors is operated in rolling shutter mode to read out an as yet unread row of pixel values corresponding to the current scan position when the second sensor has an unread row of pixel values corresponding to the current scan position, the first and second sensors capturing images of different portions of the scene area of interest (e.g. the different portions may be partially overlapping or one may be inside the other). Similarly, as part of controlling scanning the scene area of interest, in step 4110 an $X^{th}$ sensor in the plurality of sensors is operated in rolling shutter mode to read out an as yet unread row of pixel values corresponding to the current scan position when the $X^{th}$ sensor has an unread row of pixel values corresponding to the current scan position. Accordingly, in this manner the entire scene of interest and/or various portions of the scene of interest are scanned by the various sensors of the camera device.

In some embodiments the first and second sensors correspond to first and second portions of the scene area of interest, respectively, the extent of the first portion of the scene area of interest being greater than the extent of the second portion of the scene area of interest in the direction of scan. In some embodiments the direction of scan proceeds from top to bottom. In some embodiments the first sensor corresponds to a first optical chain having a first focal length and the second sensor corresponds to a second optical chain having a second focal length. In some embodiments the controlling step 4104 further includes performing step 4112 to control the duration of read out of the one or more image sensors. In step 4112 the duration of readout of the first sensor is controlled as a function of first sensor image capture size and/or focal length of a first optical chain to which the first sensor corresponds. In some embodiments, step 4112 includes performing one of the steps 4114 or 4116 as part of controlling the duration of sensor readouts. In step 4114 the duration of readout of the first sensor is controlled to have a longer duration than the readout of the second sensor when the focal length of the first optical chain is smaller than the focal length of the second optical chain. In some embodiments, the duration of the readout of the first sensor is controlled to have a longer duration than the readout of the second sensor when the first and second sensors correspond to first and second portions of the scene area of interest, respectively, and the extent of the first portion of the scene area of interest in the direction of scan is greater than the extent of the second portion of the scan area of interest in the direction of the scan. This occurs for example, when the focal length of the first optical chain including the first sensor is smaller than the focal length of the second optical chain including the second sensor.

In some other embodiments the focal length of the first optical chain (to which the first sensor corresponds) is N times the focal length of the second optical chain. In some such embodiments step 4116 is performed as part of step 4112. In step 4116 the duration of reading out of pixel values from the first sensor is controlled to include reading rows of pixel values out of the first sensor at a rate which is N times faster than the rate at which rows of pixel values are read out from the second sensor. In various embodiments a rolling shutter controller in the camera device controls the scanning and read out operation discussed above. In some embodiments the pixel size of the first sensor is the same as the pixel size of the second sensor. In some embodiments the first and second sensors include the same total number of row and columns of pixels.

Operation proceeds from step 4101 (that includes one or more steps discussed above) to step 4120 via connecting node A 4118. In step 4120 the one or more images read out of the first through $X^{th}$ sensors are stored, e.g., X images are stored, one corresponding to each of the X sensors. Operation proceeds from step 4120 to step 4122. In step 4122, at least two or more or all of the captured images (read out from the sensor) are combined to generate a composite image in accordance with the invention.

Figure 42:
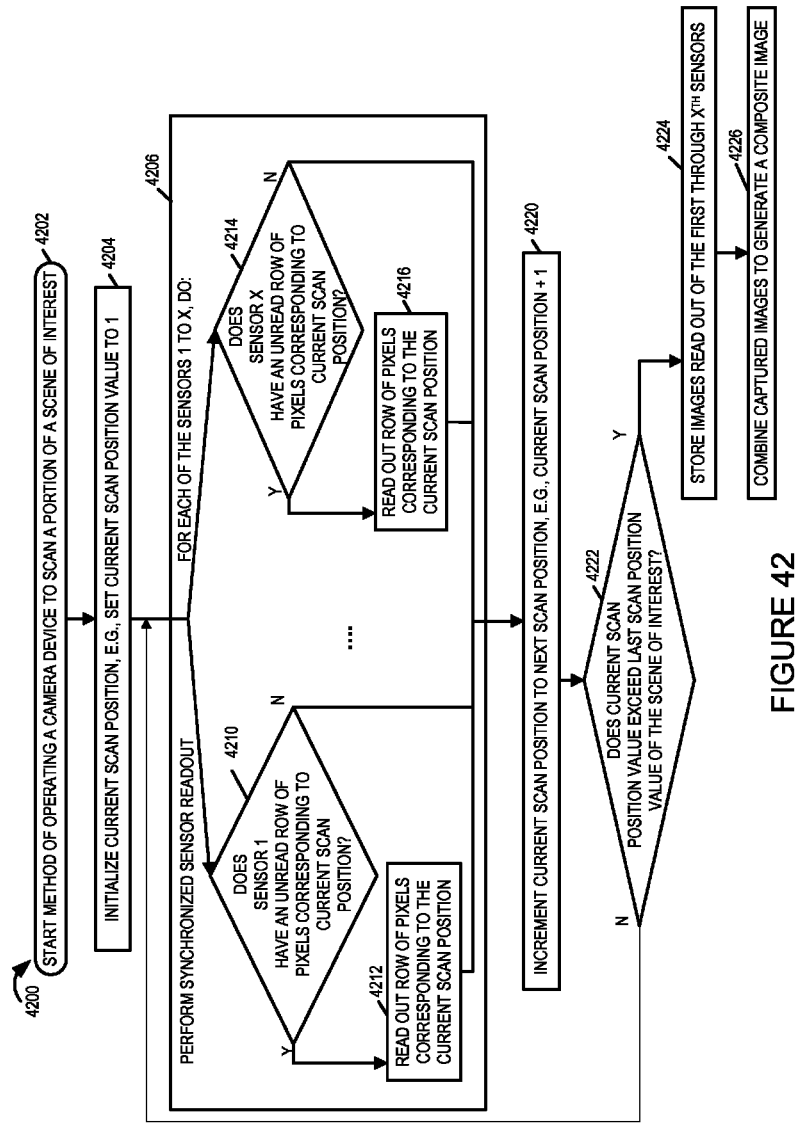
FIG. 42 shows the steps of a method of capturing a scene of interest using a plurality of camera modules in a synchronized manner.

FIG. 42 shows the steps of a method 4200 of capturing a scene area of interest using a plurality of optical chains, e.g., camera modules, that is implemented in some embodiments. The method starts in step 4202, e.g., with a user initiating the capture of a scene area of interest on a camera device which causes the camera device, e.g., camera device 100, to initiate a scan and thus image capture of the scene area of interest by one or more camera optical chains which are operated in a coordinated manner.

Operation proceeds to step 4204 in which the camera device initializes a current scan position, e.g., by setting the current scan position to a scan position starting value, e.g., 1, in the FIG. 42 example.

Once the scan position value is initialized, operation proceeds from step 4204 to step 4206, wherein a controller, e.g., rolling shutter controller 150, controls each of the image sensors of the camera device to perform a read out of pixel values, e.g., rows of pixel values, in a synchronized manner, e.g., with rows of pixel values being read out sequentially in accordance with operation of a rolling shutter implementation.

Step 4206 includes image sensor read out control steps for each of the image sensors 1 to X which are being used to capture at least a portion of a scene area of interest. For purposes of discussion steps 4210 and 4214 are shown with the same or similar steps being performed for each of the other image sensors being used to capture at least a portion of a scene area of interest.

In step 4210 a determination is made as to whether or not image sensor 1 has an as yet unread row of pixels corresponding to the current scan position, e.g., a row of pixel values which are to be read out. If image sensor 1 does not have an unread row of pixel values corresponding to the current scan position, e.g., because the image sensor corresponds to an image portion outside the area corresponding to the current scan position, operation proceeds to step 4220 without a row of pixels being read out from image sensor 1.

In step 4214 a determination is made as to whether or not image sensor X has an as yet unread row of pixels corresponding to the current scan position, e.g., a row of pixel values which are to be read out. If image sensor X does not have an unread row of pixel values corresponding to the current scan position, e.g., because image sensor X corresponds to an image portion outside the area corresponding to the current scan position, operation proceeds to step 4220 without a row of pixels being read out from image sensor X.

It should be appreciated that by the time operation proceeds to step 4220 from step 4206, each of the image sensors 1 through X which had an unread row of pixel elements corresponding to the current scan position will have read out the pixel values of the row corresponding to the current scan position.

In step 4220 the current scan position is updated to the next scan position, e.g., the current scan position is incremented by one. As the current scan position is incremented, the scanning of the image moves to the next scan line resulting in the scan lines passed through in sequence, e.g., from the top of the image to the bottom of the image assuming a top to bottom scan of a scene area.

Operation proceeds from step 4220 to step 4222 in which a determination is made as to whether the current scan position that was just updated in step 4220 exceeds the last scan position value of the scene of interest. If the current scan position exceeds the last scan position of the scene area of interest it indicates that the scene of interest has been fully scanned and captured as a result of the image sensor readouts. However, if in step 4222 it is determined that the current scan position value does not exceed the value last scan position value of the scene area of interest, operation proceeds to step 4206 so that unread pixel element rows of image sensors having a row of pixel elements corresponding to the current scene area position will be read out.

It should be appreciated that the focal length and area of a scene to which a camera optical change and its corresponding image sensor are directed will affect whether a row of pixel values of an image sensor are read out at a particular point in time in the FIG. 42 embodiment. Since image sensor read out is controlled based on scan position, the sensor readouts of multiple image sensors occurs in a coordinated manner. While the image sensor readout of pixel values is coordinated in the FIG. 42 embodiment, the readout of some image sensors may occur, depending on the camera device configuration, before the readout of one or more other sensors is completed.

Generally, in the FIG. 42 embodiment, the readout of an image sensor corresponding to a camera optical chain having a smaller focal length and thus corresponding to a larger portion of the scene area of interest will occur at a slower rate than the readout of an image sensor having the same number of rows of pixel elements but having a larger focal length and thus corresponding to a smaller portion of the overall scene area of interest.

Once the full scene area of interest has been scanned, operation proceeds from step 4222 to step 4224 in which images, e.g., sets of pixel values, read out of the first through $X^{th}$ image sensors are stored in memory. Then in step 4224, the captured images are processed, e.g., by processor 110, to generate a composite image which may be stored and/or output, e.g., transmitted and/or displayed. The generation of the composite image performed in step 4226 may be performed in any of a variety of ways including combining pixel values of images captured by different image sensors using a weighted sum approach such as described above with respect to at least some image combining processes that can, and in various embodiments are, used to generate a composite image.

It should be appreciated that the method of FIG. 42 has been explained in terms of reading out rows of pixel elements of an image sensor. Some image sensors allow, depending on the mode of operation, pixel elements of multiple pixel rows to be treated as a single row. Such a "joint" read results in a single pixel value which is the sum of the pixel values sensed by each of the jointly read rows being read out as a single pixel value. In cases of such a "joint" read, the multiple rows of pixel elements which are jointly read out as a single row of pixel values is treated as one row of pixel elements for purposes of implementing the method of FIG. 42. The joint read approach while resulting in a reduced number of pixel values being read out from an image sensor may be desirable in embodiments where motion is an issue and it is desirable to capture an image in as little time as possible.

Generally, if different image sensors correspond to different focal lengths, assuming each of the image sensors include the same number of rows of pixel values the read out time to read out the full set of rows of an image sensor in the FIG. 42 embodiment can be expressed as a function of the focal length of the optical chain, e.g., camera module, in which the image sensor is included and the number of rows of pixel elements of the image sensor which will be jointly read out and treated as a single row of pixel elements at a given time.

In some exemplary embodiment an imaging device such as e.g., the camera device 100, is used to implement the method of flowcharts 4100 and 4200. In one such embodiment the plurality of optical chains 130 of the camera device 100 include optical chains arranged in the manner as illustrated in FIG. 12A with more detailed arrangements and elements (e.g., sensors, filters) of the optical chains further shown in FIG. 12B. Thus in such an embodiment the plurality of optical chains 130 include optical chains 1202 through 1234 discussed with regard to FIG. 12A. In another embodiment the plurality of optical chains 130 of the camera device 100 include optical chains of the type and arrangement as illustrated in FIG. 17A. In such an embodiment the plurality of optical chains 130 include optical chains 1702 through 1734, some of which include non-circular lenses, discussed with regard to FIGS. 17A and 17B.

In some embodiments the controller 150 (including the sensor read out controller 289) is configured to control a plurality of image sensors, corresponding to the plurality of optical chains 130, to scan a scene area of interest from a first edge of the scene area of interest to a second edge of the scene area of interest, the first and second edges of the scene area of interest being parallel, the sensor controller 289 controlling, as part of the scan, image capture according to a scan position which progresses from the first edge to the second edge of the scene area of interest. The sensor controller controls a first sensor in the plurality of image sensors in rolling shutter mode to read out a row of pixel values corresponding to a current scan position when the first image sensor has a row of pixel values corresponding to the current scan position, the current scan position changing over time. In some embodiments the sensor controller 289 further controls a second image sensor in the plurality of image sensors in rolling shutter mode to read out a row of pixel values corresponding to the current scan position when the second image sensor has a row of pixel values corresponding to the current scan position, the first and second image sensors capturing images of different portions of the scene area of interest.

In some embodiments the first image sensor captures an image of a portion of the scene area of interest which is not captured by the second image sensor and the second image sensor captures an image of a portion of said scene area of interest which is not captured by said first image sensor.

In some embodiments the plurality of image sensors further includes a third image sensor (e.g., corresponding to a third optical chain). In some such embodiments the first image sensor captures a first portion of said scene area of interest, the second image sensor captures a second portion of the scene area of interest, the first and second portions of the scene area of interest being partially non-overlapping and the third image sensor captures the entire scene area of interest. This can be appreciated by briefly referring to FIGS. 12 and 32. For example a first portion 3206 is captured by a first image sensor corresponding to a first optical chain, e.g., OC 1204, a second portion 3208 is captured by a second image sensor corresponding to a second optical chain, e.g., OC 1208, and a third portion 3202 is captured by a third image sensor corresponding to a third optical chain, e.g., OC 1228. It can be appreciated from the example of FIG. 32 that the first and second portions (3206 and 3208) of the scene area of interest are partially non-overlapping and the third image sensor captures the entire scene area of interest.

In one embodiment the first and second image sensors correspond to first and second portions of the scene area of interest, respectively, the extent of the first portion of the scene area of interest being greater than the extent of the second portion of the scene area of interest in the direction of scan, e.g., from top to bottom. In one such embodiment the sensor controller 289 is configured to control the duration of readout of the first image sensor to have a longer duration than the readout of the second image sensor.

In some embodiments the first image sensor corresponds to an optical chain, e.g., OC 1204, having a first focal length and said second image sensor corresponds to an optical chain, e.g., OC 1234, having a second focal length. In some such embodiments the controller 289 is configured to control the rate at which pixel rows are read out of the first and second image sensors as a function of the focal length of the individual optical chains to which the first and second image sensors correspond. In some embodiments the pixel size of the first image sensor is the same as the pixel size of the second image sensor. In some embodiments the first focal length is N times the second focal length. In such embodiments the sensor controller is further configured to control the duration of reading out of pixel values from the first image sensor at a rate which is N times faster than the rate at which rows of pixel values are read out from the second image sensor. In some embodiments the first and second image sensors include the same total number of rows and columns of pixels.

In some embodiments the plurality of image sensors (corresponding to the plurality of optical chains 130) include multiple image sensors which capture substantially non-overlapping portions of the scene area of interest and a union of the portions of the scene area of interest captured by the multiple sensors cover the scene area of interest. In some embodiments multiple image sensors include an even number of sensors. In some embodiments, the even number of image sensors is four.

In one embodiment a first portion of the scene area of interest captured by the first image sensor begins at a scan location which precedes a second portion of the scene area of interest captured by the second image sensor. In one embodiment the second portion of the scene area of interest corresponds to the center of said scene area of interest. In some such embodiments the plurality of image sensors (corresponding to the plurality of optical chains) includes 5 image sensors, 4 of which capture substantially non-overlapping portions of the scene area of interest. In some such embodiments first through fourth different corner portions of the second portion of the scene area of interest overlap different corresponding portions of the scene area of interest which are captured by the remaining four sensors of said five sensors. This arrangement can be appreciated by briefly referring to FIG. 32. It can be appreciated that four corners of the scene area 3216 (in the center) overlaps the different portions (scene areas 3206, 3208, 3212, 3214) of a scene area of interest captured by four sensors (corresponding to four optical chains).

In some embodiments, the plurality of sensors includes 5 sensors, 4 of which capture four different portions of the scene area of interest, at least one corner of each of the four different portions of the scene area of interest not overlapping an image portion captured by the other three of the four different portions of the scene area of interest, the fifth sensor capturing a center portion of the scene area of interest.

In various embodiments the processor 110 initializes a current scan position, e.g., by setting the current scan position to a scan position starting value, prior to starting of a sensor read out operation as discussed with regard to FIG. 42. In various embodiments the exposure and read out controller 150 (that includes sensor read out controller 289) alone, or under direction of the processor 110, controls each of the image sensors of the camera device to perform a read out of pixel values, e.g., rows of pixel values, in a synchronized manner. In some embodiments the controller 150 is further configured to determine as to whether or not one or more image sensors have an unread row of pixels corresponding to the current scan position, e.g., a row of pixel values which are to be read out. When it is determined that not one or more image sensors have an unread row of pixels corresponding to the current scan position, the controller 150 controls each of the one or more image sensors to perform a read out of the row of pixel values. In some embodiments the processor 110 is further configured to update the current scan position to the next scan position, e.g., incrementing the current scan position by one.

Figure 43:
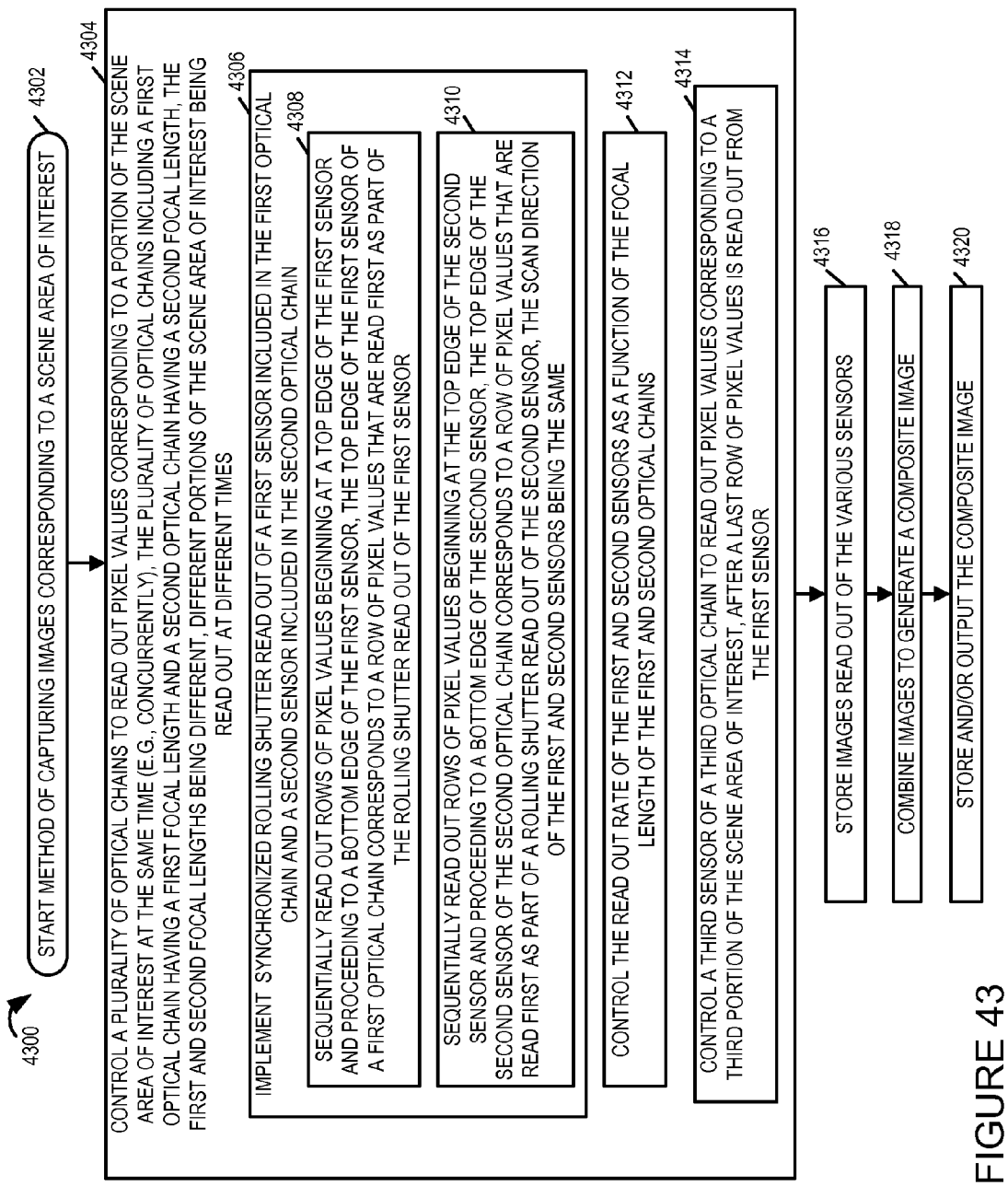
FIG. 43 shows the steps of a method of capturing a scene of interest using a plurality of camera modules in a synchronized manner in accordance with another exemplary embodiment.

It should be appreciated that various features and/or steps of method 4100 and 4200 relate to improvements in cameras and/or image processing even though such devices may use general purpose processors and/or image sensors. While one or more steps of the method 4100 and 4200 have been discussed as being performed by a processor, e.g., processor 110, 211, it should be appreciated that one or more of the steps of the method 4100 and 4200 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 4100 and 4200 therein providing additional image processing efficiency, accuracy and/or operational capability to the imaging device, e.g., camera, implementing the method. FIG. 43 shows the steps of a method 4300 of capturing a scene area of interest using a plurality of optical chains, e.g., camera modules, in a synchronized manner in accordance with another exemplary embodiment. For purposes of discussion, the capturing of images corresponding to different scene areas performed by image sensors of different optical chains will be explained by referring to the optical chains illustrated in FIG. 12A and using that as the basis of the example. As previously discussed in FIG. 12A example, three different focal lengths, f1, f2 and f3 are used where f1<f2<f3, the same focal length relationship is considered for discussion.

The method 4300 starts with step 4302, e.g., when a user of a camera device, e.g., camera 100, presses a button or takes another action to trigger the capture of an image of a scene area of interest. In step 4304 the exposure and read out controller 150 (that includes sensor read out controller 289) alone, or under direction of the processor 110, controls a plurality of optical chains 130 to read out pixel values corresponding to a portion of the scene area of interest at the same time, e.g., concurrently. It should be appreciated that while a plurality, e.g., two or more, of the optical chains 130 are operated to read out at the same time, one or more of the remaining optical chains 130, e.g., optical chains which are directed to a different portion of the scene of interest, may not be controlled to read out the pixel values while other image sensors are reading out pixel values. In at least one implementation of the method 4300, the plurality of optical chains 130 includes a first optical chain, e.g., optical chain 1204) having a first focal length (f2) and a second optical chain, e.g., optical chain 1234, having a second focal length (f1). As part of the reading out of the image sensors, different portions of the scene area of interest will be read out at different times, e.g., as the rolling shutter and read out move down from the top of the image sensor to the bottom of the image sensor where the top of the image sensor corresponds to the start of the rolling shutter readout and the bottom of the image sensor corresponds to the last row to be read out. To facilitate synchronization of sensor readouts, in at least one embodiment the tops and bottoms of image sensors of the different optical chains are arranged in the same direction so that the read out of rows of pixel values can be easily synchronized. However, the use of a uniform scan and thus readout direction for the different image sensors of the optical chains is not mandatory for all embodiments even though it is used on at least some embodiments.

Since the image sensors are controlled to perform pixel row readouts sequentially, e.g. in accordance with the implemented rolling shutter control, different portions of the scene area of interest will be read out from sensors of one or more optical chains at different times while the readout of pixel values corresponding to a portion of the scene area of interest will occur in a synchronized manner with the sensor of multiple optical chains reading out rows of pixel values corresponding to the same portion of a scene area of interest in parallel.

Step 4304 includes various sub steps in at least some embodiments. Step 4304 includes step 4306 of implementing a synchronized rolling shutter read out of the first image sensor included in the first optical chain and the second image sensor included in the second optical chain. Thus, the first and second image sensors of the first and second optical chains will be read out in a synchronized fashion taking into consideration the operation of the timing of a first rolling shutter used to control the read out of the first image sensor of the first optical chain and the timing of a second rolling shutter used to control the read out of the second image sensor, i.e., the image sensor of the second optical chain.

As part of step 4306, steps 4308 and 4310 maybe, and in various embodiments are, performed. In step 4308 the first image sensor of the first optical chains is controlled to sequentially read out rows of pixel values beginning at the top edge of the first image sensor and proceeding to a bottom edge of the first image sensor where the top edge of the first image sensor of the first optical chain corresponds to a row of pixel values that are read out first as part of the rolling shutter controlled read out of the first image sensor. In step 4310 the second image sensor of the second optical chain is controlled to sequentially read out rows of pixel values beginning at the top edge of the second image sensor. The readout of the second image sensor proceeds to a bottom edge of the second image sensor where the top edge of the second image sensor of the second optical chain corresponds to a row of pixel values that are read out first as part of the rolling shutter controlled read out of the second image sensor. In this example, the first and second image sensors are configured so that they both have their tops and bottoms oriented in the same direction relative to the top of the camera device, e.g., camera device 100, implementing the method.

While the method of 4300 is explained with respect to first and second image sensors of first and second optical chains, it should be appreciated that in some embodiments the method is implemented for more than two optical chains, e.g., for Z optical chains where Z can be anywhere in the range of from 2 to Z, Z being an integer. In such in implementation, step 4306 includes a read out step similar to steps 4308, 4310 for each of the individual Z optical chains and corresponding image sensors of the camera device in which the method is implemented.

In addition to step 4306, step 4304 includes step 4312. In step 4312, the read out rate of the first and second image sensors is controlled as a function of the focal length of the first and second optical chains, respectively. In some embodiments where the focal length of the first optical chain (f2) is larger than the focal length of the second optical chain (f1), the image sensor readout controller 289 controls the first image sensor to read out a number of rows of pixels in the first image sensor in a period of time which is calculated as the ratio of the second focal length (f1) to the first focal length (f2) times the amount of time used to read out the same number of rows of pixels in said second image sensor.

Consider for example the case where the first and second image sensors have the same number of rows of pixel elements but the first image sensor corresponds to the first optical chain 1204 having a first focal length (f2) and a second optical chain, e.g., module 1234, having a second focal length (f1) where f2 is twice f1. As previously discussed, in such a case the second optical chain (f1) will capture a portion of the scene area which is four times or approximately four times the size of the scene area captured by the first optical chain (f2). To synchronize the image capture process assuming that the image sensor of the first optical chain (f2) is controlled to read its full set of pixel values in time $NT_R$, (where N is the number of pixel element rows on the first and second image sensors and $T_R$ is the time required to read a single row of pixel elements on either of the image sensors), the second image sensor with the shorter focal length (f1) will be controlled to read out its rows of pixel values over the time period $2NT_R$ assuming all of the rows of the image sensor are to be read out individually.

Thus assuming image sensors have the same number of rows, the time over which an image sensor will be controlled to read out its rows of pixel values is as follows:

Sensor 1 with N rows of pixel elements and a focal length of f2 will have a read out period of $(f2/f2)NT_R$ Sensor 2 also with N rows pixel elements and a focal length of f1 (smaller than sensor 1 focal length f2) will have a read out period of: $NT_R$ (f2/f1)=$2NT_R$ (since f2=2f1), assuming each of the individual rows of pixel values are individually read out.

Note that f2 is used in this example as the numerator since it is the largest focal length being used in the example.

As noted above, in some modes of operation a joint read out of rows of pixel elements may be implemented to reduce amount of time required to read out an image sensor. While in various embodiments where each sensor's rows of pixel elements are read out individually to maximize the overall pixel count of a generated composite image, and the read out rate of the sensor corresponding to the smaller focal length is reduced to maintain synchronization with the read out of pixel values and thus the capture of image portions of the scene of interest of the sensor corresponding to the optical chain having the larger focal length this does not occur in all embodiments.

For example in one particular exemplary embodiment where capture of fast motion is desired, rather than slowing down the row read out rate of the image sensor corresponding to the shorter focal length, a joint read out operation is performed for rows of the image sensor corresponding to the larger focal length. As noted above, in a joint readout multiple rows of pixel values are read out jointly with, for example two rows of pixel values providing the same number of pixel values as a single row when a joint read of the two rows is implemented. While a joint read by a factor of M will result in a reduction of rows of pixel values by the same factor, the image sensor read out will be completed in 1/Mth the time.

In at least one embodiment, rather than slow down the read out rate of one or more sensors corresponding to optical chains having a short focal length, e.g., a focal length shorter than the longest focal length to be used to capture an image that will be combined to form a composite image, a joint read out of pixel rows of the sensor with the longer focal length is implemented with the number of rows being jointly read out being controlled as a function of the difference in the focal lengths. For example if f2 is twice f1, in one embodiment M is set equal to 2 so that the read out of the sensor corresponding to the f2 focal length can be completed in half the time used to read out the rows of pixel values from the second sensor corresponding to the optical chain with shorter focal length f1.

In such a case the time required to read out the pixel rows of the sensor with the shortest focal length serves as the time constraint for the multiple image sensors to complete their read out and sensors with larger focal lengths have the number of rows read out reduced by use of a joint read operation based on a factor which is determined by the ratio of the larger focal length to the smaller focal length. For example if f2 is larger than f1 by a factor of 2, sensors corresponding to optical chains with an f2 focal length will be read out using joint reads implemented by a joint read factor of 2.

In this way, the image sensors of the optical chains with different focal length can be controlled to capture the same portions of a scene area of interest with the total capture time being limited to the time required to read a single image sensor.

While the joint read reduces the number of pixel values which will be read out of the image sensor with the larger focal length, the time required to perform the read is reduced and the total pixel count of the image will not be reduced below that of the optical chain with the shorter focal length f1.

In at least one embodiment a user is provided the opportunity to select between a motion mode of operation in which joint reads are used to reduce or minimize the image capture time period, e.g., to keep the total time used to capture an image to $NT_R$ which corresponds to the time required to read a single image sensor in some embodiments, and a still or slow motion mode of operation where the pixel count of an image is optimized at the expense of the image capture time, e.g., an embodiment where the read out time period of pixel element rows corresponding to the image sensor of the optical chain with the shorter focal length is increased to achieve timing synchronization with scene area capture by optical chains having a larger focal length.

Taking into consideration the potential use of the joint row read factor M, the total time used to read out rows of pixel values from first and second image sensors having the same number of rows of pixel elements but corresponding to different focal length f1 and f2, respectively where f2 is greater than f1, can be expressed as follows:

Sensor 2 with N rows of pixel elements and corresponding to optical chain having a focal length of f1 (shorter focal length) will have a read out period of $NT_R$;

Sensor 1 also with N rows pixel elements but corresponding to the optical chain having a focal length of f2 (larger) is controlled to perform a joint read of rows by a factor of M will have a read out period of: $NT_R/M$, where M is equal to (f2/f1) assuming one row of pixel values is read out for each M rows of pixel elements.

While sensor 1 (larger focal length f2) will complete a readout in less time than sensor 2, it should be appreciated that in various embodiments another sensor S3 with the same focal length (f2) as the optical chain to which sensor 1 corresponds, but which captures an image area, in terms of scan direction beneath the area captured by sensor 1, will capture the lower portion of the image. Thus, assuming f2 is twice f1, the read out of sensors S1 and S3 will coincide to the same time period $NT_R$ in which sensor 2 is read out but with the sensor 1 S1 read out occurring during the first half of $NT_R$ and the sensor 3 S3 readout occurring in the second half of $NT_R$.

From the above discussion, it should be appreciated that step 4312 which involves controlling the read out rate of the first and second image sensors as a function of the focal length of the first and second optical chains may also depend on the mode of operation selected by the operator of the camera, e.g., still or high speed motion. The selection of which mode may, and in some embodiments is, made automatically based on detected motion in one or more sequentially captured images or portions of images captured at different points in time. For example, if a motion of one or more objects is detected which is likely to cause artifacts due to the motion which are likely to reduce the image quality of a combined image more than reducing the overall pixel count of the image would, the joint read approach to reading out pixel rows is used.

In the case of video, the camera device may, and in some embodiments does, make updated decisions as to which mode of operation to operate in to produce composite images of the best quality. As the result of said decisions, the camera device may switch between modes of operation and the image capture synchronization technique used from one frame time to the next frame time. While this may result in different composite images corresponding to the same video sequence having different numbers of pixels, overall image quality is maximized.

While such dynamic switching is supported in some embodiments, in other embodiments once a synchronization technique and mode of operation is determined, the mode is maintained for the video sequence so that the number of pixel elements of the images in the video sequence will remain constant on a per composite image basis.

As should be appreciated in the case of synchronized readout of multiple image sensors where a third sensor captures an image portion of a scene area of interest which is located below (in terms of scan direction) the image portion captured by another image sensor, e.g., first image sensor, the readout of pixel values from the third image sensor will follow the read out of pixel values from the first image sensor.

Thus, in at least one embodiment, step 4304 includes step 4314 wherein a third image sensor of a third optical chain, e.g., optical chain 1218, is controlled to read out pixel values corresponding to a third portion of the scene of interest after a last row of pixel values is read out from the first image sensor. In some embodiments the third portion of said scene area of interest is positioned below (in the direction of scan) said first portion of said scene area of interest. In some such embodiments the first image sensor captures a first portion of the scene area of interest and the second image sensor captures a second portion of the scene area of interest which is larger than the first portion. In some such embodiments the second image sensor (corresponding to smaller focal length optical chain) captures substantially the same image area as the first and third image sensors combined but during a read-out time which is longer than the read out time of either of the first and third image sensors.

It should be appreciated that in such an embodiment while pixel values corresponding to the first image sensor may be read out during the time period during which pixel values are read out from the second image sensor, read out times of the first and third image sensors will not overlap.

However, in embodiments where the first and third image sensors are controlled to capture overlapping portions of the scene of interest, the read out of pixel rows corresponding to an overlapping scene portion may be read out at the same time from the first and third image sensors.

From step 4304 operation proceeds to step 4316 where the images read out from the image sensors which were controlled in step 4304 are stored in memory for subsequent processing. Operation then proceeds to step 4318. In step 4318 the images captured by the different optical chains in a synchronized manner, e.g., in step 4304, are combined to generate a composite image.

In the case of video, steps 4304, 4316 and 4318 will be performed for each frame time, e.g., with one composite image being generated for each frame time.

In some embodiments the operation proceeds from step 4318 to step 4320. In step 4320 the composite image generated in step 4318 is stored in memory, transmitted and/or displayed, e.g., on the display 102.

While in some embodiments the generation of the composite image occurs in the camera device 100 with the composite image then being displayed or transmitted, in other embodiments the composite image is generated by a processor, e.g., as part of a post capture processing process and/or video production processes. In such embodiments the generation of the composite image may be done on a computer system including memory, a processor and a display which is different from the memory, processor and display of the camera device 100 including the optical chains 130 used to capture the images of the scene area of interest.

In some exemplary embodiments an imaging device such as e.g., the camera device 100, is used to implement the method of flowchart 4300. In one such embodiment the plurality of optical chains 130 of the camera device 100 include optical chains arranged in the manner as illustrated in FIG. 12A with more detailed arrangements and elements of the optical chains further shown in FIG. 12B. In another embodiment the plurality of optical chains 130 of the camera device 100 include optical chains of the type and arrangement as illustrated in FIG. 17A.

In one embodiment the controller 150 (including the image sensor read out controller 289) is configured to control the plurality of optical chains to read out pixel values corresponding to a portion of said scene area of interest at the same time, the plurality of optical chains 130 including a first optical chain 1204 having a first focal length (f2) and a second optical chain 1234 having a second focal length (f1), the second focal length being different from the first focal length, different portions of said scene area of interest being read out at different times. In various embodiments the controller 150 is configured to implement synchronized rolling shutter read out of a first image sensor included in the first optical chain 1204 and a second image sensor included in the second optical chain 1234.

In some embodiments the controller 150 is configured to first read a top edge of the first image sensor of the first optical chain corresponding to a row of pixel values as part of implementing the rolling shutter read out of the first image sensor, the rolling shutter read out including sequential reading out of rows of pixel values beginning at the top edge of the first image sensor and proceeding to a bottom edge of the first image sensor. In various embodiments the controller 150 is further configured to first read a top edge of the second image sensor of the second optical chain corresponding to a row of pixel values as part of a rolling shutter read out of the second image sensor, the rolling shutter read out of the second image sensor including sequential reading out of rows of pixel values beginning at the top edge of the second image sensor and proceeding to a bottom edge of the second image sensor, the scan direction of the first and second image sensors (from top to bottom) being the same. While a top to bottom direction of scan of the image sensors is considered in the example discussed with regard to FIG. 43, however it should be appreciated that scanning from one edge of the image sensor to another in a different direction is possible as part of the rolling shutter read out of the image sensors.

In some embodiments, the first and second image sensors include the same number of rows of pixels. In some embodiments the controller 150 is configured to control the read out rate of the first and second image sensors as a function of the focal length of the first and second optical chains, as part of being configured to control a plurality of optical chains to read out pixel values corresponding to a portion of the scene area of interest at the same time.

In some embodiments the first focal length is larger than the second focal length. In some embodiments the controller 150 is further configured to control the first image sensor to read out a number of rows of pixels in the first image sensor in a period of time which is calculated as the ratio of the second focal length to the first focal length times the amount of time used to read out the same number of rows of pixels in the second image sensor. For example consider that the focal length of the second optical chain is FS2 and the focal length of the first optical chain is FS1, both first and second sensors corresponding to the first and second optical chains respectively, having N rows of pixel elements. If it takes time TS2 to read N rows out of sensor 2 then the controller 150 controls the read out of sensor 1 in a time period TS1=(FS2/FS1)× TS2.

In some embodiments the first focal length is twice the second focal length. In such embodiments the controller 150 is further configured to control the second image sensor to be fully read out over a time period which is twice as long as a first time period used to read out the first image sensor.

In various embodiments the first image sensor captures a first portion of the scene area of interest and the second image sensor captures a second portion of the scene area of interest which is larger than the first portion. In some such embodiments the controller 150 is further configured to control a third image sensor of a third optical chain, e.g., optical chain 1218, to read out pixel values corresponding to a third portion of the scene area of interest after a last row of pixel values is read out from the first image sensor, the third portion of the scene area of interest being positioned below the first portion of the scene area of interest. In some embodiments the second image sensor captures at least substantially the same image area as the first and third image sensors capture but during a readout time which is longer than an individual read out time of either of the first and third image sensors.

In various embodiments the images captured by the sensors as part of the sensor read out operations are stored in the device memory, e.g., memory 108. In some embodiments, one or more of these images are further processed as part of generating a composite image. In some embodiments the processor 110 is configured to generate a composite image by combining two or more captured images. In some embodiments the processor 110 is further configured to control storage of the generated composite image in the memory 108 and/or output of the composite image on the display 102 and/or transmission of the captured images or the composite image to another device via an interface such as interface 114.

It should be appreciated that various features and/or steps of method 4300 relate to improvements in cameras and/or image processing even though such devices may use general purpose processors and/or image sensors. While one or more steps of the method 4300, e.g., such as composite image generation step, have been discussed as being performed by a processor, e.g., processor 110, 211, it should be appreciated that one or more of the steps of the method 4300 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 4300 therein providing additional image processing efficiency, accuracy and/or operational capability to the imaging device, e.g., camera, implementing the method.

Figure 44:
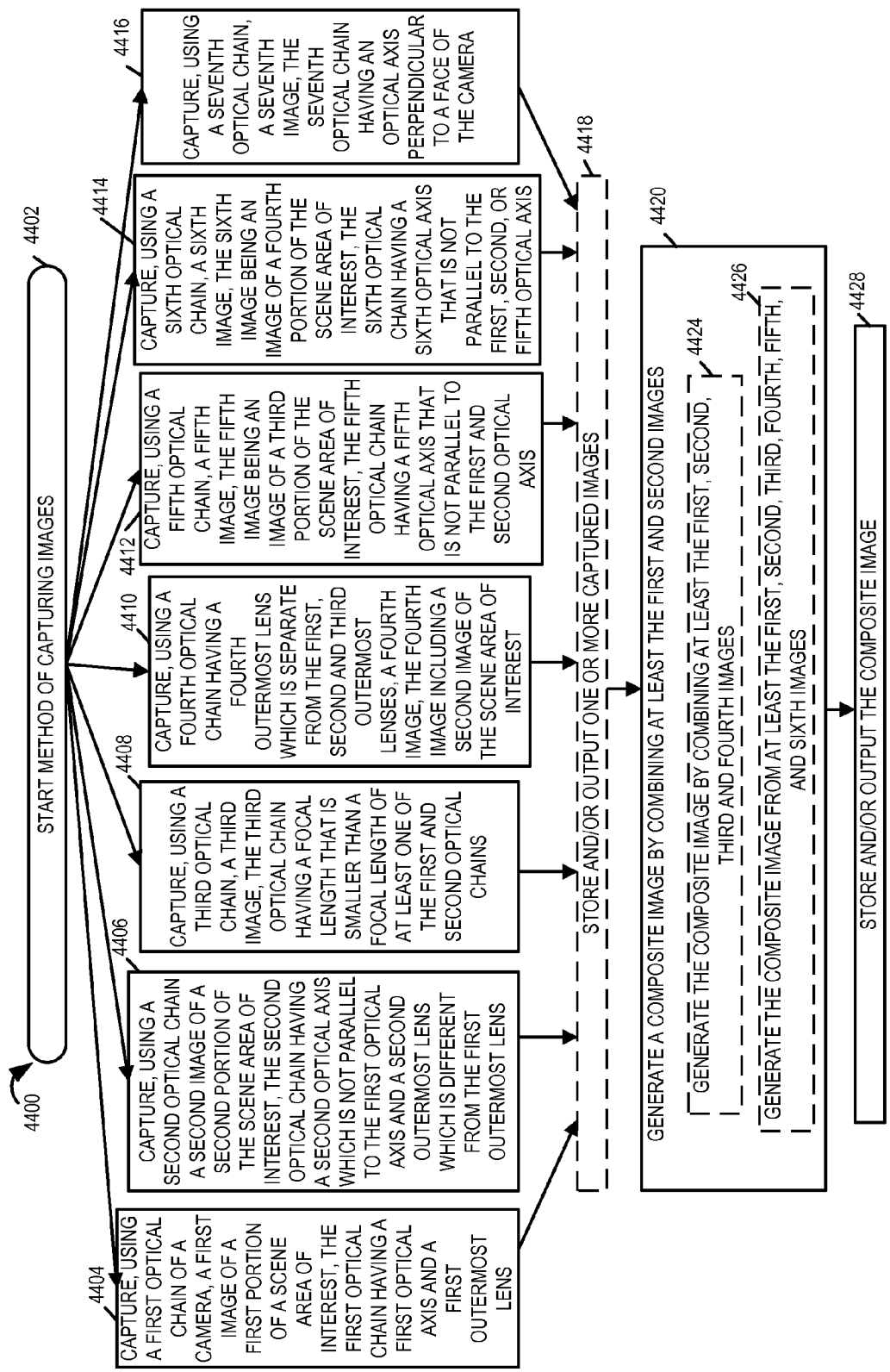
FIG. 44 shows the steps of a method of capturing images using a plurality of camera modules in a synchronized manner in accordance with an exemplary embodiment.

FIG. 44 shows a flowchart 4400 illustrating the steps of an exemplary method of capturing images using multiple optical chains in accordance with one exemplary embodiment. The method includes controlling an imaging device, e.g., such as that shown in FIGS. 1, 6, 8 and/or 14, to capture images in accordance with an exemplary embodiment. The camera device implementing the method of flowchart 4400 can and sometimes does include the same or similar elements as the camera device of FIGS. 1 and/or 4A.

The method of flowchart 4400 can be, and in some embodiments is, performed using a camera device such as the camera 100 of FIG. 1. In one such embodiment the plurality of optical chains 130 of the camera device 100 include optical chains, e.g., camera modules, arranged in the manner as illustrated in FIG. 12A with more detailed arrangements and elements of the optical chains further shown in FIG. 12B. In another embodiment the plurality of optical chains 130 of the camera device 100 include optical chains of the type and arrangement as illustrated in FIG. 17A. In such an embodiment the plurality of optical chains 130 include optical chains 1702 through 1734 discussed with regard to FIGS. 17A and 17B.

The exemplary method starts in step 4402, e.g., with a user initiating the capture of a scene area of interest which causes the camera device, e.g., camera device 100, to initiate image capture of the scene area of interest by one or more optical chains. For the purposes of discussion consider that the camera device includes a plurality of optical chains, and each of the optical chains can be independently operated and controlled.

Operation proceeds from step 4402 to steps 4404, 4406, 4408, 4410, 4412, 4414 and 4416 which involve image capture operations. The image capture operations may and in some embodiments are performed in a synchronized manner. In at least some synchronized embodiments the images captured by some by not necessarily all of the different optical chains correspond to the same or an overlapping time period. In other embodiments image capture is not synchronized but multiple one of the captured images are captured during the same or an overlapping time period. In still other embodiments as least some images are captured sequentially, e.g., in rapid succession. Sequential image capture may, and in some embodiments are used for capturing images corresponding to different portions of a scene area.

In step 4404 a first optical chain of the camera device is used to capture a first image of a first portion of a scene area of interest, the first optical chain having a first optical axis and a first outermost lens. In some embodiments the scene area of interest may be slightly smaller than the full image capture area. Operation proceeds from step 4404 to step 4418. Step 4418 is performed in some but not necessarily all embodiments. In some embodiments where step 4418 is skipped operation proceeds directly to step 4420.

In step 4406 a second image of a second portion of the scene area is captured using a second optical chain of the camera device, the second optical chain having a second optical axis which is not parallel to the first optical axis and a second outermost lens which is separate from the first outermost lens. Thus it should be appreciated that in various embodiments each optical chain has a physically disjoint and non-overlapping entrance pupil due to each optical chain having a different outer lens. In some embodiments the first and second optical axis are not perpendicular to the front face of the camera. In some embodiments the first and second optical chains have the same focal length. Operation proceeds from step 4406 to step 4418.

In step 4408 a third image including the scene area of interest, e.g., the entire scene area of interest, is captured using a third optical chain of the camera device having a third outermost lens which is separate from said first and second outermost lens. In some embodiments the third optical chain has a third optical axis which is not parallel to either of the first or the second optical axis. In some embodiments the focal length of the third optical chain is smaller than a focal length of at least one of the first and second optical chains. In some embodiments the focal length of the third optical chain is smaller than the focal length of the first optical chain. In some embodiments the focal length of the third optical chain is smaller than the focal length of the second optical chain. In some embodiments the focal length of the third optical chain is smaller than the focal length of the first and the second optical chains. In some embodiments the third optical axis is perpendicular to the front face of the camera device. In some embodiments the first optical chain captures the first image using a first sensor and the third optical chain captures the third image using a third sensor. Operation proceeds from step 4408 to step 4418.

In step 4410 a fourth image is captured using a fourth optical chain of the camera device having a having a fourth outermost lens which is separate from said first, second and third outermost lens, the fourth image including a second image of the scene area of interest. In some embodiments the third optical chain has a third optical axis, and the fourth optical chain has a fourth optical axis. In some embodiments the third and fourth optical axes are parallel to each other. In some embodiments the third and fourth optical axes are not parallel to the first or second optical axes. In some embodiments the third and fourth optical axis are perpendicular to the front face of the camera. In some embodiments the fourth optical chain has a focal length which is the same as the focal length of the third optical chain. Operation proceeds from step 4410 to step 4418.

In step 4412 a fifth image is captured using a fifth optical chain of the camera device having a fifth optical axis, the fifth image being an image of a third portion of the scene area of interest, the fifth optical axis not being parallel to the first and second optical axes. Thus the fifth optical chain captures a part, e.g., quarter or half, portion of the scene area of interest. Operation proceeds from step 4412 to step 4418.

In step 4414 a sixth image is captured using a sixth optical chain of the camera device having a sixth optical axis which is not parallel to the first, second, or fifth optical axis, the sixth image being an image of a fourth portion of the scene area of interest. Operation proceeds from step 4414 to step 4418. In some embodiments the first, second, fifth and sixth images each have a first number of pixel values.

In step 4416 a seventh image of a seventh scene area is captured using a seventh optical chain of the camera device having the same focal length as the first optical chain, the seventh optical chain having an optical axis perpendicular to the face of the camera. In some embodiments the seventh scene is at the center of the scene area of interest. Operation proceeds from step 4416 to step 4418.

Returning now to step 4418. In step 4418 one or more captured images, e.g., first, second, third, fourth, fifth, sixth and/or seventh images, are stored, e.g., in a device memory and/or output, e.g., to a display device and/or to an external device via an interface. In some embodiments the processor 110 controls storage of the one or more captured images in the memory 108 and/or outputting of the one or more captured images to the display 102. While step 4418 is performed in some embodiments, in some other embodiments step 4418 may be skipped. In such embodiments the operation proceeds from the previous step directly to step 4420.

In various embodiments the second, third, fifth, and sixth optical chains are arranged in such a manner that the images of the portion of the scene area of interest taken by these optical chains are from different spatially separated entrance pupils and thus have different perspectives. Combining such images with different perspectives introduces artifacts, e.g., parallax. To minimize and/or alleviate the effect of such artifacts from a composite image generated using the various images captured by these different optical chains, in some embodiments depth information is used which provides for parallax correction when combing the images to avoid distortions of the composite image due to the different perspectives.

Returning to step 4420. In step 4420 a composite image is generated by combining at least two of the captured images, e.g., the first and second images. In various embodiments the composite image is generated by, e.g., a processor such as processor 110 or 211, of the camera device implementing the steps of the method 4400. In some embodiments performing step 4420 includes performing one or more of steps 4424 and 4426. In some embodiments sub-steps 4424 and 4426 are different alternatives any one of which may be performed as part of implementing step 4420. In some embodiments step 4420 includes performing step 4424 where at least said first, second, third and fourth images are combined as part of generating the composite image. In such embodiments the processor 110 is configured to generate the composite image by combining at least the first, second, third and fourth images. In some embodiments the composite image is a composite image of the scene area of interest, the composite image having a larger number of pixel values than either of the first, second, third and fourth images individually have.

In some embodiments step 4420 includes performing step 4426 where the composite image is generated, e.g., by the processor 110, from at least said first, second, third, fourth, fifth, and sixth images, the composite image having a number of pixel values more than three times the first number of pixel values but less than six times the first number of pixel values. In some embodiments the composite image includes a number of pixel values which is less than the number of pixel values resulting from the sum of the number of pixel values combined to generate the composite image. In various embodiments the generated composite image is an image of the scene area of interest. In some embodiments the composite image is generated from the first, second, third, fourth, fifth, sixth images and seventh images.

In some embodiments the operations proceeds from step 4420 to step 4428. In step 4428 the generated composite image is stored, e.g., in a device memory and/or output, e.g., to a display device and/or to an external device via an interface. In some embodiments the storage of the composite image in the memory 108 and/or output, e.g., to a display device and/or to an external device via an interface is performed under the control of the processor 110.

It should be appreciated that various features and/or steps of method 4400 relate to improvements in cameras and/or image processing even though such devices may use general purpose processors and/or image sensors. While one or more steps of the method 4400, e.g., such as composite image generation step, have been discussed as being performed by a processor, e.g., processor 110, 211, it should be appreciated that one or more of the steps of the method 4400 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 4400 therein providing additional image processing efficiency, accuracy and/or operational capability to the imaging device, e.g., camera, implementing the method.

Figure 45:
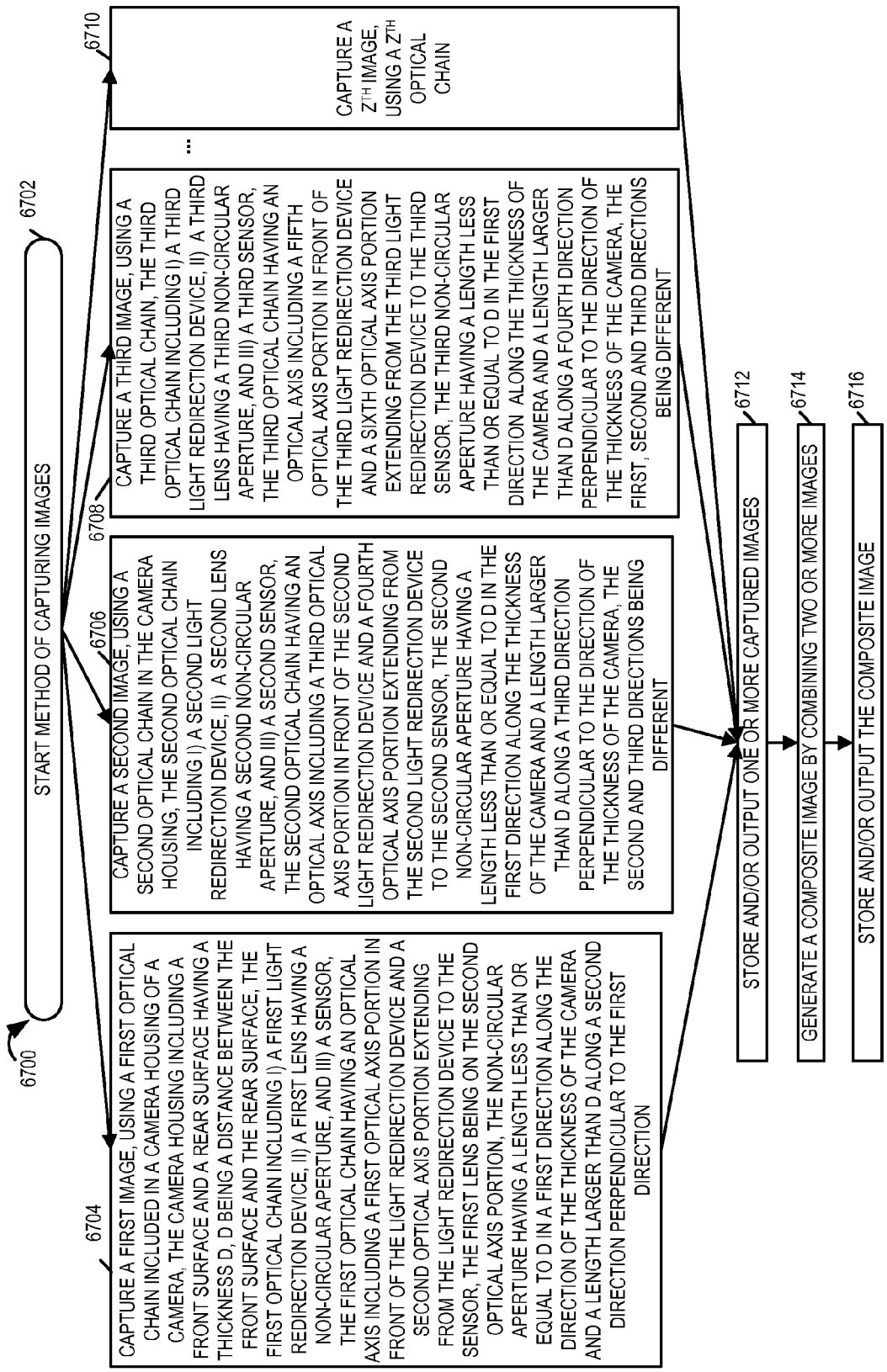
FIG. 45 is a flowchart illustrating a method of capturing images using a camera device in accordance with an exemplary embodiment.

FIG. 45 shows a flowchart 6700 illustrating the steps of an exemplary method of capturing images. The images may, and in some embodiments are captured using a plurality of optical chains included in a camera device including a camera housing with a front surface and a rear surface having a thickness D, D being a distance between the front surface and the rear surface. In one embodiment the method of flowchart 6700 can be implemented to capture images using a camera device such as, e.g., the camera device 1320 shown in FIG. 13B. The camera device includes a plurality of optical chains, and each of the optical chains can be independently operated and controlled. The camera device implementing the method of flowchart 6700 can and sometimes does include the same or similar elements as the camera device of FIGS. 1 and/or 4A. Thus it should be appreciated that the camera device implementing the method 6700 includes a processor, memory, interface(s) and other elements discussed with regard to FIGS. 1 and 4A.

The exemplary method starts in step 6702, e.g., with a user initiating the capture of a scene area of interest which causes the camera device, e.g., camera device 1320, to initiate image capture of the scene area of interest by one or more optical chains. Operation proceeds from step 6702 to steps 6704, 6706, 6708, and 6710 which involve image capture operations. The image capture operations may and in some embodiments are performed in a synchronized manner. In at least some synchronized embodiments the images captured by some by not necessarily all of the different optical chains correspond to the same or an overlapping time period. In other embodiments image capture is not synchronized but multiple one of the captured images are captured during the same or an overlapping time period. In still other embodiments as least some images are captured sequentially, e.g., in rapid succession. Sequential image capture may, and in some embodiments are used for capturing images corresponding to different portions of a scene area.

In step 6704 a first image is captured, using a first optical chain in the camera housing, the first optical chain including i) a first light redirection device, ii) a first lens having a non-circular aperture, and iii) a sensor, the first optical chain having an optical axis including a first optical axis portion in front of the light redirection device and a second optical axis portion extending from the light redirection device to the sensor, the first lens being on the second optical axis portion, the non-circular aperture having a length less than or equal to D in a first direction along the direction of the thickness of the camera and a length larger than D along a second direction perpendicular to the first direction. In some embodiments the first lens is the lens closest to the light redirection device on the second optical axis portion. The various elements and/or constructional features of the exemplary camera device that can be used to implement the method of flowchart 6700 can be appreciated from FIG. 13B that shows such features such as camera housing 1322, thickness 1323, front and rear surface 1321 and 1325. Operation proceeds from steps 6704 to step 6712.

In step 6706 a second image is captured, using a second optical chain in the camera housing, the second optical chain including i) a second light redirection device, ii) a second lens having a second non-circular aperture, and iii) a second sensor, the second optical chain having an optical axis including a third optical axis portion in front of the second light redirection device and a fourth optical axis portion extending from the second light redirection device to the second sensor, the second non-circular aperture having a length less than or equal to D in the first direction along the thickness of the camera and a length larger than D along a third direction perpendicular to the direction of the thickness of the camera, the second and third directions being different. In some embodiments the second and third directions are at an angle of 90 degrees with respect to each other. Operation proceeds from steps 6706 to step 6712.

In step 6708 a third image is captured using a third optical chain, the third optical chain including i) a third light redirection device, ii) a third lens having a third non-circular aperture, and iii) a third sensor, the third optical chain having an optical axis including a fifth optical axis portion in front of the third light redirection device and a sixth optical axis portion extending from the third light redirection device to the third sensor, the third non-circular aperture having a length less than or equal to D in the first direction along the thickness of the camera and a length larger than D along a fourth direction perpendicular to the direction of the thickness of the camera, the first, second and third directions being different. In some embodiments the second and third directions are at an angle of 90 degrees with respect to each other and the second and fourth direction area at an angle with respect to each other between 30 degrees and 60 degrees. Operation proceeds from steps 6708 to step 6712.

Similarly one or more additional optical chains in the camera device can be used to capture additional images in some embodiments as indicated in the figure. In some such embodiments where additional optical chains are used to capture additional images step 6710 is performed. In step 6710 a $Z^{th}$ image is captured using a $Z^{th}$ optical chain, the $Z^{th}$ optical chain including i) a $Z^{th}$ light redirection device, ii) a $Z^{th}$ lens having a non-circular aperture, and iii) a $Z^{th}$ sensor, the $Z^{th}$ optical chain having an optical axis including an optical axis portion in front of the $Z^{th}$ light redirection device and another optical axis portion extending from the $Z^{th}$ light redirection device to the sensor, the non-circular aperture having a length less than or equal to D in the first direction along the thickness of the camera and a length larger than D along a direction perpendicular to the direction of the thickness of the camera. Operation proceeds from steps 6710 to step 6712. In some embodiments the various images captured by the plurality of optical chains as discussed above are captured in the same time period.

Returning now to step 6712. In step 6712 one or more captured images, e.g., first, second, third etc., are stored, e.g., in a device memory for further processing in accordance with the features of the invention and/or output, e.g., to a display device and/or to an external device via an interface. Operation proceeds from step 6712 to step 6714. In step 6714 a composite image is generated by combining at least two or more of the captured images. In various embodiments the composite image is generated by, e.g., a processor such as processor 110 or 211, of the camera device implementing the steps of the method 6700. In various embodiments the generated composite image is an image of a scene area of interest. In some embodiments, at least some of the plurality of optical chains capture portions of the scene area of interest, which may then be combined in accordance with the methods of the invention to generate a composite image. Step 6714 is performed in some but not necessarily all embodiments.

Operation proceeds from steps 6714 to step 6716. In step 6716 the generated composite image is stored, e.g., in a device memory and/or output, e.g., to a display device and/or to an external device via an interface.

It should be appreciated that various features and/or steps of method 6700 relate to improvements in cameras and/or image processing even though such devices may use general purpose processors and/or image sensors. While one or more steps of the method 6700, e.g., such as composite image generation step, have been discussed as being performed by a processor, e.g., processor 110, 211, it should be appreciated that one or more of the steps of the method 6700 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 6700 therein providing additional image processing efficiency, accuracy and/or operational capability to the imaging device, e.g., camera, implementing the method.

Figure 46:
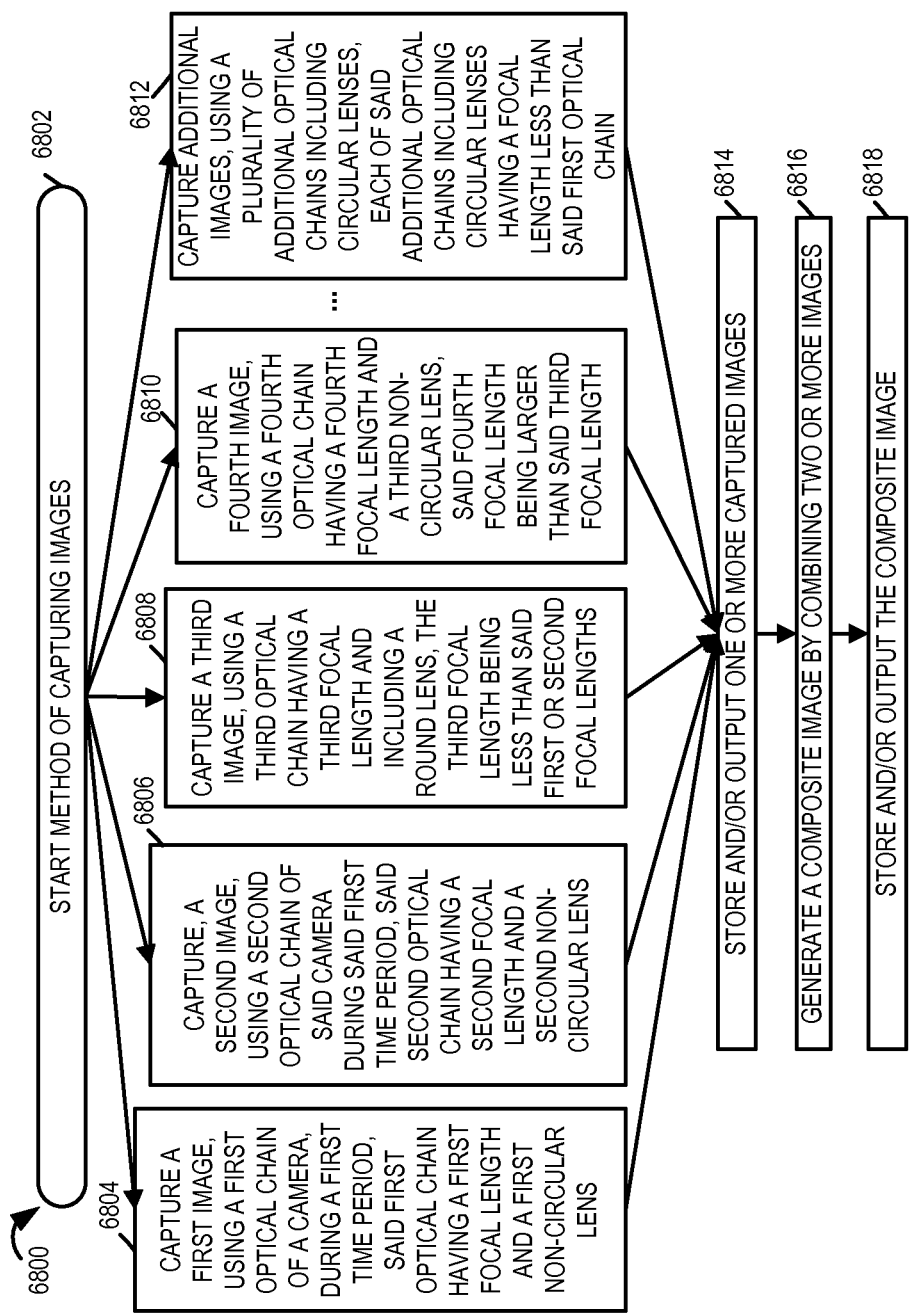
FIG. 46 is a flowchart illustrating a method of capturing images in accordance with an exemplary embodiment.

FIG. 46 is a flowchart 6800 illustrating the steps of an exemplary method of capturing images. The images may, and in some embodiments are, captured using a camera device including a plurality of optical chains. In one embodiment the method of flowchart 6800 can be implemented to capture images using a camera device such as, e.g., the camera device 1400 shown in FIG. 14. The camera device includes a plurality of optical chains, and each of the optical chains can be independently operated and controlled. The camera device implementing the method of flowchart 6800 can and sometimes does include the same or similar elements as the camera device of FIGS. 1 and/or 4A. The various elements and/or features of the exemplary camera device that can be used to implement the method of flowchart 6800 can be appreciated from FIGS. 14-17 that shows such features such as the optical chains with non-circular aperture lenses, optical chains with round lenses, camera thickness etc.

The exemplary method starts in step 6802, e.g., with a user initiating the capture of a scene area of interest which causes the camera device, e.g., camera device 1400, to initiate image capture of the scene area of interest by one or more optical chains. Operation proceeds from step 6802 to steps 6804, 6806, 6808, 6810, and 6812 which involve image capture operations. The image capture operations may and in some embodiments are performed in a synchronized manner. In at least some synchronized embodiments the images captured by some by not necessarily all of the different optical chains correspond to the same or an overlapping time period. In other embodiments image capture is not synchronized but multiple one of the captured images are captured during the same or an overlapping time period. In still other embodiments as least some images are captured sequentially, e.g., in rapid succession. Sequential image capture may, and in some embodiments are used for capturing images corresponding to different portions of a scene area.

In step 6804 a first image is captured, using a first optical chain of the camera, during a first time period, the first optical chain having a first focal length and a first non-circular lens. Operation proceeds from steps 6804 to step 6814.

In step 6806 a second image is captured, using a second optical chain of the camera during the first time period, the second optical chain having a second focal length and a second non-circular lens. In some embodiments the first and second focal lengths are the same. In some embodiments the first and second focal lengths are different. In some embodiments the first non-circular lens is longer in a first direction than in a second direction which is perpendicular to the first direction and the second non-circular lens is longer in a third direction than in a fourth direction, the fourth direction being perpendicular to the third direction, the first and third directions being different. In some embodiments the first optical chain includes a first sensor and the second optical chain includes a second sensor. Operation proceeds from steps 6806 to step 6814.

In step 6808 a third image is captured, using a third optical chain having a third focal length and including a round lens, the third focal length being less than the first or second focal lengths. In some embodiments the second and fourth directions are the same and correspond to the depth (thickness) of the camera. Operation proceeds from steps 6808 to step 6814.

In step 6810 a fourth image is captured using a fourth optical chain having a fourth focal length and a third non-circular lens, the fourth focal length being larger than the third focal length. In some embodiments the third non-circular lens is longer in a fifth direction than in a sixth direction, the sixth direction being perpendicular to the fifth direction, the first, third, and fifth directions being different by at least 20 degrees. Operation proceeds from steps 6810 to step 6814.

Similarly one or more additional optical chains in the camera device can be, and in some embodiments are, used to capture additional images. In one embodiment additional images are captured using optical having including circular lenses as indicated in step 6812. In step 6812 additional images are captured, using a plurality of additional optical chains including circular lenses, each of the additional optical chains including circular lenses having a focal length less than the first optical chain. In some embodiments the various images captured by the plurality of optical chains as discussed above are captured in the same time period. Operation proceeds from steps 6812 to step 6814.

Returning now to step 6814. In step 6814 one or more captured images, e.g., first, second, third etc., are stored, e.g., in a device memory for further processing in accordance with the features of the invention and/or output, e.g., to a display device and/or to an external device via an interface. Operation proceeds from step 6814 to step 6816 which is performed in some but not necessarily all embodiments. In step 6816 a composite image is generated by combining at least two or more of the captured images, e.g., by combining at least the first and second images. In various embodiments the composite image is generated by, e.g., a processor such as processor 110 or 211, of the camera device 1400 implementing the steps of the method 6800. In various embodiments the generated composite image is an image of a scene area of interest. In some embodiments, at least some of the plurality of optical chains capture portions of the scene area of interest, which may then be combined in accordance with the methods of the invention to generate a composite image.

Operation proceeds from steps 6816 to step 6818. In step 6818 the generated composite image is stored, e.g., in a device memory and/or output, e.g., to a display device and/or to an external device via an interface.

It should be appreciated that various features and/or steps of method 6800 relate to improvements in cameras and/or image processing even though such devices may use general purpose processors and/or image sensors. While one or more steps of the method 6800, e.g., such as composite image generation step, have been discussed as being performed by a processor, e.g., processor 110, 211, it should be appreciated that one or more of the steps of the method 6800 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 6800 therein providing additional image processing efficiency, accuracy and/or operational capability to the imaging device, e.g., camera, implementing the method.

Figure 47:
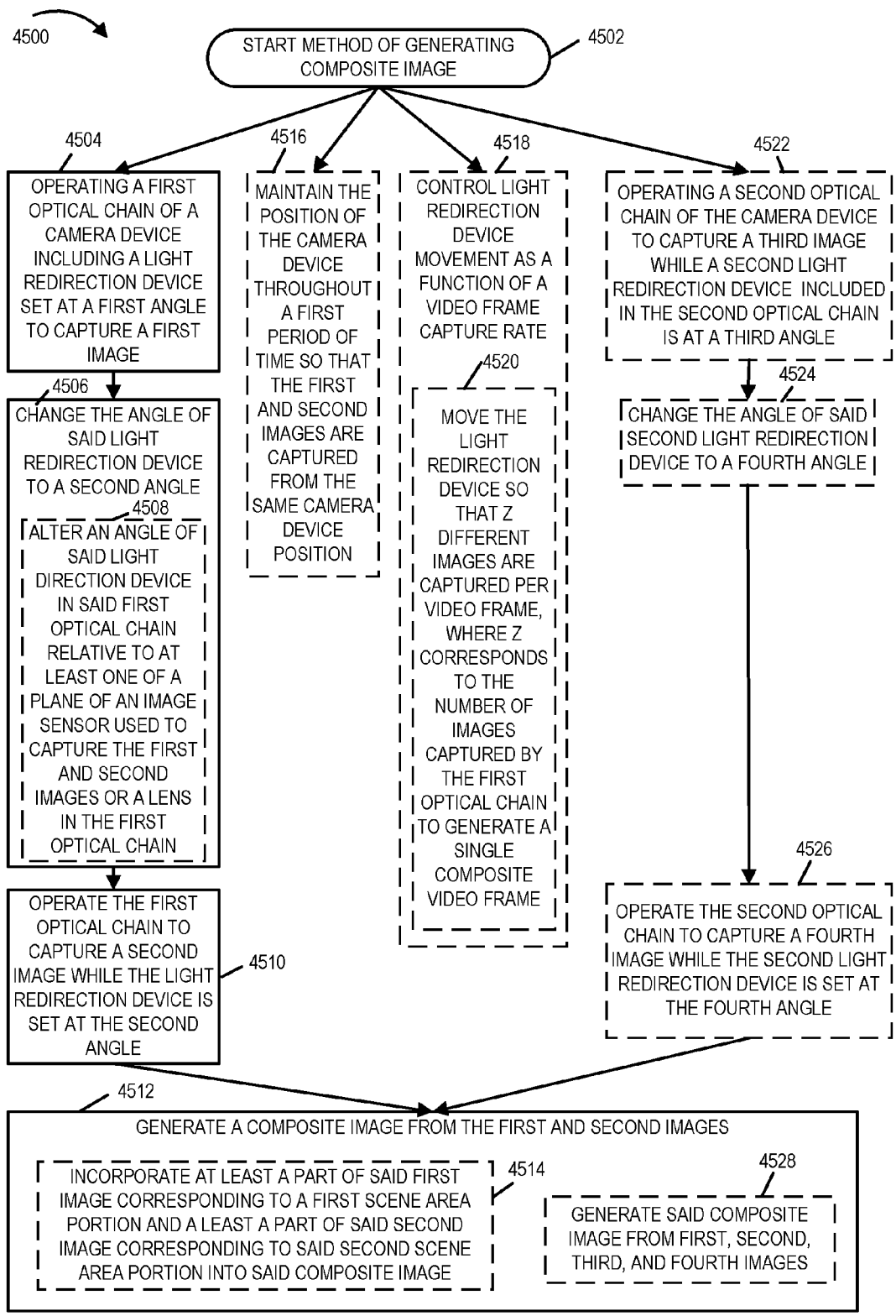
FIG. 47 is a flowchart of a method of generating a composite image in accordance with an exemplary embodiment.

FIG. 47 is a flowchart 4500 of an exemplary method of generating a composite image in accordance with various exemplary embodiments. The operation of flowchart 4500 may be performed by a camera device or a camera device in combination with an image processing device. In some embodiments, the camera device is included is a camera. In some embodiments, the camera device is included in a wireless communications device, e.g., a smart phone. In some embodiments, the image processing device is a personal computer.

Operation of the exemplary method starts in step 4502, in which initialization is performed, and proceeds to step 4504. In some embodiments, operation also proceeds from step 4502 to one or more or all of optional steps 4516, 4518 and 4522.

In step 4504 a first optical chain of a camera device including a light redirection device set at first angle is operated to capture a first image. Operation proceeds from step 4504 to step 4506, in which the angle of said light redirection device is changed to a second angle. Operation proceeds from step 4506 to step 4510. In step 4510, the first optical chain is operated to capture a second image while the light redirection device is set at the second angle. Operation proceeds from step 4510 to step 4512.

In step 4512 a composite image is generated from the first and second images.

In some embodiments, the light redirection device is a mirror, e.g., a substantially plane mirror. A substantially plane mirror includes a plane mirror which is used in some embodiments as well as mirrors which may have a slight curvature, e.g., mirrors with a curvature of in the range of 0 to 3 degrees in some embodiments but other ranges are also possible. In some such embodiments, the substantially plane mirror is a plane mirror. In various embodiments, the light redirection device is a prism. In some embodiments, step 4506 includes step 4508 in which an angle of the light redirection device is changed relative to at least one of a plane of an image sensor used to capture the first and second images or a lens in the first optical chain.

In some embodiments, the first and second images are captured during a first period of time, and step 4516 is performed. In step 4516 the position of the camera device is maintained through the first period of time so that the first and second images are captured from the same camera device position. In some such embodiments, the first and second images correspond to the first and second portions of a scene area of interest, respectively, said first and second portions being at least partially non-overlapping.

In some embodiments, the first image includes a first scene area portion, and the second image includes a second scene area portion, and the first and second scene area portions are non-overlapping. In some embodiments, step 4512 includes step 4514. In step 4514 at least part of said first image corresponding to a first scene area portion and at least part of said second image corresponding to said second scene area portion are incorporated into said composite image.

Thus, in this exemplary embodiment, the composite image is generated at least from the non-overlapping image portions; the scene area to which the composite image corresponds is not a subset of image area of a single one of the first and second images. In some embodiments, the first and second images may also include overlapping scene area portions.

In some embodiments, step 4518 is performed in which light redirection device movement is controlled as a function of video frame capture rate. In some such embodiments, step 4518 includes step 4520. In step 4520 the light redirection device is moved so the z different images are captured per video frame, where z corresponds to the number of images captured by the first optical chain to generate a single composite video frame.

In some embodiments, the camera includes at least two optical chains and steps 4522, 4524, and 4526 are performed. In step 4522 a second optical chain of the camera device is operated to capture a third image, while a second light redirection device, e.g., a mirror or a prism, in the second optical chain is at third angle. Operation proceeds from step 4522 to step 4524. In step 4524 the angle of the second light redirection device is set to a fourth angle. Operation proceeds from step 4524 to step 4526. In step 4526 the second optical chain is operated to capture a fourth image while the second light redirection device is set at the fourth angle.

In some embodiments, the first and third images correspond to a first capture time and the second and fourth images correspond to a second capture time. In some such embodiments, the camera is maintained in the same position for the first and second capture times.

Operation proceeds from step 4526 to step 4512. In some embodiments, step 4512 includes step 4528 in which the composite image is generated from first, second, third, and fourth images.

Figure 48A:
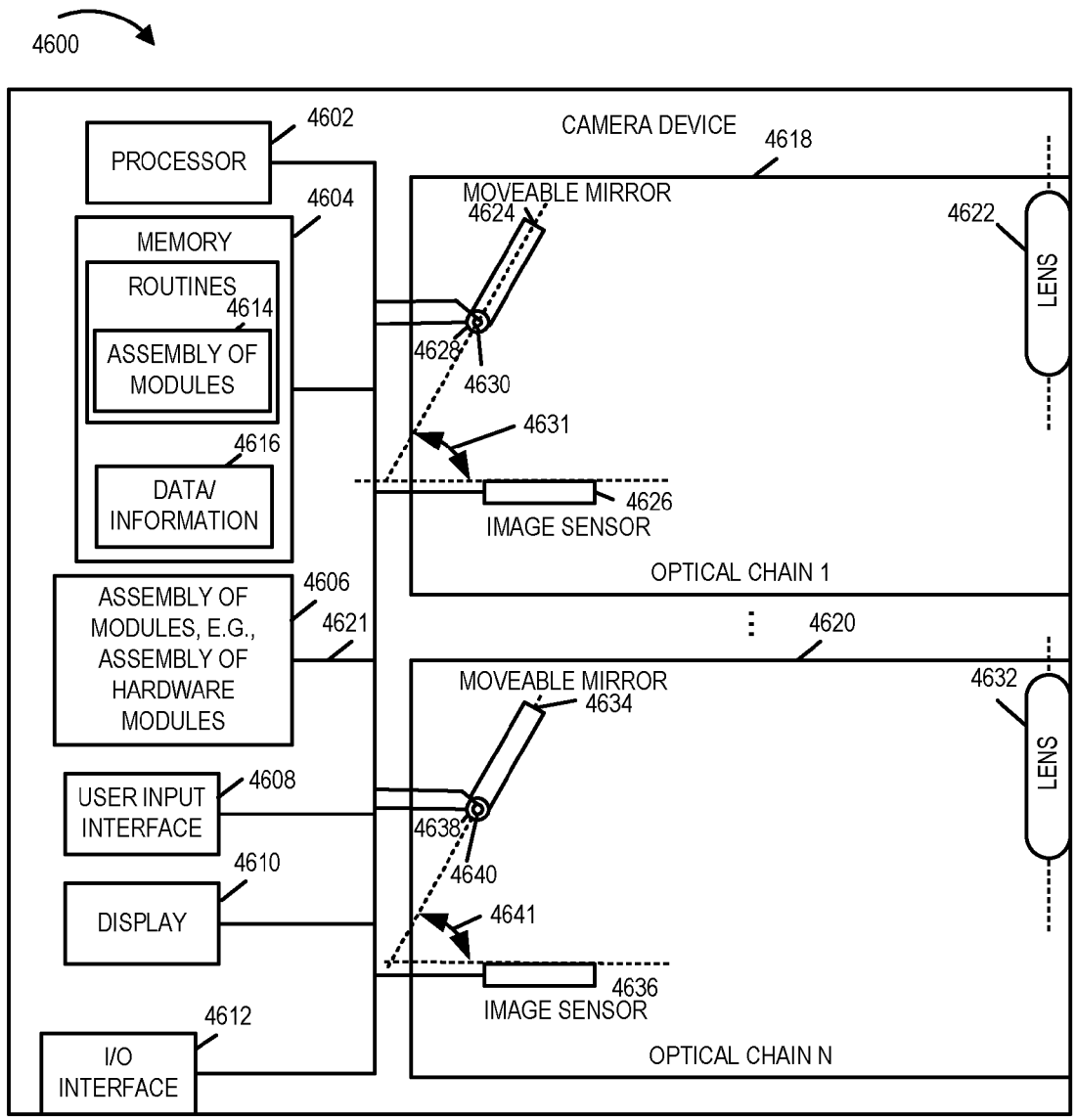
FIG. 48A is a drawing of an exemplary camera device including moveable mirrors in accordance with an exemplary embodiment.

FIG. 48A is a drawing of an exemplary camera device 4600 in accordance with an exemplary embodiment. Camera device 4600 includes a processor 4602, e.g., a CPU, memory 4604, an assembly of modules 4606, e.g., an assembly of hardware modules such as circuits, a user input interface 4608, a display 4610, an I/O interface 4612, and a plurality of optical chains (optical chain 1 4618, . . . , optical chain N 4620) coupled together via a bus 4621 over which the various elements may interchange data and information. Display 4610, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera device 4600. User input interface 4608 includes, e.g., switches, buttons, touch screen interface, etc., for receiving input from the user. I/O interface 4612 includes a plurality of communications ports for communicating with other devices, e.g., a personal computer. I/O interface 4612 in some embodiments, includes one or more wireless communications interfaces. Information communicated over I/O interface 4612 includes, e.g., a combined images generated from captured images from multiple optical chains, and/or captured images from individual optical chains to be processed and/or combined externally, e.g., in a personal computer.

Memory 4604 includes assembly of modules 4614 and data/information 4616.

Optical chain 1 4618 includes a lens 4622, e.g., an outer lens, a moveable mirror 4624, e.g., a moveable substantially plane mirror, and an image sensor 4626. In some embodiments, the substantially plane mirror is a plane mirror. In various embodiments, the plane mirror has a flat light reflective surface. In some embodiments, the substantially plane mirror has a curvature in the range of 0 to 5 degrees. In various embodiments, the moveable mirror 4624 includes a hinge mount. Optical chain 1 4618 further includes a mirror movement module 4628, e.g., a drive motor and corresponding drive circuitry, and a mirror position detection module 4630, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 4626 is used to capture first and second images. Light passes through lens 4622 before reaching mirror 4624. Mirror 4624, which is a light redirection device, directs the light which has passed through lens 4622 onto the image sensor 4626.

Optical chain N 4620 includes a lens 4632, e.g., an outer lens, a moveable mirror 4634, e.g., a moveable substantially plane mirror, and an image sensor 4636. In some embodiments, the moveable substantially plane mirror is a plane mirror. In various embodiments, the moveable mirror 4634 includes a hinge mount. Optical chain N 4620 further includes a mirror movement module 4638, e.g., a drive motor and corresponding drive circuitry, and a mirror position detection module 4640, e.g., a angular position sensing device such as a resolver or synchro or an optical rotary encoder or a magnetic rotary encoder, and, in some embodiments, circuitry to convert the sensor measurement into a digital value. One or more of the optical chain modules (4618, . . . , 4620) in some embodiments, include one or more additional elements, e.g., an additional lens, an additional mirror, a prism, a filter, etc.

Figure 48B:
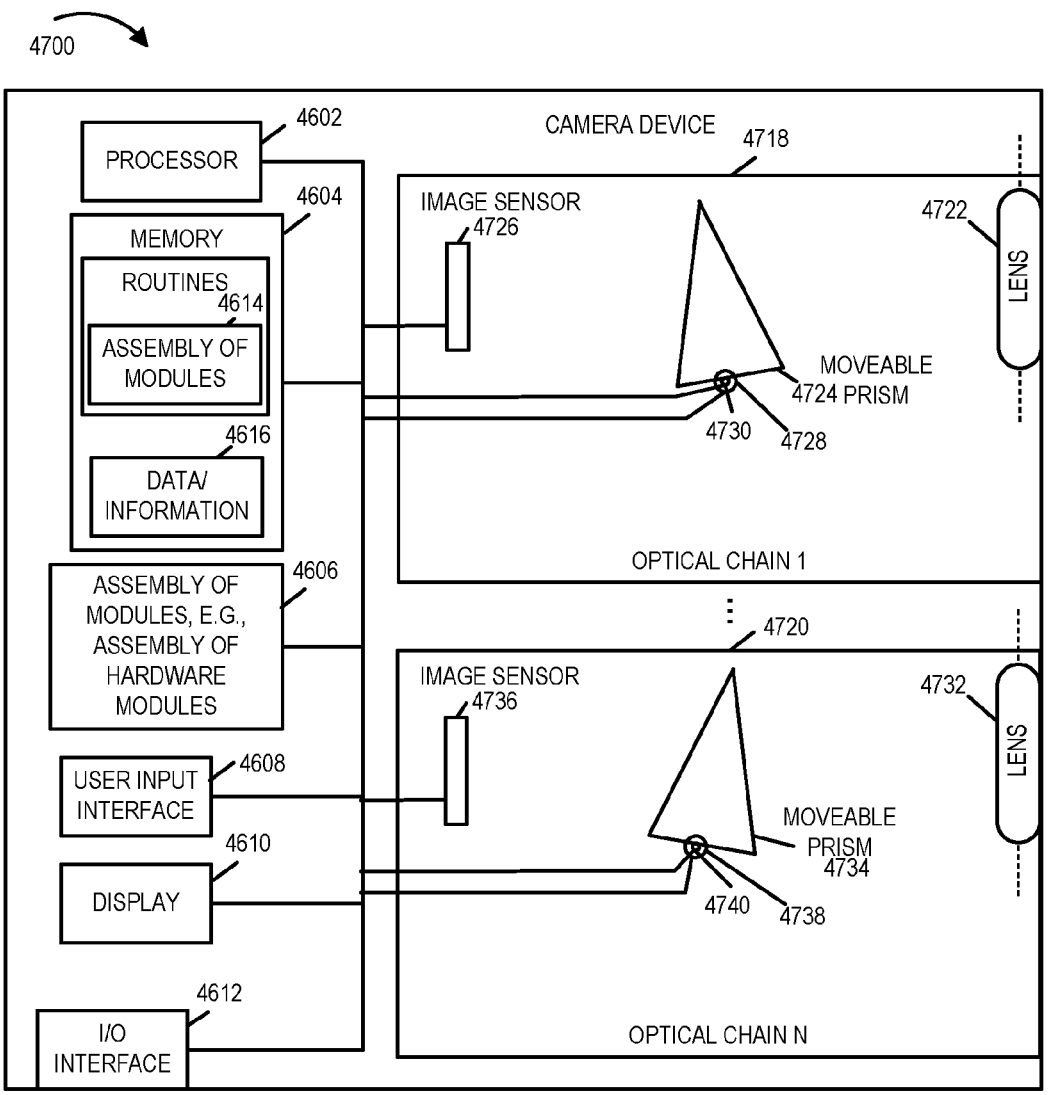
FIG. 48B is a drawing of an exemplary camera device including moveable prisms in accordance with an exemplary embodiment.

FIG. 48B is a drawing of an exemplary camera device 4700 in accordance with an exemplary embodiment. Camera device 4700 includes a processor 4602, e.g., a CPU, memory 4604, an assembly of modules 4606, e.g., an assembly of hardware modules such as circuits, a user input interface 4608, a display 4610, an I/O interface 4612, and a plurality of optical chains (optical chain 1 4718, . . . , optical chain N 4720) coupled together via a bus 4621 over which the various elements may interchange data and information. Display 4610, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera device 4700. User input interface 4608 includes, e.g., switches, buttons, touch screen interface, etc. for receiving input from the user. I/O interface 4612 includes a plurality of communications ports for communicating with other devices, e.g., a personal computer. I/O interface 4612 in some embodiments, includes one or more wireless communications interfaces. Information communicated over I/O interface 4612 includes, e.g., a combined images generated from captured images from multiple optical chains, and/or captured images from individual optical chains to be processed and/or combined externally, e.g., in a personal computer.

Memory 4604 includes assembly of modules 4614 and data/information 4616.

Optical chain 1 4718 includes a lens 4722, e.g., an outer lens, a prism 4724, and an image sensor 4726. In various embodiments, the prism 4724 includes a hinge mount. Optical chain 1 4718 further includes a prism movement module 4728, e.g., a drive motor and corresponding drive circuitry, and a prism position detection module 4730, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 4726 is used to capture first and second images. Light passes through lens 4722 before reaching prism 4724. Prism 4724, which is a light redirection device, directs the light which has passed through lens 4722 onto the image sensor 4726.

Optical chain N 4720 includes a lens 4732, e.g., an outer lens, a moveable prism 4734, and an image sensor 4736. In various embodiments, the moveable prism 4734 includes a hinge mount. Optical chain N 4720 further includes a prism movement module 4738, e.g., a drive motor and corresponding drive circuitry, and a prism position detection module 4740, e.g., a angular position sensing device such as a resolver or synchro or an optical rotary encoder or a magnetic rotary encoder, and, in some embodiments, circuitry to convert the sensor measurement into a digital value. One or more of the optical chain modules (4718, . . . , 4720) in some embodiments, include one or more additional elements, e.g., an additional lens, an additional prism, a mirror, a filter, etc.

FIG. 48 is a drawing of an assembly of modules 4800, which may be included in a camera device implemented in accordance with the present invention, e.g., camera 4600 of FIG. 46 or camera 4700 of FIG. 47. Assembly of modules 4800 may implement steps of a method, e.g., steps of the method of flowchart 4500 of FIG. 45. In some embodiments, assembly of modules 4800 is an assembly of circuits, which may be coupled together. In one exemplary embodiment, assembly of modules 4800 is assembly of modules 4606 of camera 4600 of FIG. 46 or camera 4700 of FIG. 47. In some embodiments, the assembly of module 4800 is an assembly of software modules. In one exemplary embodiment, assembly of modules 4800 is assembly of modules 4614 of memory 4604 of camera 4600 of FIG. 46 or camera 4700 of FIG. 47.

Figure 48C:
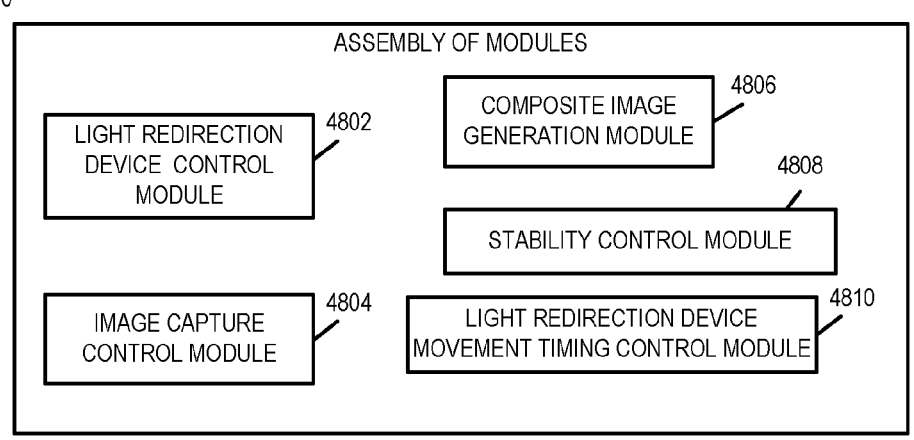
FIG. 48C is a drawing of an exemplary assembly of modules, which may be included in an exemplary camera device in accordance with an exemplary embodiment.

FIG. 48C illustrates an assembly of modules 4800 which can, and in some embodiments is, used in the camera device 4600 illustrated in FIG. 48A or camera device 4700 of FIG. 48B. The modules in the assembly of modules 4800 can, and in some embodiments are, implemented fully in hardware within the processor 4602, e.g., as individual circuits. The modules in the assembly of modules 4800 can, and in some embodiments are, implemented fully in hardware within the assembly of modules 4606, e.g., as individual circuits corresponding to the different modules. In other embodiments some of the modules are implemented, e.g., as circuits, within the processor 4602 with other modules being implemented, e.g., as circuits within assembly of modules 4606, external to and coupled to the processor. As should be appreciated the level of integration of modules on the processor and/or with some modules being external to the processor may be one of design choice.

Alternatively, rather than being implemented as circuits, all or some of the modules in assembly of modules 4800 may be implemented in software and stored in the memory 4604 of the camera device 4600 or camera device 4700, with the modules controlling operation of camera device 4600 or camera device 4700 to implement the functions corresponding to the modules when the modules are executed by a processor, e.g., processor 4602. In some such embodiments, the assembly of modules 4800 is included in the memory 4604 as assembly of modules 4614. In still other embodiments, various modules in assembly of modules 4800 are implemented as a combination of hardware and software, e.g., with another circuit external to the processor providing input to the processor 4602 which then under software control operates to perform a portion of a module's function. While shown in the FIG. 48A and FIG. 48B embodiments as a single processor, e.g., computer, it should be appreciated that the processor 4602 may be implemented as one or more processors, e.g., computers.

When implemented in software the modules include code, which when executed by the processor 4602, configure the processor 4602 to implement the function corresponding to the module. In embodiments where the assembly of modules 4800 is stored in the memory 4604, the memory 4604 is a computer program product comprising a computer readable medium comprising code, e.g., individual code for each module, for causing at least one computer, e.g., processor 4602, to implement the functions to which the modules correspond Completely hardware based or completely software based modules may be used. However, it should be appreciated that any combination of software and hardware, e.g., circuit implemented modules may be used to implement the functions. As should be appreciated, the modules illustrated in FIG. 48C control and/or configure the camera device 4600 or camera device 4700 or elements therein such as the processor 4602, to perform functions of the corresponding steps illustrated in the method flowchart 4500 of FIG. 47. Thus the assembly of modules 4800 includes various modules that perform functions of the corresponding steps of the method shown in FIG. 47.

FIG. 48C is an assembly of modules 4800 in accordance with an exemplary embodiment. Assembly of modules 4800 includes a light redirection device control module 4802, an image capture control module 4804, a composite image generation module 4806, a stability control module 4808 and a light redirection device movement timing control module 4810.

Light redirection setting control module 4802, e.g., a mirror redirection setting control module or prism redirection setting control module, is configured to determine at least one light redirection device angle position to be used by the first optical, e.g., optical chain 1 4618 or optical chain 1 4718. Image capture control module 4804 is configured to operate the first optical chain to capture a first image while the first light redirection device, e.g., mirror 4624 or prism 4724, is set, under the direction of the light redirection device control module 4802, at a first angle and to capture a second image while the first light redirection device is set, under the direction of the light redirection device control module 4802 at a second angle. Composite image generation module 4806 is configured to generate a composite image from the first and second images. In some embodiments, the light redirection device is a mirror, e.g., mirror 4624, which is a plane mirror or a substantially plane mirror. In some embodiments, the light redirection device is a prism, e.g., prism 4724.

Light redirection device control module 4802 is further configured to control the angle of the light redirection device, e.g., mirror 4624 or prism 4724, to change when the determined light redirection device angle is different from a current light redirection device angle. In some embodiments, the light redirection device is a mirror, e.g., mirror 4624, is a substantially plane mirror, and the change involves altering an angle of the mirror relative to at least one of a plane of the image sensor, e.g., sensor 4626, or a lens, e.g., lens 4622, included in the first optical chain.

In various embodiments, the first and second images, e.g., from the first optical chain, optical chain 1 4618 or optical chain 1 4718, are captured during a first period of time, and stability control module 4808 is configured to maintain image stability throughout the first period of time, e.g., so that the first and second images are captured from the same camera position. In some embodiments, the first and second images correspond to first and second portions of a scene of interest, respectively, and said first and second portions are at least partially non-overlapping.

In some embodiments, the first image includes a first scene area portion, and the second image includes a second scene area portion, and the first and second scene portions are non-overlapping. In various embodiments, the first and second images may also include overlapping scene area portions. In some such embodiments, composite image generation module 4806 is configured to generate a composite image from the first and second images by incorporating at least a part of said first image corresponding to said first scene area portion and a part of said second image corresponding to said second scene area portion into said composite image. Thus in various embodiments, the composite image is generated at least from the non-overlapping portions.

Light redirection device movement timing control module 4810 is configured to control light redirection device movement as a function of video frame capture rate. In some such embodiments, the light redirection device movement timing control module 4810 controls light redirection device movement as a function of the video capture rate to move the light redirection device so that z different images are captured per video frame, where z corresponds to the number of images captured by the first optical chain to generate a single composite image.

In various embodiments, the camera device including assembly of modules 4800 includes a second optical chain, e.g., optical chain N 4620 or optical chain N 4720, including a second light redirection device, e.g., moveable mirror 4634 or moveable prism 4734, which can be set at different angles, and light redirection device control module 4802 is further configured to determine a third angle at which the second light redirection device is to be positioned. In some such embodiments, the image capture control module 4804 is further configured to control the second optical chain, e.g., module 4620 or module 4720, to capture a third image while the second light redirection device is set at a third angle, and capture a fourth image while the second light redirection device is set at a fourth angle. In some such embodiments, the composite image generation module 4806 is further configured to generate the composite image from the third and fourth images, in addition to the first and second images. In some embodiments, the first and third images correspond to a first capture time and the second and fourth images correspond to a second capture time. In various embodiments, the camera device is maintained in the same position for the first and second capture times.

Figure 49:
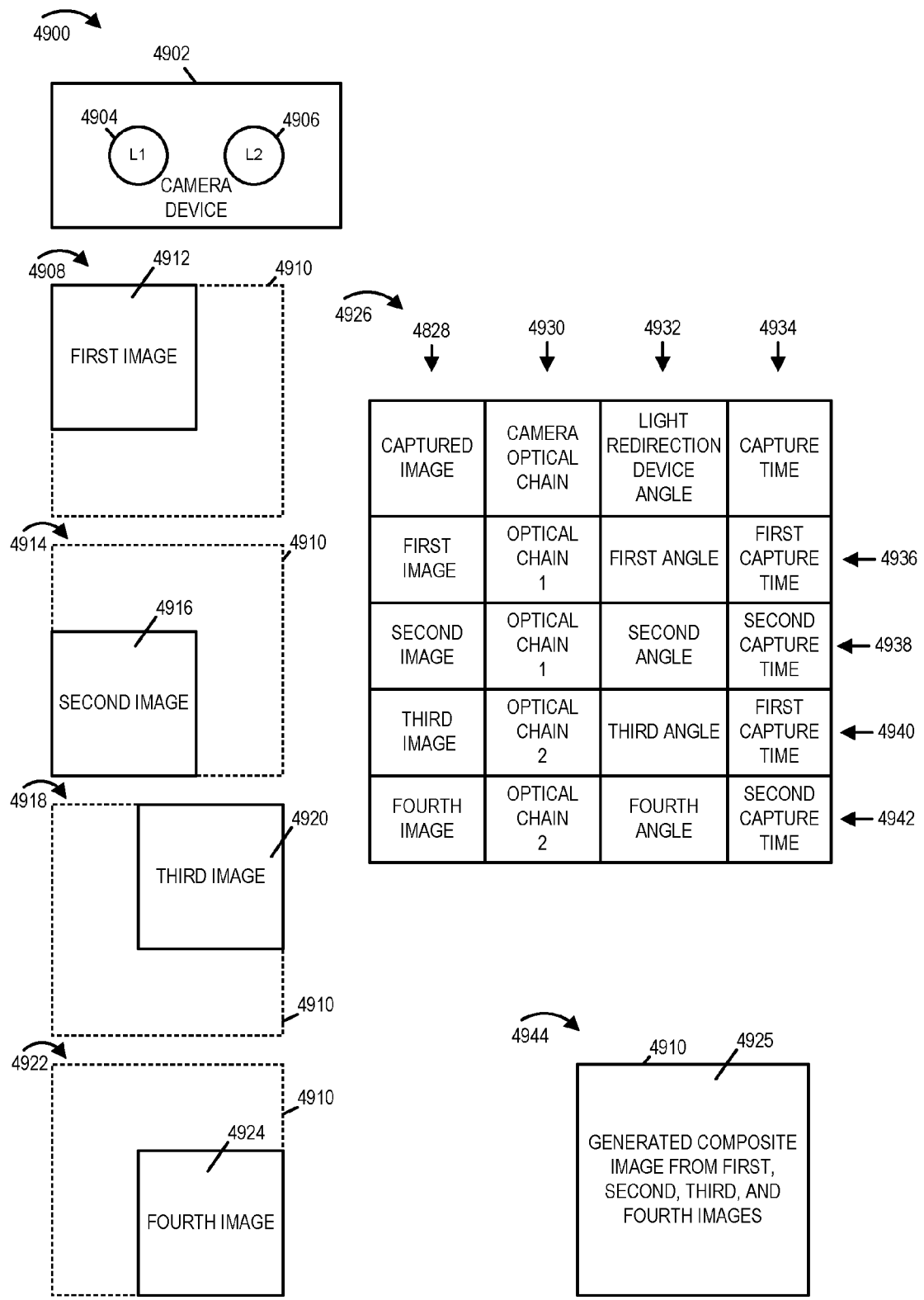
FIG. 49 is a drawing used to illustrate exemplary captured images used to generate a combined image in accordance with an exemplary embodiment.

FIG. 49 is a drawing 4900 used to illustrate exemplary captured images used to generate a combined image in accordance with an exemplary embodiment. Drawing 4900 includes an exemplary camera device 4902 including two optical chains in accordance with an exemplary embodiment. Camera device 4900 is, e.g., camera device 4600 of FIG. 48A or camera device 4700 of FIG. 48B, a camera device including assembly of modules 4800 of FIG. 48C, and/or a camera device implementing the method of flowchart 4500 of FIG. 47. Each of the optical chains of camera device 4900 includes and a lens, e.g., an outer lens, a controllable moveable light redirection device, e.g., a moveable mirror or a moveable prism, and an image sensor. In one example, lens L1 4904 is the outer lens for optical chain 1, and lens L2 4906 is the outer lens for optical chain 2.

Drawing 4908 of FIG. 49 illustrates a first captured image 4912 within a scene of interest 4910. Drawing 4914 of FIG. 49 illustrates a second captured image 4916 within the scene of interest 4910. Drawing 4918 of FIG. 49 illustrates a third captured image 4920 within the scene of interest 4910. Drawing 4922 of FIG. 49 illustrates a fourth captured image 4924 within the scene of interest 4910. Note that each of the images (first image 4912, second image 4916, third image 4920, fourth image 4924) includes a non-overlapping image portion with respect to the other images. Drawing 4944 illustrates a composite image 4925, corresponding to the scene area of interest 4910, which is generated from the captured images (first image 4912, second image 4916, third image 4920 and fourth image 4924).

Table 4926 illustrates which optical chains are used to capture which images, exemplary light redirection device angle settings used for image capture, and exemplary capture times corresponding to the captured images. First column 4928 identifies the captured image. Second column 4930 identifies the optical chain used to capture the identified image in the same row of the first column. Third column 4932 identifies an exemplary light redirection device angle setting to which the light redirection device of the optical chain which captured the image was set at the time of image capture. Fourth column 4934 identifies an exemplary capture time during which the corresponding image of the same row was captured.

Row 4936 identifies that first image 4912 was captured by optical chain 1; the controllable moveable light redirection device of optical chain 1 was set at a first angle when the first image was captured; and the first image was captured during a first capture time interval. Row 4938 identifies that second image 4916 was captured by optical chain 1; the controllable moveable light redirection device of optical chain 1 was set at a second angle when the second image was captured; and the second image was captured during a second capture time interval. Row 4940 identifies that third image 4920 was captured by optical chain 2; the controllable moveable light redirection device of optical chain 2 was set at a third angle when the third image was captured; and the third image was captured during a first capture time interval. Row 4942 identifies that fourth image 4924 was captured by optical chain 2; the controllable moveable light redirection device of optical chain 2 was set at a fourth angle when the fourth image was captured; and the fourth image was captured during a second capture time interval.

In one exemplary embodiment, the second angle is greater than the first angle, and the fourth angle is greater than the third angle. In some such embodiments, the first angle is substantially the same as the third angle, and the second angle is substantially the same as the fourth angle. In various embodiments, the first capture time is the same duration as the second capture time. In some embodiments, the moveable light redirection device of the first optical chain and the moveable light redirection device of the second optical chain are moved in parallel during a time interval between first capture time and the second capture time, e.g., to facilitate a small time gap between the first capture time and second capture time. In some embodiments, the moveable light redirection device of the first optical chain and the moveable light redirection device of the second optical chain are moved serially during a time interval between first capture time and the second capture time, e.g., to limit instantaneous battery power drain.

Figure 50:
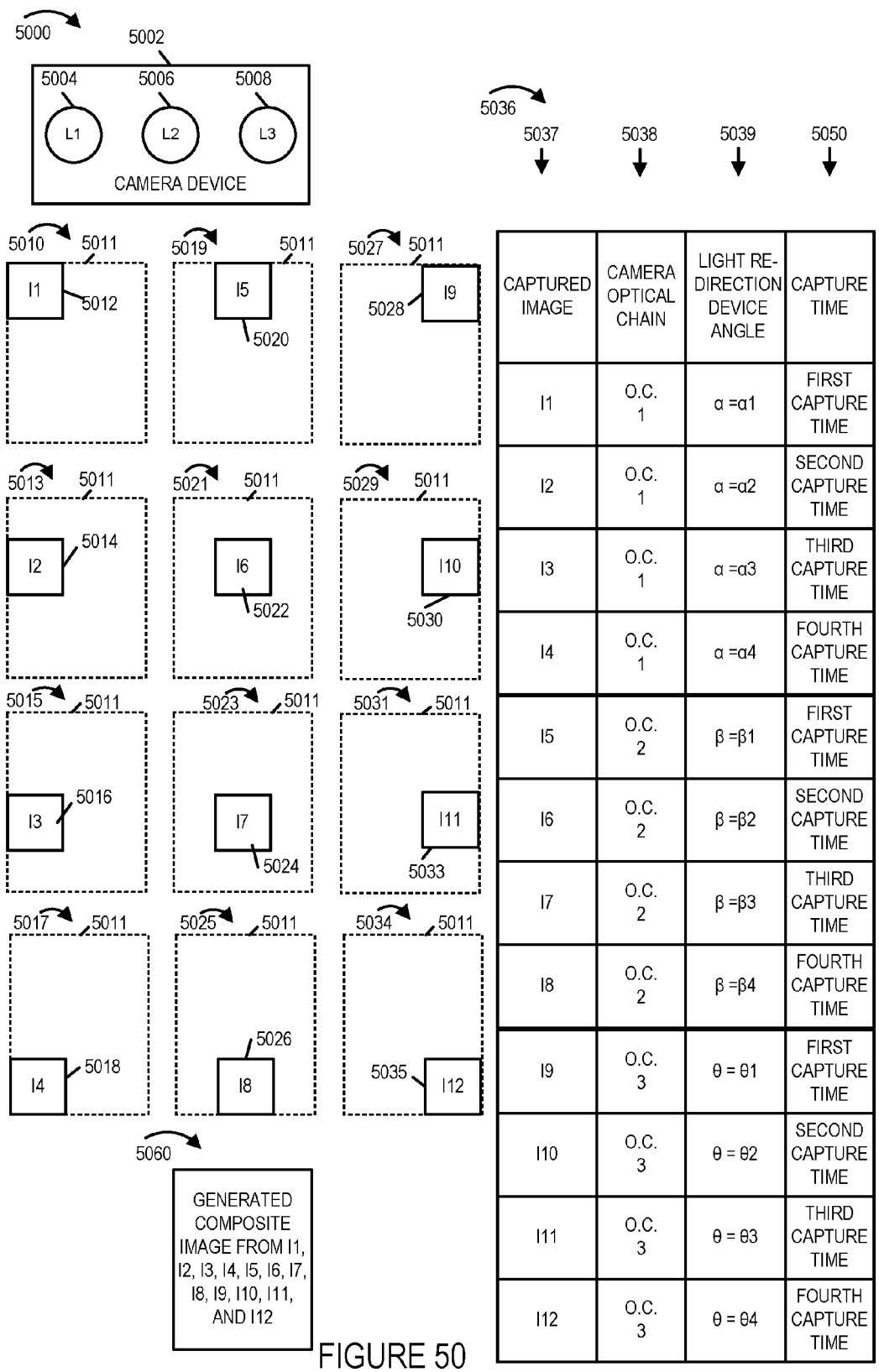
FIG. 50 is a drawing used to illustrate exemplary captured images used to generate a combined image in accordance with an exemplary embodiment.

FIG. 50 is a drawing 5000 used to illustrate exemplary captured images used to generate a combined image in accordance with an exemplary embodiment. Drawing 5000 includes an exemplary camera device 5002 including three optical chains in accordance with an exemplary embodiment. Camera device 5000 is, e.g., camera device 4600 of FIG. 48A, camera 4700 of FIG. 48B, a camera device including assembly of modules 4800 of FIG. 48C, and/or a camera device implementing the method of flowchart 4500 of FIG. 47. Each of the optical chains of camera device 5000 includes a lens, e.g., an outer lens, a controllable moveable light redirection device, and an image sensor. Lens L1 5004 is the outer lens for optical chain 1, lens L2 5006 is the outer lens for optical chain 2, and lens L3 5008 is the outer lens for optical chain 3.

Drawing 5010 of FIG. 50 illustrates captured image I1 5012 within a scene of interest 5011. Drawing 5013 of FIG. 50 illustrates captured image I2 5014 within the scene of interest 5011. Drawing 5015 of FIG. 50 illustrates captured image I3 5016 within the scene of interest 5011. Drawing 5017 of FIG. 50 illustrates captured image I4 5018 within the scene of interest 5011. Drawing 5019 of FIG. 50 illustrates captured image I5 5020 within the scene of interest 5011. Drawing 5021 of FIG. 50 illustrates captured image I6 5022 within the scene of interest 5011. Drawing 5023 of FIG. 50 illustrates captured image I7 5026 within the scene of interest 5011. Drawing 5025 of FIG. 50 illustrates captured image I8 5026 within the scene of interest 5011. Drawing 5027 of FIG. 50 illustrates captured image I9 5028 within the scene of interest 5011. Drawing 5029 of FIG. 50 illustrates captured image I10 5030 within the scene of interest 5011. Drawing 5031 of FIG. 50 illustrates captured image I11 5033 within the scene of interest 5011. Drawing 5034 of FIG. 50 illustrates captured image I12 5035 within the scene of interest 5011.

A composite image 5060, corresponding to the scene area of interest 5011 is generated from the captured images (I1 5012, I2 5014, I3 5016, I4 5018, I5 5020, I6 5022, I7 5024, I8 5026, I9 5028, I10 5030, I11 5033, I12 5035).

Table 5036 illustrates which optical chains of camera 5002 are used to capture which images, exemplary light redirection device angle settings used for image capture, and exemplary capture times corresponding to the captured images. First column 5037 identifies the captured image. Second column 5038 identifies the optical module used to capture the identified image in the same row of the first column. Third column 5039 identifies an exemplary light redirection device angle setting to which the moveable light redirection device of the optical chain which captured the image was set at the time of image capture. Fourth column 5050 identifies an exemplary capture time during which the corresponding image of the same row was captured.

The second row of table 5036 identifies that image I1 5012 was captured by optical chain 1; the controllable light redirection device of optical chain 1 was set at a angle $\alpha=\alpha 1$ when image I1 was captured; and image I1 was captured during a first capture time interval. The third row of table 5036 identifies that image I2 5014 was captured by optical chain 1; the controllable moveable light redirection device of optical chain 1 was set at an angle $\alpha=\alpha 2$ when the image I2 was captured; and the image I2 was captured during a second capture time interval. The fourth row of table 5036 identifies that image I3 5016 was captured by optical chain 1; the controllable light redirection device of optical chain 1 was set at an angle $\alpha=\alpha 3$ when the image I3 5016 was captured; and image I3 5016 was captured during a third capture time interval. The fifth row of table 5036 identifies that image I4 5018 was captured by optical chain 1; the controllable moveable light redirection device of optical chain 1 was set at an angle $\alpha=\alpha 4$ when image I4 was captured; and image I4 was captured during a fourth capture time interval. In some embodiments, $\alpha 4 > \alpha 3 > \alpha 2 > \alpha 1$. In some other embodiments, $\alpha 4 < \alpha 3 < \alpha 2 < \alpha 1$.

The sixth row of table 5036 identifies that image I5 5020 was captured by optical chain 2; the controllable moveable light redirection device of optical chain 2 was set at an angle $\beta=\beta 1$ when image I5 5020 was captured; and image I5 was captured during a first capture time interval. The seventh row of table 5036 identifies that image I6 5022 was captured by optical chain 2; the controllable moveable light redirection device of optical chain 2 was set at an angle $\beta=\beta 2$ when image I6 was captured; and image I6 was captured during a second capture time interval. The eighth row of table 5036 identifies that image I7 5024 was captured by optical chain 2; the controllable moveable light redirection device of optical chain 2 was set at an angle $\beta=\beta 3$ when image I7 5024 was captured; and image I7 5024 was captured during a third capture time interval. The ninth row of table 5036 identifies that image I8 5026 was captured by optical chain 2; the controllable moveable light redirection device of optical chain 2 was set at an angle $\beta=\beta 4$ when image I8 5026 was captured; and image I8 5026 was captured during a fourth capture time interval. In some embodiments, $\beta 4 > \beta 3 > \beta 2 > \beta 1$. In some embodiments, $\beta 4 < \beta 3 < \beta 2 < \beta 1$.

The tenth row of table 5036 identifies that image I9 5028 was captured by optical chain 3; the controllable moveable light redirection device of optical chain 3 was set at a angle $\theta=\theta 1$ when image I9 5028 was captured; and image I9 was captured during a first capture time interval. The eleventh row of table 5036 identifies that image I10 5030 was captured by optical chain 3; the controllable moveable light redirection device of optical chain 3 was set at an angle $\theta=\theta 2$ when image I10 was captured; and image I10 was captured during a second capture time interval. The twelfth row of table 5036 identifies that image I11 5033 was captured by optical chain 3; the controllable moveable light redirection device of optical chain 3 was set at an angle $\theta=\theta 3$ when image I11 5033 was captured; and image I11 5033 was captured during a third capture time interval. The thirteenth row of table 5036 identifies that image I12 5026 was captured by optical chain 3; the controllable moveable light redirection device of optical chain 3 was set at an angle $\theta=\theta 4$ when image I12 5035 was captured; and image I12 5035 was captured during a fourth capture time interval. In some embodiments, $\theta 4 > \theta 3 > \theta 2 > \theta 1$. In some embodiments, $\theta 4 < \theta 3 < \theta 2 < \theta 1$.

Figure 51A:
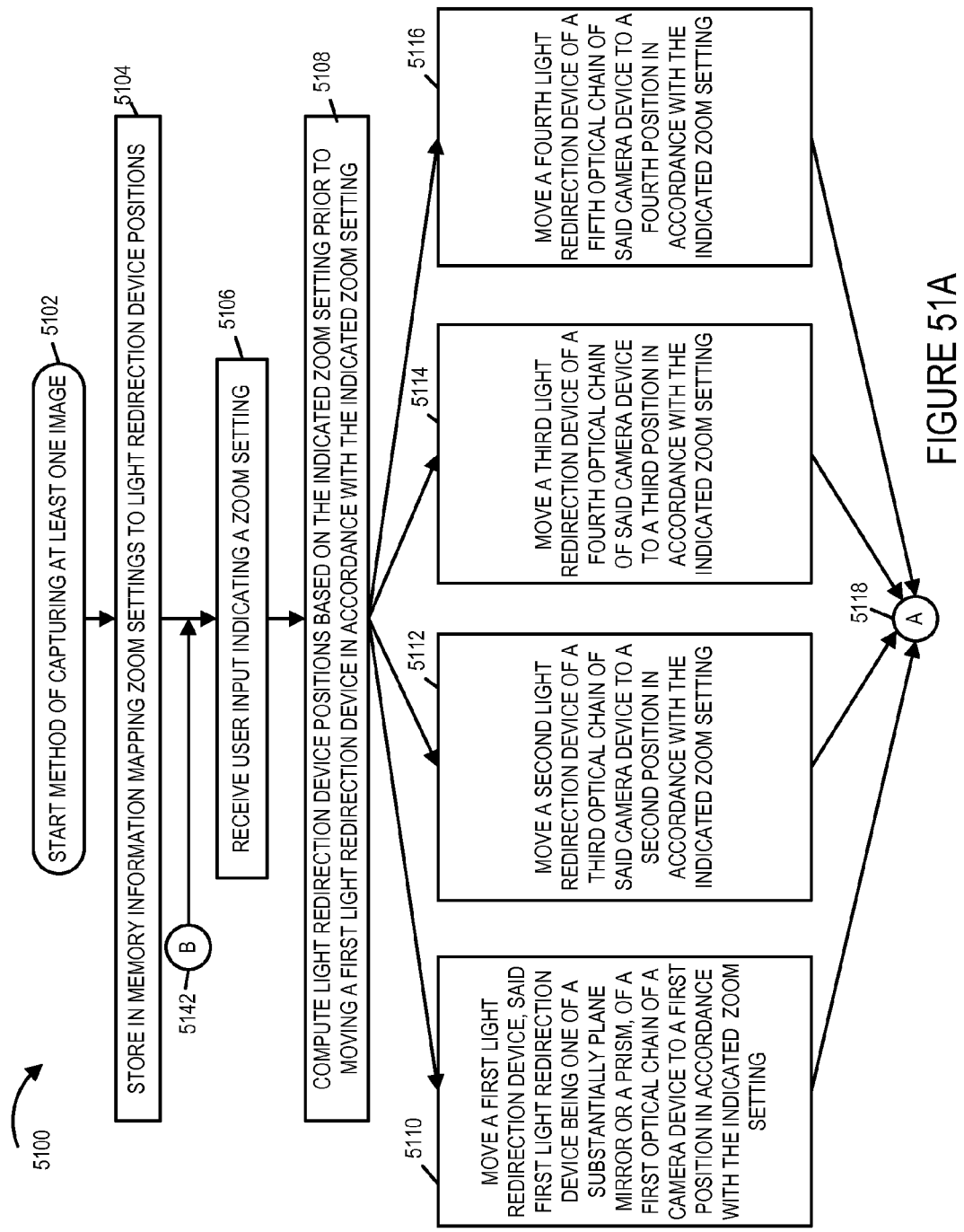
FIG. 51A is a first part of a flowchart of an exemplary method of capturing at least one image in accordance with an exemplary embodiment.

FIG. 51, comprising the combination of FIG. 51A and FIG. 51B, is a flowchart 5100 of an exemplary method of capturing at least one image. The exemplary method of flowchart 5100 may be performed by a camera device including five or more optical chains or by a camera device including five or more optical chains and an image processing device. In some embodiments, the camera device is one of: a smart phone and a camera. In some embodiments, the image processing device is a personal computer.

Operation of the exemplary method starts in step 5102 and proceeds to step 5104. In step 5104, information mapping zoom settings to light redirection device positions is stored in memory. In various embodiments, the light redirection devices are mirrors, e.g., plane mirror, or prisms. Operation proceeds from step 5104 to step 5106. In step 5106 user input indicating a zoom setting is received. Operation proceeds from step 5106 to step 5108. In step 5108 light redirection device positions, based on the indicated zoom setting, are computed prior to moving a first light redirection device in accordance with the indicated zoom setting. Thus, in step 5108 light redirection device positions for moveable controllable light redirection devices are determined corresponding to a zoom setting, e.g., from a stored look-up table in memory. For example, in step 5108 the camera device determines: a first position for a first light redirection device of a first optical chain corresponding to a the indicated zoom setting, a second position for a second light redirection device of a third optical chain corresponding to a the indicated zoom setting, a third position for a third light redirection device of a fourth optical chain corresponding to a the indicated zoom setting, and a fourth position for a fourth light redirection device of a fifth optical chain corresponding to the indicated zoom setting. In some embodiments, corresponding to each of a plurality of predetermined discrete possible alternative user selectable zoom settings, there is a corresponding set of light redirection device positions and/or angles for each of the moveable light redirection devices. Operation proceeds from step 5108 to steps 5110, 5112, 5114, and 5116, which may be performed in parallel.

In step 5110 a first light redirection device, said first light redirection device being one of a substantially plane mirror or a prism, of a first optical chain or the camera device is moved to a first position in accordance with the indicated zoom setting. In some embodiments, the substantially plane mirror is a plane mirror. In some embodiments, the first light redirection device is a plane mirror, and said first position is a first mirror position corresponding to a first direction of the first plane mirror. In various embodiments, the first direction of the first plane mirror is defined as the direction of the perpendicular to the plane of the first plane mirror. In step 5112 a second light redirection device of a third optical chain of the camera device is moved to a second position in accordance with the indicated zoom setting. In some embodiments, the second light redirection device is a second plane mirror, and said second position is a second mirror position corresponding to a first direction of the second plane mirror. In various embodiments, the first direction of the second plane mirror is defined as the direction of the perpendicular to the plane of the second plane mirror. In step 5114 a third light redirection device of a fourth optical chain of the camera device is moved to a third position in accordance with the indicated zoom setting. In some embodiments, the third light redirection device is a third plane mirror, and said third position is a third mirror position corresponding to a first direction of the third plane mirror. In various embodiments, the first direction of the third plane mirror is defined as the direction of the perpendicular to the plane of the third plane mirror. In step 5116 a light redirection device of a fifth optical chain of the camera device is moved to a fourth position in accordance with the indicated zoom setting. In some embodiments, said fourth light redirection device is a fourth plane mirror, and said fourth position is a fourth mirror position corresponding to a first direction of the fourth plane mirror. In various embodiments, the first direction of the fourth plane mirror is defined as the direction of the perpendicular to the plane of the fourth plane mirror. Operation proceeds from steps 5110, 5112, 5114, and 5116, via connecting node A 5118, to steps 5120, 5122, 5124, 5126 and 5128, and in some embodiments to steps 5130 and 5132. In various embodiments, steps 5120, 5122, 5124, 5126, 5128, 5130 and 5132 are performed in parallel.

In step 5120 the camera device captures a first image of a first portion of a scene area of interest using said first optical chain while said first light redirection device is at the first position. In step 5122, the camera device captures a second image of a second portion of the scene area of interest using the second optical chain, while said first light redirection device is at the first position. In some embodiments, the first image is captured during a period of time which at least partially overlaps the period of time during which the second image is captured. In some embodiments, said first image is captured at the same time said second image is captured. In step 5124 the camera device captures a third image of a third portion of the scene area of interest using a third optical chain while said first light redirection device is at the first position. In step 5126 the camera device captures a fourth image of a fourth portion of the scene area of interest using said fourth optical chain while said first light redirection device is at the first position. In step 5128 the camera device captures a fifth image of a fifth portion of the scene area of interest using said fifth optical chain while said first light redirection device is at the first position. In some embodiments, one or both of optional step 5130 and optional step 5132 are performed. In step 5130, the camera device captures a sixth image of a sixth portion of the scene area of interest using a sixth optical chain, while said first light redirection device is at the first position. In step 5132, the camera device captures a seventh image of a seventh portion of the scene area of interest using a seventh optical chain, while said first light redirection device is at the first position.

In various embodiments, the first, second, third and fourth plane light redirection devices are not being moved during the image capture operations of steps 5120, 5122, 5124, 5126 and 5128. In various embodiments, the first, second, third and fourth light redirection devices are not being moved during the image capture operations of steps 5120, 5122, 5124, 5126, 5128, 5130 and 5132. In various embodiments, the first, second, third, fourth and fifth optical chains capture the images at the same time, e.g., when set for a particular zoom setting. In various embodiments, the first, second, third, fourth, fifth, sixth and seventh optical chains capture the images at the same time, e.g., when set for a particular zoom setting.

Operation proceeds from steps 5120, 5122, 5124, 5126, 5128, and in some embodiments, steps 5130 and/or 5132 to step 5134. In step 5134 the captured images are combined to generate a composite image corresponding to the indicated zoom setting. In some embodiments, step 5134 includes one or both of steps 5136 and 5138. In step 5136 the first, second, third, fourth, and fifth images are combined to generate a composite image corresponding to the indicated zoom setting. In step 5138 the first, second, third, fourth, fifth, sixth and seventh images are combined to generate a composite image corresponding to the indicated zoom setting. Operation proceeds from step 5134 to step 5140, in which the generated composite image is stored in memory. Steps 5134 and 5136 may be performed by the camera device or by an image processing device. Operation proceeds from step 5140, via connecting node B 5142 to step 5106.

In some embodiments, the first and second optical chains have different focal lengths. In some such embodiments, the first optical chain has a larger focal length than the second optical chain. In some such embodiments, the second optical chain has a smaller focal length than each of the first, second third and fourth optical chains. In some embodiments, the first, third, fourth and fifth optical chains have the same focal length and capture smaller portions of the scene area of interest than the second optical chain.

In various embodiments, the first optical chain includes a first light redirection device which is a moveable light redirection device and the second optical chain does not include a moveable light redirection device.

In various embodiments, the first, third, fourth, and fifth optical chains each include a moveable controllable light redirection device, and the second, sixth and seventh optical chains do not include a moveable controllable light redirection device, e.g., the light redirection devices in the second, sixth and seventh optical chains are fixed position light redirection devices, e.g., each of which is hard mounted in a fixed position. In some embodiments, two of the second, sixth, and seventh images are substantially the same size. In some embodiments, one of the second, sixth, and seventh images is substantially the same size as each of the first, third, fourth, and fifth images.

Figure 52:
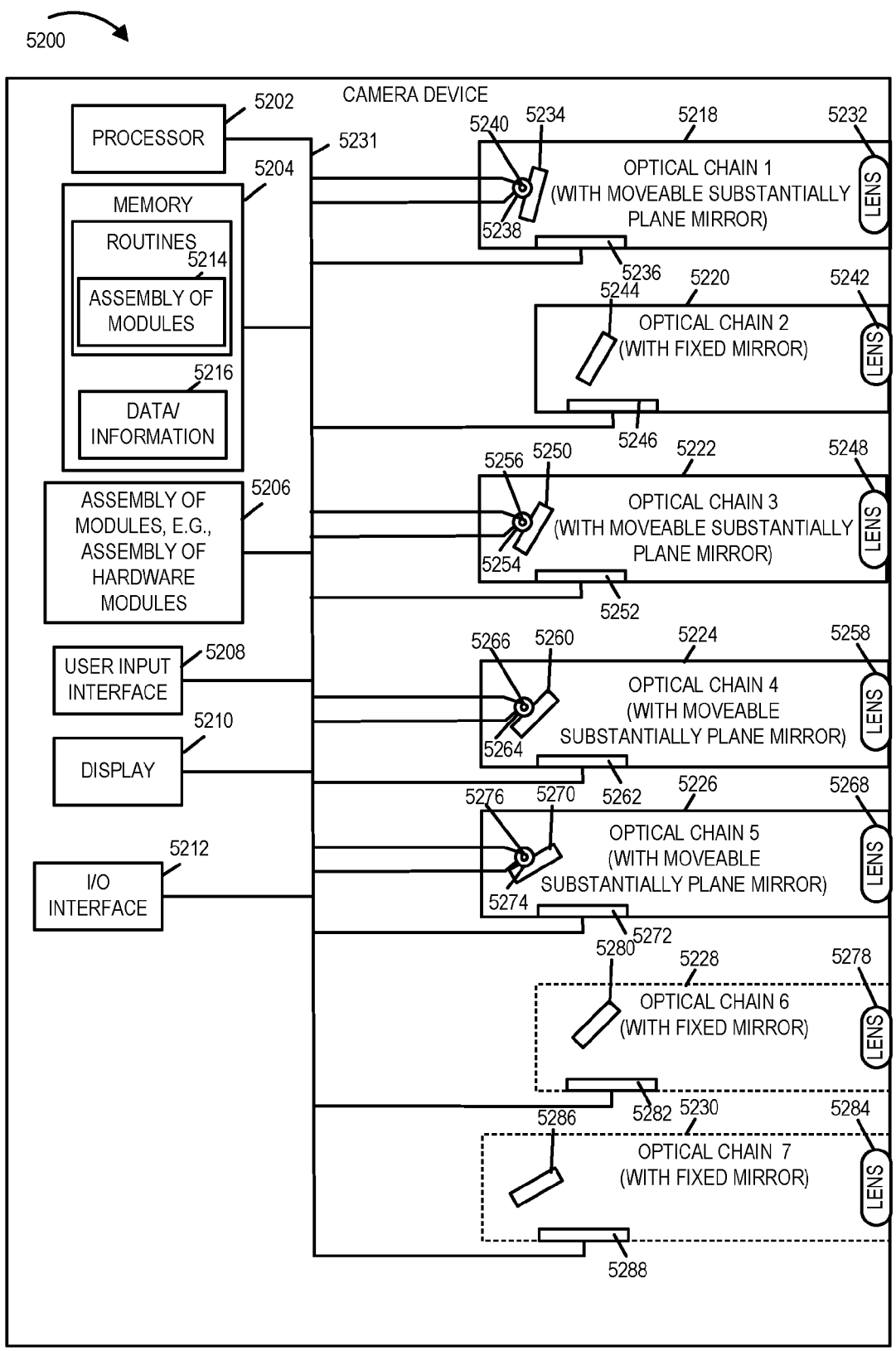
FIG. 52 is a drawing of an exemplary camera device including moveable mirrors in accordance with an exemplary embodiment.

FIG. 52 is a drawing of an exemplary camera device 5200 in accordance with an exemplary embodiment. Camera device 5200 includes a processor 5202, e.g., a CPU, memory 5204, an assembly of modules 5206, e.g., an assembly of hardware modules such as circuits, a user input interface 5208, a display 5210, an I/O interface 5212, and a plurality of optical chains (optical chain 1 5218, optical chain 2 5220, optical chain 3 5222, optical chain 4 5224, optical chain 5 5226, optical chain 6 5228, optical chain 7 5230) coupled together via a bus 5231 over which the various elements may interchange data and information. In some embodiments, optical chain 6 5228 and optical chain 7 5230 are optional. Display 5210, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera 5200. User input interface 5208 includes, e.g., switches, buttons, touch screen interface, etc. for receiving input from the user. I/O interface 5212 includes a plurality of communications ports for communicating with other devices, e.g., a personal computer. I/O interface 5212 in some embodiments, includes one or more wireless communications interfaces. Information communicated over I/O interface 5212 includes, e.g., combined images generated from captured images from multiple optical chains, and/or captured images from individual optical chains to be processed and/or combined externally, e.g., in a personal computer.

Memory 5204 includes assembly of modules 5214 and data/information 5216. Data/information 5216, in some embodiments, includes stored information mapping zoom settings to light redirection device positions, e.g., a look-up table 5500 of FIG. 55.

Optical chain 1 5218 includes a lens 5232, e.g., an outer lens, a moveable substantially plane mirror 5234, and an image sensor 5236. In some embodiments, the substantially plane mirror is a plane mirror. In various embodiments, the moveable mirror 5234 includes a hinge mount. Optical chain 1 5218 further includes a mirror movement module 5238, e.g., a drive motor and corresponding drive circuitry, and a mirror position detection module 5240, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 5236 is used to capture a first image of a first portion of a scene area of interest. Light passes through lens 5232 before reaching mirror 5234. Mirror 5234, which is a light redirection device, directs the light which has passed through lens 5232 onto the image sensor 5234.

Optical chain 2 5220 includes a lens 5242, e.g., an outer lens, a fixed mirror 5244, e.g., a substantially plane fixed mirror, and an image sensor 5246. In some embodiments, the substantially plane fixed mirror is a fixed plane mirror. Image sensor 5246 is used to capture a second image of a second portion of a scene area of interest. Light passes through lens 5242 before reaching mirror 5246. Mirror 5244, which is a light redirection device, directs the light which has passed through lens 5242 onto the image sensor 5246.

Optical chain 3 5222 includes a lens 5248, e.g., an outer lens, a moveable substantially plane mirror 5250, and an image sensor 5252. In various embodiments, the moveable mirror 5250 includes a hinge mount. Optical chain 3 5222 further includes a mirror movement module 5254, e.g., a drive motor and corresponding drive circuitry, and a mirror position detection module 5256, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 5252 is used to capture a third image of a third portion of a scene area of interest. Light passes through lens 5248 before reaching mirror 5250. Mirror 5250, which is a light redirection device, directs the light which has passed through lens 5248 onto the image sensor 5252.

Optical chain 4 5224 includes a lens 5258, e.g., an outer lens, a moveable substantially plane mirror 5260, and an image sensor 5262. In various embodiments, the moveable mirror 5260 includes a hinge mount. Optical chain 4 5224 further includes a mirror movement module 5264, e.g., a drive motor and corresponding drive circuitry, and a mirror position detection module 5266, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 5262 is used to capture a fourth image of a fourth portion of a scene area of interest. Light passes through lens 5258 before reaching mirror 5260. Mirror 5260, which is a light redirection device, directs the light which has passed through lens 5258 onto the image sensor 5262.

Optical chain 5 5226 includes a lens 5268, e.g., an outer lens, a moveable substantially plane mirror 5270, and an image sensor 5272. In various embodiments, the moveable mirror 5270 includes a hinge mount. Optical chain 5 5226 further includes a mirror movement module 5274, e.g., a drive motor and corresponding drive circuitry, and a mirror position detection module 5276, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 5272 is used to capture a fifth image of a firth portion of a scene area of interest. Light passes through lens 5268 before reaching mirror 5270. Mirror 5270, which is a light redirection device, directs the light which has passed through lens 5268 onto the image sensor 5272.

Optical chain 6 5228 includes a lens 5278, e.g., an outer lens, a fixed mirror 5280, e.g., a fixed substantially plane mirror, and an image sensor 5282. In some embodiments, the fixed substantially plane mirror is a fixed plane mirror. Image sensor 5282 is used to capture a sixth image of a sixth portion of a scene area of interest. Light passes through lens 5278 before reaching mirror 5280. Mirror 5280, which is a light redirection device, directs the light which has passed through lens 5278 onto the image sensor 5282.

Optical chain 7 5230 includes a lens 5284, e.g., an outer lens, a fixed mirror 5286, e.g., a fixed substantially plane mirror, and an image sensor 5288. In some embodiments, the fixed substantially plane mirror is a fixed plane mirror. In an alternative embodiment, optical chain 7 5230 includes a moveable substantially plane mirror which is set to a fixed position, e.g., irrespective of the zoom setting. Image sensor 5288 is used to capture a seventh image of a seventh portion of a scene area of interest. Light passes through lens 5284 before reaching mirror 5286. Mirror 5286, which is a light redirection device, directs the light which has passed through lens 5284 onto the image sensor 5288.

In some exemplary embodiments, the size of the second image is substantially the same as the size of the scene or interest. In some embodiments, the size of the first image, third image, fourth image, and fifth image are substantially the same. In some such embodiments, the size of the first image is approximately ¼ the size of the scene of interest. In some embodiments, the size of the seventh image is substantially the same as the size of the first image, and the size of the sixth image is substantially the same as the size of the second image. In various embodiments, the second image and the sixth image are used to compute depth information.

Figure 53:
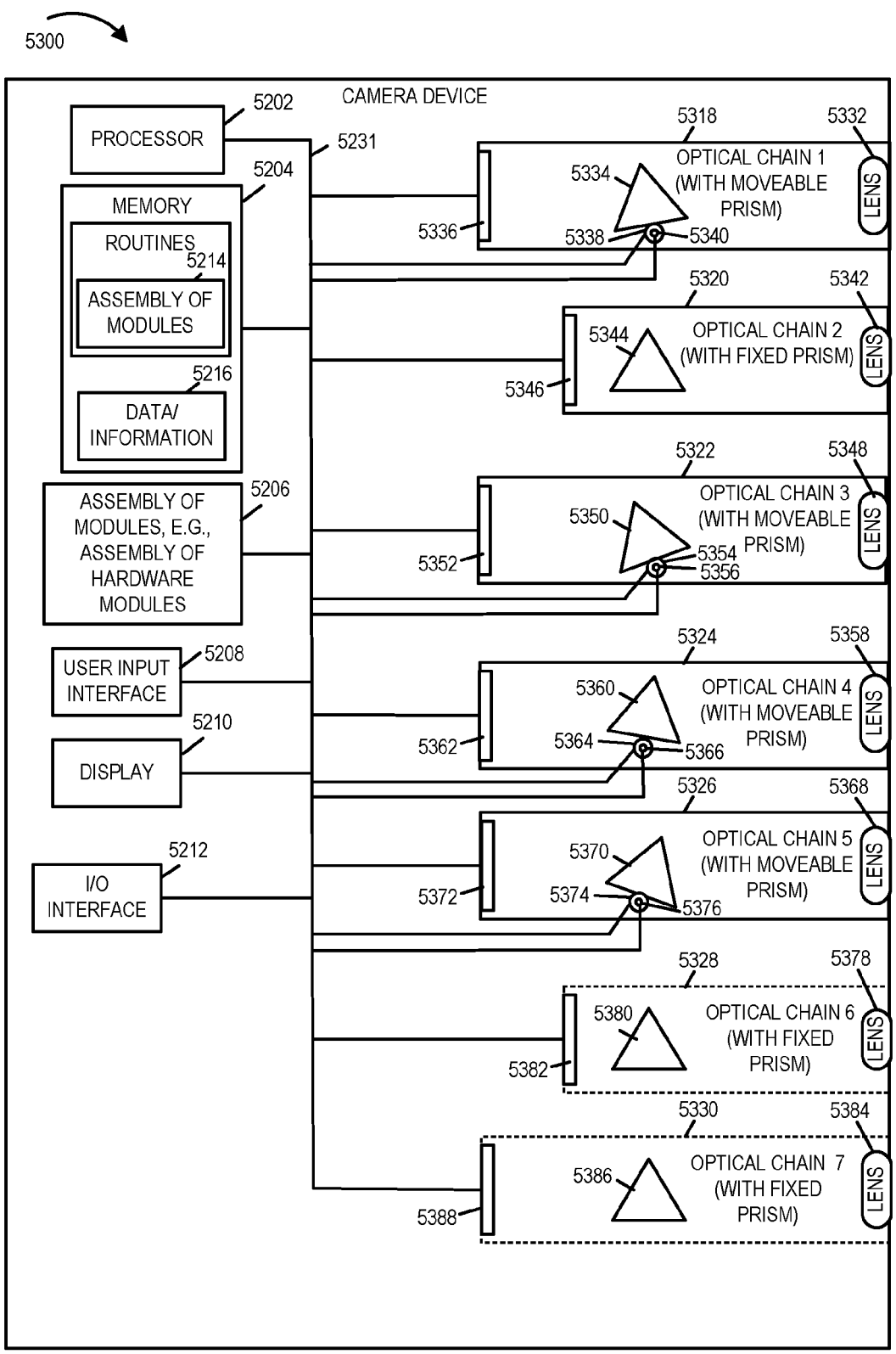
FIG. 53 is a drawing of an exemplary camera device including moveable prisms in accordance with an exemplary embodiment.

FIG. 53 is a drawing of an exemplary camera device 5300 in accordance with an exemplary embodiment. Camera device 5300 includes a processor 5202, e.g., a CPU, memory 5204, an assembly of modules 5206, e.g., an assembly of hardware modules such as circuits, a user input interface 5208, a display 5210, an I/O interface 5212, and a plurality of optical chains (optical chain 1 5318, optical chain 2 5320, optical chain 3 5322, optical chain 4 5324, optical chain 5 5326, optical chain 6 5328, optical chain 7 5330) coupled together via a bus 5231 over which the various elements may interchange data and information. In some embodiments, optical chain 6 5328 and optical chain 7 5330 are optional. Display 5210, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera 5300. User input interface 5208 includes, e.g., switches, buttons, touch screen interface, etc. for receiving input from the user. I/O interface 5212 includes a plurality of communications ports for communicating with other devices, e.g., a personal computer. I/O interface 5212 in some embodiments, includes one or more wireless communications interfaces. Information communicated over I/O interface 5212 includes, e.g., combined images generated from captured images from multiple optical chains, and/or captured images from individual optical chains to be processed and/or combined externally, e.g., in a personal computer.

Memory 5204 includes assembly of modules 5214 and data/information 5216. Data/information 5216, in some embodiments, includes stored information mapping zoom settings to light redirection device positions, e.g., a look-up table 5500 of FIG. 55.

Optical chain 1 5318 includes a lens 5332, e.g., an outer lens, a moveable prism 5334 and an image sensor 5336. In various embodiments, the moveable prism 5334 includes a hinge mount. Optical chain 1 5318 further includes a prism movement module 5338, e.g., a drive motor and corresponding drive circuitry, and a prism position detection module 5340, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 5336 is used to capture a first image of a first portion of a scene area of interest. Light passes through lens 5332 before reaching prism 5334. Prism 5334, which is a light redirection device, directs the light which has passed through lens 5332 onto the image sensor 5334.

Optical chain 2 5320 includes a lens 5342, e.g., an outer lens, a fixed prism 5344 and an image sensor 5346. Image sensor 5346 is used to capture a second image of a second portion of a scene area of interest. Light passes through lens 5342 before reaching prism 5346. Prism 5344, which is a light redirection device, directs the light which has passed through lens 5342 onto the image sensor 5346.

Optical chain 3 5322 includes a lens 5348, e.g., an outer lens, a moveable prism 5350 and an image sensor 5352. In various embodiments, the moveable prism 5350 includes a hinge mount. Optical chain 3 5322 further includes a prism movement module 5354, e.g., a drive motor and corresponding drive circuitry, and a prism position detection module 5346, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 5352 is used to capture a third image of a third portion of a scene area of interest. Light passes through lens 5348 before reaching prism 5350. Prism 5350, which is a light redirection device, directs the light which has passed through lens 5348 onto the image sensor 5352.

Optical chain 4 5324 includes a lens 5358, e.g., an outer lens, a moveable prism 5360 and an image sensor 5362. In various embodiments, the moveable prism 5360 includes a hinge mount. Optical chain 4 5324 further includes a prism movement module 5364, e.g., a drive motor and corresponding drive circuitry, and a prism position detection module 5366, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 5362 is used to capture a fourth image of a fourth portion of a scene area of interest. Light passes through lens 5358 before reaching prism 5360. Prism 5360, which is a light redirection device, directs the light which has passed through lens 5358 onto the image sensor 5362.

Optical chain 5 5326 includes a lens 5368, e.g., an outer lens, a moveable prism 5370 and an image sensor 5372. In various embodiments, the moveable prism 5370 includes a hinge mount. Optical chain 5 5326 further includes a prism movement module 5374, e.g., a drive motor and corresponding drive circuitry, and a prism position detection module 5376, e.g., a angular position sensing device such as a resolver or synchro or optical rotary encoder or a magnetic rotary encoder, and, in some embodiments, circuitry to convert the sensor measurement into a digital value, e.g., an analog to digital converter. Image sensor 5372 is used to capture a fifth image of a fifth portion of a scene area of interest. Light passes through lens 5378 before reaching prism 5370. Prism 5370, which is a light redirection device, directs the light which has passed through lens 5368 onto the image sensor 5372.

Optical chain 6 5328 includes a lens 5278, e.g., an outer lens, a fixed prism 5380 and an image sensor 5382. Image sensor 5382 is used to capture a sixth image of a sixth portion of a scene area of interest. Light passes through lens 5378 before reaching prism 5380. Prism 5380, which is a light redirection device, directs the light which has passed through lens 5378 onto the image sensor 5382.

Optical chain 7 5330 includes a lens 5384, e.g., an outer lens, a fixed prism 5386 and an image sensor 5388. In some embodiments, fixed position prism 5386 of optical chain 7 5338 is replaced by a moveable prism which is set at a fixed position irrespective of the zoom setting. Image sensor 5388 is used to capture a seventh image of a seventh portion of a scene area of interest. Light passes through lens 5384 before reaching prism 5386. Prism 5386, which is a light redirection device, directs the light which has passed through lens 5384 onto the image sensor 5388.

In some exemplary embodiments, the size of the second image is substantially the same as the size of the scene or interest. In some embodiments, the size of the first image, third image, fourth image, and fifth image are substantially the same. In some such embodiments, the size of the first image is approximately ¼ the size of the scene of interest. In some embodiments, the size of the seventh image is substantially the same as the size of the first image, and the size of the sixth image is substantially the same as the size of the second image. In various embodiments, the second image and the sixth image are used to compute depth information.

Figure 54:
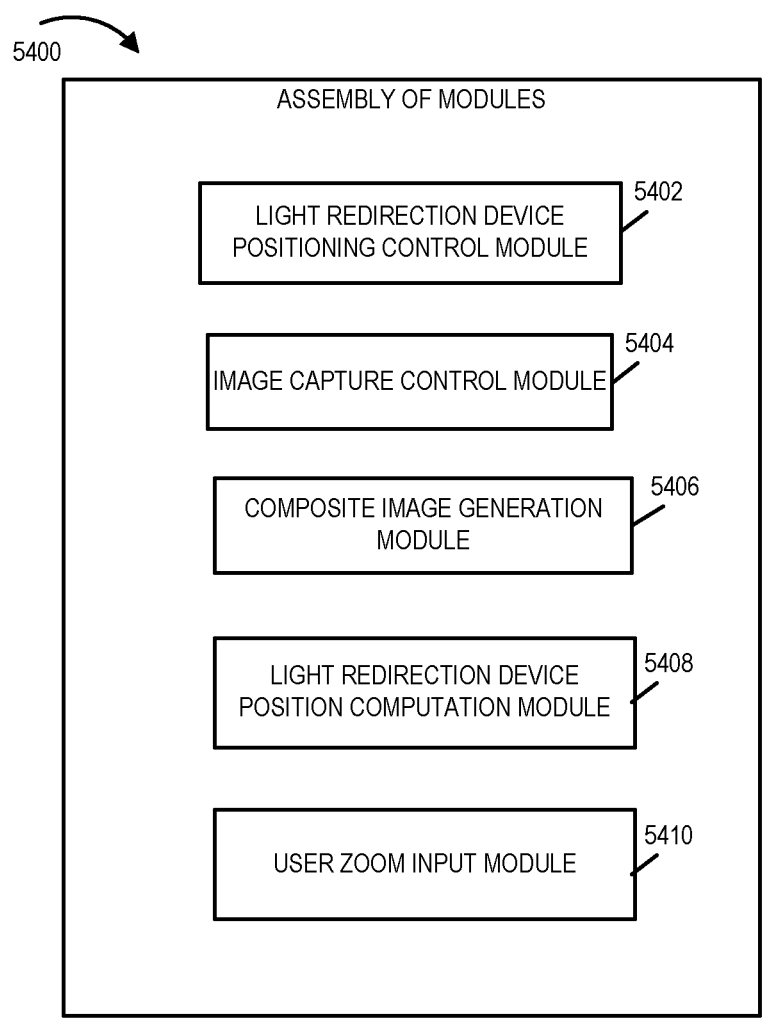
FIG. 54 is a drawing of an exemplary assembly of modules, which may be included in an exemplary camera device in accordance with an exemplary embodiment.

FIG. 54 is a drawing of an assembly of modules 5400, which may be included in a camera device implemented in accordance with the present invention, e.g., camera 5200 of FIG. 52 or camera 5300 of FIG. 53. Assembly of modules 5400 may implement steps of a method, e.g., steps of the method of flowchart 5100 of FIG. 51. In some embodiments, assembly of modules 5400 is an assembly of circuits, which may be coupled together. In one exemplary embodiment, assembly of modules 5400 is assembly of modules 5206 of camera 5200 of FIG. 52 or camera 5300 of FIG. 53. In some embodiments, the assembly of module 5400 is an assembly of software modules. In one exemplary embodiment, assembly of modules 5400 is assembly of modules 5214 of memory 5204 of camera device 5200 of FIG. 52 or camera device 5300 of FIG. 53.

FIG. 54 illustrates an assembly of modules 5400 which can, and in some embodiments is, used in the camera device 5200 illustrated in FIG. 52 or camera device 5300 of FIG. 53. The modules in the assembly of modules 5400 can, and in some embodiments are, implemented fully in hardware within the processor 5202, e.g., as individual circuits. The modules in the assembly of modules 5400 can, and in some embodiments are, implemented fully in hardware within the assembly of modules 5206, e.g., as individual circuits corresponding to the different modules. In other embodiments some of the modules are implemented, e.g., as circuits, within the processor 5202 with other modules being implemented, e.g., as circuits within assembly of modules 5206, external to and coupled to the processor. As should be appreciated the level of integration of modules on the processor and/or with some modules being external to the processor may be one of design choice.

Alternatively, rather than being implemented as circuits, all or some of the modules in assembly of modules 5400 may be implemented in software and stored in the memory 5204 of the camera device 5200 or camera device 5300, with the modules controlling operation of camera device 5200 or camera device 5300 to implement the functions corresponding to the modules when the modules are executed by a processor, e.g., processor 5202. In some such embodiments, the assembly of modules 5400 is included in the memory 5204 as assembly of modules 5214. In still other embodiments, various modules in assembly of modules 5400 are implemented as a combination of hardware and software, e.g., with another circuit external to the processor providing input to the processor 5202 which then under software control operates to perform a portion of a module's function. While shown in the FIG. 52 and FIG. 53 embodiments as a single processor, e.g., computer, it should be appreciated that the processor 5202 may be implemented as one or more processors, e.g., computers.

When implemented in software the modules include code, which when executed by the processor 5202, configure the processor 5202 to implement the function corresponding to the module. In embodiments where the assembly of modules 5400 is stored in the memory 5204, the memory 5204 is a computer program product comprising a computer readable medium comprising code, e.g., individual code for each module, for causing at least one computer, e.g., processor 5202, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 54 control and/or configure the camera deice 5200 or camera device 5300 or elements therein such as the processor 5202, to perform functions of the corresponding steps illustrated in the method flowchart 5100 of FIG. 51. Thus the assembly of modules 5400 includes various modules that perform functions of the corresponding steps of the method shown in FIG. 51.

FIG. 54 is a drawing of an assembly of modules 5400 in accordance with an exemplary embodiment. Assembly of modules 5400 includes a light redirection device positioning control module 5402, an image capture control module 5404, a composite image generation module 5406, a light redirection device position computation module 5408, and a user zoom input module 5410.

Light redirection device positioning control module 5402 is configured to control a first light redirection device, included in a first optical chain, to move to a first position in accordance with an indicated zoom setting, said first light redirection device being one of a substantially plane mirror or a prism. In some embodiments, the substantially plane mirror is a plane mirror.

Image capture control module 5404 is configured to control a first optical chain to capture a first image of a first portion of a scene of interest while said first light redirection device is at a first position. Image capture control module 5404 is further configured to Control a second optical chain to capture a second image of a second portion of a scene of interest, the second image being captured while said first light redirection device is at the first position. In some embodiments, the first and second images are captured at the same time, under the control of the image capture control module 5404.

In some embodiments, the first and second optical chains have different focal length. In some such embodiments, the first optical chain has a larger focal length than the second optical chain. In various embodiments, the first light redirection device includes a movable light redirection device and the second optical chain does not include a moveable light redirection device.

In various embodiments, the camera device including assembly of modules 5400 includes a third optical chain including a second light redirection device, a fourth optical chain including a third light redirection device, and a fifth optical chain including a fourth light redirection device. In some such embodiments, the light redirection device positioning control module 5402 is further configured to: move the second light redirection device of the third optical chain to a second position in accordance with an indicated zoom setting, move the third light redirection device of the fourth optical chain to a third position in accordance with an indicated zoom setting, and move the fourth light redirection device of the fifth optical chain to a fourth position in accordance with an indicated zoom setting. In some such embodiments, the image capture control module 5404 is further configured to: control the third optical chain to capture a third image of a third portion of the scene of interest while the first light redirection device is at the first position, control the fourth optical chain to capture a fourth image of a fourth portion of the scene of interest while the first light redirection device is at the first position, and control the fifth optical chain to capture a fifth image of a fifth portion of the scene of interest while the first light redirection device is at the first position.

In some embodiments, the camera device including assembly of modules 5400 further includes a sixth optical chain and a seventh optical chain, and the image capture control module 5404 is further configured to: control the sixth optical chain to capture a sixth image of sixth portion of the scene of interest while the first light redirection device is at the first position, and control the seventh optical chain to capture a seventh image of seventh portion of the scene of interest while the first light redirection device is at the first position. In various embodiments, the first, second, third, fourth, fifth, sixth, and seventh optical chains are controlled under the direction of the image capture control module 5404 to capture images during a time interval in which the moveable light redirection devices are not moving. In various embodiments, the first, second, third, fourth, fifth, sixth, and seventh optical chains are controlled under the direction of the image capture control module 5404 to capture images such that each of the captured images at least partially overlaps the other captured images in time. In some embodiments, the first, second, third, fourth, fifth, sixth, and seventh optical chains are controlled under the direction of the image capture control module 5404 to capture images at the same time.

Composite image generation module 5406 is configured to combine at least the first and second images to generate a composite image corresponding to the indicated zoom setting. In some embodiments, in which the camera device including assembly of modules 5400 includes five optical chains, the composite image generation module 5406 is configured to combine the first, second, third, fourth, and fifth images to generate a composite image corresponding to the indicated zoom setting. In some embodiments, in which the camera device including assembly of modules 5400 includes seven optical chains, the composite image generation module 5406 is configured to combine the first, second, third, fourth, fifth, sixth, and seventh images to generate a composite image corresponding to the indicated zoom setting, e.g., combine information from overlapping portions.

In various embodiments, the first, third, fourth, and fifth optical chains have the same focal length and capture smaller portions of the scene area of interest than the second optical chain. In some embodiments, the second and sixth optical chains have the same focal length and capture the same portion of the scene of interest or substantially the same portion of the scene of interest.

Light redirection device position computation module 5408 is configured to compute light redirection device positions based on the indicated zoom setting prior to moving the first light redirection device in accordance with the indicated zoom setting, e.g., for the first, second, third and fourth moveable light redirection devices of the first, third, fourth and fifth optical chains.

User zoom input module 5410 is configured to receive user input indicating a zoom setting, e.g., from user input interface 5208.

FIG. 55 is a drawing of an exemplary stored zoom setting to light redirection devices positions mapping table 5500 in accordance with an exemplary embodiment including four optical chains including moveable light redirection devices. For example, table 5500 may be used when implementing a method in accordance with flowchart 5100 of FIG. 51; The moveable light redirection devices are, e.g., mirrors, e.g., substantially plane mirrors or prisms. In some embodiments, the substantially plane mirrors are plane mirrors. In this example, optical chains 1, 3, 4, and 5 include moveable light redirection devices. The four moveable light redirection devices are, e.g., moveable controllable mirrors (5234, 5250, 5260, 5270) of camera 5200 of FIG. 52 or moveable controllable prisms (5334, 5350, 5360, 5370) of camera 5300 of FIG. 53.

First row 5502 includes 9 column headers (zoom setting, optical chain 1 light redirection device 1 position, optical chain 1 light redirection device 1 angle, optical chain 3 light redirection device 2 position, optical chain 3 light redirection device 2 angle, optical chain 4 light redirection device 3 position, optical chain 4 light redirection device 3 angle, optical chain 5 light redirection device 4 position, optical chain 5 light redirection device 4 angle) which corresponds to columns (first column 5502, second column 5504, third column 5506, fourth column 5508, fifth column 5510, sixth column 5512, seventh column 5514, eight column 5516, ninth column 5518), respectively. In table 5500, the first position is the setting position for the light redirection device of optical chain 1, which is moveable light redirection device 1; $\alpha$ is the angular setting corresponding to the first position; the second position is the setting position for the light redirection device of optical chain 3, which is moveable light redirection device 2, $\beta$ is the angular setting corresponding to the second position; the third position is the setting position for the light redirection device of optical chain 4, which is moveable light redirection device 3; $\theta$ is the angular setting corresponding to the third position; the fourth position is the setting position for the light redirection device of optical chain 5, which is moveable light redirection device 4, $\phi$ is the angular setting corresponding to the fourth position;

Second row 5522 indicates that for the zoom setting of 1×, the first position=P1A; $\alpha=\alpha 1$; the second position=P2A; $\beta=\beta 1$; the third position=P3A; $\theta=\theta 1$; the fourth position=P4A; and $\phi=\phi 1$. Third row 5524 indicates that for the zoom setting of 2×, the first position=P1B; $\alpha=\alpha 2$; the second position=P2B; $\beta=\beta 2$; the third position=P3B; $\theta=\theta 2$; the fourth position=P4B; and $\phi=\phi 2$. Fourth row 5526 indicates that for the zoom setting of 3×, the first position=P1C; $\alpha=\alpha 3$; the second position=P2C; $\beta=\beta 3$; the third position=P3C; $\theta=\theta 3$; the fourth position=P4C; and $\phi=\phi 3$. Fifth row 5528 indicates that for the zoom setting of 4×, the first position=P1D; $\alpha=\alpha 4$; the second position=P2D; $\beta=\beta 4$; the third position=P3D; $\theta=\theta 4$; the fourth position=P4D; and $\phi=\phi 4$.

Figure 56:
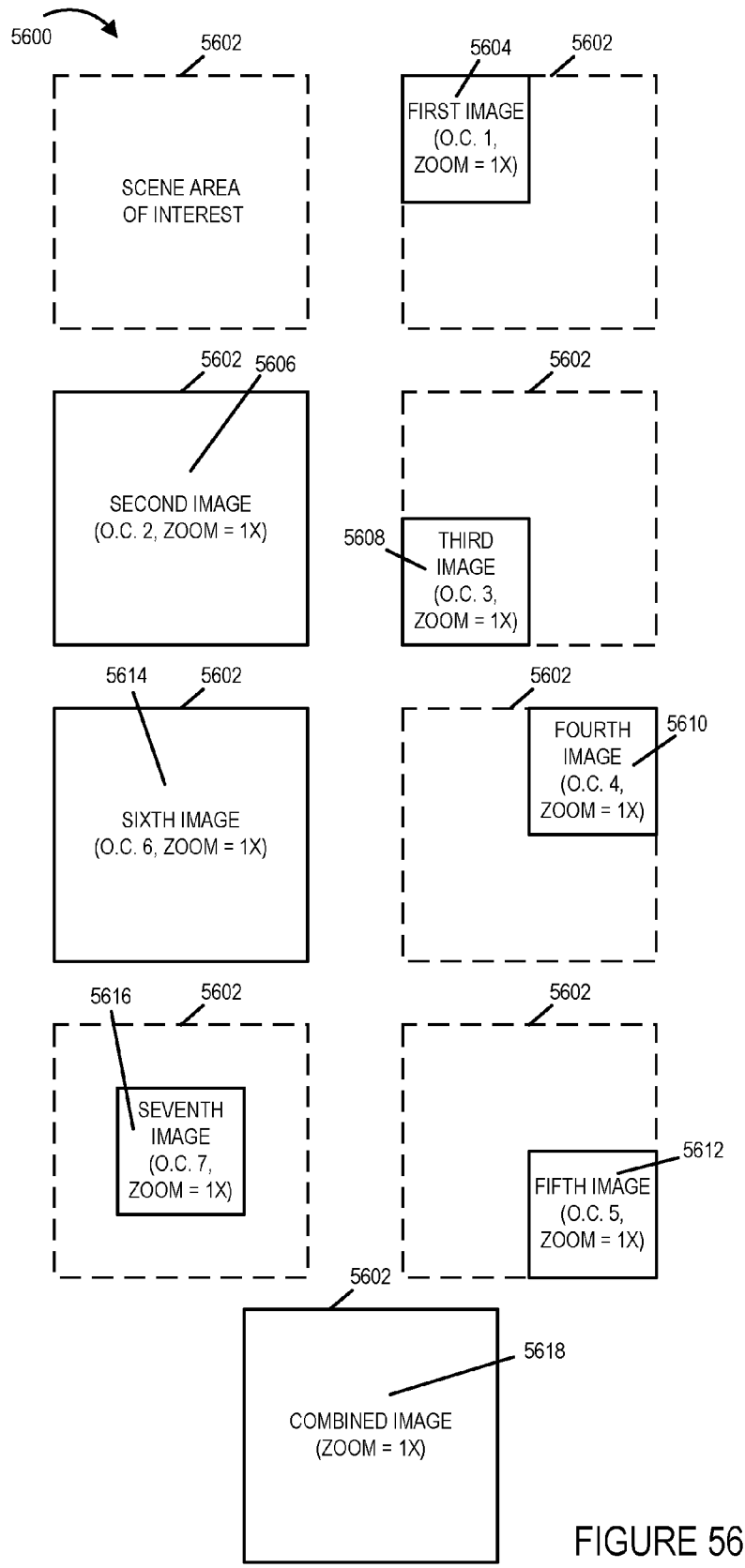
FIG. 56 is a drawing illustrating an example in which a combined image is generated from captured images from multiple optical chains, corresponding to a zoom setting of 1×, in accordance with an exemplary embodiment.

FIG. 56 is a drawing 5600 illustrating an example in which a combined image is generated from captured images from multiple optical chains, corresponding to a zoom setting of 1×, in accordance with an exemplary embodiment. For example, camera device 5200 of FIG. 52 or camera device 5300 of FIG. 53 uses stored zoom light setting to light redirection device position mapping table 5500 of FIG. 55 and implement a method in accordance with flowchart 5100 of FIG. 51, to position moveable light redirection devices in accordance with the zoom setting of 1×, capturing images (5604, 5606, 5608, 5610, 5612, 5614, 5616) from optical chains, and generating combined image 5618. Area 5602 represents a scene area of interest. First image 5604 is of a first portion of the scene of interest 5602, and is captured using the first optical chain, with the moveable light redirection device of the first optical chain set so that variable first position=value P1A, and variable α=value α1, which corresponds to the 1× zoom setting for the first optical chain, as listed in table 5500. Second image 5606 is of a second portion of the scene of interest 5602, and is captured using the second optical chain. Third image 5608 is of a third portion of the scene of interest 5602, and is captured using the third optical chain, with the moveable light redirection device of the third optical chain set so that variable second position=value P2A, and variable β=value β1, which corresponds to the 1× zoom setting for the third optical chain, as listed in table 5500. Fourth image 5610 is of a fourth portion of the scene of interest 5602, and is captured using the fourth optical chain, with the moveable light redirection device of the fourth optical chain set so that variable third position=value P3A, and variable θ=value θ1, which corresponds to the 1× zoom setting for the fourth optical chain, as listed in table 5500. Fifth image 5612 is of a fifth portion of the scene of interest 5602, and is captured using the fifth optical chain, with the moveable light redirection device of the fifth optical chain set so that variable fourth position=value P4A, and variable φ=value φ1, which corresponds to the 1× zoom setting for the fifth optical chain, as listed in table 5500. Sixth image 5614 is of a sixth portion of the scene of interest 5602, and is captured using the sixth optical chain. Seventh image 5616 is of a seventh portion of the scene of interest 5602, and is captured using the seventh optical chain.

The first image 5604 is of a first portion of the scene of interest 5602 which corresponds to the upper left corner of the scene of interest. The second image 5606 is of a second portion of the scene of interest 5602 which corresponds to the entire area of the scene of interest or substantially the entire area of the scene of interest. The third image 5608 is of a third portion of the scene of interest 5602 which corresponds to the lower left corner of the scene of interest. The fourth image 5610 is of a fourth portion of the scene of interest 5602 which corresponds to the upper right corner of the scene of interest. The fifth image 5612 is of a fifth portion of the scene of interest 5602 which corresponds to the lower right corner of the scene of interest. The sixth image 5614 is of a sixth portion of the scene of interest 5602 which corresponds to the entire area of the scene of interest or substantially the entire area of the scene of interest. The seventh image 5616 is of a seventh portion of the scene of interest 5602 which corresponds to a center area of the scene of interest.

The combined image 5618, for the 1× setting, is generated by combining the captured images (5604, 5606, 5608, 5610, 5612, 5614, 5616) to generate composite image 5618, which corresponds to the entire area of the scene or interest 5602 or substantially the entire area of the scene of interest 5602. Note that the area of the center of the combined image 5618 is generated using information from more captured images, than the area near the outside of the combined image 5618.

Figure 57:
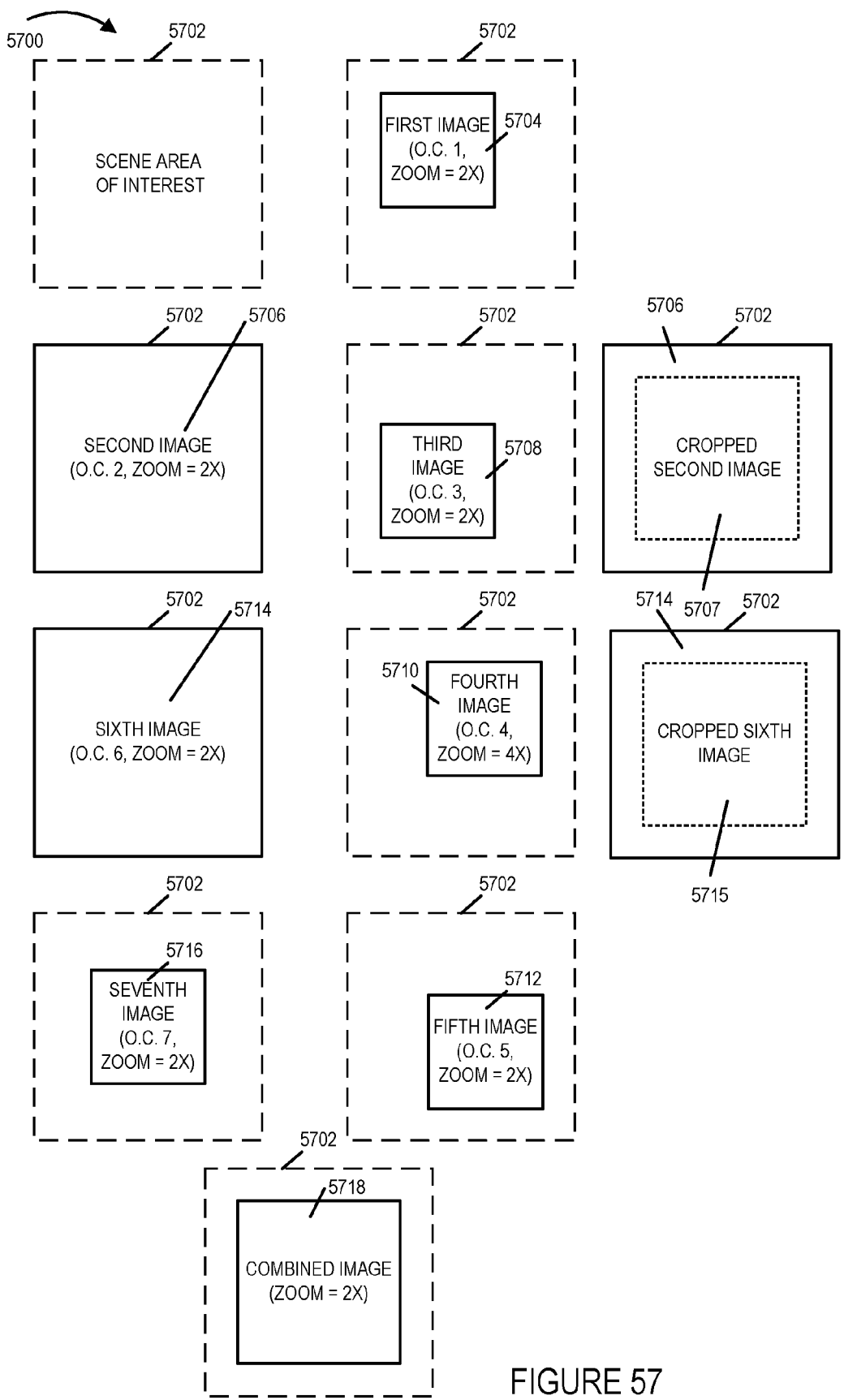
FIG. 57 is a drawing illustrating an example in which a combined image is generated from captured images from multiple optical chains, corresponding to a zoom setting of 2×, in accordance with an exemplary embodiment.

FIG. 57 is a drawing 5700 illustrating an example in which a combined image is generated from captured images from multiple optical chains, corresponding to a zoom setting of 2×, in accordance with an exemplary embodiment. For example, camera device 5200 of FIG. 52 or camera device 5300 of FIG. 53 uses stored zoom light setting to light redirection device position mapping table 5500 of FIG. 55 and implement a method in accordance with flowchart 5100 of FIG. 51, to position moveable light redirection devices in accordance with the zoom setting of 2×, capturing images (5704, 5706, 5708, 5710, 5712, 5714, 5716) from optical chains, and generating combined image 5718. Area 5702 represents a scene area of interest. First image 5704 is of a first portion of the scene of interest 5702, and is captured using the first optical chain, with the moveable light redirection device of the first optical chain set so that variable first position=value P1B, and variable α=value α2, which corresponds to the 2× zoom setting for the first optical chain, as listed in table 5500. Second image 5706 is of a second portion of the scene of interest 5702, and is captured using the second optical chain. Third image 5708 is of a third portion of the scene of interest 5702, and is captured using the third optical chain, with the moveable light redirection device of the third optical chain set so that variable second position=value P2B, and variable β=value β2, which corresponds to the 2× zoom setting for the third optical chain, as listed in table 5500. Fourth image 5710 is of a fourth portion of the scene of interest 5702, and is captured using the fourth optical chain, with the moveable light redirection device of the fourth optical chain set so that variable third position=value P3B, and variable θ=value θ2, which corresponds to the 2× zoom setting for the fourth optical chain, as listed in table 5500. Fifth image 5712 is of a fifth portion of the scene of interest 5702, and is captured using the fifth optical chain, with the moveable light redirection device of the fifth optical chain set so that variable fourth position=value P4B, and variable φ=value φ2, which corresponds to the 2× zoom setting for the fifth optical chain, as listed in table 5500. Sixth image 5714 is of a sixth portion of the scene of interest 5702, and is captured using the sixth optical chain. Seventh image 5716 is of a seventh portion of the scene of interest 5702, and is captured using the seventh optical chain.

The first image 5704 is of a first portion of the scene of interest 5702 which corresponds to an area in the upper left area of the scene of interest, centered along a diagonal extending from the center of the scene of interest to the upper left corner of the scene of interest. The second image 5706 is of a second portion of the scene of interest 5702 which corresponds to the entire area of the scene of interest or substantially the entire area of the scene of interest. The third image 5708 is of a third portion of the scene of interest 5702 which corresponds to the lower left area of the scene of interest, centered along a diagonal extending from the center of the scene of interest to the lower left corner of the scene of interest. The fourth image 5710 is of a fourth portion of the scene of interest 5702 which corresponds to the upper right area of the scene of interest, centered along a diagonal extending from the center of the scene of interest to the upper right corner of the scene of interest. The fifth image 5712 is of a fifth portion of the scene of interest 5702 which corresponds to the lower right area of the scene of interest, centered along a diagonal extending from the center of the scene of interest to the lower right corner of the scene of interest. The sixth image 5714 is of a sixth portion of the scene of interest 5702 which corresponds to the entire area of the scene of interest or substantially the entire area of the scene of interest. The seventh image 5716 is of a seventh portion of the scene of interest 5702 which corresponds to a center area of the scene of interest.

The combined image 5718, for the 2× zoom setting, is generated by combining information from the captured images (5704, 5706, 5708, 5710, 5712, 5714, 5716), e.g., overlapping areas within the captured images, which are within the area of composite image 5718 boundaries are used, to generate composite image 5718, which corresponds to an area which is one half or approximately one half the area of the scene of interest, and which is centered at the center of the scene of interest. Note that combined image 5718 is generated from first image 5704, cropped second image 5707, third image 5708, fourth image 5710, fifth image 5712, cropped sixth image 5715, and seventh image 5716. Note that the area of the center of the combined image 5718 is generated using information from more captured images, than the area near the outside of the combined image 5718.

Figure 58:
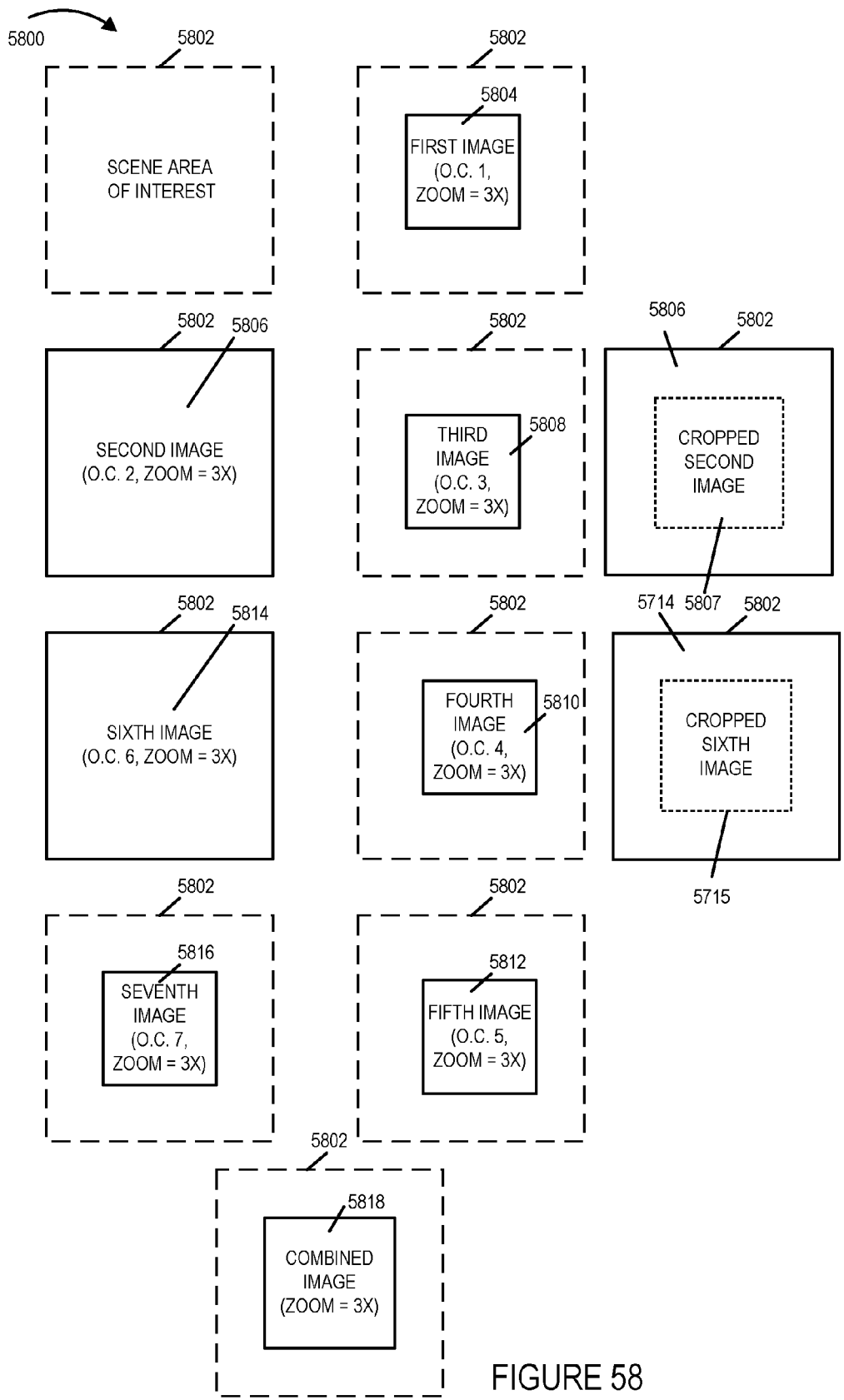
FIG. 58 is a drawing illustrating an example in which a combined image is generated from captured images from multiple optical chains, corresponding to a zoom setting of 3×, in accordance with an exemplary embodiment.

FIG. 58 is a drawing 5800 illustrating an example in which a combined image is generated from captured images from multiple optical chains, corresponding to a zoom setting of 3×, in accordance with an exemplary embodiment. For example, camera device 5200 of FIG. 52 or camera device 5300 of FIG. 53 uses stored zoom light setting to light redirection device position mapping table 5500 of FIG. 55 and implement a method in accordance with flowchart 5100 of FIG. 51, to position moveable light redirection devices in accordance with the zoom setting of 3×, capturing images (5804, 5806, 5808, 5810, 5812, 5814, 5816) from optical chains, and generating combined image 5818. Area 5802 represents a scene area of interest. First image 5804 is of a first portion of the scene of interest 5802, and is captured using the first optical chain, with the moveable light redirection device of the first optical chain set so that variable first position=value P1C, and variable α=value α3, which corresponds to the 3× zoom setting for the first optical chain, as listed in table 5500. Second image 5806 is of a second portion of the scene of interest 5802, and is captured using the second optical chain. Third image 5808 is of a third portion of the scene of interest 5802, and is captured using the third optical chain, with the moveable light redirection device of the third optical chain set so that variable second position=value P2C, and variable β=value β3, which corresponds to the 3× zoom setting for the third optical chain, as listed in table 5500. Fourth image 5810 is of a fourth portion of the scene of interest 5802, and is captured using the fourth optical chain, with the moveable light redirection device of the fourth optical chain set so that variable third position=value P3C, and variable θ=value θ3, which corresponds to the 3× zoom setting for the fourth optical chain, as listed in table 5500. Fifth image 5812 is of a fifth portion of the scene of interest 5802, and is captured using the fifth optical chain, with the moveable light redirection device of the fifth optical chain set so that variable fourth position=value P4C, and variable φ=value φ3, which corresponds to the 3× zoom setting for the fifth optical chain, as listed in table 5500. Sixth image 5814 is of a sixth portion of the scene of interest 5802, and is captured using the sixth optical chain. Seventh image 5816 is of a seventh portion of the scene of interest 5802, and is captured using the seventh optical chain.

The first image 5804 is of a first portion of the scene of interest 5802 which corresponds to an area in the upper left area of the scene of interest, centered along a diagonal extending from the center of the scene of interest to the upper left corner of the scene of interest. The second image 5806 is of a second portion of the scene of interest 5802 which corresponds to the entire area of the scene of interest or substantially the entire area of the scene of interest. The third image 5808 is of a third portion of the scene of interest 5802 which corresponds to the lower left area of the scene of interest, centered along a diagonal extending from the center of the scene of interest to the lower left corner of the scene of interest. The fourth image 5810 is of a fourth portion of the scene of interest 5802 which corresponds to the upper right area of the scene of interest, centered along a diagonal extending from the center of the scene of interest to the upper right corner of the scene of interest. The fifth image 5812 is of a fifth portion of the scene of interest 5802 which corresponds to the lower right area of the scene of interest, centered along a diagonal extending from the center of the scene of interest to the lower right corner of the scene of interest. The sixth image 5814 is of a sixth portion of the scene of interest 5802 which corresponds to the entire area of the scene of interest or substantially the entire area of the scene of interest. The seventh image 5816 is of a seventh portion of the scene of interest 5802 which corresponds to a center area of the scene of interest.

The combined image 5818, for the 3× zoom setting, is generated by combining information from the captured images (5804, 5806, 5808, 5810, 5812, 5814, 5816,), e.g., overlapping areas within the captured images, which are within the area of combined image 5718 boundaries are used, to generate composite image 5818, which corresponds to an area which is one third or approximately one third the area of the scene of interest, and which is centered at the center of the scene of interest. Note that combined image 5818 is generated from first image 5804, cropped second image 5807, third image 5808, fourth image 5810, fifth image 5812, cropped sixth image 5815, and seventh image 5816. Note that the area of the center of the combined image 5818 is generated using information from more captured images, than the area near the outside of the combined image 5818.

Figure 59:
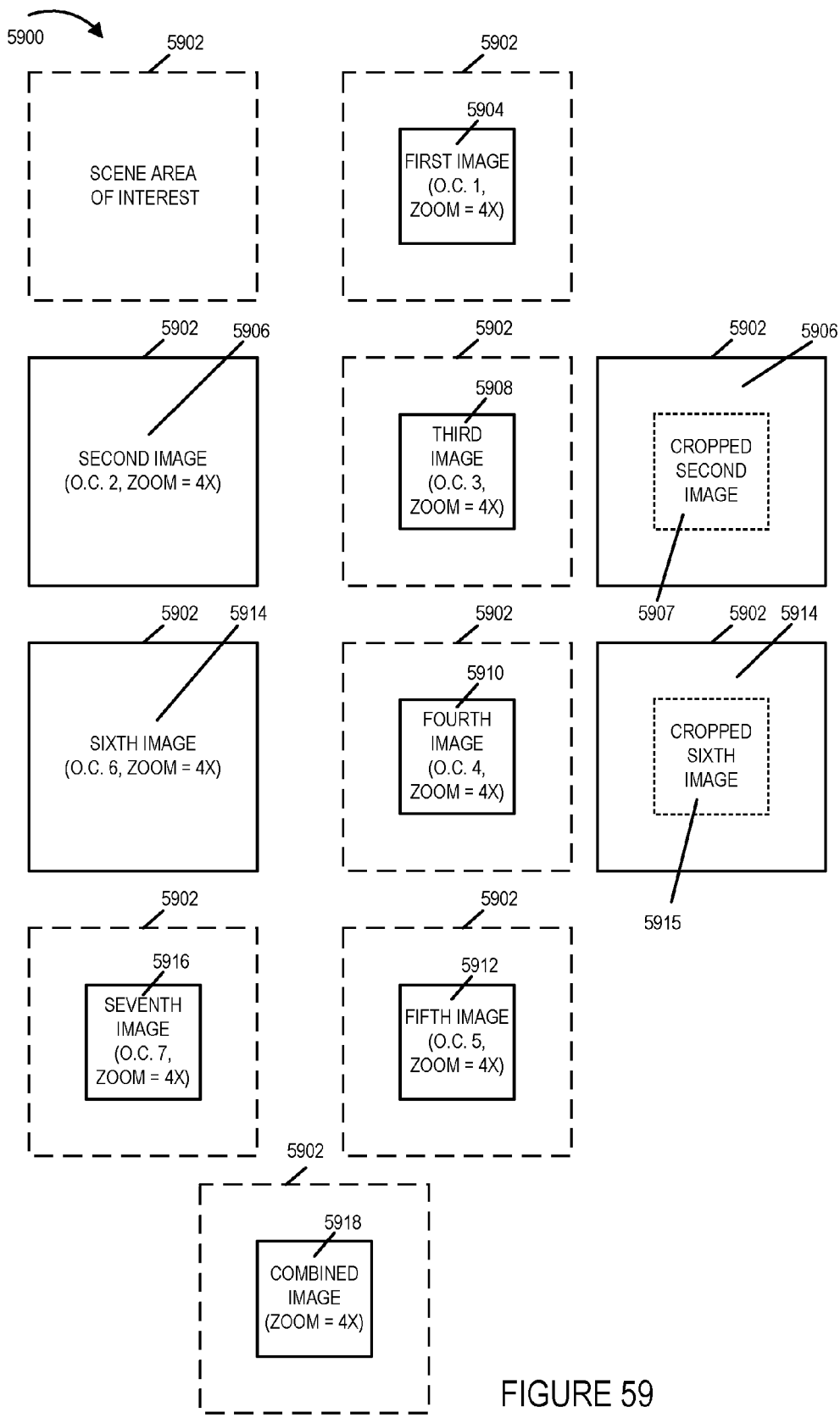
FIG. 59 is a drawing illustrating an example in which a combined image is generated from captured images from multiple optical chains, corresponding to a zoom setting of 4×, in accordance with an exemplary embodiment.
Figure 60A:
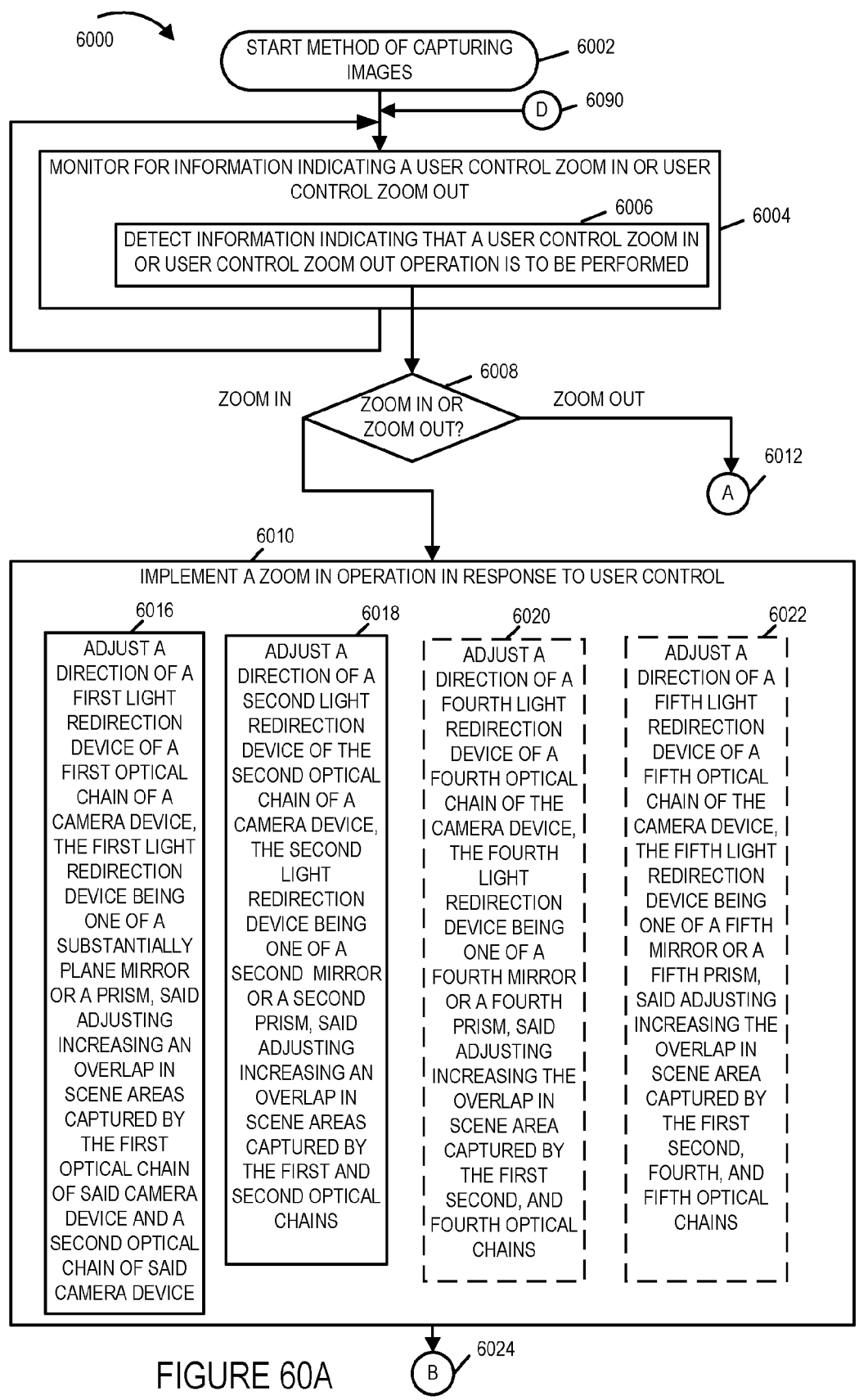
FIG. 60A is a first part of a flowchart of an exemplary method of capturing images in accordance with an exemplary embodiment.
Figure 60B:
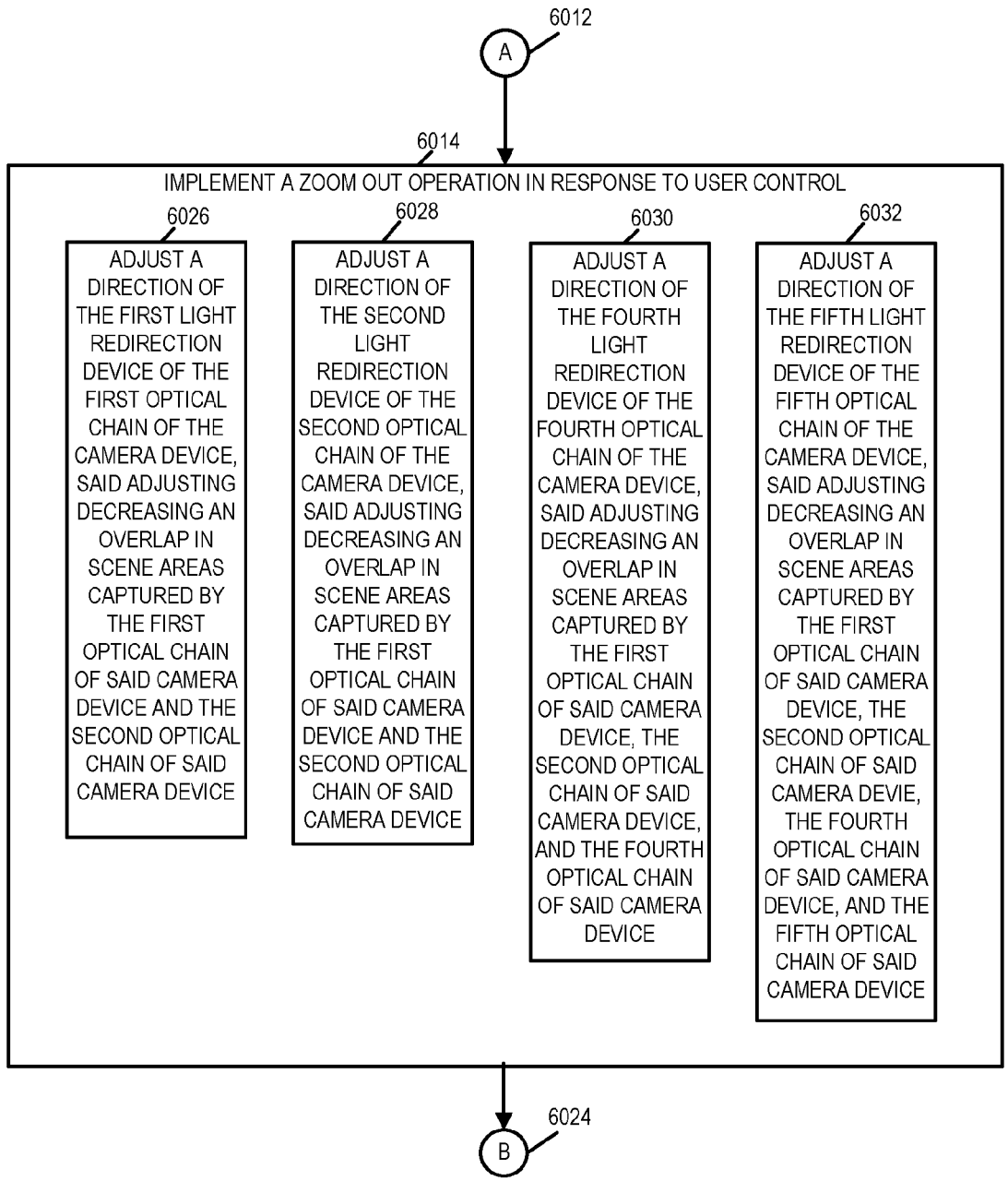
FIG. 60B is a second part of a flowchart of an exemplary method of capturing images in accordance with an exemplary embodiment.
Figure 60C:
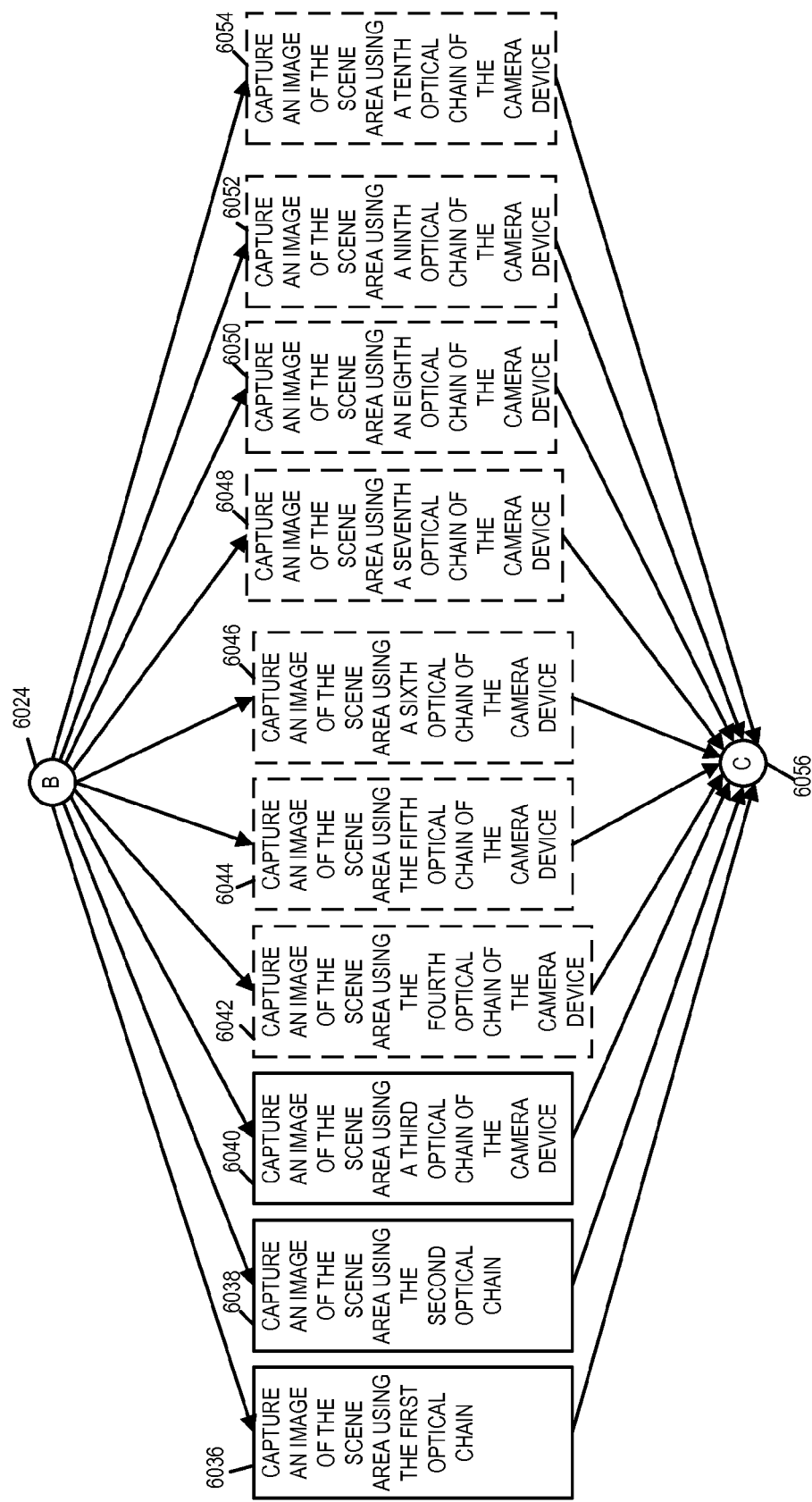
FIG. 60C is a third part of a flowchart of an exemplary method of capturing images in accordance with an exemplary embodiment.
Figure 60D:
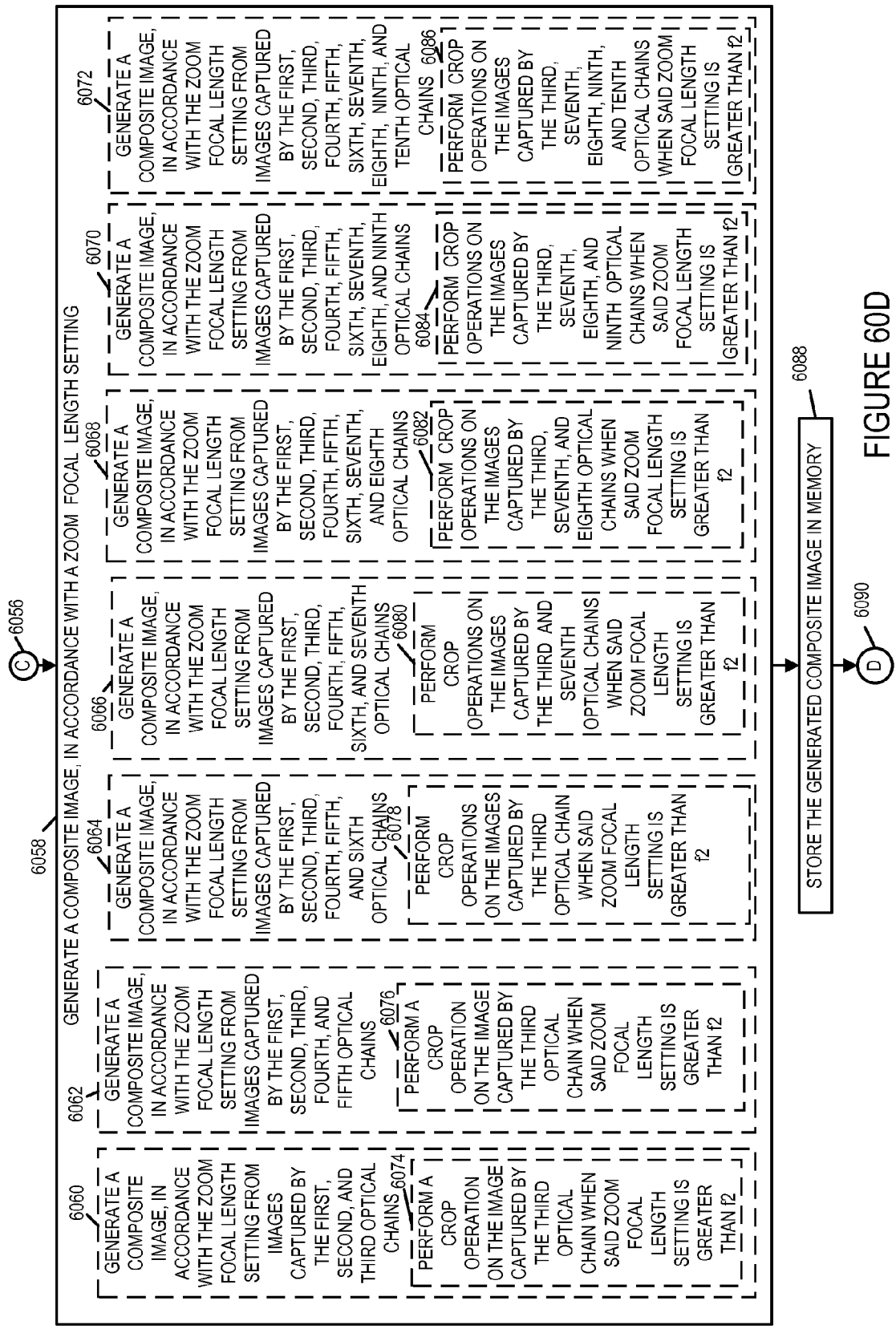
FIG. 60D is a fourth part of a flowchart of an exemplary method of capturing images in accordance with an exemplary embodiment.

FIG. 59 is a drawing 5900 illustrating an example in which a combined image is generated from captured images from multiple optical chains, corresponding to a zoom setting of 4×, in accordance with an exemplary embodiment. For example, camera device 5200 of FIG. 52 or camera device 5300 of FIG. 53 uses stored zoom light setting to light redirection device position mapping table 5500 of FIG. 55 and implement a method in accordance with flowchart 5100 of FIG. 51, to position moveable light redirection devices in accordance with the zoom setting of 4×, capturing images (5904, 5906, 5908, 5910, 5912, 5914, 5916) from optical chains, and generating combined image 5918. Area 5902 represents a scene area of interest. First image 5904 is of a first portion of the scene of interest 5902, and is captured using the first optical chain, with the moveable light redirection device of the first optical chain set so that variable first position=value P1D, and variable α=value α4, which corresponds to the 4× zoom setting for the first optical chain, as listed in table 5500. Second image 5906 is of a second portion of the scene of interest 5902, and is captured using the second optical chain. Third image 5908 is of a third portion of the scene of interest 5902, and is captured using the third optical chain, with the moveable light redirection device of the third optical chain set so that variable second position=value P2D, and variable β=value β4, which corresponds to the 4× zoom setting for the third optical chain, as listed in table 5500. Fourth image 5910 is of a fourth portion of the scene of interest 5902, and is captured using the fourth optical chain, with the moveable light redirection device of the fourth optical chain set so that variable third position=value P3D, and variable θ=value θ4, which corresponds to the 4× zoom setting for the fourth optical chain, as listed in table 5500. Fifth image 5912 is of a fifth portion of the scene of interest 5902, and is captured using the fifth optical chain, with the moveable light redirection device of the fifth optical chain set so that variable fourth position=value P4D, and variable φ=value φ4, which corresponds to the 4× zoom setting for the fifth optical chain, as listed in table 5500. Sixth image 5914 is of a sixth portion of the scene of interest 5902, and is captured using the sixth optical chain. Seventh image 5916 is of a seventh portion of the scene of interest 5902, and is captured using the seventh optical chain.

The first image 5904 is of a first portion of the scene of interest 5902 which corresponds to a center area of the scene of interest. The second image 5906 is of a second portion of the scene of interest 5902 which corresponds to the entire area of the scene of interest or substantially the entire area of the scene of interest. The third image 5908 is of a third portion of the scene of interest 5902 which corresponds a center area of the scene of interest. The fourth image 5910 is of a fourth portion of the scene of interest 5902 which corresponds to a center area of the scene of interest. The fifth image 5912 is of a fifth portion of the scene of interest 5902 which corresponds to a center area of the scene of interest. The sixth image 5914 is of a sixth portion of the scene of interest 5902 which corresponds to the entire area of the scene of interest or substantially the entire area of the scene of interest. The seventh image 5916 is of a seventh portion of the scene of interest 5902 which corresponds to a center area of the scene of interest.

The combined image 5918, for the 4× zoom setting, is generated by combining information from the captured images (5904, 5906, 5908, 5910, 5912, 5914, 5916), e.g., overlapping areas within the captured images, to generate composite image 5918, which corresponds to an area which is one fourth or approximately one fourth the area of the scene of interest, and which is centered at the center of the scene of interest. Note that combined image 5918 is generated from first image 5904, cropped second image 5907, third image 5908, fourth image 5910, fifth image 5912, cropped sixth image 5915, and seventh image 5916.

FIG. 60, comprising the combination of FIG. 60A, FIG. 60B, FIG. 60C and FIG. 60D, is a flowchart 6000 of an exemplary method of capturing images in accordance with an exemplary embodiment. The exemplary method of flowchart 6000 may be performed by a camera device including multiple optical chains or by a camera device including multiple optical chains and an image processing device. In some embodiments, the camera device is one of: a smart phone and a camera. In some embodiments, the image processing device is a personal computer.

Operation of the exemplary method starts in step 6002 and proceeds to step 6004. In step 6004 the camera device monitors for information indicating a user control zoom in or user control zoom out. Step 6004 is being performed on an ongoing basis. Step 6004 may, and sometimes does, include step 6006 in which the camera device detects information indicating that a user control zoom in or user control zoom out operation is to be performed. Operation proceeds from step 6006 to step 6008. If the detection is for user control zoom in, then operation proceeds from step 6008 to step 6010; however, if the detection is for user control zoom out, then operation proceeds from step 6008, via connecting node 6012 to step 6014.

Returning to step 6010, in step 6010 the camera device implements a zoom in operation in response to user control. Step 6010 includes steps 6016 and step 6018. In some embodiments, step 6010 further includes one or both of steps 6020 and 6022. In step 6016 the camera device adjusts a direction of a first light redirection device of a first optical chain of the camera device, the first light redirection device being one of a substantially plane mirror or a prism, said adjusting increasing an overlap in scene areas captured by the first optical chain of said camera device and a second optical chain of said camera device. In some embodiments, the substantially plane mirror is a plane mirror.

In step 6018, the camera devices adjusts a direction of a second light redirection device of the second optical chain of the camera device, the second light redirection device being one of a mirror or a prism, said adjusting increasing an overlap in scene areas captured by the first and second optical chains. In step 6020, the camera devices adjusts a direction of a fourth light redirection device of a fourth optical chain of the camera device, the fourth light redirection device being one of a mirror or a prism, said adjusting increasing an overlap in scene areas captured by the first, second, and fourth optical chains. In step 6022, the camera device adjusts a direction of a fifth light redirection device of a fifth optical chain of the camera device, the fifth light redirection device being one of a mirror or a prism, said adjusting increasing an overlap in scene areas captured by the first, second, fourth, and fifth optical chains.

Returning to step 6014, in step 6014 the camera device implements a zoom out operation in response to user control. Step 6014 includes steps 6026 and step 6028. In some embodiments, step 6014 further includes one or both of steps 6030 and 6032. In step 6026 the camera device adjusts a direction of the first light redirection device of the first optical chain of the camera device, said adjusting decreasing an overlap in scene areas captured by the first optical chain of said camera device and a second optical chain of said camera device.

In step 6028, the camera device adjusts a direction of the second light redirection device of the second optical chain of the camera device, said adjusting decreasing an overlap in scene areas captured by the first and second optical chains. In step 6030, the camera device adjusts a direction of the fourth light redirection device of the fourth optical chain of the camera device, said adjusting decreasing an overlap in scene areas captured by the first, second, and fourth optical chains. In step 6032, the camera device adjusts a direction of the fifth light redirection device of the fifth optical chain of the camera device said adjusting decreasing an overlap in scene areas captured by the first, second, fourth, and fifth optical chains.

Operation proceeds from step 6010 or step 6014, via connecting node B 6024, to step 6036, 6038, and 6040. In some embodiments, operation also proceeds, via connecting node B 6024 to one or more or all of steps 6042, 6044, 6046, 6048, 6050, 6052, and 6054.

In step 6036 the camera device captures an image of the scene area using the first optical chain. In step 6038 the camera device captures an image of the scene area using the second optical chain. In step 6040 the camera device captures an image of the scene area using a third optical chain. In step 6042 the camera device captures an image of the scene area using the fourth optical chain. In step 6044 the camera device captures an image of the scene area using the fifth optical chain. In step 6046 the camera device captures an image of the scene area using a sixth optical chain. In step 6048 the camera device captures an image of the scene area using a seventh optical chain. In step 6050 the camera device captures an image of the scene area using an eighth optical chain. In step 6052 the camera device captures an image of the scene area using a ninth optical chain. In step 6054 the camera device captures an image of the scene area using a tenth optical chain.

Operation proceeds from steps 6036, 6038, 6040, 6042, 6044, 6046, 6048, 6050, 6052 and 6054, via connecting node C 6056 to step 6058. In step 6058 a composite image is generated in accordance with a zoom focal length setting. Step 6058 includes one or more or all of steps 6060, 6062,

6064, 6066, 6068, 6070, and 6072. In some embodiments, step 6058 includes one of steps 6060, 6062, 6064, 6066, 6068, 6070, and 6072.

In step 6060 a composite image is generated, in accordance with the zoom setting from images captured by the first second and third optical chains. In some such embodiments, step 6060 includes step 6074, in which a crop operation is performed on the image captured by the third optical chain when the zoom focal length setting is greater than f2.

In step 6062 a composite image is generated, in accordance with the zoom setting from images captured by the first, second, third, fourth, and fifth optical chains. In some such embodiments, step 6062 includes step 6076, in which a crop operation is performed on the image captured by the third optical chain when the zoom focal length setting is greater than f2.

In step 6064 a composite image is generated, in accordance with the zoom setting from images captured by the first, second, third, fourth, fifth, and sixth optical chains. In some such embodiments, step 6064 includes step 6078, in which crop operations are performed on the images captured by the third optical chain when the zoom focal length setting is greater than f2.

In step 6066 a composite image is generated, in accordance with the zoom setting from images captured by the first, second, third, fourth, fifth, sixth, and seventh optical chains. In some such embodiments, step 6066 includes step 6080, in which crop operations are performed on the images captured by the third and seventh optical chains when the zoom focal length setting is greater than f2.

In step 6068 a composite image is generated, in accordance with the zoom setting from images captured by the first, second, third, fourth, fifth, sixth, seventh, and eighth optical chains. In some such embodiments, step 6068 includes step 6082, in which crop operations are performed on the images captured by the third, seventh and eighth optical chains when the zoom focal length setting is greater than f2.

In step 6070 a composite image is generated, in accordance with the zoom setting from images captured by the first, second, third, fourth, fifth, sixth, seventh, eighth, and ninth optical chains. In some such embodiments, step 6070 includes step 6084, in which crop operations are performed on the images captured by the third, seventh, eighth and ninth optical chains when the zoom focal length setting is greater than f2.

In step 6072 a composite image is generated, in accordance with the zoom setting from images captured by the first, second, third, fourth, fifth, sixth, seventh, eighth, ninth, and tenth optical chains. In some such embodiments, step 6072 includes step 6086, in which crop operations are performed on the images captured by the third, seventh, eighth, ninth and tenth optical chains when the zoom focal length setting is greater than f2.

Operation proceeds from step 6058 to step 6088, in which the generated composite image is stored in memory. In some embodiments, step 6058 and 6088 are performed by the camera device which captured the images. In other embodiments, steps 6058 and 6088 are performed by an image processing device, e.g., a personal computer which received the captured images from the plurality of optical chains.

Operation proceeds from step 6088, via connecting node D 6090 to step 6004.

In some embodiments, one or more or all of the optical chains corresponding to focal length f2 do not need and do not include a mirror, since f2 is a small focal length and the optical chain captures a large area, and cropping is used to the extent necessary, based on the user selected zoom setting.

In various embodiments, f1>f2. In some such embodiments, f1=2f2. In various embodiments, maximum zoom in corresponds to user selected zoom focal length setting=f1 with cropping for the f2 focal length chains.

In some embodiments, at maximum zoom in, overlap is total, with regard to the various chains used to generate the composite image. In some embodiments, at maximum zoom in, the moveable mirrors, e.g., of first, second fourth and fifth optical chains, are each set at a 45 degree angle with respect the respective sensor of its optical chain.

In various embodiments, at maximum zoom out, the overlap is minimal between the chains with moveable light redirection devices, and the mirror angles of the moveable mirrors of the individual optical chains will depend on camera configuration.

In some embodiments, between maximum zoom in and maximum zoom out, the cropping of images captured by the f2 modules is implemented and the amount of cropping is a function of the user selected zoom setting. In various embodiments, there is maximum cropping for a user selected zoom setting=f1, and there is no cropping for a user selected zoom setting=f2.

Figure 61:
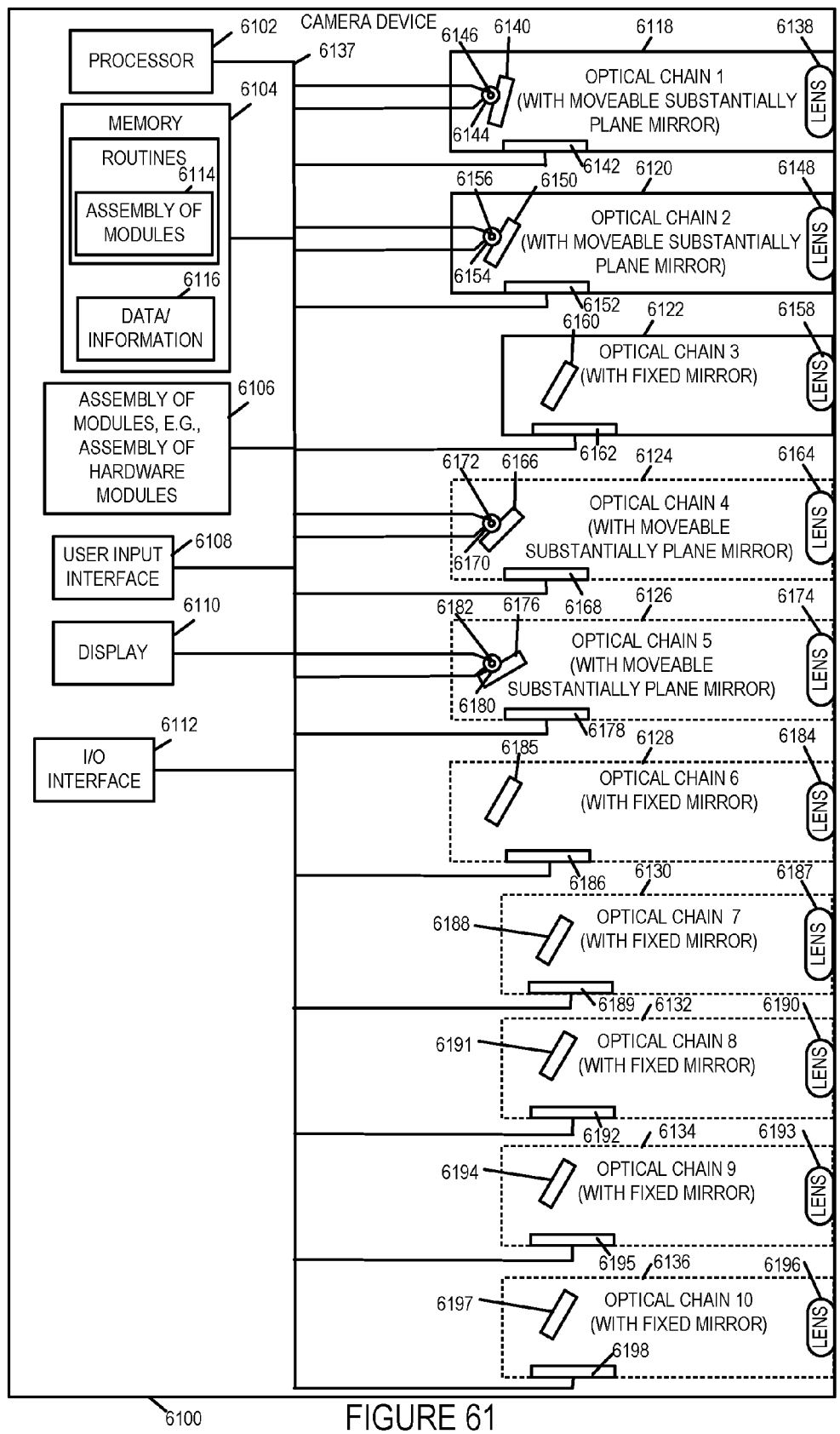
FIG. 61 is a drawing of an exemplary camera device including a plurality of optical chains with moveable light redirection devices in accordance with an exemplary embodiment.

FIG. 61 is a drawing of an exemplary camera device 6100 in accordance with various exemplary embodiments. Camera device 6100 includes a processor 6102, e.g., a CPU, memory 6104, an assembly of modules 6106, e.g., an assembly of hardware modules such as circuits, a user input interface 6108, a display 6110, an I/O interface 6112, and a plurality of optical chains (optical chain 1 6118, optical chain 2 6120, optical chain 3 6122, optical chain 4 6124, optical chain 5 6126, optical chain 6 6128, optical chain 7 6130, optical chain 8 6132, optical chain 9 6134, optical chain 10 6136) coupled together via a bus 6137 over which the various elements may interchange data and information. In some embodiments, optical chain 4 6124, optical chain 5 6126, optical chain 6 6128, optical chain 7 6130, optical chain 8 6132, optical chain 9 6134, and optical chain 10 6136 are optional. Display 6110, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera 6100. User input interface 6108 includes, e.g., switches, buttons, touch screen interface, etc. for receiving input from the user. Received user input includes input indicating a user controlled zoom in or a user controlled zoom out. I/O interface 6112 includes a plurality of communications ports for communicating with other devices, e.g., a personal computer. I/O interface 6112 in some embodiments, includes one or more wireless communications interfaces. Information communicated over I/O interface 6112 includes, e.g., combined images generated from captured images from multiple optical chains, and/or captured images from individual optical chains to be processed and/or combined externally, e.g., in a personal computer.

Memory 6104 includes assembly of modules 6114 and data/information 6116. Data/information 6116, in some embodiments, includes stored information used to determine a light redirection device position of an optical chain including moveable light redirection as a function of user zoom in and or user zoom out information, e.g. scale factors and/or calibration information, for multiple optical chains with moveable light redirection devices. Data information 6116, in some embodiments, further includes stored information used to determine an amount of cropping to be performed on an image captured from an optical chain corresponding to zoom setting, e.g., for one or more optical chains in which light redirection devices are not moved as a function of zoom setting.

Optical chain 1 6118 includes a lens 6138, e.g., an outer lens, a moveable substantially plane mirror 6140, and an image sensor 6142. In some embodiments, the substantially plane mirror is a plane mirror. In various embodiments, the moveable mirror 6140 includes a hinge mount. Optical chain 1 6118 further includes a mirror movement module 6144, e.g., a drive motor and corresponding drive circuitry, and a mirror position detection module 6146, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 6142 is used to capture an image. Light passes through lens 6138 before reaching mirror 6140. Mirror 6140, which is a light redirection device, directs the light which has passed through lens 6138 onto the image sensor 6142.

Optical chain 2 6120 includes a lens 6148, e.g., an outer lens, a moveable substantially plane mirror 6150, and an image sensor 6152. In some embodiments, the substantially plane mirror is a plane mirror. In various embodiments, the moveable mirror 6150 includes a hinge mount. Optical chain 2 6120 further includes a mirror movement module 6154, e.g., a drive motor and corresponding drive circuitry, and a mirror position detection module 6156, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 6152 is used to capture a an image. Light passes through lens 6148 before reaching mirror 6150. Mirror 6150, which is a light redirection device, directs the light which has passed through lens 6148 onto the image sensor 6152.

Optical chain 3 6122 includes a lens 6158, e.g., an outer lens, a fixed mirror 6160, e.g., a substantially plane fixed mirror, and an image sensor 6162. In some embodiments, the substantially plane fixed mirror is a fixed plane mirror. Image sensor 6162 is used to capture a image. Light passes through lens 6122 before reaching mirror 6160. Mirror 6160, which is a light redirection device, directs the light which has passed through lens 6158 onto the image sensor 6162.

Optical chain 4 6124 includes a lens 6164, e.g., an outer lens, a moveable substantially plane mirror 6166, and an image sensor 6168. In some embodiments, the substantially plane mirror is a plane mirror. In various embodiments, the moveable mirror 6166 includes a hinge mount. Optical chain 4 6124 further includes a mirror movement module 6170, e.g., a drive motor and corresponding drive circuitry, and a mirror position detection module 6172, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 6168 is used to capture an image. Light passes through lens 6164 before reaching mirror 6166. Mirror 6166, which is a light redirection device, directs the light which has passed through lens 6164 onto the image sensor 6168.

Optical chain 5 6126 includes a lens 6174, e.g., an outer lens, a moveable substantially plane mirror 6176, and an image sensor 6178. In some embodiments, the substantially plane mirror is a plane mirror. In various embodiments, the moveable mirror 6176 includes a hinge mount. Optical chain 5 6126 further includes a mirror movement module 6180, e.g., a drive motor and corresponding drive circuitry, and a mirror position detection module 6182, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 6178 is used to capture a an image. Light passes through lens 6174 before reaching mirror 6176. Mirror 6176, which is a light redirection device, directs the light which has passed through lens 6174 onto the image sensor 6178.

Optical chain 6 6128 includes a lens 6184, e.g., an outer lens, a fixed mirror 6185, e.g., a substantially plane fixed mirror, and an image sensor 6186. In some embodiments, the substantially plane fixed mirror is a fixed plane mirror. Image sensor 6186 is used to capture a image. Light passes through lens 6184 before reaching mirror 6185. Mirror 6185, which is a light redirection device, directs the light which has passed through lens 6184 onto the image sensor 6186.

Optical chain 7 6130 includes a lens 6187, e.g., an outer lens, a fixed mirror 6188, e.g., a substantially plane fixed mirror, and an image sensor 6189. In some embodiments, the substantially plane fixed mirror is a fixed plane mirror. Image sensor 6189 is used to capture a image. Light passes through lens 6187 before reaching mirror 6188. Mirror 6188, which is a light redirection device, directs the light which has passed through lens 6187 onto the image sensor 6189.

Optical chain 8 6132 includes a lens 6190, e.g., an outer lens, a fixed mirror 6191, e.g., a substantially plane fixed mirror, and an image sensor 6192. In some embodiments, the substantially plane fixed mirror is a fixed plane mirror. Image sensor 6192 is used to capture a image. Light passes through lens 6190 before reaching mirror 6191. Mirror 6191, which is a light redirection device, directs the light which has passed through lens 6190 onto the image sensor 6192.

Optical chain 9 6134 includes a lens 6193, e.g., an outer lens, a fixed mirror 6194, e.g., a substantially plane fixed mirror, and an image sensor 6195. In some embodiments, the substantially plane fixed mirror is a fixed plane mirror. Image sensor 6195 is used to capture a image. Light passes through lens 6193 before reaching mirror 6194. Mirror 6194, which is a light redirection device, directs the light which has passed through lens 6193 onto the image sensor 6195.

Optical chain 10 6136 includes a lens 6196, e.g., an outer lens, a fixed mirror 6197, e.g., a substantially plane fixed mirror, and an image sensor 6198. In some embodiments, the substantially plane fixed mirror is a fixed plane mirror. Image sensor 6198 is used to capture a image. Light passes through lens 6196 before reaching mirror 6197. Mirror 6197, which is a light redirection device, directs the light which has passed through lens 6196 onto the image sensor 6198.

In one exemplary embodiment optical chain 1 6118, optical chain 2 6120, optical chain 4 6124, optical chain 5 6126 and optical chain 6 6128 have a focal length=f1; optical chain 3 6122, optical chain 7 6130, optical chain 8 6132, optical chain 9 6134 and optical chain 10 6136 have a focal length=f2; and f1>f2.

In various embodiments, camera device 6100 includes a user selectable continuous zoom capability between zoom focal length setting of f2 and zoom focal length setting f1.

In some embodiments, the images captured by the optical chains in which the mirror does not move as a function of zoom setting (optical chain 3 6122, optical chain 6 6128, optical chain 7 6130, optical chain 8 6132, optical chain 9 6134, and optical chain 10 6136) are centered at substantially the same position irrespective of the zoom setting. In various embodiments, an image captured by an optical chain in which the mirror moves a function of zoom setting (optical chain 1 6118, optical chain 2 6120, optical chain 4 6124, optical chain 5 6126), captures an image which is centered as a function of the zoom settings. For example, the image captured by optical chain 1 6118 is located along a first diagonal between the center of the zoom image and a corner of the scene of interest, as a function of the zoom setting; the image captured by optical chain 2 6120 is located along a second diagonal between the center of the zoom image and a corner of the scene of interest, as a function of the zoom setting; the image captured by optical chain 4 6124 is located along a third diagonal between the center of the zoom image and a corner of the scene of interest, as a function of the zoom setting; and the image captured by optical chain 5 6126 is located along a second diagonal between the center of the zoom image and a corner of the scene of interest, as a function of the zoom setting.

In some embodiments, an optical chain with a fixed mirror (optical chain 3 6122, optical chain 6 6128, optical chain 7 6130, optical chain 8 6132, optical chain 9 6134, optical chain 10 6136) may be replaced by an optical chain with a moveable mirror, in which the mirror remains in a fixed position irrespective of the zoom setting.

In various embodiments, a different type of light redirection device is used instead of a mirror, e.g., a prism is used in place of a mirror in an optical chain. For example, a moveable prism is used in optical chain 1 6118 in place of moveable substantially plane mirror 6140. In some embodiments, different types of light redirection devices are used in different optical chains. For example, in one embodiment, a moveable substantially plane mirror is used in optical chain 1 6118, and a moveable prism is used in optical chain 2 6120.

In some embodiments, an optical chain corresponding to focal length f2 does not include a light redirection device and the image sensor of the optical chain is positioned to be able to capture light entering the lens of the optical chain without redirection via a light redirection device.

In some embodiments, one or more or all of the optical chains corresponding to focal length f2, e.g., optical chain 3 6122, optical chain 7 6130, optical chain 8 6132, optical chain 9 6134, and/or optical chain 10 6136, do not need and do not include a mirror, since f2 is a small focal length and the optical chain captures a large area, and cropping is used to the extent necessary, based on the user selected zoom setting.

In various embodiments, f1>f2. In some such embodiments, f1=2f2. In various embodiments, maximum zoom in corresponds to user selected zoom focal length setting=f1 with cropping for the f2 focal length chains.

In some embodiments, at maximum zoom in, overlap is total, with regard to the various chains used to generate the composite image. In some embodiments, at maximum zoom in, the moveable mirrors, e.g., mirrors (6140, 6150, 6166, 6176), are set at a 45 degree angle with respect the respective sensor (6142, 6152, 6168, 6178), of the chain (6118, 6120, 6124, 6126), respectively.

In various embodiments, at maximum zoom out, the overlap is minimal between the chains with moveable light redirection devices, and the mirror angles of the moveable mirrors of the individual optical chains will depend on camera configuration.

In some embodiments, between maximum zoom in and maximum zoom out, the cropping of images captured by the f2 modules, e.g. modules (6122, 6130, 6132, 6134, 6134, 6136) is implemented and the amount of cropping is a function of the user selected zoom setting. In various embodiments, there is maximum cropping for a user selected zoom setting=f1, and there is no cropping for a user selected zoom setting=f2.

In one exemplary embodiment, camera 6100 of FIG. 61 is camera 1250 of FIG. 12B, and optical chains (optical chain 1 6118, optical chain 2 6120, optical chain 3 6122, optical chain 4 6124, optical chain 5 6126, optical chain 6 6128, optical chain 7 6130, optical chain 8 6132, optical chain 9 6134, optical chain 10 6136) of FIG. 61 are optical chains (1210, 1212, 1224, 1202, 1220, 1216, 1208, 1214, 1204, 1218), respectively. In some embodiments, optical chains (1210, 1212, 1202, 1220, 1216) have a focal length of f1, and optical chains (1224, 1208, 1214, 1204, 1218) have a focal length of f2. In such embodiments, the mirrors of chains (1224, 1216, 1208, 1214, 1204, 1218), remained at a fixed position, irrespective of the zoom focal length setting, e.g., within the range of f2 to f1, while the mirrors of chains (1210, 1212, 1202, 1220), are controllably positioned as a function of the user selected focal length setting, e.g., within the range of f2 to f1.

Figure 62:
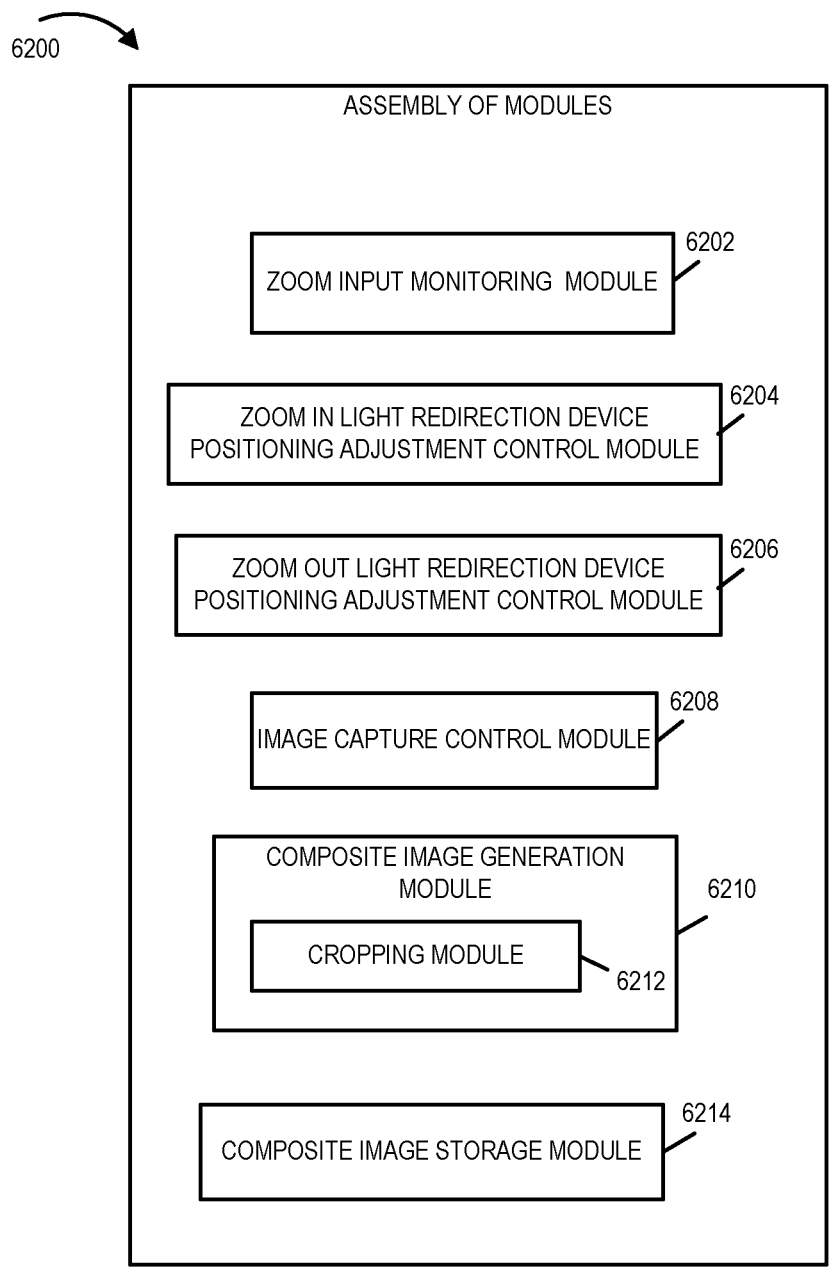
FIG. 62 is a drawing of an assembly of modules which may be included in an exemplary camera device in accordance with an exemplary embodiment.

FIG. 62 is a drawing of an assembly of modules 6200, which may be included in a camera device implemented in accordance with the present invention, e.g., camera 6100 of FIG. 61. Assembly of modules 6200 may implement steps of a method, e.g., steps of the method of flowchart 6000 of FIG. 60. In some embodiments, assembly of modules 6200 is an assembly of circuits, which may be coupled together. In one exemplary embodiment, assembly of modules 6200 is assembly of modules 6106 of camera 6100 of FIG. 61. In some embodiments, the assembly of module 6200 is an assembly of software modules. In one exemplary embodiment, assembly of modules 6200 is assembly of modules 6114 of memory 6104 of camera 6100 of FIG. 61.

FIG. 62 illustrates an assembly of modules 6200 which can, and in some embodiments is, used in the camera device 6100 illustrated in FIG. 61. The modules in the assembly of modules 6200 can, and in some embodiments are, implemented fully in hardware within the processor 6102, e.g., as individual circuits. The modules in the assembly of modules 6200 can, and in some embodiments are, implemented fully in hardware within the assembly of modules 6106, e.g., as individual circuits corresponding to the different modules. In other embodiments some of the modules are implemented, e.g., as circuits, within the processor 6102 with other modules being implemented, e.g., as circuits within assembly of modules 6106, external to and coupled to the processor. As should be appreciated the level of integration of modules on the processor and/or with some modules being external to the processor may be one of design choice.

Alternatively, rather than being implemented as circuits, all or some of the modules in assembly of modules 6100 may be implemented in software and stored in the memory 6104 of the camera device 6100, with the modules controlling operation of camera 6100 to implement the functions corresponding to the modules when the modules are executed by a processor, e.g., processor 6102. In some such embodiments, the assembly of modules 6200 is included in the memory 6104 as assembly of modules 6114. In still other embodiments, various modules in assembly of modules 6200 are implemented as a combination of hardware and software, e.g., with another circuit external to the processor providing input to the processor 6102 which then under software control operates to perform a portion of a module's function. While shown in the FIG. 61 embodiment as a single processor, e.g., computer, it should be appreciated that the processor 6102 may be implemented as one or more processors, e.g., computers.

When implemented in software the modules include code, which when executed by the processor 6102, configure the processor 6102 to implement the function corresponding to the module. In embodiments where the assembly of modules 6200 is stored in the memory 6104, the memory 6104 is a computer program product comprising a computer readable medium comprising code, e.g., individual code for each module, for causing at least one computer, e.g., processor 6102, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 62 control and/or configure the camera device 6100 or elements therein such as the processor 6102, to perform functions of the corresponding steps illustrated in the method flowchart 6000 of FIG. 60. Thus the assembly of modules 6200 includes various modules that perform functions of the corresponding steps of the method shown in FIG. 60.

Assembly of modules 6200 includes a zoom input monitoring module 6202, a zoom in light redirection device positioning adjustment control module 6204, a zoom out light redirection device positioning adjustment control module 6206, an image capture control module 6208, a composite image generation module 6210, a cropping module 6212, and a composite image storage module 6214.

Zoom input monitoring module 6202 is configured to monitor for information indicating that a user control user input zoom or user control zoom output is to be performed. Zoom input monitoring module 6202 detects information indicating that a user control zoom in or a user control zoom output operation is to be performed. Detected information includes, e.g., information identifying which one of a zoom in or zoom out is to be performed and/or information indicating the selected value for the zoom setting, e.g., at which the camera is to capture images.

Zoom in light redirection device positioning adjustment control module 6204 is configured to implement a zoom in operation in response to user control, said zoom in operation including adjusting a direction of a first light redirection device of a first optical chain of a camera, said first light redirection device being one of a substantially plane mirror or a prism, said adjusting increasing an overlap in scene areas captured by the first optical chain of the camera and a second optical chain of the camera. In some embodiments, the direction of the first light redirection device is a direction perpendicular to a face of the first light redirection device.

In various embodiments, zoom in light redirection device positioning adjustment control module 6204 is further configured to adjust a direction of the second light redirection device of the second optical chain, said second light redirection device being one of a mirror or a prism, said adjusting increasing an overlap in scene areas captured by the first and second optical chains, as part of implementing a zoom in operation.

In some embodiments, zoom in light redirection device positioning adjustment control module 6204 is further configured to adjust a direction of a fourth light redirection device of a fourth optical chain and a fifth light redirection device of a fifth optical chain, said adjusting increasing the overlap in scene areas captured by the first, second, fourth and fifth optical chains.

Zoom out light redirection device positioning adjustment control module 6206 is configured to implement a zoom out operation in response to user control, said zoom out operation including adjusting the direction of the first light redirection device and the direction of the second light redirection device, said adjusting decreasing an overlap in scene areas captured by the first and second optical chains. In some embodiments, zoom out light redirection device positioning adjustment control module 6206 is further configured to adjust a direction of a fourth light redirection device of a fourth optical chain and a fifth light redirection device of a fifth optical chain, said adjusting decreasing the overlap in scene areas captured by the first, second, fourth and fifth optical chains.

Image capture control module 6208 is configured to: control the first optical chain to capture an image of a scene area, and control the second optical chain to capture an image of a scene area. Image capture control module 6208 is further configured to control a third optical chain of the camera device to capture an image of the scene area.

In some embodiment, the first and second optical chains have the same focal length, f1. In some such embodiments, the third optical chain of the camera has a focal length f2, where f2 is smaller than f1. In some embodiments, the third optical chain has an optical axis which is perpendicular to the face of the optical chain and which remains fixed irrespective of a zoom setting, the range extending between f2 and f1.

In various embodiments, the zoom in and zoom out operation correspond to a zoom focal length setting in the range of f2 to f1, said range including f2 and f1.

In some embodiments, image capture control module 6208 is further configured to: control a fourth optical chain to capture an image of a scene area, and control the fifth optical chain to capture an image of a scene area. In some such embodiments, image capture control module 6208 is further configured to control a sixth optical chain of the camera device to capture an image of the scene area. In some such embodiments, the first, second, fourth, fifth, and sixth optical chains have the same focal length, e.g., f1.

In some embodiments, image capture control module 6208 is further configured to: control a seventh optical chain to capture an image of a scene area. In some such embodiments, image capture control module 6208 is further configured to: control an eight optical chain to capture an image of a scene area. In some such embodiments, image capture control module 6208 is further configured to: control a ninth optical chain to capture an image of a scene area. In some such embodiments, image capture control module 6208 is further configured to: control a tenth optical chain to capture an image of a scene area. In some such embodiments, the third, seventh, eighth, ninth, and tenth optical chains have the same focal length, e.g., f2.

Composite image generation module 6210 is configured to generate a composite image, in accordance with a zoom focal length setting, from captured images. In some embodiments, composite image generation module 6210 is configured to generate a composite image in accordance with the zoom focal length setting from images captured by the first, second, and third optical chains. In some embodiments, composite image generation module 6210 is configured to generate a composite image in accordance with the zoom focal length setting from images captured by the first, second, third, fourth, and fifth optical chains. In some embodiments, composite image generation module 6210 is configured to generate a composite image in accordance with the zoom focal length setting from images captured by the first, second, third, fourth, fifth, and sixth optical chains. In some embodiments, composite image generation module 6210 is configured to generate a composite image in accordance with the zoom focal length setting from images captured by the first, second, third, fourth, fifth, sixth, and seventh optical chains. In some embodiments, composite image generation module 6210 is configured to generate a composite image in accordance with the zoom focal length setting from images captured by the first, second, third, fourth, fifth, sixth, seventh, and eighth optical chains. In some embodiments, composite image generation module 6210 is configured to generate a composite image in accordance with the zoom focal length setting from images captured by the first, second, third, fourth, fifth, sixth, seventh, eighth, and ninth optical chains. In some embodiments, composite image generation module 6210 is configured to generate a composite image in accordance with the zoom focal length setting from images captured by the first, second, third, fourth, fifth, sixth, seventh, eighth, ninth, and tenth optical chains.

Cropping module 6212 is configured to perform a crop operation on the image captured by the third optical chain when the zoom setting is greater than f2. In various embodiments, the amount of crop is a function of the difference between the zoom focal length setting and f2, and cropping module 6212 determines, e.g., calculates, the amount of crop prior to performing the crop.

In some embodiments, cropping module 6216 is configured to perform a crop operation on the image captured by the third and seventh optical chain when the zoom setting is greater than f2. In some embodiments, cropping module 6216 is configured to perform a crop operation on the image captured by the third, seventh, and eighth optical chains when the zoom setting is greater than f2. In some embodiments, cropping module 6216 is configured to perform a crop operation on the image captured by the third, seventh, eighth, and ninth optical chains when the zoom setting is greater than f2. In some embodiments, cropping module 6216 is configured to perform a crop operation on the image captured by the third, seventh, eighth, ninth, and tenth optical chains when the zoom setting is greater than f2.

Composite image storage module 6214 is configured to store a generated composite image in memory.

Figure 63:
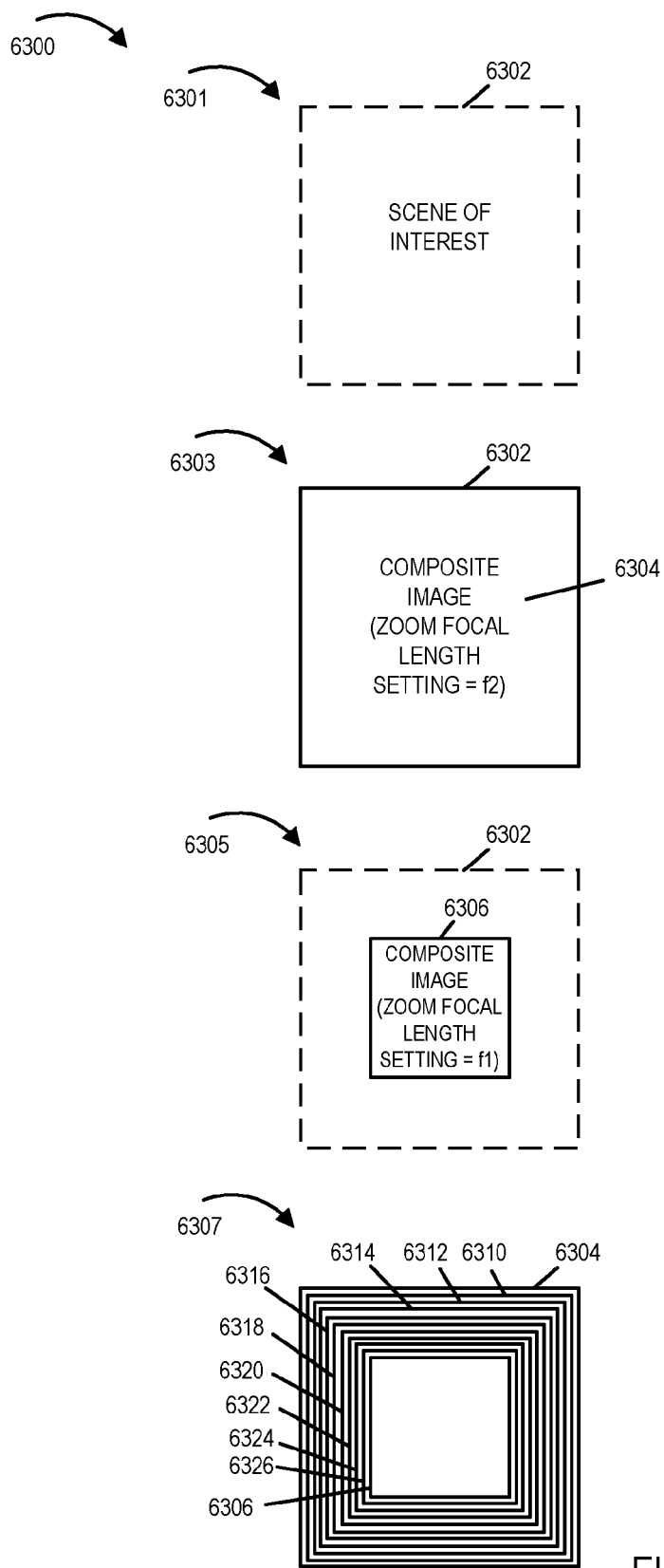
FIG. 63 is a drawing which illustrates exemplary composite images, corresponding to different zoom focal length settings, in accordance with an exemplary embodiment.

FIG. 63 is a drawing 6300 which illustrates exemplary composite images, corresponding to different zoom focal length settings, in accordance with an exemplary embodiment. Drawing 6301 includes an exemplary scene of interest 6302. Consider that an exemplary camera device, e.g., camera 6100 of FIG. 62 and/or a camera implementing the method of flowchart 6000 of FIG. 60 includes continuous zoom in/zoom out capability in a range of zoom focal length setting of f2 to f1, where f2<f1. Drawing 6303 illustrates an exemplary composite image 6304 corresponding to a user selected zoom focal length setting of f2. In this example, the composite image 6304 corresponds to that full area of the scene of interest 6302. Drawing 6305 illustrates an exemplary composite image 6306 corresponding to a user selected zoom focal length setting of f1. For this example, composite image 6306 corresponds to a maximum zoom in, and composite image 6304 corresponds to a maximum zoom out.

Drawing 6307 illustrates composite images (6304, 6310, 6312, 6314, 6316, 6318, 6320, 6322, 6324, 6326, 6306) corresponding to a plurality of exemplary different user selected zoom focal length settings. Note that in this example, the zoom is about the center of the image. Going in direction 6306→6310→6312→6314→6316→6318→6320→6322→6324→6326→6306 is the zoom in direction. Going in direction 6306→6326→6324→6322→6320→6318→6316→6314→6312→6310→6304 is the zoom in direction. In various embodiments continuous zoom is possible in the range of zoom focal length setting f2 to f1.

Figure 64:
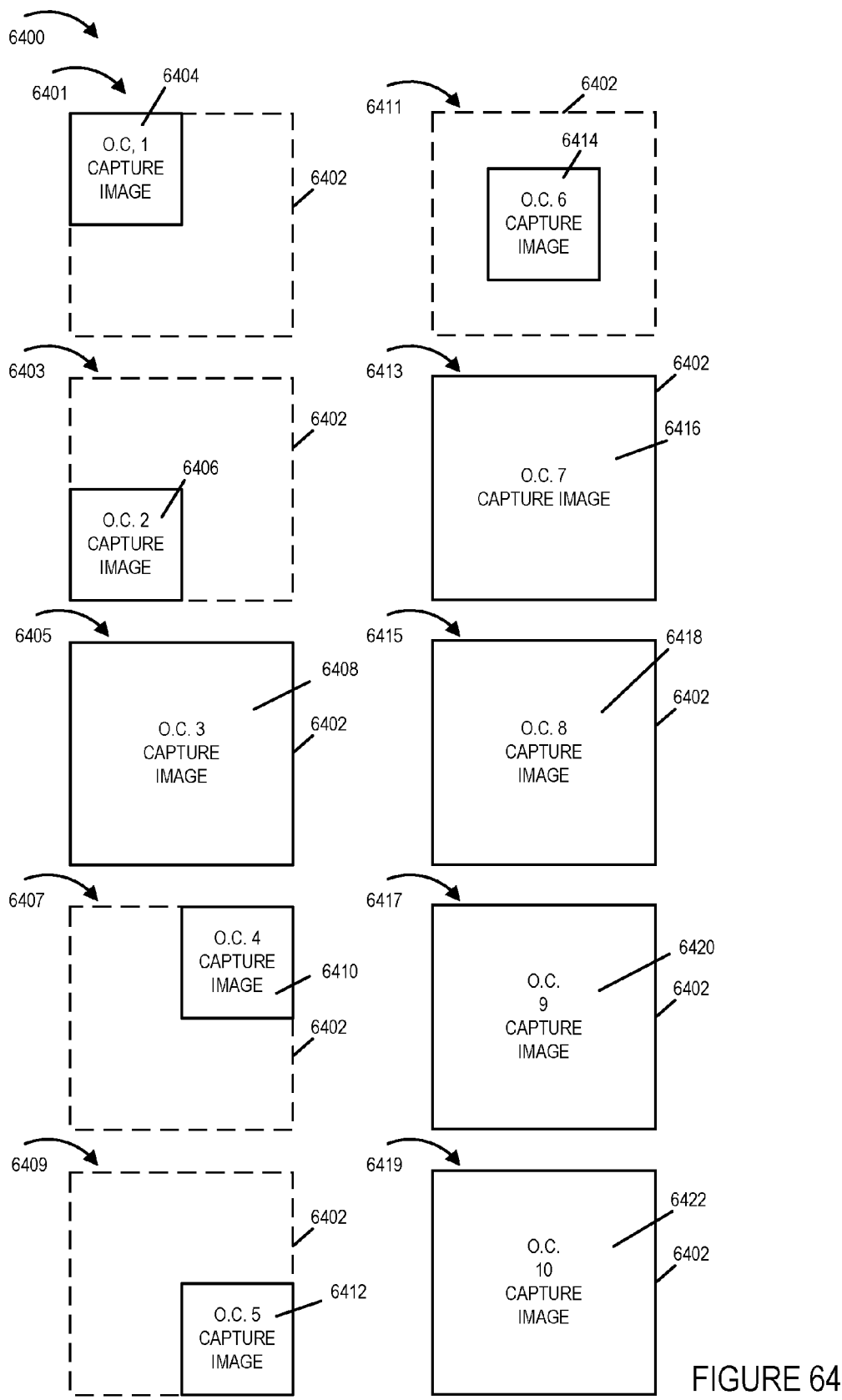
FIG. 64 illustrates captured images which are combined to generate a composite image for an example in which the user selected focal length setting is set at a maximum zoom out, e.g., zoom focal length setting=f2, in accordance with an exemplary embodiment.

Drawing 6400 of FIG. 64 illustrates captured images which are combined to generate a composite image for an example in which the user selected focal length setting is set at a maximum zoom out, e.g., zoom focal length setting=f2, in accordance with an exemplary embodiment. Consider that an exemplary camera device, e.g., camera device 6100 of FIG. 62, and/or a camera device implementing the method of flowchart 6000 of FIG. 60 includes continuous zoom in/zoom out capability in a range of zoom focal length setting of f2 to f1, where f2<f1.

Drawing 6401 illustrates that optical chain 1 capture image 6404 corresponds to a left upper portion of the scene of interest 6402. Drawing 6403 illustrates that optical chain 2 capture image 6406 corresponds to a left lower portion of the scene of interest 6402. Drawing 6405 illustrates that optical chain 3 capture image 6408 corresponds to the entire scene of interest 6402. Drawing 6407 illustrates that optical chain 4 capture image 6410 corresponds to a right upper portion of the scene of interest 6402. Drawing 6409 illustrates that optical chain 5 capture image 6412 corresponds to a right lower portion of the scene of interest 6402. Drawing 6411 illustrates that optical chain 6 capture image 6414 corresponds to a center portion of the scene of interest 6402. Drawing 6413 illustrates that optical chain 7 capture image 6416 corresponds to the entire scene of interest 6402. Drawing 6415 illustrates that optical chain 8 capture image 6418 corresponds to the entire scene of interest 6402. Drawing 6417 illustrates that optical chain 9 capture image 6420 corresponds to the entire scene of interest 6402. Drawing 6419 illustrates that optical chain 10 capture image 6422 corresponds to the entire scene of interest 6402.

A composite image is generated, in accordance with the zoom focal length setting, from captured images (6404, 6406, 6408, 6410, 6412, 6414, 6418, 6420, 6422). The generated composite image is, e.g., composite image 6304 of FIG. 63.

Figure 65:
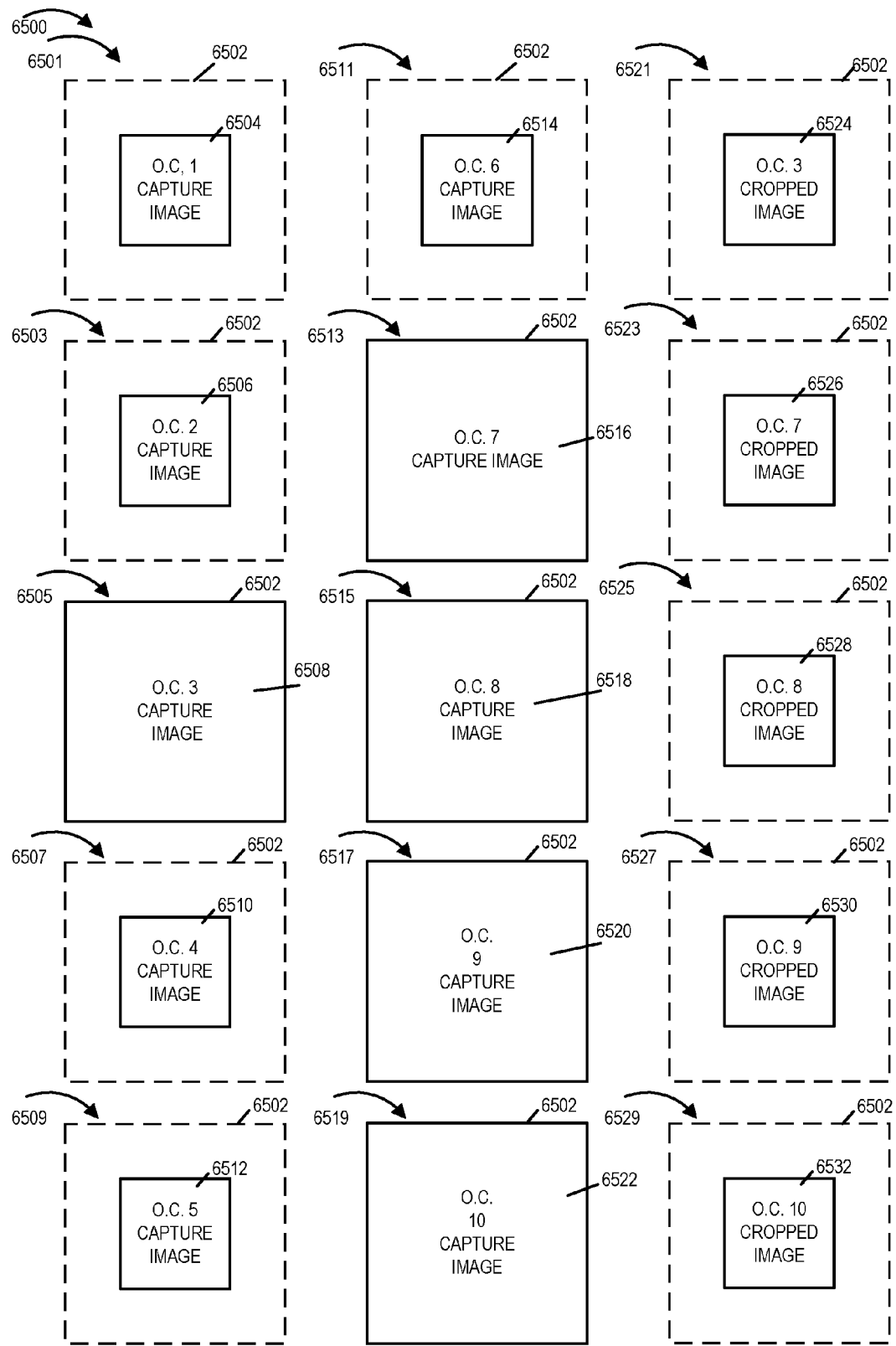
FIG. 65 illustrates captured images and cropped captured images, some of which are combined to generate a composite image for an example in which the user selected focal length setting is set at a maximum zoom in, e.g., zoom focal length setting=f1, in accordance with an exemplary embodiment.

Drawing 6500 of FIG. 65 illustrates captured images and cropped captured images, some of which are combined to generate a composite image for an example in which the user selected focal length setting is set at a maximum zoom in, e.g., zoom focal length setting=f1, in accordance with an exemplary embodiment. Consider that an exemplary camera device, e.g., camera 6100 of FIG. 62, and/or a camera implementing the method of flowchart 6000 of FIG. 60 includes continuous zoom in/zoom out capability in a range of zoom focal length setting of f2 to f1, where f2<f1.

Drawing 6501 illustrates that optical chain 1 capture image 6504 corresponds to a center portion of the scene of interest 6502. Drawing 6503 illustrates that optical chain 2 capture image 6506 corresponds to a center portion of the scene of interest 6502. Drawing 6505 illustrates that optical chain 3 capture image 6508 corresponds to the entire scene of interest 6502. Drawing 6507 illustrates that optical chain 4 capture image 6510 corresponds to a center portion of the scene of interest 6502. Drawing 6509 illustrates that optical chain 5 capture image 6512 corresponds to a center portion of the scene of interest 6502. Drawing 6511 illustrates that optical chain 6 capture image 6514 corresponds to a center portion of the scene of interest 6502. Drawing 6513 illustrates that optical chain 7 capture image 6516 corresponds to the entire scene of interest 6502. Drawing 6515 illustrates that optical chain 8 capture image 6518 corresponds to the entire scene of interest 6502. Drawing 6517 illustrates that optical chain 9 capture image 6520 corresponds to the entire scene of interest 6502. Drawing 6519 illustrates that optical chain 10 capture image 6522 corresponds to the entire scene of interest 6502.

In this example, since the user selected zoom focal length setting is f1, which is greater than f2, cropping operations are performed on the optical chains with focal length=f2. The amount of the cropping is a function of the difference between the zoom focal length setting and f2. Thus, captured images (6508, 6516, 6518, 6520, 6522) are cropped.

Drawing 6521 illustrates that optical chain 3 cropped capture image 6524, corresponds to a center portion of the scene of interest 6502. Drawing 6523 illustrates that optical chain 7 cropped capture image 6526, corresponds to a center portion of the scene of interest 6502. Drawing 6525 illustrates that optical chain 8 cropped capture image 6528, corresponds to a center portion of the scene of interest 6502. Drawing 6527 illustrates that optical chain 9 cropped capture image 6530, corresponds to a center portion of the scene of interest 6502. Drawing 6529 illustrates that optical chain 10 cropped capture image 6532, corresponds to a center portion of the scene of interest 6502.

A composite image is generated, in accordance with the zoom focal length setting, from optical chain 1 capture image 6504, optical chain 2 capture image 6506, optical chain 3 cropped image 6524, optical chain 4 capture image 6510, optical chain 5 capture image 6512, optical chain 6 capture image 6514, optical chain 7 cropped image 6526, optical chain 8 cropped image 6528, optical chain 9 cropped image 6530 and optical chain 10 cropped image 6532. The generated composite image is, e.g., composite image 6306 of FIG. 63.

Figure 66:
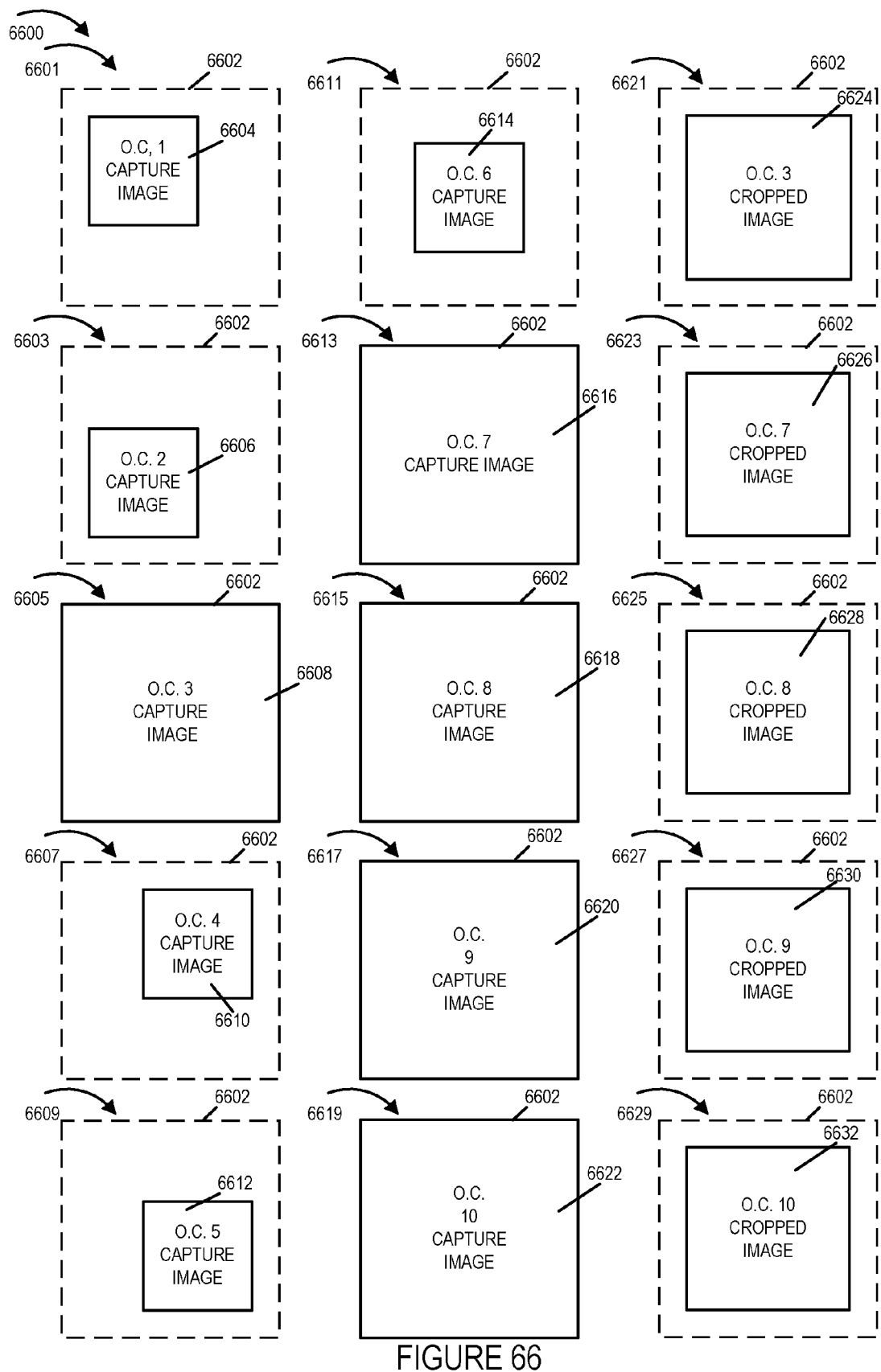
FIG. 66 illustrates captured images and cropped captured images, some of which are combined to generate a composite image for an example in which the user selected focal length setting is set at an intermediate value, e.g., a value between f2 and f1, in accordance with an exemplary embodiment.

Drawing 6600 of FIG. 66 illustrates captured images and cropped captured images, some of which are combined to generate a composite image for an example in which the user selected focal length setting is set at an intermediate value, e.g., a value between f2 and f1 in accordance with an exemplary embodiment. Consider that an exemplary camera device, e.g., camera device 6100 of FIG. 62, and/or a camera implementing the method of flowchart 6000 of FIG. 60 includes continuous zoom in/zoom out capability in a range of zoom focal length setting of f2 to f1, where f2<f1.

Drawing 6601 illustrates that optical chain 1 capture image 6604 corresponds to a portion of the scene of interest 6602, which is centered along a diagonal extending from the center of the scene of interest to the left upper corner of the scene of interest. Drawing 6603 illustrates that optical chain 2 capture image 6606 corresponds to a portion of the scene of interest 6602, which is centered along a diagonal extending from the center of the scene of interest to a left lower corner of the scene of interest. Drawing 6605 illustrates that optical chain 3 capture image 6608 corresponds to the entire scene of interest 6602. Drawing 6607 illustrates that optical chain 4 capture image 6610 corresponds to a portion of the scene of interest 6602, which is centered along a diagonal extending from the center of the scene of interest to the right upper corner of the scene of interest. Drawing 6609 illustrates that optical chain 5 capture image 6612 corresponds to a portion of the scene of interest 6602, which is centered along a diagonal extending from the center of the scene of interest to the right lower corner of the scene of interest. Drawing 6611 illustrates that optical chain 6 capture image 6614 corresponds to a center portion of the scene of interest 6602. Drawing 6613 illustrates that optical chain 7 capture image 6616 corresponds to the entire scene of interest 6602. Drawing 6615 illustrates that optical chain 8 capture image 6618 corresponds to the entire scene of interest 6602. Drawing 6617 illustrates that optical chain 9 capture image 6620 corresponds to the entire scene of interest 6602. Drawing 6619 illustrates that optical chain 10 capture image 6622 corresponds to the entire scene of interest 6602.

In this example, since the user selected zoom focal length setting is a value which is greater than f2, cropping operations are performed on the optical chains with focal length=f2. The amount of the cropping is a function of the difference between the zoom focal length setting and f2. Thus, captured images (6608, 6616, 6618, 6620, 6622) are cropped.

Drawing 6621 illustrates that optical chain 3 cropped capture image 6624, corresponds to a center portion of the scene of interest 6602. Drawing 6623 illustrates that optical chain 7 cropped capture image 6626, corresponds to a center portion of the scene of interest 6602. Drawing 6625 illustrates that optical chain 8 cropped capture image 6628, corresponds to a center portion of the scene of interest 6602. Drawing 6627 illustrates that optical chain 9 cropped capture image 6630, corresponds to a center portion of the scene of interest 6602. Drawing 6629 illustrates that optical chain 10 cropped capture image 6632, corresponds to a center portion of the scene of interest 6602.

A composite image is generated, in accordance with the zoom focal length setting, from optical chain 1 capture image 6604, optical chain 2 capture image 6606, optical chain 3 cropped image 6624, optical chain 4 capture image 6610, optical chain 5 capture image 6612, optical chain 6 capture image 6614, optical chain 7 cropped image 6626, optical chain 8 cropped image 6628, optical chain 9 cropped image 6630 and optical chain 10 cropped image 6632.

The generated composite image is, e.g., composite image 6318 of FIG. 63.

Figure 67:
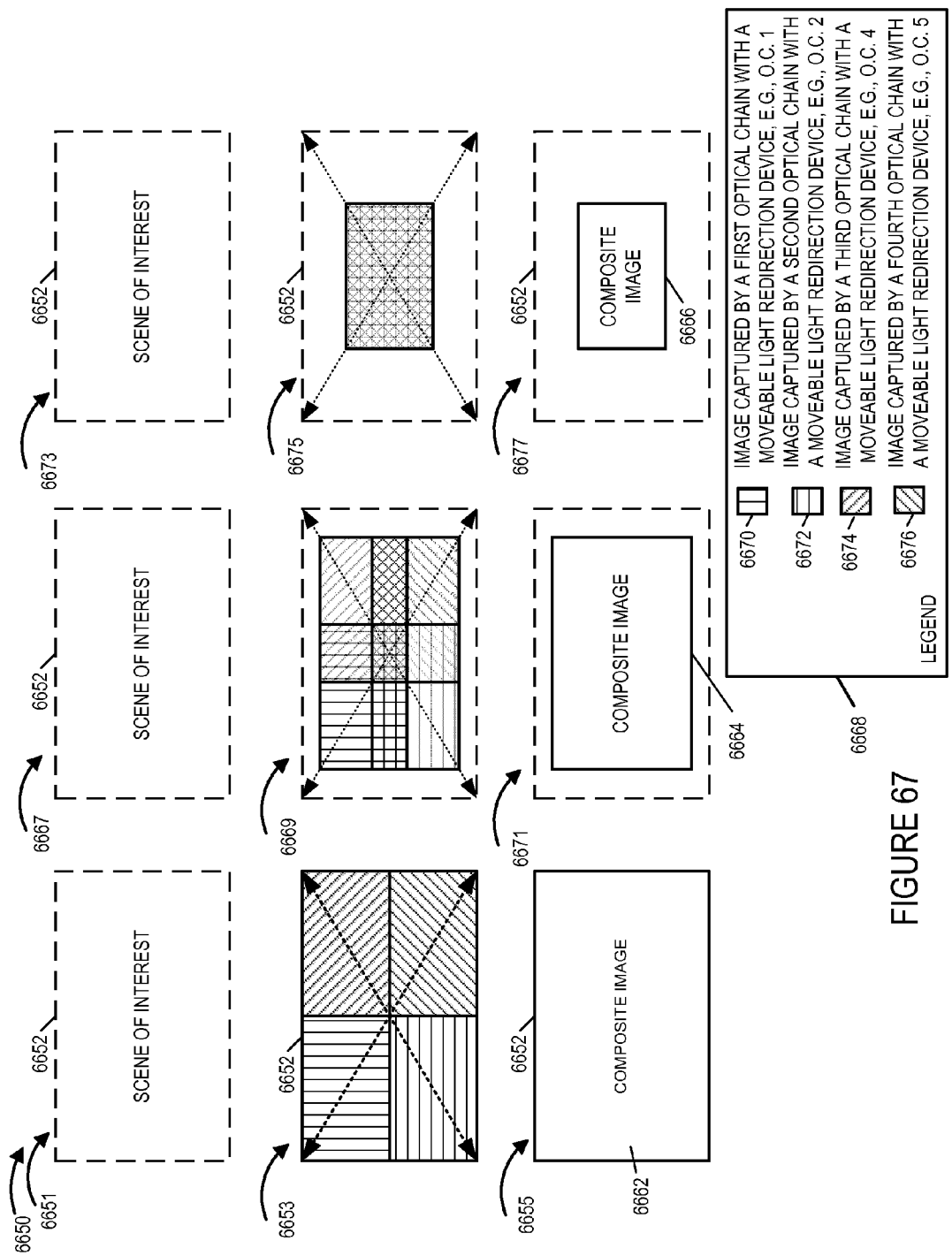
FIG. 67 illustrates exemplary user controlled zoom and exemplary overlap between captured images from different optical chains, each including a moveable light redirection device which is positioned, e.g., adjusted, as a function of a user selected zoom focal length setting, in accordance with an exemplary embodiment.

FIG. 67 includes drawing 6650 which illustrates exemplary user controlled zoom and exemplary overlap between captured images from different optical chains, each including a moveable light redirection device which is positioned, e.g., adjusted, as a function of a user selected zoom focal length setting, in accordance with an exemplary embodiment.

Drawings 6651, 6653 and 6655 correspond to an example of a user selected zoom focal length setting of f2, which corresponds to a maximum zoom out. Drawings 6667, 6669 and 6671 correspond to an example of a user selected zoom focal length setting of a value in between f2 and f1, where f1>f2, which corresponds to an intermediate zoom setting. Drawings 6673, 6675 and 6677 correspond to an example of a user selected zoom focal length setting f1, which corresponds to a maximum zoom in.

Legend 6668 identifies shading patterns used to illustrate the portion of the scene of interest captured by each of a plurality of optical chains with a moveable light redirection device, e.g., a moveable substantially plane mirror or a prism. Vertical line shading as indicated by block 6670 is used to identify the image captured by a first optical chain with a moveable light redirection device, e.g., optical chain 1 6118 of camera device 6100 of FIG. 61. Horizontal line shading as indicated by block 6672 is used to identify the image captured by a second optical chain with a moveable light redirection device, e.g., optical chain 2 6120 of camera device 6100 of FIG. 61. Negative slope line shading as indicated by block 6674 is used to identify the image captured by a third optical chain with a moveable light redirection device, e.g., optical chain 4 6124 of camera device 6100 of FIG. 61. Positive slope line shading as indicated by block 6676 is used to identify the image captured by a fourth optical chain with a moveable light redirection device, e.g., optical chain 5 6125 of camera device 6100 of FIG. 61.

Drawing 6653 illustrates that for maximum zoom out, which corresponds to zoom focal length setting of f2, the images captured by the four optical chains including a moveable light redirection device are non-overlapping or substantially non-overlapping. Drawing 6655 illustrates that the composite image 6662 for the zoom focal length setting=f2, which is generated from images including the captured images from the four optical chains including a moveable light redirection device, as illustrated in drawing 6653, occupies the full area or substantially the full area of the scene of interest 6652.

Drawing 6669 illustrates that for an intermediate zoom setting, which corresponds to zoom focal length setting value between f2 and f1, the images captured by the four optical chains including a moveable light redirection device are partially overlapping. As may be observed, the maximum overlap is in the center portion of the scene of interest. Drawing 6671 illustrates that the composite image 6664 for the intermediate zoom focal length setting, which is generated from images including the captured images from the four optical chains including a moveable light redirection device, as illustrated in drawing 6669, occupies a center portion of the scene of interest 6652.

Drawing 6675 illustrates that for a maximum zoom in, which corresponds to zoom focal length setting value of f1, the images captured by the four optical chains including a moveable light redirection device are fully overlapping or substantially fully overlapping. Drawing 6677 illustrates that the composite image 6666 for the maximum zoom in which corresponds to zoom focal length setting of f1, which is generated from images including the captured images from the four optical chains including a moveable light redirection device, as illustrated in drawing 6669, occupies the center portion of the scene of interest 6652. Note that the size of the composite image 6666 is the same as or substantially the same as the size captured by an individual optical chain with a moveable light redirection device.

Proceeding from drawing 6653 to drawing 6669 illustrates exemplary zoom in, and proceeding from drawing 6669 to drawing 6675 illustrates further zoom in. Proceeding from drawing 6675 to drawing 6669 illustrates exemplary zoom out, and proceeding from drawing 6669 to drawing 6653 illustrates further zoom out.

It should be appreciated that captured images from other optical chains, may be, and in some embodiments, are further used in generating the composite image, e.g., captured images from optical chains in which a light redirection device is not moved as a function of the zoom focal length setting are further used in generating a composite image. In some such embodiments, cropping is used on some images captured by optical chains in which a moveable light redirection device is not moved as a function of zoom focal length setting, e.g., cropping is used on images captured by optical chain 3 6122, optical chain 7 6128, optical chain 8 6132, optical chain 9 6134, optical chain 10 6136 of camera 6100 of FIG. 61, with the amount of cropping being a function of the amount that the user selected zoom focal length setting is greater than f2. For example, no cropping used in generating composite image 6652 and maximum cropping used in generating composite image 6666.

Figure 68A:
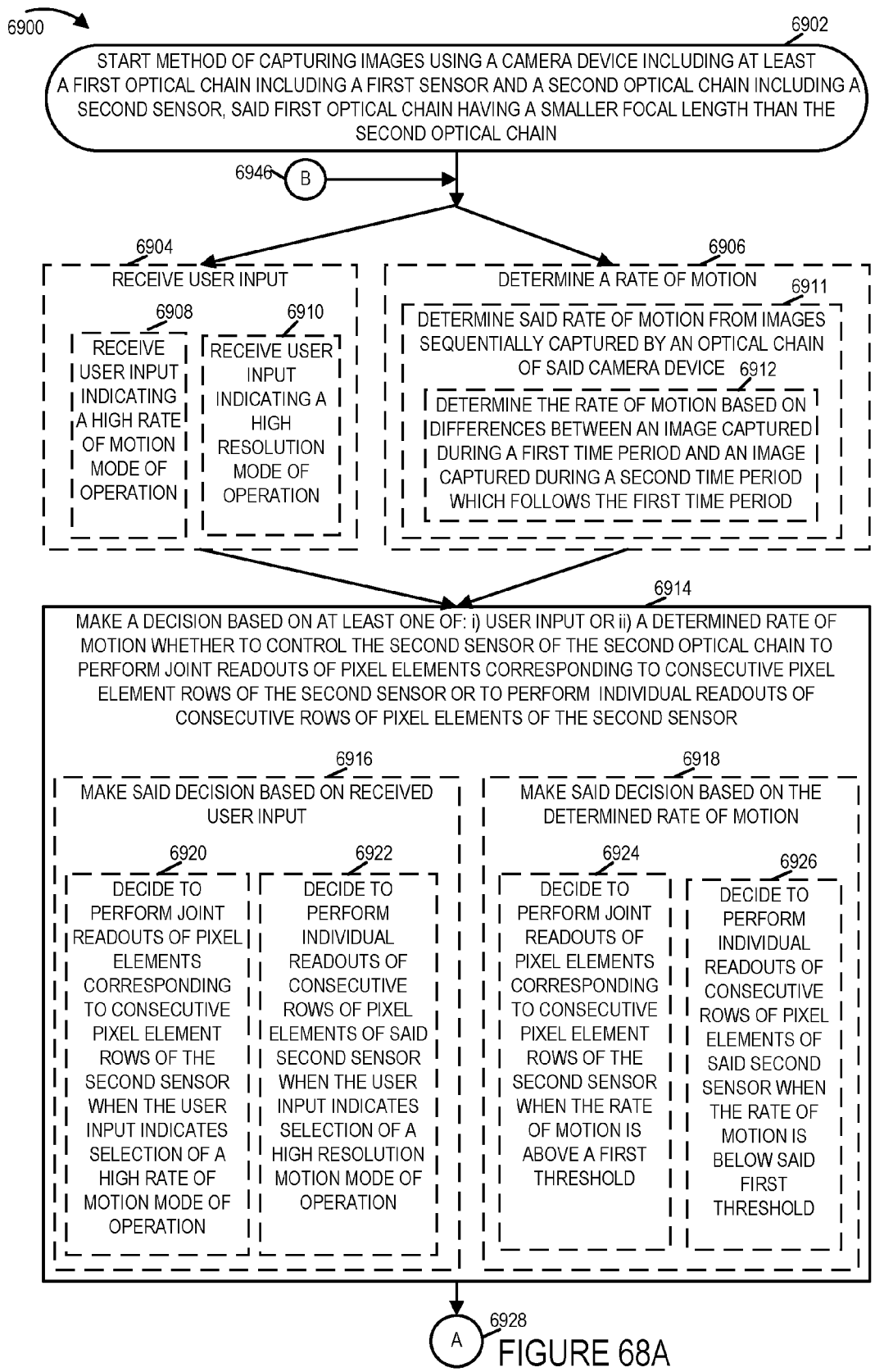
FIG. 68A is a first part of a flowchart of an exemplary method of capturing an image using a camera device in accordance with an exemplary embodiment.
Figure 68B:
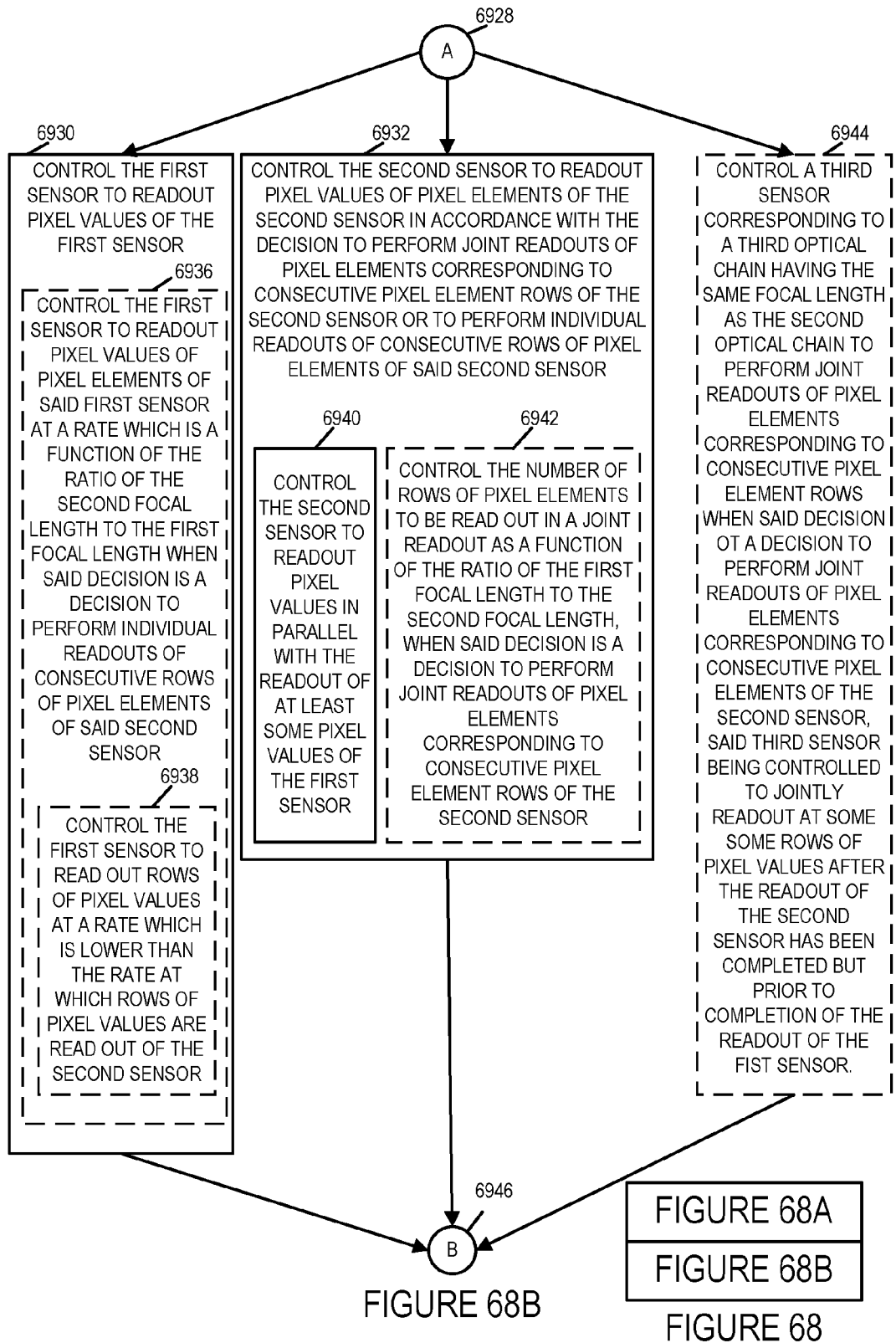
FIG. 68B is a second part of a flowchart of an exemplary method of capturing an image using a camera device in accordance with an exemplary embodiment.

FIG. 68, comprising the combination of FIG. 68A and FIG. 68B, is a flowchart 6900 of an exemplary method of capturing images using a camera device including at least a first optical chain including a first sensor and a second optical chain including a second sensor, said first optical chain having a smaller focal length than the second optical chain. In one exemplary embodiment, the focal length of the first optical chain is f2 and the focal length of the second optical chain is f1, where f2<f1.

Operation of the exemplary method starts in step 6902, in which the camera device is powered on and initialized, and proceeds to one or both of optional steps 6904 and 6906.

In step 6904, the camera device receives user input. In some embodiments, step 6904 includes one or both of steps 6908 and 6910. In step 6908 the camera device receives user input indicating a high rate of motion operation. In step 6910 the camera device receives user input indicating a high resolution mode of operation.

Returning to step 6906, in step 6906 the camera device determines a rate of motion. In various embodiments, the step 6906 includes step 6911 in which the camera device determines the rate of motion from images sequentially captured by an optical chain of said camera device. In some such embodiments, step 6911 includes step 6912 in which the camera device determines the rate of motion based on differences between an image captured during a first time period and an image captured during a second time period which follows the first time period.

Operation proceeds from step 6904 and/or step 6906 to step 6914. In step 6914, the camera device makes, e.g., in a control device of said camera device, a decision based on at least one of: i) user input or ii) a determined rate of motion whether to control the second sensor of the second optical chain to perform joint readouts of pixel elements corresponding to consecutive pixel element rows of the second sensor or to perform individual readouts of consecutive rows of pixel elements of the second sensor. In some embodiments, step 6914 includes one or both of steps 6916 and 6918. In step 6916, the camera device makes the decision based on user input. In step 6918, the camera device makes the decision based on the determined rate of motion.

In various embodiments, step 6916 includes one or both of steps 6920 and 6922. In step 6920 the camera device decides to perform joint readouts of pixel elements corresponding to consecutive pixel element rows of the second sensor when the user input indicates selection of a high rate of motion mode of operation. In step 6922 the camera device decides to perform individual readouts of consecutive rows of pixel elements of said second sensor when the user input indicates selection of a high resolution mode of operation.

In some embodiments, step 6918 includes one or both of steps 6924 and 6926. In step 6924 the camera device decides to perform joint readouts of pixel elements corresponding to consecutive pixel element rows of the second sensor when the rate of motion is above a first threshold. In step 6926 the camera decides to perform individual readouts of consecutive rows of pixel elements of said second sensor when the rate of motion is below said first threshold.

Operation proceeds from step 6914, via connecting node A 6928, to steps 6930 and step 6932. In some embodiments, in which the camera includes a third optical chain, operation also proceeds from step 6914, via connecting node A 6928 to step 6944. In step 6930 the camera controls the first sensor to readout pixel values of the first sensor. In some embodiments, step 6930 includes step 6936, in which the camera controls the first sensor to readout pixel values of pixel elements of the first sensor at a rate which is a function of the ratio of the second focal length to the first focal length when said decision is a decision to perform individual readouts of consecutive rows of pixel elements of said second sensor. In some such embodiments, step 6936 includes step 6938 in which the camera device controls the first sensor to read out rows of pixel values at rate which is lower than the rate at which rows of pixel values are read out of the second sensor.

Returning to step 6932, in step 6932 the camera device controls the second sensor to read out pixel values of pixel elements if the second sensor in accordance with the decision to perform joint readouts of pixel element rows of the second sensor or to perform individual readouts of consecutive rows of pixel elements of said second sensor. In some embodiments, step 6932 includes one or both of step 6940 and step 6942. In step 6940 the camera device controls the second sensor to read out pixel values in parallel with the readout of at least some pixel values of the first sensor. In step 6942 the camera device controls the number of rows of pixel elements to be read out in a joint readout as a function of the ratio of the first focal length to the second focal length when said decision is a decision to perform joint readouts of pixel elements corresponding to consecutive pixel element rows of the second sensor.

Returning to step 6944, in step 6944 the camera device controls a third sensor corresponding to a third optical chain having the same focal length as the second optical china to perform joint readouts of pixel elements corresponding to consecutive pixel element rows when said decision is a decision to perform joint readouts of pixel elements corresponding to consecutive pixel elements of the second sensor, said third sensor being controlled to jointly readout at some of pixel values after the readout of the second sensor has been completed but prior to completion of the readout of the first sensor. Operation proceeds from steps 6930, 6932 and 6944, via connecting node B 6946, to the input to steps 6904 and 6906.

Figure 69:
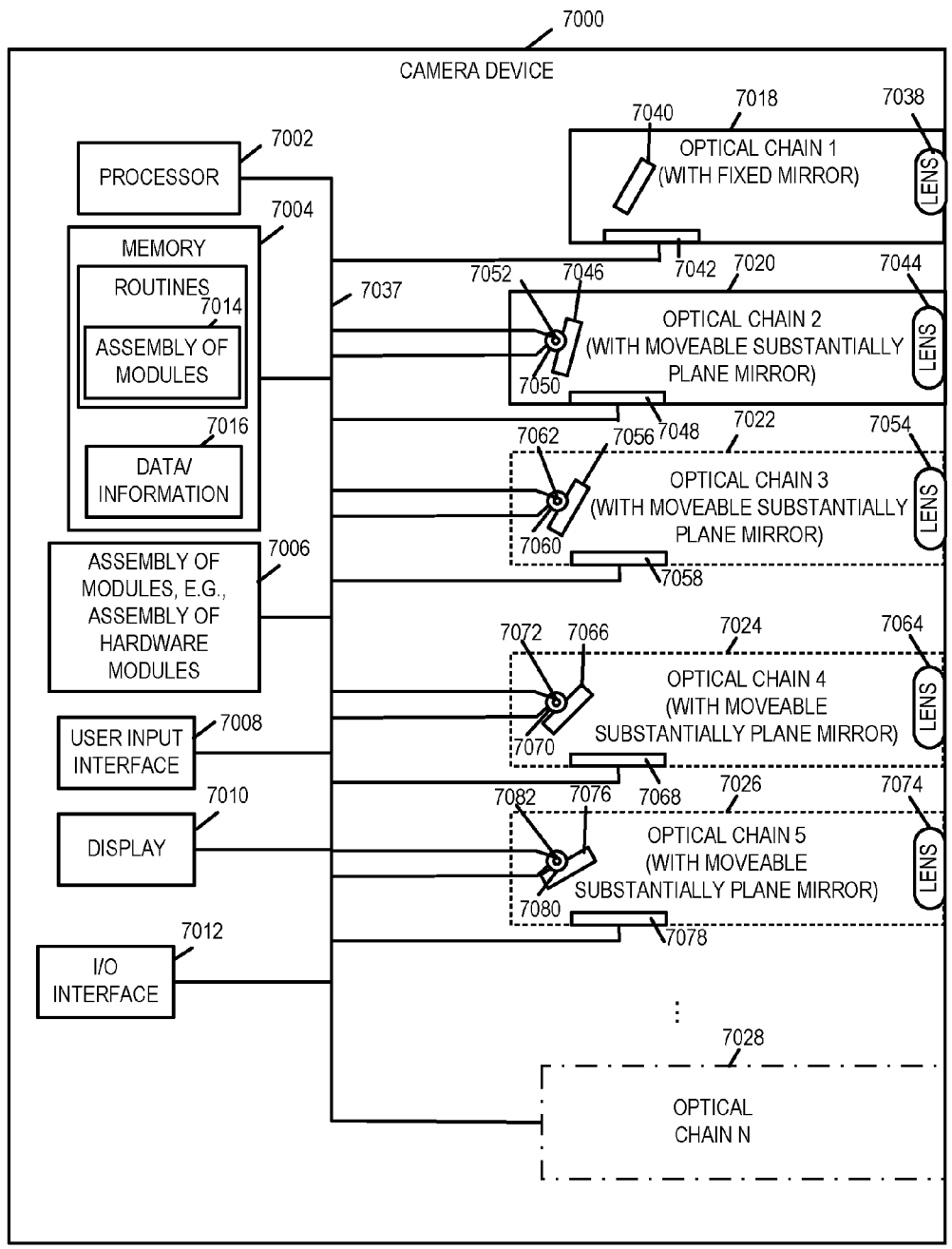
FIG. 69 is a drawing of an exemplary camera device including at least two optical chains with different focal lengths in accordance with an exemplary embodiment.

FIG. 69 is a drawing of an exemplary camera device 7000 in accordance with various exemplary embodiments. Camera device 7000 includes a processor 7002, e.g., a CPU, memory 7004, an assembly of modules 7006, e.g., an assembly of hardware modules such as circuits, a user input interface 7008, a display 7010, an I/O interface 7012, and a plurality of optical chains (optical chain 1 7018, optical chain 2 7020, optical chain 3 7022, optical chain 4 7024, optical chain 5 7026 . . . , optical chain N 7028) coupled together via a bus 7037 over which the various elements may interchange data and information. In some embodiments, optical chain 3 7022, optical chain 4 7024, optical chain 5 7026, . . . , optical chain N 7028 are optional, and one or more of the optical chains may be included. Display 7010, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera 7000. User input interface 7008 includes, e.g., switches, buttons, touch screen interface, etc. for receiving input from the user. Received user input includes, e.g., input indicating that a user has selected a high rate of motion mode of operation or input indicating that the user has selected a high resolution mode of operation. In some embodiments, the various modes of operation can be, and sometimes are, selected from a menu of user modes of operation, e.g., a menu of alternative mode of operation. I/O interface 7012 includes a plurality of communications ports for communicating with other devices, e.g., a personal computer. I/O interface 7012 in some embodiments, includes one or more wireless communications interfaces. Information communicated over I/O interface 7012 includes, e.g., combined images generated from captured images from multiple optical chains, and/or captured images from individual optical chains to be processed and/or combined externally, e.g., in a personal computer.

Memory 7004 includes assembly of modules 7014 and data/information 7016. Data/information 7016, in some embodiments, includes one or more or all of: received user input indicating a selected mode of operation, a stored rate of motion threshold used in making a decision as to whether to perform joint readouts or individual readouts, e.g., with regard to the second sensor, a determined rate of motion, the focal length value for the first optical chain, the focal length value for the second optical chain, readouts from image sensors of optical chains, a determined number of rows to be read in a joint readout, readout rate timing information corresponding to the first sensor, and readout rate timing information corresponding to the second sensor.

Optical chain 1 7018 includes a lens 7038, e.g., an outer lens, a fixed mirror 7040, e.g., a substantially plane fixed mirror, and an image sensor 7042. In some embodiments, the substantially plane fixed mirror is a fixed plane mirror. Image sensor 7042 is used to capture a image. Light passes through lens 7038 before reaching mirror 7040. Mirror 7040, which is a light redirection device, directs the light which has passed through lens 7038 onto the image sensor 7042.

Optical chain 2 7020 includes a lens 7044, e.g., an outer lens, a moveable substantially plane mirror 7046, and an image sensor 7048. In some embodiments, the substantially plane mirror is a plane mirror. In various embodiments, the moveable mirror 7046 includes a hinge mount. Optical chain 2 7020 further includes a mirror movement module 7050, e.g., a drive motor and corresponding drive circuitry, and a mirror position detection module 7052, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 7048 is used to capture a an image. Light passes through lens 7044 before reaching mirror 7046. Mirror 7046, which is a light redirection device, directs the light which has passed through lens 7044 onto the image sensor 7048.

Optical chain 3 7022 includes a lens 7054, e.g., an outer lens, a moveable substantially plane mirror 7056, and an image sensor 7058. In some embodiments, the substantially plane mirror is a plane mirror. In various embodiments, the moveable mirror 7056 includes a hinge mount. Optical chain 3 7022 further includes a mirror movement module 7060, e.g., a drive motor and corresponding drive circuitry, and a mirror position detection module 7062, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 7058 is used to capture a an image. Light passes through lens 7054 before reaching mirror 7056. Mirror 7056, which is a light redirection device, directs the light which has passed through lens 7054 onto the image sensor 7058.

Optical chain 4 7024 includes a lens 7064, e.g., an outer lens, a moveable substantially plane mirror 7066, and an image sensor 7068. In some embodiments, the substantially plane mirror is a plane mirror. In various embodiments, the moveable mirror 7066 includes a hinge mount. Optical chain 4 7024 further includes a mirror movement module 7070, e.g., a drive motor and corresponding drive circuitry, and a mirror position detection module 7072, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 7068 is used to capture a an image. Light passes through lens 7064 before reaching mirror 7066. Mirror 7066, which is a light redirection device, directs the light which has passed through lens 7064 onto the image sensor 7068.

Optical chain 5 7026 includes a lens 7074, e.g., an outer lens, a moveable substantially plane mirror 7076, and an image sensor 7078. In some embodiments, the substantially plane mirror is a plane mirror. In various embodiments, the moveable mirror 7076 includes a hinge mount. Optical chain 5 7026 further includes a mirror movement module 7080, e.g., a drive motor and corresponding drive circuitry, and a mirror position detection module 7082, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 7078 is used to capture a an image. Light passes through lens 7074 before reaching mirror 7076. Mirror 7076, which is a light redirection device, directs the light which has passed through lens 7074 onto the image sensor 7078.

Additional optical chains, e.g. optical chain N 7028, may include a fixed or a moveable light redirection device, e.g., mirror.

In one exemplary embodiment optical chain 1 7018 has a focal length=f2; and each of optical chain 2 7020, optical chain 3 7022, optical chain 4 6124, and optical chain 5 6126 have a focal length=f1; and f1>f2.

In various embodiments, a different type of light redirection device is used instead of a mirror, e.g., a prism is used in place of a mirror in an optical chain. For example, a moveable prism is used in optical chain 2 7020 in place of moveable substantially plane mirror 7046. In some embodiments, different types of light redirection devices are used in different optical chains.

In some embodiments, an optical chain corresponding to focal length f2 does not include a light redirection device and the image sensor of the optical chain is positioned to be able to capture light entering the lens of the optical chain without redirection via a light redirection device.

In various embodiments, f1>f2. In some such embodiments, f1=2f2.

In one exemplary embodiment, camera 7000 of FIG. 69 is camera 1250 of FIG. 12B, and optical chains (optical chain 1 7018, optical chain 2 7020, optical chain 3 7022, optical chain 4 7024, optical chain 5 7026) of FIG. 69 are optical chains (1202, 1210, 1212, 1224, 1220), respectively of camera 1250 of FIG. 12B.

Figure 70:
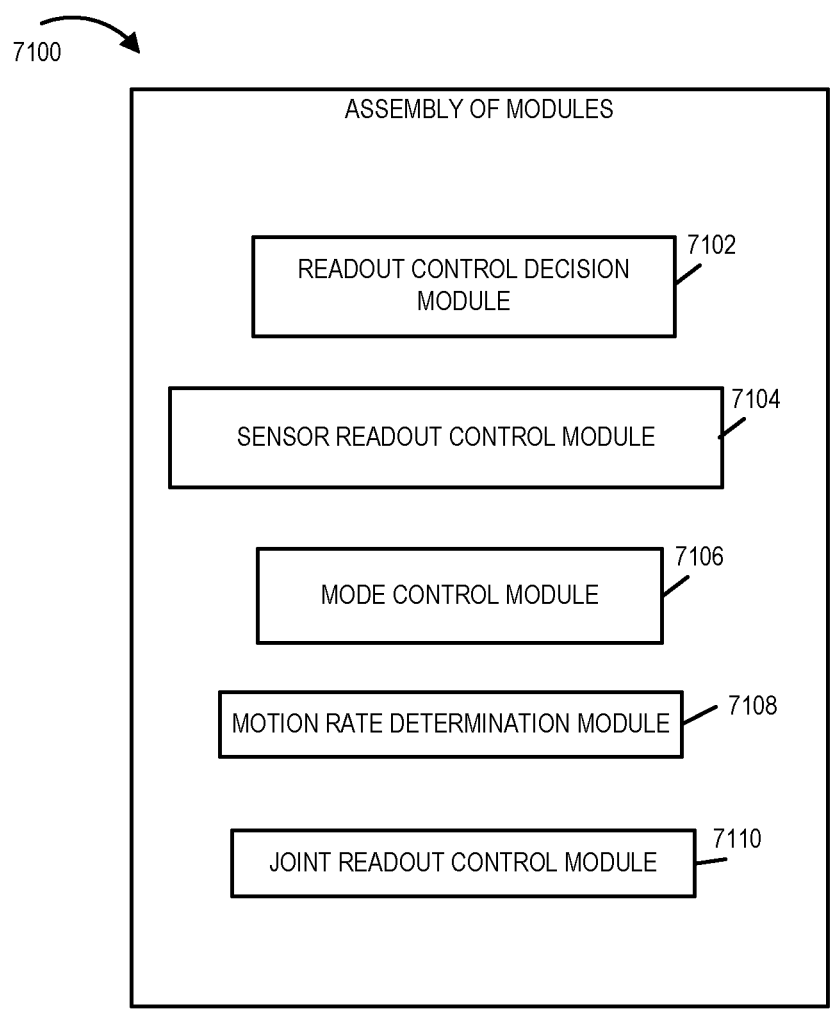
FIG. 70 is a drawing of an assembly of modules which may be included in an exemplary camera device in accordance with an exemplary embodiment.

FIG. 70 is a drawing of an assembly of modules 7100, which may be included in a camera device implemented in accordance with the present invention, e.g., camera device 7000 of FIG. 69. Assembly of modules 7100 may implement steps of a method, e.g., steps of the method of flowchart 6900 of FIG. 68. In some embodiments, assembly of modules 7100 is an assembly of circuits, which may be coupled together. In one exemplary embodiment, assembly of modules 7100 is assembly of modules 7006 of camera 7000 of FIG. 69. In some embodiments, the assembly of module 7100 is an assembly of software modules. In one exemplary embodiment, assembly of modules 7100 is assembly of modules 7014 of memory 7004 of camera 7000 of FIG. 69.

FIG. 70 illustrates an assembly of modules 7100 which can, and in some embodiments is, used in the camera 7000 illustrated in FIG. 69. The modules in the assembly of modules 7100 can, and in some embodiments are, implemented fully in hardware within the processor 7002, e.g., as individual circuits. The modules in the assembly of modules 7100 can, and in some embodiments are, implemented fully in hardware within the assembly of modules 7006, e.g., as individual circuits corresponding to the different modules. In other embodiments some of the modules are implemented, e.g., as circuits, within the processor 7002 with other modules being implemented, e.g., as circuits within assembly of modules 7006, external to and coupled to the processor. As should be appreciated the level of integration of modules on the processor and/or with some modules being external to the processor may be one of design choice.

Alternatively, rather than being implemented as circuits, all or some of the modules in assembly of modules 7100 may be implemented in software and stored in the memory 7004 of the camera 7000, with the modules controlling operation of camera 7000 to implement the functions corresponding to the modules when the modules are executed by a processor, e.g., processor 7002. In some such embodiments, the assembly of modules 7100 is included in the memory 7004 as assembly of modules 7014. In still other embodiments, various modules in assembly of modules 7100 are implemented as a combination of hardware and software, e.g., with another circuit external to the processor providing input to the processor 7002 which then under software control operates to perform a portion of a module's function. While shown in the FIG. 69 embodiment as a single processor, e.g., computer, it should be appreciated that the processor 7002 may be implemented as one or more processors, e.g., computers.

When implemented in software the modules include code, which when executed by the processor 7002, configure the processor 7002 to implement the function corresponding to the module. In embodiments where the assembly of modules 7100 is stored in the memory 7004, the memory 7004 is a computer program product comprising a computer readable medium comprising code, e.g., individual code for each module, for causing at least one computer, e.g., processor 7002, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 71 control and/or configure the camera 7000 or elements therein such as the processor 7002, to perform functions of the corresponding steps illustrated in the method flowchart 6900 of FIG. 68. Thus the assembly of modules 7100 includes various modules that perform functions of the corresponding steps of the method shown in FIG. 68.

FIG. 70 is an assembly of modules 7100 in accordance with various exemplary embodiments. Assembly of modules 7100 includes a readout control decision module 7102, a sensor readout control module 7104, a mode control module 7106, a motion rate determination module 7108 and a joint readout control module 7110.

In various embodiments, assembly of modules 7100 is included in a camera device, e.g. camera device 7000 of FIG. 69, including first optical chain, e.g., optical chain 1 7018, including a first sensor, e.g., sensor 7042, and having a first focal length, e.g., f2, and a second optical chain, e.g. optical chain 2 7020, including a second sensor, e.g., sensor 7048, and having a second focal length, e.g., f1, said first focal length being smaller than said second focal length.

Readout control decision module 7102 is configured to make a readout control decision, based on at least one of: i) user input or ii) a determined rate of motion, whether to control the second sensor of the second optical chain to perform joint readouts of pixel elements corresponding to consecutive pixel element rows of the second sensor or to perform individual read outs of consecutive rows of pixel elements of the second sensor.

Sensor readout control module 7104 is configured to: i) control the first sensor to readout pixel values of said first sensor; and ii) control the second sensor to readout pixel values of pixel elements of the second sensor in accordance with the readout control decision.

In various embodiments, the sensor readout control module 7104 is configured to control said second sensor to perform joint readouts of pixel elements corresponding to consecutive pixel element rows of the second sensor when said sensor control decision is a decision to control the second sensor to perform joint readouts of pixel elements corresponding to consecutive pixel element rows of the second sensor and to control the second sensor to perform individual read outs of consecutive rows of pixel elements of said second sensor when said sensor control decision is a decision to perform individual read outs of consecutive rows of pixel elements of said second sensor. In some such embodiments, said sensor readout control module 7104 controls the first and second sensors so that they readout rows of pixel values corresponding to the same portions of an image area of interest in a synchronized manner. In some embodiments, the first and second sensors correspond to overlapping image portions, and said sensor readout control module 7104 is configured to control the first and second sensors to readout pixel values corresponding to the same portion of the image area of interest in parallel.

In some embodiments, said sensor readout control module 7104 controls the second sensor to readout pixel values in parallel with the readout of at least some pixel values of said first sensor, as part of controlling the second sensor to readout pixel values.

In some embodiments, a user input interface, e.g., user input interface 7008 of camera 7000 of FIG. 69, is configured to receive user input indicating an automatic mode of operation, a high rate motion mode of operation or a high resolution mode of operation. Mode control module 7106 is configured to set the camera device in a mode of operation in response to received user input. In various embodiments, readout control decision module 7102 is configured to make said decision based on a rate of motion detected in images captured by said camera device when received user input indicates an automatic mode of operation.

Readout control decision module 7102, in some embodiments, is configured to: i) decide to perform joint readouts of pixel elements corresponding to consecutive pixel element rows of the second sensor when the rate of motion is above a first threshold; and ii) decide to perform individual read outs of consecutive rows of pixel elements of said second sensor when the rate of motion is below said first threshold.

Motion rate determination module 7108 is configured to determine said rate of motion from images sequentially captured by an optical chain of said camera device, e.g., prior to the readout control decision module 7102 making a decision. In various embodiments, motion rate determination module 7108 determines the rate of motion based on differences between an image captured during a first time period and an image captured during a second time period which follows said first time period.

In some embodiments, readout control decision module 7102 is configured to: i) decide to perform joint readouts of pixel elements corresponding to consecutive pixel element rows of the second sensor when the user input indicates selection of a high rate of motion mode of operation; and ii) decide to perform individual read outs of consecutive rows of pixel elements of said second sensor when the user input indicates selection of a high resolution motion mode of operation.

In various embodiments, the sensor readout control module 7104 is further configured to: control a third sensor, e.g., sensor 7058, corresponding to a third optical chain, e.g. optical chain 3 7022, having the same focal length as said second optical chain to perform joint readouts of pixel elements corresponding to consecutive pixel element rows when said decision is a decision to perform joint readouts of pixel elements corresponding to consecutive pixel element rows of the second sensor, said third sensor being controlled to jointly read out at least some rows of pixel values after the readout of said second sensor has been completed but prior to completion of the readout of the first sensor.

Joint readout control module 7110 is configured to control the number of rows of pixel elements to be read out in a joint read as a function of the ratio of the first focal length to the second focal length when said decision is a decision to perform joint readouts of pixel elements corresponding to consecutive pixel element rows of the second sensor.

In some embodiments, the sensor readout control module 7104 is further configured to: control the first sensor to readout pixel values of pixel elements of said first sensor at a rate which is a function of the ratio of the second focal length to the first focal length when said decision is a decision to perform individual read outs of consecutive rows of pixel elements of said second sensor. In some such embodiments, said sensor readout control module 7104 is further configured to: control the first sensor to read out rows of pixel values at a rate which is lower than the rate at which rows of pixel values are read out of the second sensor, as part of being configured to control the first sensor to readout pixel values of pixel elements of said first sensor at a rate which is based is a function of the ratio of the second focal length to the first focal length.

Figure 71:
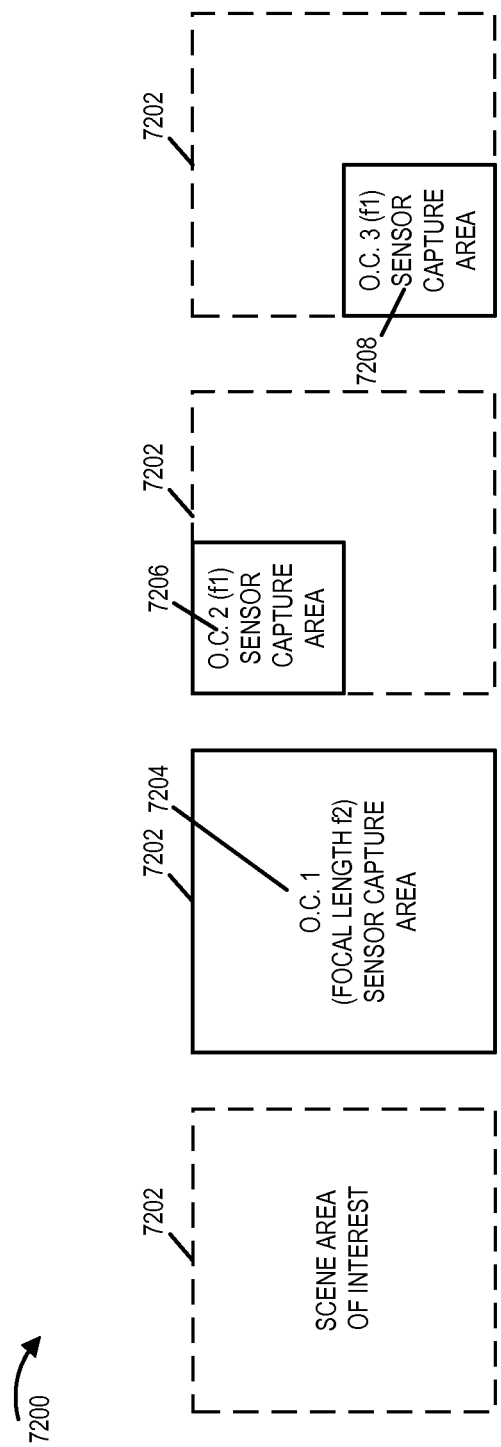
FIG. 71 is a drawing illustrating an exemplary scene of interest and exemplary capture areas corresponding to different optical chains in a camera device in accordance with an exemplary embodiment.

FIG. 71 is a drawing 7200 illustrating an exemplary scene of interest 7202 and exemplary capture areas corresponding to different optical chains in a camera device in accordance with an exemplary embodiment. Area 7204 represents a sensor capture area for the sensor of optical chain 1 with a focal length=f2. Area 7206 represents a sensor capture area for the sensor of optical chain 2 with a focal length=f1. Area 7028 represents a sensor capture area for the sensor of optical chain 3 with a focal length=f1. In one example, the camera device is camera device 7000 of FIG. 69, which implements a method in accordance with flowchart 6900 of FIG. 68 and includes the assembly of modules 7100 of FIG. 70.

Figure 72:
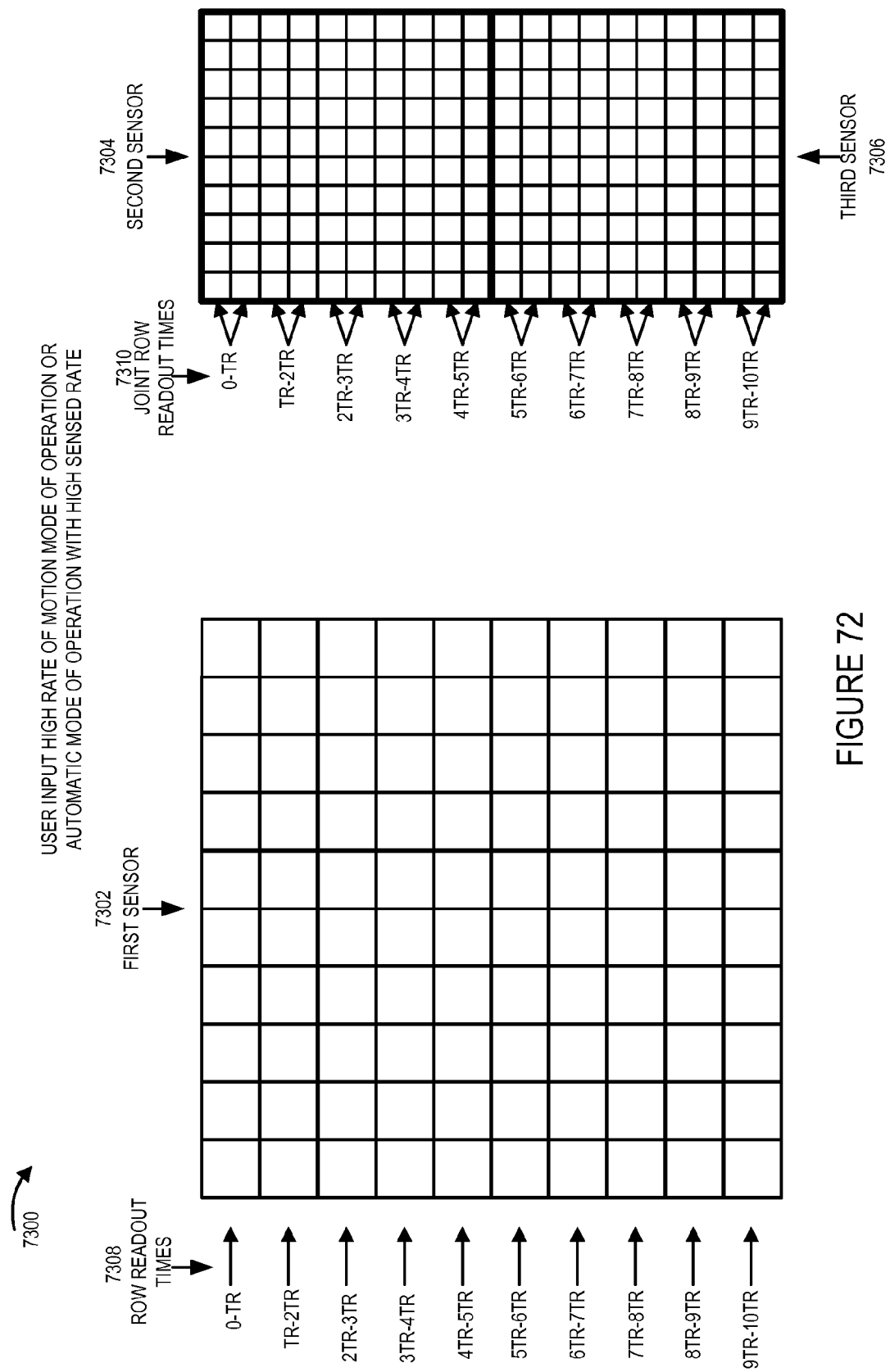
FIG. 72 is a drawing illustrating exemplary readout times for an example corresponding to user input high rate of motion mode of operation or automatic mode of operation with a high sensed rate.

FIG. 72 is a drawing 7300 illustrating exemplary readout times for an example corresponding to user input high rate of motion mode of operation or automatic mode of operation with a high sensed rate. First sensor 7302, which is included in optical chain 1 corresponds to capture area 7204 of FIG. 71. Second sensor 7304, which is included in optical chain 2 corresponds to capture area 7206 of FIG. 71. Third sensor 7306, which is included in optical chain 3 corresponds to capture area 7208 of FIG. 71. Column 7308 lists row readout times corresponding to each of the pixel element rows of first sensor 7302. Column 7310 lists joint row readout times corresponding to each of the pairs of consecutive pixel element rows of second sensor 7304 and third sensor 7306.

In this example, in order to achieve a fast read, e.g., to avoid or reduce blurring, joint readouts of pixel elements corresponding to consecutive pixel element rows of second and third sensors are performed. During time 0→TR, the first row of the first sensor is read out and a joint readout is performed for the first and second rows of the second sensor. During time TR→2TR, the second row of the first sensor is read out and a joint readout is performed for the third and fourth rows of the second sensor. During time 2TR→3TR, the third row of the first sensor is read out and a joint readout is performed for the fifth and sixth rows of the second sensor. During time 3TR→4TR, the fourth row of the first sensor is read out and a joint readout is performed for the seventh and eight rows of the second sensor. During time 4TR→5TR, the fifth row of the first sensor is read out and a joint readout is performed for the ninth and tenth rows of the second sensor. During time 5TR→6TR, the sixth row of the first sensor is read out and a joint readout is performed for the first and second rows of the third sensor. During time 6TR→7TR, the seventh row of the first sensor is read out and a joint readout is performed for the third and fourth rows of the third sensor. During time 7TR→8TR, the eighth row of the first sensor is read out and a joint readout is performed for the fifth and sixth rows of the third sensor. During time 8TR→9TR, the ninth row of the first sensor is read out and a joint readout is performed for the seventh and eight rows of the third sensor. During time 9TR→10TR, the tenth row of the first sensor is read out and a joint readout is performed for the ninth and tenth rows of the third sensor.

Figure 73:
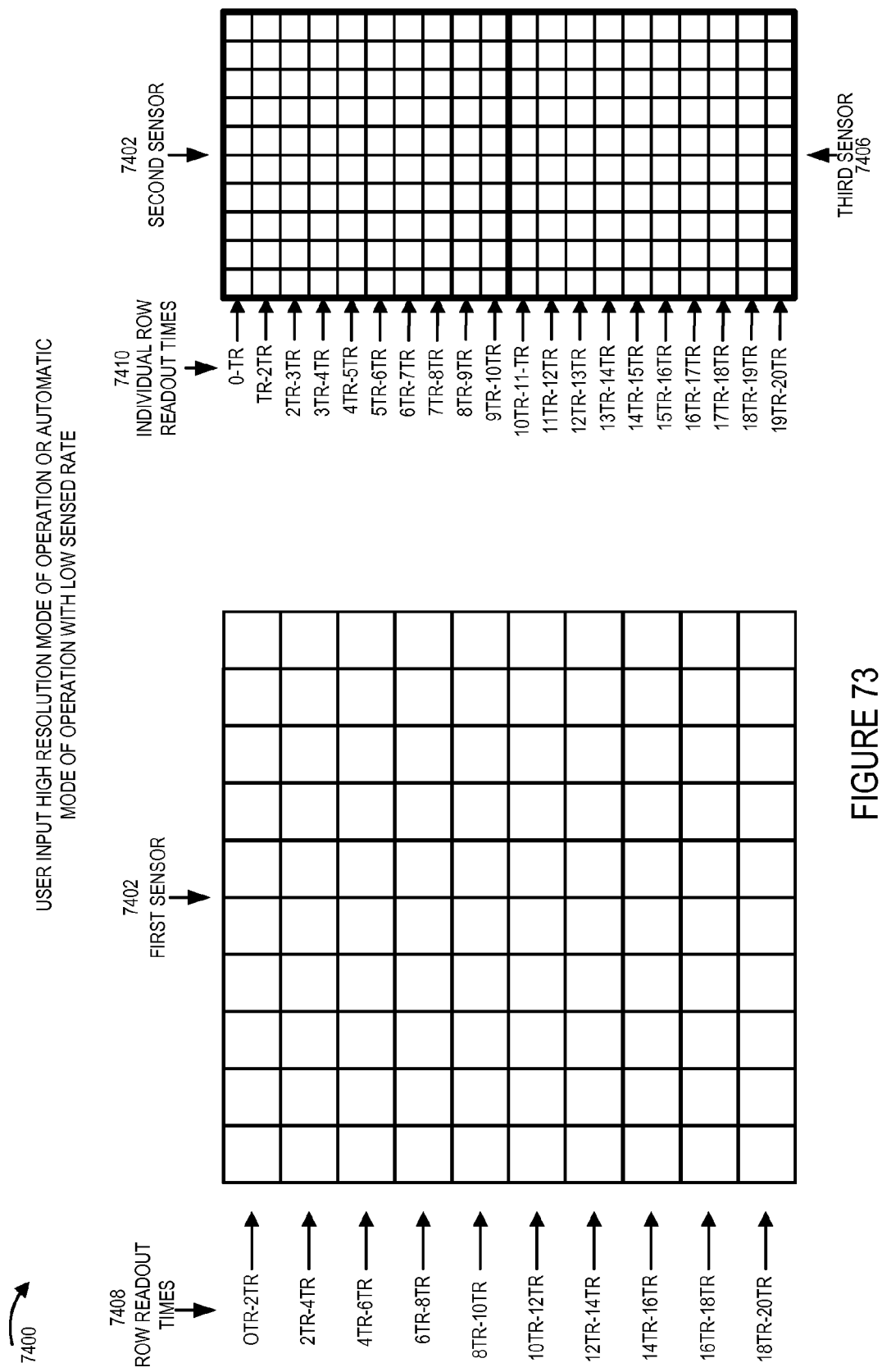
FIG. 73 is a drawing illustrating exemplary readout times for an example corresponding to user input high resolution mode of operation or automatic mode of operation with a low sensed rate.

FIG. 73 is a drawing 7400 illustrating exemplary readout times for an example corresponding to user input high resolution mode of operation or automatic mode of operation with a low sensed rate. First sensor 7402, which is included in optical chain 1 corresponds to capture area 7204 of FIG. 71. Second sensor 7404, which is included in optical chain 2 corresponds to capture area 7206 of FIG. 71. Third sensor 7406, which is included in optical chain 3 corresponds to capture area 7208 of FIG. 71. Column 7408 lists row readout times corresponding to each of the pixel element rows of first sensor 7402. Column 7410 lists individual row readout times corresponding to each of the pairs of consecutive pixel element rows of second sensor 7404 and third sensor 7406.

In this example, in order to achieve high resolution, individual readouts of pixel elements corresponding to pixel element rows of second and third sensors are performed. During time 0→2TR, the first row of the first sensor is read out; during the time 0→TR the first row of the second sensor is read out; and during the time 1TR→2TR the second row of the second sensor is read out. During time 2TR→4TR, the second row of the first sensor is read out; during the time 2TR→3TR the third row of the second sensor is read out; and during the time 3TR→4TR the fourth row of the second sensor is read out. During time 4TR→6TR, the third row of the first sensor is read out; during the time 4TR→5TR the fifth row of the second sensor is read out; and during the time 5TR→6TR the sixth row of the second sensor is read out. During time 6TR→8TR, the fourth row of the first sensor is read out; during the time 6TR→7TR the seventh row of the second sensor is read out; and during the time 7TR→8TR the eighth row of the second sensor is read out. During time 8TR→10TR, the fifth row of the first sensor is read out; during the time 8TR→9TR the ninth row of the second sensor is read out; and during the time 9TR→10TR the tenth row of the second sensor is read out. During time 10→12TR, the sixth row of the first sensor is read out; during the time 10→11TR the first row of the third sensor is read out; and during the time 11TR→12TR the second row of the third sensor is read out. During time 12TR→14TR, the seventh row of the first sensor is read out; during the time 12TR→13TR the third row of the third sensor is read out; and during the time 13TR→14TR the fourth row of the third sensor is read out. During time 14TR→16TR, the eighth row of the first sensor is read out; during the time 14TR→15TR the fifth row of the third sensor is read out; and during the time 15TR→16TR the sixth row of the third sensor is read out. During time 16TR→18TR, the ninth row of the first sensor is read out; during the time 16TR→17TR the seventh row of the third sensor is read out; and during the time 17TR→18TR the eighth row of the third sensor is read out. During time 18TR→20TR, the tenth row of the first sensor is read out; during the time 18TR→19TR the ninth row of the third sensor is read out; and during the time 19TR→20TR the tenth row of the third sensor is read out.

Note that the overall readout time for the example of FIG. 73 is twice as long as in the example of FIG. 72.

Various features are directed to methods and apparatus for reducing the thickness of a camera apparatus using one or more light redirection elements are described. In various embodiments, the path of light along the optical axis is redirected prior to reaching a sensor. In at least some embodiments, the path of light entering the front of a camera device along the optical axis is redirected so it travels at least partially, in a direction which extends parallel to the face of the camera. Accordingly, in at least some embodiments the length of the path of the light is not limited by the depth, e.g., front to back length, of the camera.

The use of a light redirection element, such as, for example, a mirror or prism, is useful in extending the length of the light path from the front most lens to the corresponding sensor, e.g., of an optical chain, e.g., camera module, in a camera which includes one or more camera modules. In some embodiments, round lenses, e.g., lenses with round apertures, are used as the outermost camera lenses and light redirection elements which have a depth comparable to the diameter of the outer most lens are used. In this manner the light received in what may be considered both the vertical and horizontal dimensions of the outer lens or lenses, assuming a camera is arranged vertically and the lens or lenses are mounted in a vertical plane corresponding to the front of a camera housing, can be redirected and captured without requiring the camera to be sufficiently deep to allow the optical chain to be arranged in a straight front to back configuration where the front outermost lens of the optical chain is positioned at the front of the camera and the sensor is positioned at the back of the camera directly behind the outermost lens of the optical chain.

In some embodiments, a camera is implemented using multiple optical chains, e.g., camera modules. In at least some such embodiments, redirection of light is implemented so that at least a portion of a camera module can take advantage of the left to right dimension, e.g., side to side dimension of a camera, or up to down dimension (height) thereby allowing a relatively long focal length to be supported in a relatively thin camera format. In one such embodiment camera modules with small focal lengths and corresponding small lenses are implemented in a straight front to back implementation while camera modules with larger focal length and larger lenses take advantage of light redirection, e.g., by 90 degrees in some embodiments, to allow a portion of the camera module with the higher focal length to be implemented in the sideways or up-down direction relative to the front of the camera.

While round lenses are used for camera modules in many embodiments, in at least some embodiments camera modules with long focal lengths are implemented using lenses with non-round, e.g., oval, elongated or other lens configurations which have apertures which are larger in one dimension than the other. In at least one such embodiment, the non-round lenses are used in combination with light redirection devices. As explained in the detailed description the use of non-round lenses in combination with one or more light redirection devices can be used to implement a camera module which is thinner than might be possible if a lens with a round aperture was used instead.

In at least some embodiments, a combination of camera modules some with round lenses and others with non-round lenses are used. The non-round lenses, e.g., lenses with apertures longer in one dimension of a plane than in another dimension of the same plane, are used for camera modules having a large focal length, e.g., a focal length equivalent to a 70 mm focal length of a full frame DSLR or greater in some embodiments, equivalent to a 150 mm focal length of a full frame DSLR or greater in some embodiments, equivalent to a 300 mm focal length of a full frame DSLR or greater in some embodiments. In at least some such embodiments, lenses with round apertures are used for camera modules with small focal lengths, e.g., an equivalent a focal length shorter than 70 mm full frame DSLR. Focal length of a lens (camera) is often stated as the equivalent focal length for a full frame DSLR camera where a DSLR camera is digital single-lens reflex camera. A lens or system such as an optical chain with an equivalent focal length of 35 mm will frame the same shot from the same location as a full frame DSLR camera with a 35 mm lens would frame. The actual focal length of the optical chain with an equivalent focal length of 35 mm may be significantly smaller because the sensor is typically much smaller than a full frame DSLR sensor. In general if the sensor is 5 times smaller in each dimension (25 times smaller area), an optical chain of 7 mm real focal length will have a focal length equivalent to 35 mm of a full frame DSLR.

While in various embodiments light redirection is used for camera modules with some focal lengths to allow for a thin camera implementation, some other camera modules with shorter, e.g., a focal length equivalent to a 35 mm full frame DSLR focal lengths, maybe and sometimes are implemented without the use of light redirection elements.

In some embodiments, to allow for camera thickness to be less than the maximum dimension of the outermost lens element of a camera module (which is along the horizontal direction in some embodiments) and corresponding aperture, a light redirection device, which is configured to support a bigger aperture in one direction, e.g., the horizontal direction than another direction, e.g., the vertical direction, is used in some embodiments. This light redirection device redirects light traveling towards the camera along the optical axis of the camera module to travel in a different direction, e.g., vertically, after redirection. This allows the depth of the light redirection device to be smaller than the maximum dimension of the aperture.

The use of a redirection element which supports a bigger aperture in one dimension (e.g., horizontal) than the other results in the capture of a two dimensional image with a higher quality, e.g., more captured higher frequency image content, in one dimension (e.g., horizontal) than the other. While such an image may be less desirable than a more uniform image where the same amount of optical information is captured in both the vertical and horizontal dimensions, the thinner camera width made possible by using a light redirection element which-supports an oblong aperture can be desirable because it allows the camera to be thinner than the longest length of the lens opening though which light enters the camera. Thus, in such an embodiment the thickness of the camera is not coupled or constrained by the maximum dimension of an oblong or non-circular lens opening (aperture).

The use of non-circular, e.g., oblong, oval or other non-circular, apertures can result in more high frequency image information being captured in one dimension, e.g., along the longer dimension of the non-circular lens, than in the other dimension. In various embodiments to make up for the difference in high frequency information in different directions resulting from a lens and/or effective aperture being narrower in one dimension than the other, multiple optical chains with different orientations of the higher resolution dimension are used. The optical chains with different orientations capture images with different directions (e.g., horizontal, vertical, slanted) of the highest resolution dimension in the image, where the camera is in a vertical orientation and the camera lenses are facing forward.

In one such embodiment, the images captured by the different optical chains are combined to form a combined or composite image. As should be appreciated by combining images with different amounts of high frequency information in different dimensions, e.g., captured by different optical chains at the same time, the combined image need not be constrained by the lower frequency information captured in one dimension by an optical chain with a non-round aperture stop. This is because the image captured by a different optical chain, e.g., an optical chain with an orientation allowing for capture of higher frequency information in the dimension where the other optical chain suffers, can be used to make up for the weakness of the image captured by the other optical chain. As an example if there are two optical chains both having non-round, e.g., oblong, apertures, the orientation of the first optical chain maybe such that the aperture of the first optical chain is larger in the horizontal dimension giving the image captured by the first optical chain a higher resolution in the horizontal direction, while the second optical chain orientation maybe such that it correspondingly captures images with a higher vertical resolution. The two images can, and in some embodiments are, combined into a single composite image that has the higher resolution in both vertical and horizontal directions.

Thus, by using multiple optical chains with non-round apertures but different orientations, and combining the images captured by such optical chains, a relatively thin camera can be implemented without the quality (sharpness) of the image being constrained by the use of a smaller round aperture the diameter of which would normally be limited by the camera depth.

In some embodiments non-round lenses are used as the outermost lens of multiple optical chains used to capture images in parallel which are then combined to form a combined image. The non-round lenses may be formed by cutting off portions of a round lens, e.g., left and right portions, to form an oblong lens. In other embodiments portions of round lenses are masked by an applied mask or a portion of the camera housing in which the lenses are mounted forming lenses with oblong apertures. In still other embodiments round outer lenses are used and the light redirecting device is of a size and shape such that not all the light passing through the round lenses will be redirected to the sensor. In such embodiments the light redirection device operates as the constraint on the optical light path and becomes the aperture stop, e.g., the point of light constraint, on the light being passed to the sensor. Thus, in various embodiments the oblong lens serves as the aperture stop with the oblong aperture being the point of constriction on the light path of the optical chain while in other embodiments the light redirection element servers as a constraint on the light path and the aperture stop in the optical chain with the effective aperture being oblong in shape despite the fact that the outer lens may have been round.

Methods and apparatus which use multiple optical chains to capture multiple images of an area at the same time are described. The multiple captured images may, and in some embodiments are then combined to form a combined image. The combined image in various embodiments is normally of higher quality than would be achieved using just a single one of the optical chains.

Various embodiments, provide many of the benefits associated with use of a large lens and/or large high quality sensor, through the use of multiple optical chains which can normally be implemented using smaller and/or lower cost components than commonly used with a high quality large lens single optical chain camera implementation.

In various embodiments an optical chain, e.g., camera module, includes a combination of elements including one or more lenses, a light redirection device and a sensor. The light redirection device is a light diverter and may take various forms, e.g., it may be a mirror or prism. The light redirection device may be hinged to allow the angle and thus direction in which an optical chain is pointing to be changed by moving the light redirection device.

In at least some embodiments images captured by different optical chains with non-round apertures having different orientations are combined. In some embodiments the images from two, three or more, e.g., six or more, optical chains with different orientations are combined to form a single combined image. While images from optical chains with different orientations are combined in some embodiments, it should be appreciated that images captured by more than one optical chain with the same orientation can be combined with one or more images captured by optical chains with a different orientation, e.g., relative to the bottom of the camera, e.g., the horizontal, for purposes of explanation. Thus, by combining images from different optical chains many advantages can be achieved allowing for multiple small lenses to be used and a relatively thin camera housing as compared to systems using a single large round lens.

In various embodiments the outer lens of the multiple optical chains are fixed and thus unlike many conventional zoom camera devices in such embodiments the outer lenses, i.e., the lenses on the face of the camera, do not move out of the camera body and are fixed with respect to the face of the camera even during zoom operations. The outermost lenses may, and in some embodiments do have zero or very little optical power and serve largely as a cover to keep dirt out of the optical chains to which the outer lens corresponds. The outer lens in such embodiments may be implemented using flat glass or plastic. In some embodiments a slideable cover is slide over the outer lenses when the camera is to be placed in storage and slide back when the camera device is to be used. FIG. 14 shows one such embodiment with the lenses being uncovered and the cover slide to a position in which the case which includes the lens cover can be used as a camera grip or handle.

In some embodiments while a portion of the outermost lens may extend from the front of the camera device beyond the surface of the camera device, the outermost lenses generally extend, if at all, a small amount which is less than the thickness of the camera. Thus even during use the lenses to not extend significantly beyond the face of the camera device in which the optical chains are mounted and normally less than half the thickness of the camera device at most.

In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

Different optical chain modules maybe and sometimes are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amount of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits to as modules alone or in combination with other hardware elements. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform one or more of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

What is claimed is:

1. A method of using a camera device, the method comprising:
   moving a first light redirection device, said first light redirection device being one of a substantially plane mirror or a prism, of a first optical chain of the camera device to a first position in accordance with an indicated zoom setting;
   capturing a first image of a first portion of a scene area of interest using said first optical chain while said first light redirection device is at said first position; and
   capturing, using a second optical chain of said camera device, a second image of a second portion of a scene area of interest, said second image being captured while said first light redirection device is at said first position, said first and second optical chains having different focal lengths.

2. The method of claim 1, wherein said first optical chain has a larger focal length than said second optical chain.

3. The method of claim 2, wherein said first light redirection device is a movable light redirection device and wherein said second optical chain does not include a movable light redirection device.

4. The method of claim 1, further comprising:
   moving a second light redirection device of a third optical chain of the camera device to a second light redirection device position in accordance with the indicated zoom setting;
   moving a third light redirection device of a fourth optical chain of the camera device to a third light redirection device position in accordance with the indicated zoom setting;
   moving a fourth light redirection device of a fifth optical chain of the camera device to a fourth light redirection device position in accordance with the indicated zoom setting;
   capturing a third image of a third portion of the scene area of interest using said third optical chain while said first light redirection device is at said first position;
   capturing a fourth image of a fourth portion of the scene area of interest using said fourth optical chain while said first light redirection device is at said first position; and
   capturing a fifth image of a fifth portion of the scene area of interest using said fifth optical chain while said first light redirection device is at said first position.

5. The method of claim 4, further comprising:
   combining the first, second, third, fourth and fifth images to generate a composite image corresponding to the indicated zoom setting.

6. The method of claim 5, further comprising:
   storing in memory information mapping zoom settings to light redirection device positions.

7. The method of claim 5, further comprising:
   computing light redirection device positions based on the indicated zoom setting prior to moving the first light redirection device in accordance with the indicated zoom setting.

8. The method of claim 7, further comprising:
   receiving user input indicating said zoom setting.

9. A camera device comprising:
   a first optical chain including a first light redirection device, said first light redirection device being one of a substantially plane mirror or a prism;
   a second optical chain;
   a light redirection device positioning control module configured to control the first light redirection device to move to a first position in accordance with an indicated zoom setting; and
   an image capture control module configured to control the first optical chain to capture a first image of a first portion of a scene area of interest while said first light redirection device is at said first position and control the second optical chain to capture a second image of a second portion of a scene area of interest, said second image being captured while said first light redirection device is at said first position, said first and second optical chains having different focal lengths.

10. The camera device of claim 9, wherein said first optical chain has a larger focal length than said second optical chain.

11. The camera device of claim 10, wherein said first light redirection device is a movable light redirection device and wherein said second optical chain does not include a movable light redirection device.

12. The camera device of claim 9, further comprising:
   a third optical chain including a second light redirection device;
   a fourth optical chain including a third light redirection device;
   a fifth optical chain including a fourth light redirection device; and
   wherein said light redirection device positioning control module is further configured to:
      move the second light redirection device of the third optical chain to a second position in accordance with the indicated zoom setting;
      move the third light redirection device of the fourth optical chain to a third position in accordance with the indicated zoom setting;
      moving the fourth light redirection device of the fifth optical chain to a fourth position in accordance with the indicated zoom setting; and
   wherein said image capture control module is further configured to:
      control the third optical chain to capture a third image of a third portion of the scene area of interest while said first light redirection device is at said first position;
      control the fourth optical chain to capture a fourth image of a fourth portion of the scene area of interest while said first light redirection device is at said first position; and control the fifth optical chain to capture a fifth image of a fifth portion of the scene area of interest while said first light redirection device is at said first position.

13. The camera device of claim 12, further comprising:
a composite image generation module configured to combine the first, second, third, fourth and fifth images to generate a composite image corresponding to the indicated zoom setting.

14. The camera device of claim 13, further comprising:
memory including stored information mapping zoom settings to light redirection device positions.

15. The camera device of claim 13, further comprising:
a light redirection device position computation module configured to compute light redirection device positions based on the indicated zoom setting prior to moving the first light redirection device in accordance with the indicated zoom setting.

16. A non-transitory machine readable medium including machine executable instructions which when executed by a processor of a camera device control said camera device to:
move a first light redirection device, said first light redirection device being one of a substantially plane mirror or a prism, of a first optical chain of a camera device to a first position in accordance with an indicated zoom setting;
capture a first image of a first portion of a scene area of interest using said first optical chain while said first light redirection device is at said first position; and
capture, using a second optical chain of said camera device, a second image of a second portion of a scene area of interest, said second image being captured while said first light redirection device is at said first position, said first and second optical chains having different focal lengths.

* * * * *